US010513657B2

(12) United States Patent
Archetti et al.

(10) Patent No.: US 10,513,657 B2
(45) **Date of Patent: *Dec. 24, 2019**

(54) LIQUID-CRYSTALLINE MEDIA HAVING HOMEOTROPIC ALIGNMENT

(71) Applicant: Merck Patent GmbH, Darmstadt (DE)

(72) Inventors: Graziano Archetti, Darmstadt (DE); Izumi Saito, Darmstadt (DE); Rocco Fortte, Frankfurt am Main (DE); Thorsten Kodek, Moerfelden-Walldorf (DE)

(73) Assignee: Merck Patent GmbH, Darmstadt (DE)

( * ) Notice: Subject to any disclaimer, the term of this patent is extended or adjusted under 35 U.S.C. 154(b) by 60 days.

This patent is subject to a terminal disclaimer.

(21) Appl. No.: 15/803,156

(22) Filed: Nov. 3, 2017

(65) Prior Publication Data

US 2018/0057743 A1 Mar. 1, 2018

Related U.S. Application Data

(63) Continuation of application No. 14/643,147, filed on Mar. 10, 2015, now Pat. No. 9,809,748.

(30) Foreign Application Priority Data

Mar. 10, 2014 (EP) .................................... 14000831
Nov. 24, 2014 (EP) .................................... 14003943

(51) Int. Cl.

| | |
|---|---|
| ***G02F 1/1333*** | (2006.01) |
| ***C09K 19/34*** | (2006.01) |
| ***C09K 19/38*** | (2006.01) |
| ***C09K 19/30*** | (2006.01) |
| ***C09K 19/56*** | (2006.01) |
| ***G02F 1/1337*** | (2006.01) |
| ***G02F 1/1343*** | (2006.01) |
| ***G02F 1/1341*** | (2006.01) |
| ***C09K 19/04*** | (2006.01) |
| ***C09K 19/14*** | (2006.01) |
| *C09K 19/12* | (2006.01) |

(52) U.S. Cl.

CPC .......... *C09K 19/3402* (2013.01); *C09K 19/04* (2013.01); *C09K 19/14* (2013.01); *C09K 19/3003* (2013.01); *C09K 19/3068* (2013.01); *C09K 19/3852* (2013.01); *C09K 19/56* (2013.01); *G02F 1/1337* (2013.01); *G02F 1/1341* (2013.01); *G02F 1/133788* (2013.01); *G02F 1/134363* (2013.01); *C09K 2019/0425* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/304* (2013.01); *C09K 2019/3009* (2013.01); *C09K 2019/3016* (2013.01); *C09K 2019/3027* (2013.01); *C09K 2019/3078* (2013.01); *C09K 2019/3422* (2013.01); *G02F 2001/133742* (2013.01)

(58) Field of Classification Search

CPC .... C09K 19/3402; C09K 19/04; C09K 19/14; C09K 19/3003; C09K 19/3068; C09K 19/3852; C09K 19/56; C09K 2019/0448; C09K 2019/122; C09K 2019/123; C09K 2019/3004; C09K 2019/3009; C09K 2019/301; C09K 2019/3016; C09K 2019/3027; C09K 2019/304; C09K 2019/3078; C09K 2019/3422; G02F 1/1337; G02F 1/1333; G02F 1/133788; G02F 1/1341; G02F 1/134363; G02F 2001/133742

USPC ....................................................... 252/299.6

See application file for complete search history.

(56) References Cited

U.S. PATENT DOCUMENTS

| | | | |
|---|---|---|---|
| 3,972,589 | A | 8/1976 | Skelly et al. |
| 4,482,472 | A | 11/1984 | Neil |
| 4,564,694 | A | 1/1986 | Yoichi |
| 4,620,938 | A | 11/1986 | Romer et al. |
| 5,484,552 | A | 1/1996 | Wartenberg et al. |
| 5,698,134 | A | 12/1997 | Jubb et al. |
| 5,737,051 | A | 4/1998 | Kondo et al. |
| 5,910,271 | A | 6/1999 | Ohe et al. |
| 5,961,881 | A | 10/1999 | Andou et al. |
| 5,993,691 | A | 11/1999 | Pausch et al. |
| 6,007,740 | A | 12/1999 | Andou et al. |
| 6,011,606 | A | 1/2000 | Ohe et al. |
| 6,027,665 | A | 2/2000 | Pausch et al. |
| 6,124,915 | A | 9/2000 | Kondo et al. |

(Continued)

FOREIGN PATENT DOCUMENTS

| | | |
|---|---|---|
| CN | 102660299 A | 9/2012 |
| CN | 103119128 A | 5/2013 |

(Continued)

OTHER PUBLICATIONS

Search report in corresponding TW application No. 104107659 dated Aug. 23, 2018 (pp. 1-6).

(Continued)

*Primary Examiner* — Geraldina Visconti
(74) *Attorney, Agent, or Firm* — Millen White Zelano & Branigan, PC

(57) ABSTRACT

The present invention relates to liquid-crystalline media (LC media) having negative or positive dielectric anisotropy, comprising a low-molecular-weight component and a polymerizable component. The polymerizable component comprises self-aligning, polymerizable mesogens (polymerizable self-alignment additives) which effect homeotropic (vertical) alignment of the LC media at a surface or the cell walls of a liquid-crystal display (LC display). The invention therefore also encompasses LC displays having homeotropic alignment of the LC medium without alignment layers. The invention discloses novel structures for self-alignment additives which have a certain position of the functional groups.

58 Claims, No Drawings

(56) References Cited

U.S. PATENT DOCUMENTS

| | | | |
|---|---|---|---|
| 6,139,925 | A | 10/2000 | Darius et al. |
| 6,146,720 | A | 11/2000 | Pausch et al. |
| 6,177,972 | B1 | 1/2001 | Held et al. |
| 6,187,223 | B1 | 2/2001 | Andou et al. |
| 6,341,004 | B1 | 1/2002 | Kondo et al. |
| 6,444,278 | B1 | 9/2002 | Volker |
| 6,724,455 | B2 | 4/2004 | Kondo et al. |
| 6,861,107 | B2 | 3/2005 | Klasen-Memmer et al. |
| 6,899,823 | B2 | 5/2005 | Sato et al. |
| 6,903,796 | B2 | 6/2005 | Kataoka |
| 7,169,449 | B2 | 1/2007 | Nakanishi et al. |
| 7,731,865 | B2 | 6/2010 | Bematz et al. |
| 7,740,769 | B2 | 6/2010 | Sasada |
| 8,114,310 | B2 | 2/2012 | Bernatz et al. |
| 8,585,925 | B2 | 11/2013 | Czanta et al. |
| 8,778,466 | B2 | 7/2014 | Georg |
| 9,234,136 | B2 | 1/2016 | Archetti |
| 9,809,748 | B2 * | 11/2017 | Archetti ............. C09K 19/3402 |
| 9,868,904 | B2 | 1/2018 | Graziano |
| 2002/0021401 | A1 | 2/2002 | Kataoka |
| 2002/0039162 | A1 | 4/2002 | Ohe et al. |
| 2002/0063822 | A1 | 5/2002 | Kondo et al. |
| 2002/0084444 | A1 | 7/2002 | Darius et al. |
| 2004/0011996 | A1 | 1/2004 | Klasen-Memmer et al. |
| 2004/0113119 | A1 | 6/2004 | Iftime et al. |
| 2004/0189923 | A1 | 9/2004 | Kondo et al. |
| 2004/0191428 | A1 | 9/2004 | Tsuda et al. |
| 2005/0092965 | A1 | 5/2005 | Ishizaki et al. |
| 2006/0066793 | A1 | 3/2006 | Ohmuro et al. |
| 2006/0103804 | A1 | 5/2006 | Hirosawa |
| 2006/0182897 | A1 | 8/2006 | Saito et al. |
| 2006/0198967 | A1 | 9/2006 | Saito et al. |
| 2008/0090026 | A1 | 4/2008 | Bernatz et al. |
| 2008/0180608 | A1 | 7/2008 | Ishizaki et al. |
| 2009/0103011 | A1 | 4/2009 | Bernatz |
| 2012/0032112 | A1 | 2/2012 | Czanta et al. |
| 2013/0182202 | A1 | 7/2013 | Graziano et al. |
| 2013/0277609 | A1 | 10/2013 | Goto |
| 2013/0287970 | A1 | 10/2013 | Zhong et al. |
| 2013/0314655 | A1 | 11/2013 | Archetti et al. |
| 2014/0138581 | A1 | 5/2014 | Archetti et al. |
| 2015/0301368 | A1 | 10/2015 | Archetti |

FOREIGN PATENT DOCUMENTS

| | | | |
|---|---|---|---|
| CN | 103619993 | A | 3/2014 |
| DE | 4000451 | A1 | 7/1991 |
| DE | 19528106 | A1 | 8/1996 |
| DE | 19509410 | A1 | 9/1996 |
| DE | 19528107 | A1 | 9/1996 |
| DE | 19539141 | A1 | 4/1997 |
| DE | 10117224 | A | 2/2002 |
| DE | 10117224 | A1 | 2/2002 |
| DE | 102011108708 | A1 | 3/2012 |
| EP | 0588568 | A2 | 3/1994 |
| EP | 0667555 | A1 | 8/1995 |
| EP | 0673986 | A2 | 9/1995 |
| EP | 1170626 | A2 | 1/2002 |
| EP | 1378557 | A1 | 1/2004 |
| EP | 1911828 | A | 4/2008 |
| FR | 2204002 | | 5/1974 |
| JP | 1975035076 | | 4/1975 |
| JP | 1982-140737 | A | 8/1982 |
| JP | 1983-041827 | A | 3/1983 |
| JP | 06-263691 | A | 9/1994 |
| JP | 7-181439 | A | 7/1995 |
| JP | 1997-124529 | A | 5/1997 |
| JP | 10-36847 | A | 2/1998 |
| JP | 10204016 | A | 8/1998 |
| JP | 1999-302652 | A | 11/1999 |
| JP | 2000327924 | A | 11/2000 |
| JP | 2002356515 | A | 12/2002 |
| JP | 2003253265 | A | 9/2003 |
| JP | 2004-323729 | A | 11/2004 |
| JP | 2005002164 | A | 1/2005 |
| JP | 2007217288 | A | 8/2007 |
| JP | 2008-116931 | A | 5/2008 |
| JP | 2008164925 | A | 7/2008 |
| JP | 2009102639 | A | 5/2009 |
| JP | 2010-170090 | A | 8/2010 |
| WO | 96/23851 | A1 | 8/1996 |
| WO | 96/28521 | A1 | 9/1996 |
| WO | 2010/089092 | A1 | 8/2010 |
| WO | 2012/038026 | A1 | 3/2012 |
| WO | 2013/004372 | A1 | 1/2013 |
| WO | 2014094959 | A1 | 6/2014 |

OTHER PUBLICATIONS

English Abstract of DE 4000451 A1 published Jul. 11, 1991.
English Abstract of JPH 07-181439 A published Jul. 21, 1995.
English Abstract of DE 19528107 A1 published Sep. 19, 1996.
English Abstract of JPH 10-36847 A published Feb. 10, 1998.
European Search Report dated Aug. 27, 2015 issued in corresponding EP 15000445 application (pp. 1-6).
English machine translation of JP2005002164A published Jan. 6, 2005 to Dainippon ink.
English machine translation of JP2003253265A published Sep. 10, 2003 to Dainippon ink.
English bibliographic abstract information for JP1975035076 published Apr. 3, 1975 (assignee unknown).
EPO third party observations in EP2619284 dated Jan. 26, 2016.
JP third party observations in JP 2013-529564 dated Mar. 31, 2016.
JP 2013-529564; dated Jul. 28, 2015; Office Action.
English Translation of JP 2013-529564; dated Jul. 28, 2015; Office Action.
JP2010-170090; published Aug. 5, 2010 to LG Display (Machine Translation ).
DE10117224A1; Stabilization of halogen-containing compounds, especially liquid crystal compounds, by addition of a 4-substituted 2,6-di-tertiary butyl-phenol, itself having liquid crystal-type units , Publication date Feb. 21, 2002 (Machine Translation).
Matsushita Electric Ind Co Ltd., "Liquid crystal screen with room temp nematic props contg substd phenyl alkoxy benzoate(s), for use in electro-optical equipment," Thomson Innovation Record View, Publication Date: May 17, 1974; English Abstract of FR-2204 002.
Merck Patent GmbH, "Stabilization of halogen-containing compounds, especially liquid crystal compounds, by addition of a 4-substituted 2,6-di-tertiary butyl-phenol, itself having liquid crystal-type units," Espacenet, Publication Date: Feb. 21, 2002; English Abstract of DE-101 17 224.
Merck Patent GmbH, "Liquid-crystal mixture used in the adjustment of the resistance of liquid crystal compositions," Espacenet, Publication Date: Aug. 5, 1999; English Abstract of DE-199 03 746.
Jankowiak et. al. A new series of nematic and smectic liquid crystals with negative dielectric anisotropy: the effect of terminal chain substitution on thermal and electro-optical proerties Liquid Crystals, vol. 35, No. 1, pp. 65-67, 2008.
CAPLUS-1998-208510.
Office Action in corresponding JP2016-046649 dispatched May 15, 2019 (pp. 1-9).

* cited by examiner

LIQUID-CRYSTALLINE MEDIA HAVING HOMEOTROPIC ALIGNMENT

This application is a continuation of Ser. No. 14/643,147 (now U.S. Pat. No. 9,809,748), filed Mar. 10, 2015.

The present invention relates to liquid-crystalline media (LC media) having negative or positive dielectric anisotropy, comprising a low-molecular-weight component and a polymer sable component. The polymer sable component comprises self-aligning, polymer sable mesogens (polymerizable self-alignment additives) which effect homeotropic (vertical) alignment of the LC media at a surface or the cell walls of a liquid-crystal display (LC display). The invention therefore also encompasses LC displays having homeotropic alignment of the liquid-crystalline medium (LC medium) without alignment layers. The invention discloses novel structures for polymerizable self-alignment additives which have a certain position of the functional groups.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants K3/K1, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New Stateof-the-Art for LCD-TV", SID 2004 International Symposium, Digest of Technical Papers, XXXV, Book II, pp. 760 to 763), and ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Considerable effort is associated with the production of VA displays having two or more domains of different preferential direction. It is an aim of this invention to simplify the production processes and the display devices themselves without giving up the advantages of VA technology, such as relatively short response times and good viewing-angle dependence.

VA displays which comprise LC media having positive dielectric anisotropy are described in S. H. Lee et al. *Appl. Phys. Lett.* (1997), 71, 2851-2853. These displays use interdigital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. *J. Appl. Phys.* (2008), 104, 084515 (DSIPS: 'double-side in-plane switching' for improvements of driver voltage and transmission), M. Jiao et al. *App. Phys. Lett* (2008), 92, 111101 (DFFS: 'dual fringe field switching' for improved response times) and Y. T. Kim et al. *Jap. J. App. Phys.* (2009), 48, 110205 (VAS: 'viewing angle switchable' LCD).

In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA-IPS technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display.

Owing to possible interactions of this type, the number of suitable liquid-crystal components is considerably reduced. It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development is the so-called PS (polymer sustained) or PSA (polymer sustained alignment) displays, for which the term "polymer stabilized" is also occasionally used. The PSA displays are distinguished by the shortening of the response times without significant adverse effects on other parameters, such as, in particular, the favorable viewing-angle dependence of the contrast.

In these displays, a small amount (for example 0.3% by weight, typically <1% by weight) of one or more polymerizable compound(s) is added to the LC medium and, after introduction into the LC cell, is polymerized or crosslinked in situ, usually by UV photopolymerization, between the electrodes with or without an applied electrical voltage. The addition of polymerizable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSATN displays are known. The polymerization of the polymerizable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilized so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. (2006), 45, 2702-2704 and S. H. Kim, L.-C-Chien, Jpn. J. Appl. Phys. (2004), 43, 7643-7647. PSA-IPS displays are described, for example, in U.S. Pat. No. 6,177,972 and Appl. Phys. Lett. (1999), 75(21), 3264. PSA-TN displays are described, for example, in Optics Express (2004), 12(7), 1221. PSA-VA-IPS displays are disclosed, for example, in WO 2010/089092 A1.

Like the conventional LC displays described above, PSA displays can be operated as active-matrix or passive-matrix (PM) displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimization of the response times, but also of the contrast and luminance (i.e. also transmission), of the LC display is still sought after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerizable compounds of the following formula, for example, are used for PSA-VA:

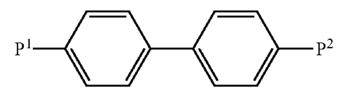

in which P denotes a polymerizable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimize the image quality (viewing-angle dependence, contrast, response times) would therefore be desirable.

The specification WO 2012/038026 A1 describes self-aligning mesogens (non-polymerizable, conventional self-alignment additives) containing a hydroxyl group which is located on a mesogenic basic structure comprising two or more rings. The structures disclosed therein do not contain a polymerizable group arranged in accordance with the invention.

However, the existing approaches for obtaining VA display applications without polyimide layer are not yet entirely satisfactory.

The present invention relates to an LC medium comprising a low-molecular-weight, non-polymerizable liquid-crystalline component and a polymerizable or polymerized component comprising one or more compounds of the formula I, where the polymerized component is obtainable by polymerization of the polymerizable component, $$R^1\text{-}[A^3\text{-}Z^3]_m\text{-}[A^2]_k\text{-}[Z^2]_n\text{-}A^1\text{-}R^a \qquad (I)$$

in which $A^1$, $A^2$, $A^3$ each, independently of one another, denote an aromatic, heteroaromatic, alicyclic or heterocyclic group, which may also contain fused rings, and which may also be mono- or polysubstituted by a group L or -Sp-P, L in each case, independently of one another, denotes H, F, Cl, Br, I, —CN, —$NO_2$, —NCO, —NCS, —OCN, —SCN, —C(=O)N($R^0$)$_2$, —C(=O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F or Cl, P denotes a polymerizable group, Sp denotes a spacer group (also called spacer) or a single bond, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, —$(CR^0R^{00})_{n1}$—, —CH(-Sp-P)—, —$CH_2$CH(-Sp-P)—, or —CH(-Sp-P)CH(-Sp-P)—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, —$(CR^0R^{00})_{n1}$—, —CH(-Sp-P)—, —$CH_2$CH(-Sp-P)—, or —CH(-Sp-P)CH(-Sp-P)—, n1 denotes 1, 2, 3 or 4, n denotes 0 or 1, m denotes 0, 1, 2, 3, 4, 5 or 6, preferably 0, 1, 2 or 3, k denotes 0 or 1, $R^0$ in each case, independently of one another, denotes alkyl having 1 to 12 C atoms, $R^{00}$ in each case, independently of one another, denotes H or alkyl having 1 to 12 C atoms, $R^1$, independently of one another, denotes H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, $R^a$ denotes an anchor group of the formula

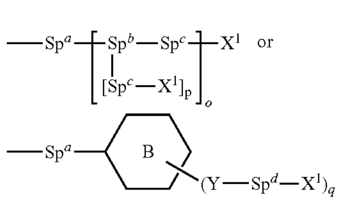

p denotes 1 or 2, q denotes 2 or 3,

B denotes a substituted or unsubstituted ring system or condensed ring system, preferably a ring system selected from benzene, pyridine, cyclohexane, dioxane or tetrahydropyran, Y, independently of one another, denotes —O—, —S—, —C(O)—, —C(O)O—, —OC(O)—, —$NR^{11}$— or a single bond, o denotes 0 or 1, $X^1$, independently of one another, denotes H, alkyl, fluoroalkyl, OH, $NH_2$, $NHR^{11}$, $NR^{11}_2$, $OR^{11}$, C(O)OH, or —CHO, where at least one group $X^1$ denotes a radical selected from —OH, —$NH_2$, $NHR^{11}$, C(O)OH and —CHO, $R^{11}$ denotes alkyl having 1 to 12 C atoms, $Sp^a$, $Sp^c$, $Sp^d$ each, independently of one another, denote a spacer group or a single bond, $Sp^b$ denotes a tri- or tetravalent group, preferably CH, N or C, where the compound of the formula I contains at least one polymerizable group P within the groups $A^1$, $A^2$, $A^3$, $Z^2$ and $Z^3$, as are present.

The polymerizable or polymerized component of the LC medium optionally comprises further polymerizable compounds. Use is preferably made of those which are suitable for the PSA principle.

The invention furthermore relates to an LC display comprising an LC cell having two substrates and at least two electrodes, where at least one substrate is transparent to light and at least one substrate has one or two electrodes, and a layer of an LC medium according to the invention located between the substrates. The LC display is preferably one of the PSA type.

The invention furthermore relates to novel compounds of the formula I, as disclosed above and below, which are characterized in that they have two or more rings, for example, compounds of the formula I in which k=1.

The invention furthermore relates to the use of compounds of the formula I as additive for LC media for effecting homeotropic alignment with respect to a surface delimiting the LC medium.

A further aspect of the present invention is a process for the preparation of an LC medium according to the invention, which is characterized in that one or more polymerizable self-alignment additives (compounds of the formula I) are mixed with a low-molecular-weight, liquid-crystalline component, and optionally one or more polymerizable compounds and optionally a further, non-polymerizable self-alignment additive (for example of the formula I') and/or any desired additives are added.

The invention furthermore relates to a process for the production of an LC display comprising an LC cell having two substrates and at least two electrodes, where at least one substrate is transparent to light and at least one substrate has one or two electrodes, comprising the process steps:

filling of the cell with an LC medium according to the invention, where homeotropic (vertical) alignment of the LC medium with respect to the substrate surfaces becomes established, and polymerization of the polymerizable component(s), optionally with application of a voltage to the cell or under the action of an electric field, in one or more process steps.

The use according to the invention of the self-alignment additives as additives of LC media is not tied to particular LC media. The LC medium or the non-polymerizable component present therein can have positive or negative dielectric anisotropy. The LC medium is preferably nematic, since most displays based on the VA principle comprise nematic LC media.

The polymerizable self-alignment additive is introduced into the LC medium as additive. It effects homeotropic alignment of the liquid crystal with respect to the substrate surfaces (such as, for example, a surface made from glass or coated with ITO or with polyimide). In view of the investigations in connection with this invention, it appears that the polar anchor group interacts with the substrate surface. This causes the organic compounds on the substrate surface to align and induce homeotropic alignment of the liquid crystal. In this view, the anchor group should be sterically accessible, i.e. not, as in the case of a phenolic (phenyl-substituted) OH group, surrounded by tert-butyl groups in the ortho position, as is the case, for example, in 2,6-di-tert-butylphenol, i.e. compounds containing a head group of the formula

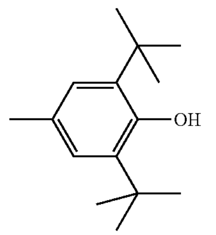 [SMILES: Cc1cc(C(C)(C)C)c(O)c(C(C)(C)C)c1]

are preferably not encompassed in formula I and the sub-formulae.

The LC cell of the LC display according to the invention preferably has no alignment layer, in particular no polyimide layer for homeotropic alignment of the LC medium. The polymerized component of the LC medium is in this connection not regarded as an alignment layer. In the case where an LC cell nevertheless has an alignment layer or a comparable layer, this layer is, in accordance with the invention, not the cause of the homeotropic alignment. Rubbing of, for example, polyimide layers is, in accordance with the invention, not necessary in order to achieve homeotropic alignment of the LC medium with respect to the substrate surface. The LC display according to the invention is preferably a VA display comprising an LC medium having negative dielectric anisotropy and electrodes arranged on opposite substrates. Alternatively, it is a VA-IPS display comprising an LC medium having positive dielectric anisotropy and interdigital electrodes arranged at least on one substrate.

The polymerizable self-alignment additive of the formula I is preferably employed in a concentration of less than 10% by weight, particularly preferably <5% by weight and very particularly <3% by weight. It is preferably employed in a concentration of at least 0.05% by weight, preferably at least 0.2% by weight. The use of 0.1 to 2.5% by weight of the self-alignment additive generally already results in completely homeotropic alignment of the LC layer in the case of the usual cell thicknesses (3 to 4 μm) with the conventional substrate materials and under the conventional conditions of the production processes of an LC display. Due to the polymerizable nature, higher concentrations of self-alignment additives are also possible without influencing the LC medium in the long term, since the polymerizable substance is bound again by the polymerization.

Besides the polymerizable self-alignment additives of the formula I, the LC medium according to the invention may also comprise further self-alignment additives which are not polymerizable or have a different structure. In a preferred embodiment, the LC medium therefore comprises one or more self-alignment additives without a polymerizable group (conventional self-alignment additives). The concentration of the polymerizable and conventional self-alignment additives together is preferably the values indicated above, i.e., for example, 0.1 to 2.5% by weight. With a combination of self-alignment additives with and without a polymerizable group, the additional advantage is achieved that the self-alignment of the LC medium becomes more stable to the influence of stress (increased processability).

The further, non-polymerizable self-alignment additives can have a structure of the formula I':

$$R^1\text{-}[A^3\text{-}Z^3]_m\text{-}[A^2]_k\text{-}[Z^2]_n\text{-}A^1\text{-}R^a \qquad \text{I'}$$

in which m, k, n and the group $R^a$ are as defined for formula I above, and $A^1$, $A^2$, $A^3$ each, independently of one another, denote an aromatic, heteroaromatic, alicyclic or heterocyclic group, which may also contain fused rings, and which may also be mono- or polysubstituted by a group L, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, or —$(CR^0R^{00})_{n1}$—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, or —$(CR^0R^{00})_{n1}$—, n1 denotes 1, 2, 3 or 4, L in each case, independently of one another, denotes H, F, Cl, Br, I, —CN, —$NO_2$, —NCO, —NCS, —OCN, —SCN, —C(═O)N$(R^0)_2$, —C(═O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F or Cl, $R^0$ in each case, independently of one another, denotes alkyl having 1 to 12 C atoms, $R^{00}$ in each case, independently of one another, denotes H or alkyl having 1 to 12 C atoms, and $R^1$, independently of one another, denotes H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl.

In contrast to the formula I, the formula I' contains no polymerizable group -Sp-P or P.

Preferred and illustrative structures of the self-alignment additives, in particular the polymerizable self-alignment additives, are disclosed below:

The anchor group $R^a$ contains by definition one, two or three groups $X^1$, which are intended to serve as bonding element to a surface. The spacer groups are intended to form a flexible bond between the mesogenic group with rings and the group(s) $X^1$. The structure of the spacer groups is therefore very variable and in the most general case of the formula I not definitively defined. The person skilled in the art will recognize that a multiplicity of possible variations of chains come into question here.

An anchor group of the formula

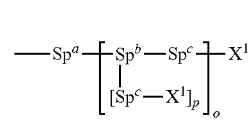

as defined above and below, preferably stands for an anchor group selected from the following formulae:

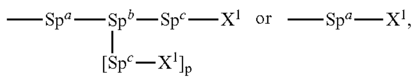

in which in each case independently the groups are as defined above and below, particularly preferably for a group of the formulae

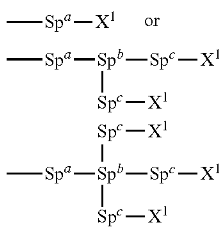

in which in each case independently the groups are as defined above and below.

Particularly preferred anchor groups of the formula $R^a$ are selected from the following part-formulae, where the group $R^a$ is bonded to the group $A^1$ of the formula I or I' via the dashed bond:

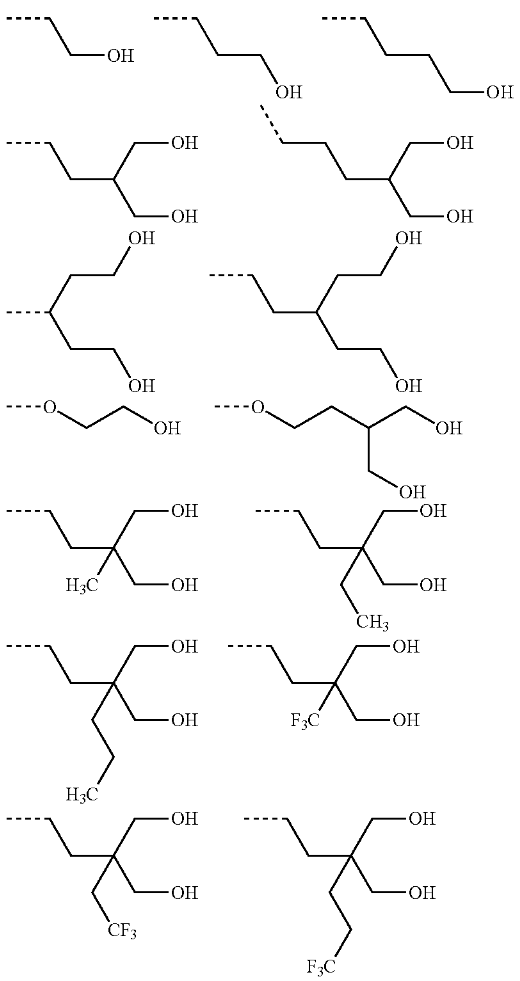

-continued

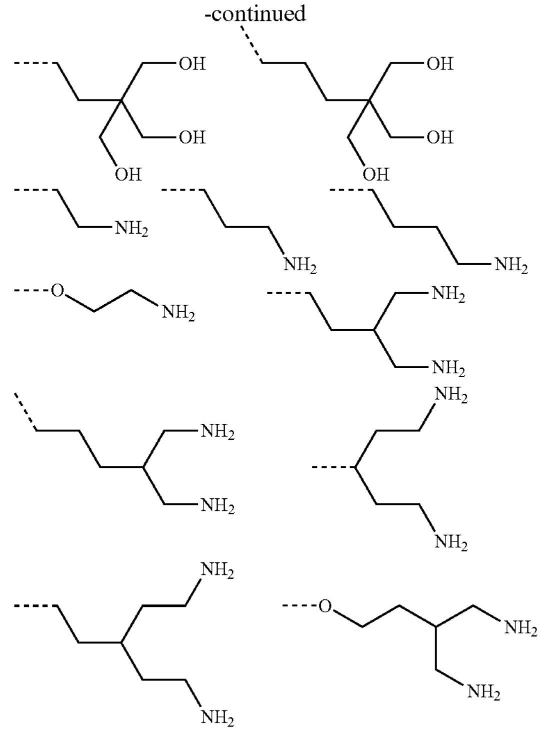

The anchor group $R^a$ in the above formulae and sub-formulae particularly preferably contains one, two or three OH groups.

The term "spacer group" or "spacer", generally denoted by "Sp" (or $Sp^{a/c/d/1/2}$) herein, is known to the person skilled in the art and is described in the literature, for example in Pure Appl. Chem. 73(5), 888 (2001) and C. Tschierske, G. Pelzl, S. Diele, Angew. Chem. (2004), 116, 6340-6368. In the present disclosure, the term "spacer group" or "spacer" denotes a connecting group, for example an alkylene group, which connects a mesogenic group to a polymerizable group. Whereas the mesogenic group generally contains rings, the spacer group is generally without ring systems, i.e. is in chain form, where the chain may also be branched. The term chain is applied, for example, to an alkylene group. Substitutions on and in the chain, for example by —O— or —COO—, are generally included. In functional terms, the spacer (the spacer group) is a bridge between linked functional structural parts which facilitates a certain spatial flexibility to one another.

The group $Sp^b$ preferably denotes a trivalent group of the formula selected from CH, C(Me), $C(CH_2CH_3)$ or N, or the tetravalent group C (tetravalent carbon atom).

The group $Sp^a$ preferably denotes a group selected from the formulae $—CH_2—$, $—CH_2CH_2—$, $—OCH_2CH_2—$, $—CH_2CH_2CH_2—$, $—OCH_2CH_2CH_2—$, $—CH_2CH_2CH_2CH_2—$, $—OCH_2CH_2CH_2CH_2—$, $—CH_2CH_2OCH_2CH_2—$, $—OCH_2CH_2OCH_2CH_2—$.

The group $Sp^c$ or $Sp^d$ preferably denotes a group selected from the formulae $—CH_2—$, $—CH_2CH_2—$, $—CH_2CH_2CH_2—$, $—CH_2CH_2CH_2CH_2—$, $—CH_2CH_2OCH_2CH_2—$.

An above-defined anchor group of the formula

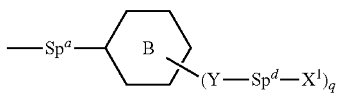

preferably stands for

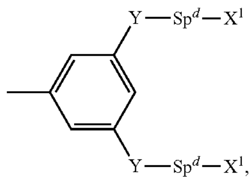

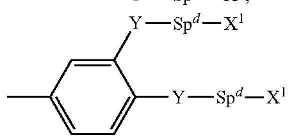

or

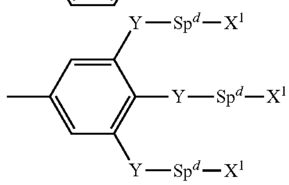

in which Y, $Sp^d$ and $X^1$ are as defined for formula I.

The ring groups $A^1$, $A^2$, $A^3$ each independently preferably denote 1,4-phenylene, naphthalene-1,4-diyl or naphthalene-2,6-diyl, where, in addition, one or more CH groups in these groups may each be replaced by N, cyclohexane-1,4-diyl, in which, in addition, one or more non-adjacent $CH_2$ groups may each be replaced by O or S, 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl), where all these groups may be unsubstituted or mono- or polysubstituted by a group L or -Sp-P.

Preferably, at least one of the groups $A^1$, $A^2$ and $A^3$, if present, is substituted by at least one group -Sp-P.

Particularly preferably, the groups $A^1$, $A^2$, $A^3$ each independently denote a group selected from a) the group consisting of 1,4-phenylene and 1,3-phenylene, in which, in addition, one or more H atoms may be replaced by L or -Sp-P, b) the group consisting of trans-1,4-cyclohexylene, 1,4-cyclohexenylene and 4,4'-bicyclohexylene, in which, in addition, one or more non-adjacent $CH_2$ groups may each be replaced by —O— or —S— and in which, in addition, one or more H atoms may each be replaced by F, L, or -Sp-P. The groups $A^1$ and $A^2$ especially preferably denote a group from the above sub-group a). $A^1$ and $A^2$ independently very particularly preferably denote 1,4-phenylene or cyclohexane-1,4-diyl, which may be mono- or polysubstituted by a group L or -Sp-P.

The compounds of the formula I preferably encompass one or more compounds of the formula I1,

I1

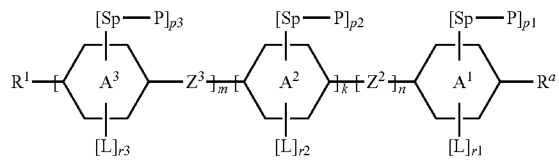

and more preferably of the formulae IA, IB, IC, ID or IE:

IA

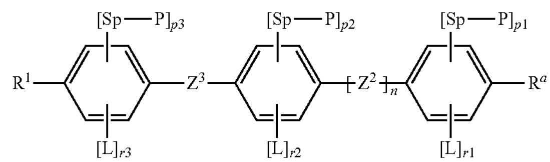

IB

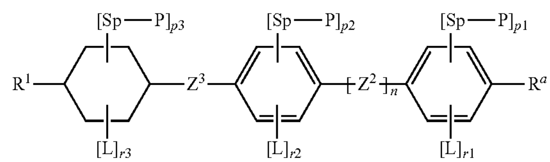

IC

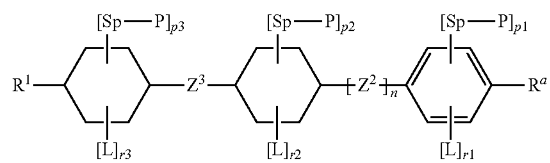

ID

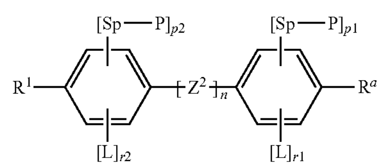

IE

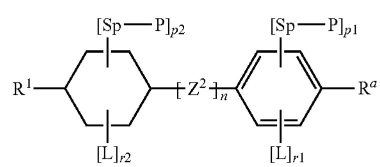

in which in each case independently $R^1$, $R^a$, $A^1$, $A^2$, $A^3$, $Z^2$, $Z^3$, L, Sp, P, m, k and n are as defined for formula I, and p1, p2, p3 independently denote 0, 1, 2 or 3, and r1, r2, r3 independently denote 0, 1, 2 or 3, where the compound of formula I contains overall (i.e. in total) at least one polymerizable group P within the groups $A^1$, $A^2$, $A^3$, $Z^2$ and $Z^3$, as are present.

Preferably, p1+p2+p3>0 in the formulae I1 and IA, IB and IC, and correspondingly p1+p2>0 for formulae ID and IE, i.e. at least one polymerizable group P is present within the groups $A^1$, $A^2$, $A^3$ or $A^1$, $A^2$ or the corresponding rings in IA-IE. Furthermore, it is, in a particular embodiment of the invention, preferred that r1+r2+r3>0 in the formulae I1 and IA, IB and IC, and correspondingly r1+r2>0 in the formulae ID and IE, and L does not denote H, i.e. at least one lateral substituent L is present within the groups $A^1$, $A^2$, $A^3$ or $A^1$, $A^2$ or the corresponding rings in IA-IE. Alternatively, it is preferred that p1+p2+p3>1 or p1+p2>1, i.e. two or more lateral polymerizable groups are present. The compounds according to the invention containing at least one lateral substituent L or two lateral P groups have, inter alia, improved solubility.

In the formulae I and I' above and below and in the preferred sub-formulae, the index n preferably, in each case independently, denotes 0.

Preferred compounds of the formula I are reproduced and illustrated by the following formulae:

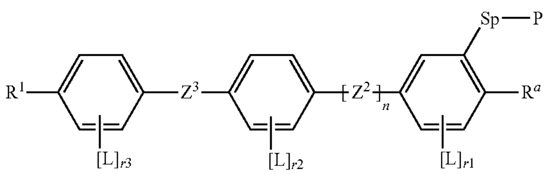

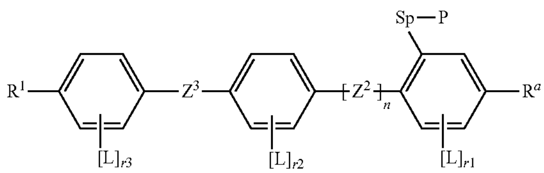

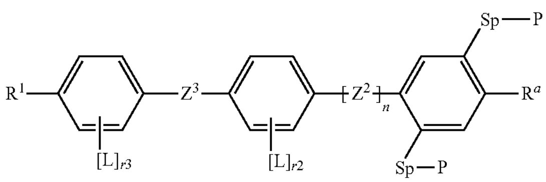

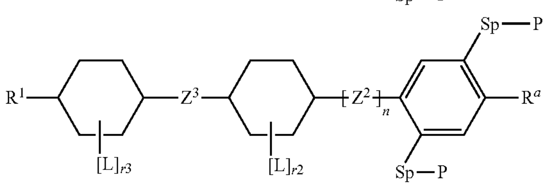

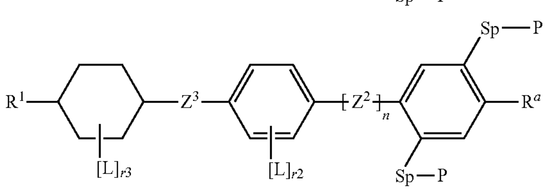

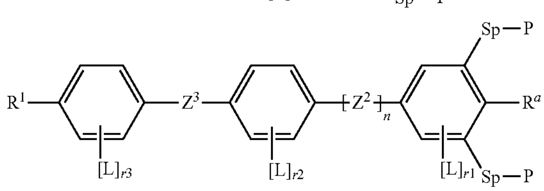

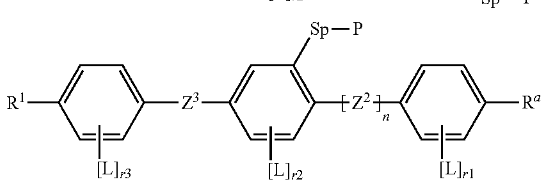

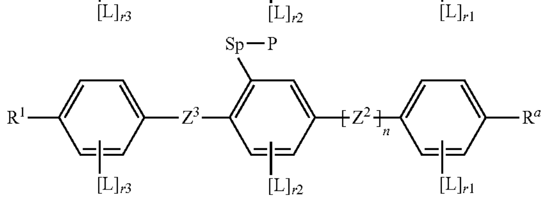

-continued

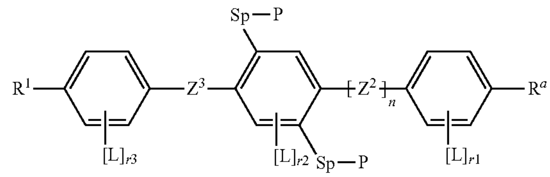

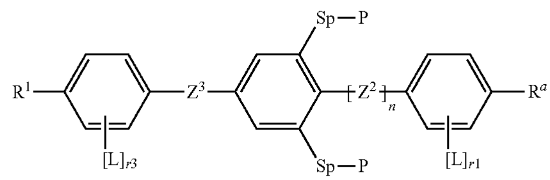

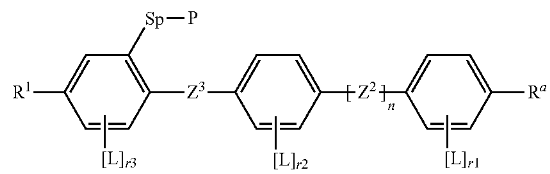

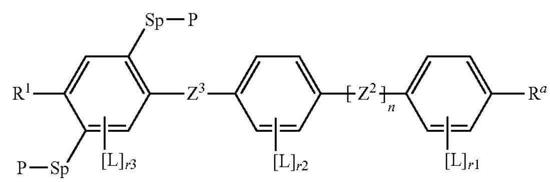

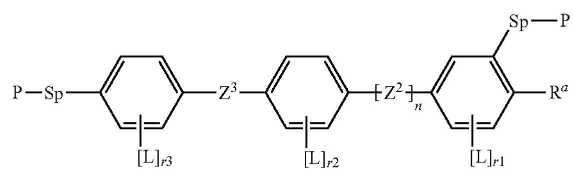

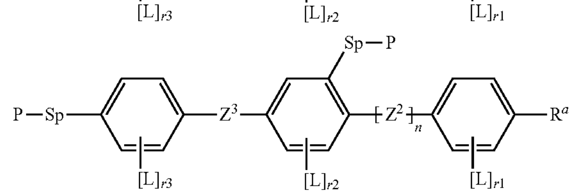

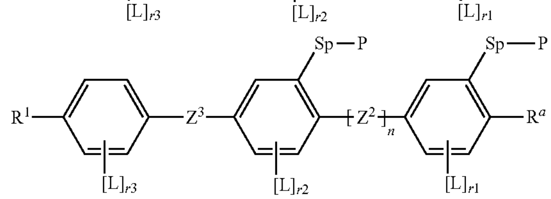

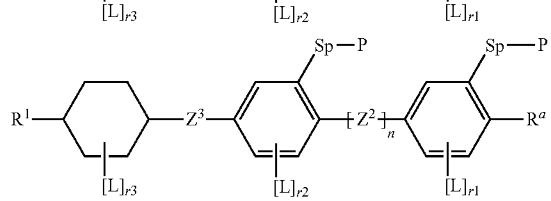

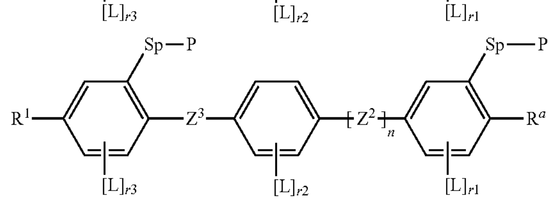

in which L, Sp, P, n and $R^a$ independently are as defined for formula I, r1, r2, r3 independently denote 0, 1, 2 or 3, and $Z^2/Z^3$ independently are as defined above, and where $Z^3$ preferably denotes a single bond or —$CH_2CH_2$— and very particularly a single bond.

Very particularly preferred compounds of the formula I are illustrated by the following formulae:
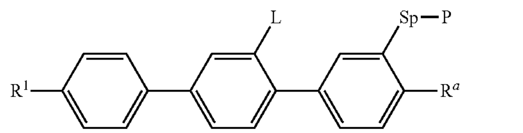
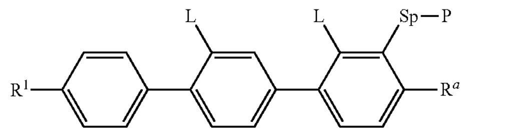
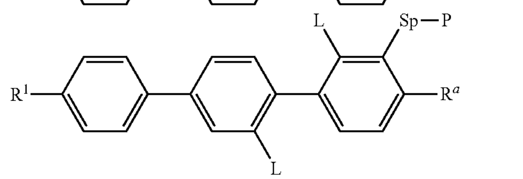
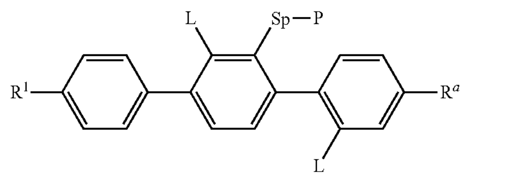
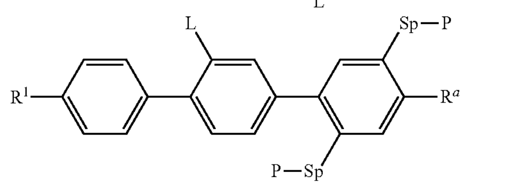
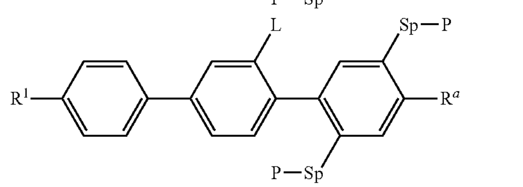
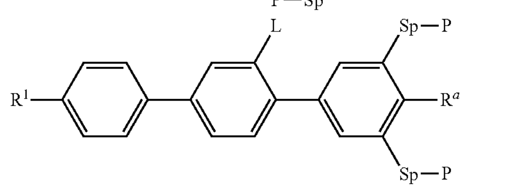
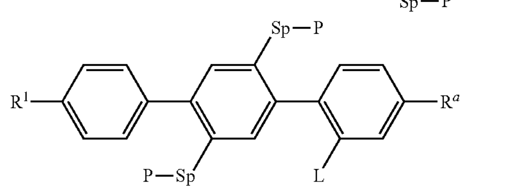
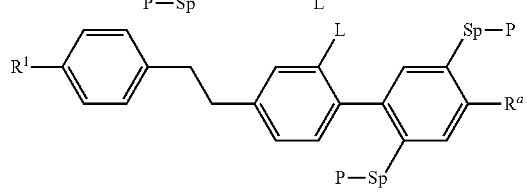
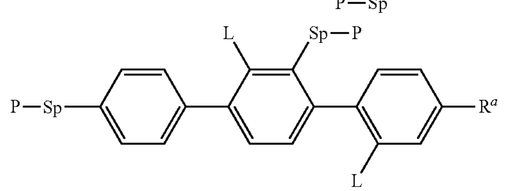
-continued
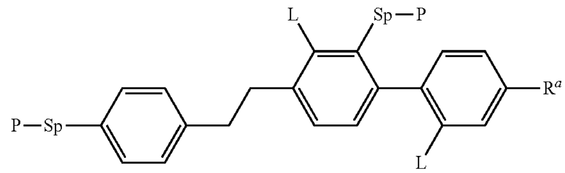
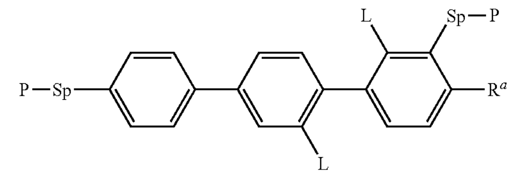
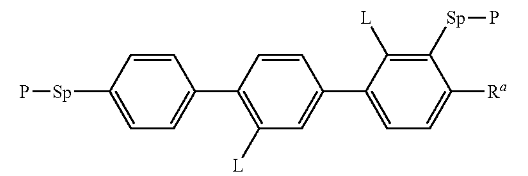
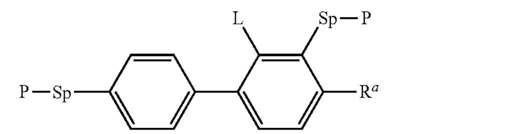
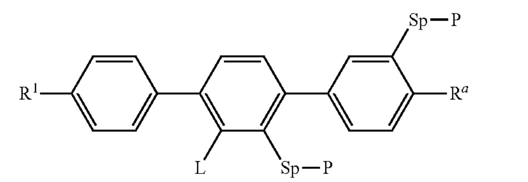
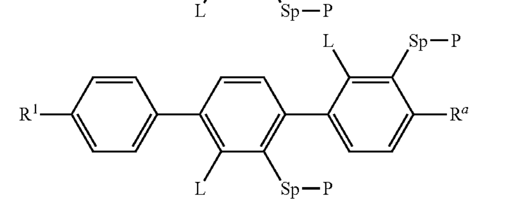
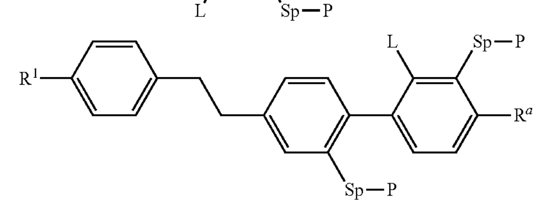
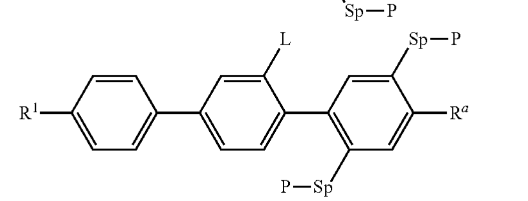
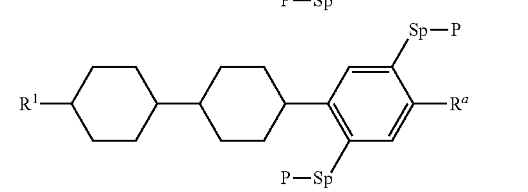
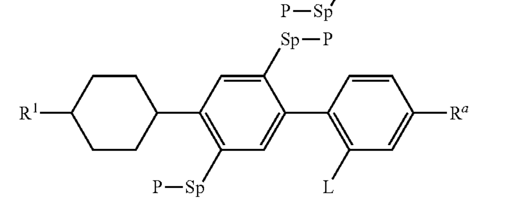

-continued

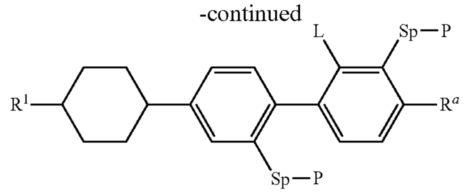

in which $R^1$, Sp, P, L and $R^a$ independently are as defined for formula I. L is preferably a group other than H.

The compounds of the formula I' (conventional self-alignment additives) preferably encompass compounds of the formulae IA1, IB', IC', ID' or IE':

IA'

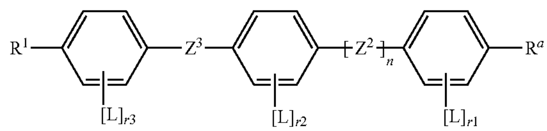

IB'

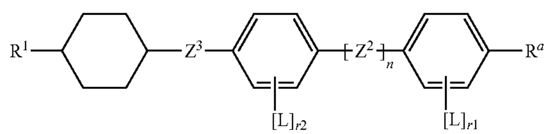

IC'

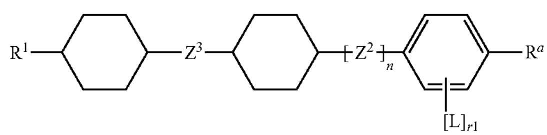

ID'

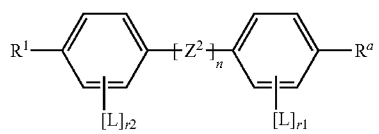

IE'

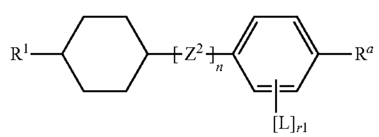

in which $R^1$, $R^a$, $Z^2$, $Z^3$, L and n independently are as defined for the above formulae IA to IE, and r1, r2, r3 independently denote 0, 1, 2, 3 or 4, preferably 0, 1 or 2.

The preparation of the conventional self-alignment additives is disclosed, for example, in the specification WO 2012/038026.

The term "aryl" denotes an aromatic carbon group or a group derived therefrom. The term "heteroaryl" denotes "aryl" as defined above containing one or more heteroatoms.

Aryl and heteroaryl groups may be monocyclic or polycyclic, i.e. they may contain one ring (such as, for example, phenyl) or two or more fused rings. At least one of the rings here has an aromatic configuration. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, naphthyl, anthracene, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, coumarin or combinations of these groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms. Preference is furthermore given to 5-, 6-, 7- or 8-membered carbocyclic groups, in which, in addition, one or more C atoms may each be replaced by Si and/or one or more CH groups may each be replaced by N and/or one or more non-adjacent $CH_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

In connection with the present invention, the term "alkyl" denotes a straight-chain or branched, saturated or unsaturated, preferably saturated, aliphatic hydrocarbon radical having 1 to 15 (i.e. 1,2, 3, 4, 5, 6, 7, 8, 9, 10, 11, 12, 13, 14 or 15) carbon atoms.

The term "cyclic alkyl" encompasses alkyl groups which have at least one carbocyclic part, i.e., for example, also cycloalkylalkyl, alkylcycloalkyl and alkylcycloalkylalkyl. The carbocyclic groups encompass, for example, cyclopropyl, cyclobutyl, cyclopentyl, cyclohexyl, cycloheptyl, cyclooctyl, etc.

"Halogen" in connection with the present invention stands for fluorine, chlorine, bromine or iodine, preferably for fluorine or chlorine.

The above preferred compounds of the formula I can in principle be prepared by the following illustrative synthetic routes (Schemes 1 to 4):

via Sonogashira reaction with

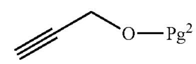

and subsequent hydrogenation, or via boronic acid oxidation to give the phenol with subsequent etherification using

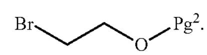

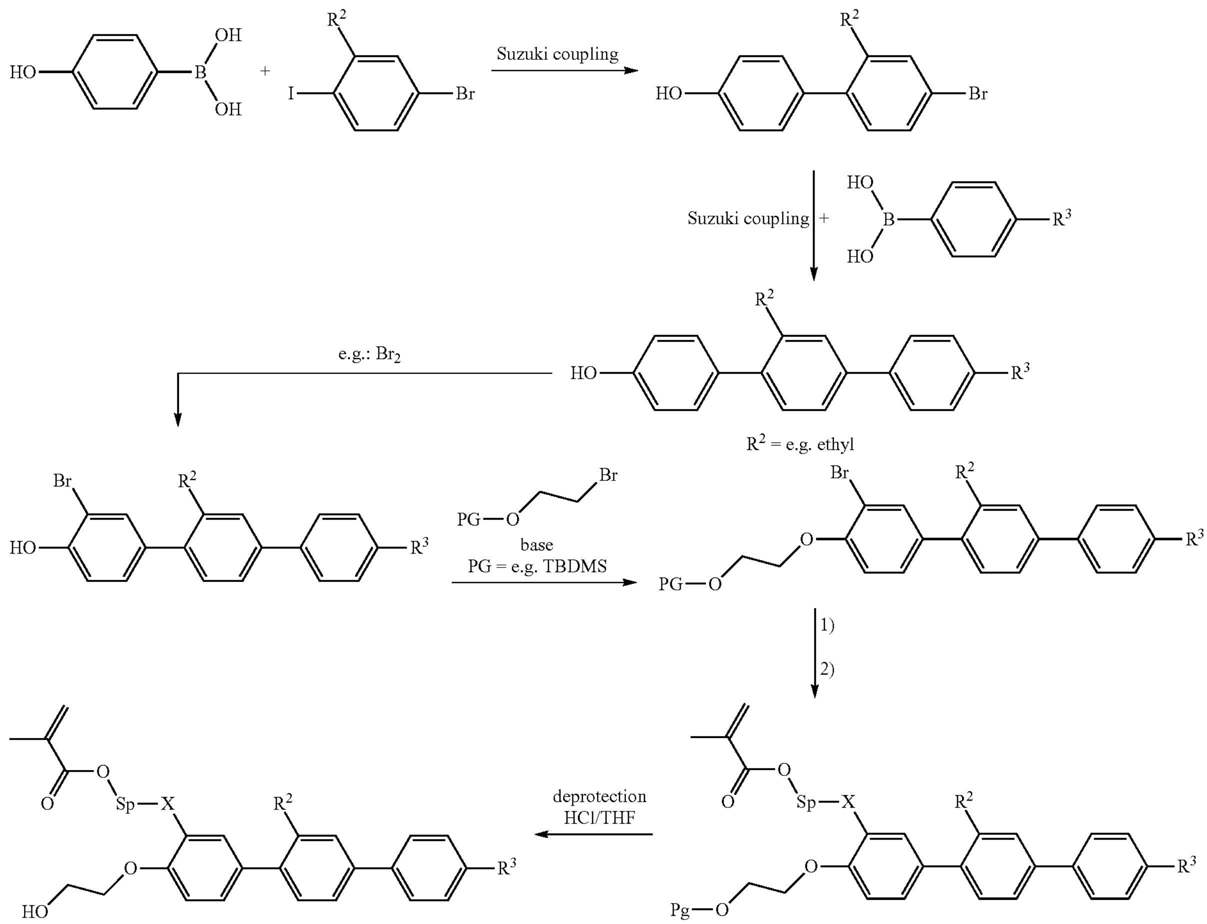

Scheme 1.

General synthetic scheme I. Reaction conditions:

1) Functionalization, for example, via:

n-BuLi and $BF_3$*$OEt_2$ for ring opening with

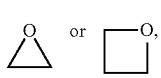

2) Esterification using methacrylic acid:

Definitions: X=$CH_2$, O or a single bond, $R^2$ has one of the meanings of L or -Sp-P in formula (I) (e.g., alkyl having 1 to 25 C atoms) or is an intermediate reactive group, $R^3$ has one of the meanings of $R^1$ in formula (I) (e.g., alkyl having 1 to 25 C atoms such as propyl), Pg=protecting group (e.g., tert-butyldimethylsilyl, TBDMS), $Pg^2$=protecting group (for example benzyl), Sp=spacer having, for example: 0-3 C atoms.

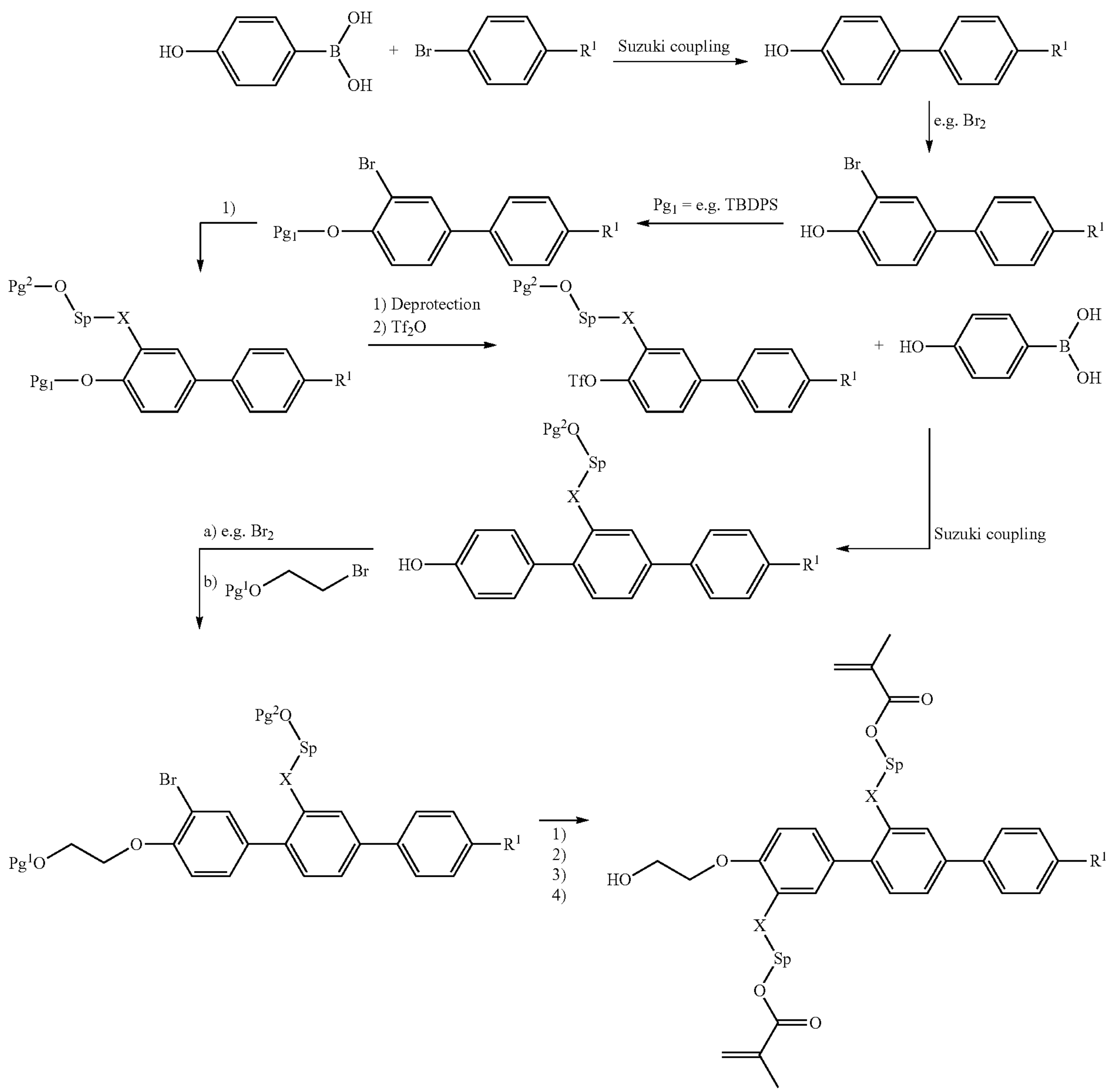

Scheme 2.

General synthetic scheme II. Reaction conditions: 1) as in Scheme 1; 2) deprotection of $OPg^2$; 3) esterification using methacrylic acid; 4) deprotection of $OPg^1$. Definitions: X═$CH_2$, O or a single bond, $R^1$ has one of the meanings of $R^1$ in formula (I) (e.g., alkyl having 1 to 7 C atoms such as propyl), $Pg^1$=protecting group, $Pg^2$=protecting group (for example benzyl), Sp=spacer having, for example: 0-3 C atoms.

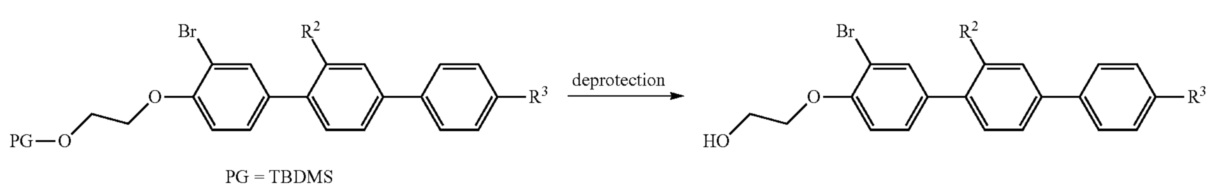

-continued

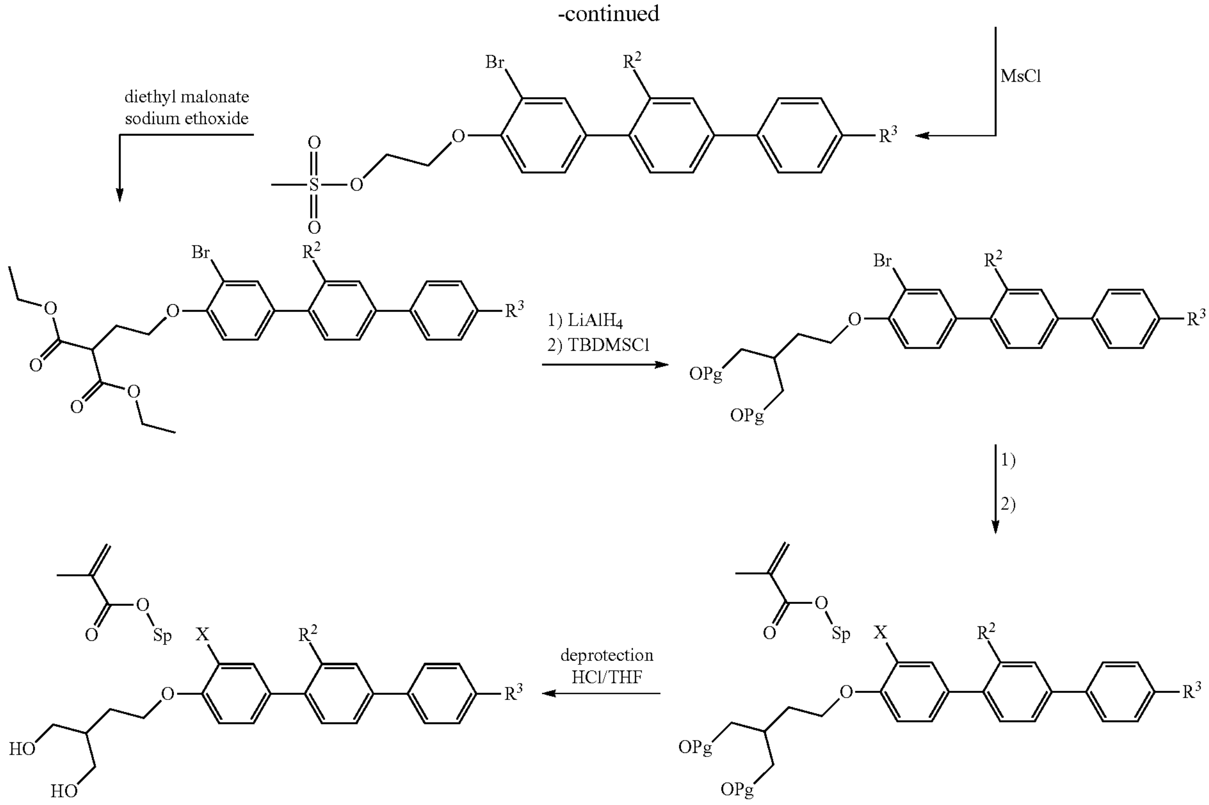

Scheme 3.

General synthetic scheme III. Reaction conditions: 1), 2) as in Scheme 1. Definitions: X═$CH_2$, O or a single bond, $R^2$ has one of the meanings of L in formula (I) (e.g., alkyl having 1 to 25 C atoms), $R^3$ has one of the meanings of $R^1$ in formula (I) (e.g., alkyl having 1 to 25 C atoms such as propyl), PG and Pg=protecting group (e.g., tert-butyldimethylsilyl, TBDMS), $Pg^2$=protecting group (for example benzyl), Sp=spacer having, for example: 0-3 C atoms.

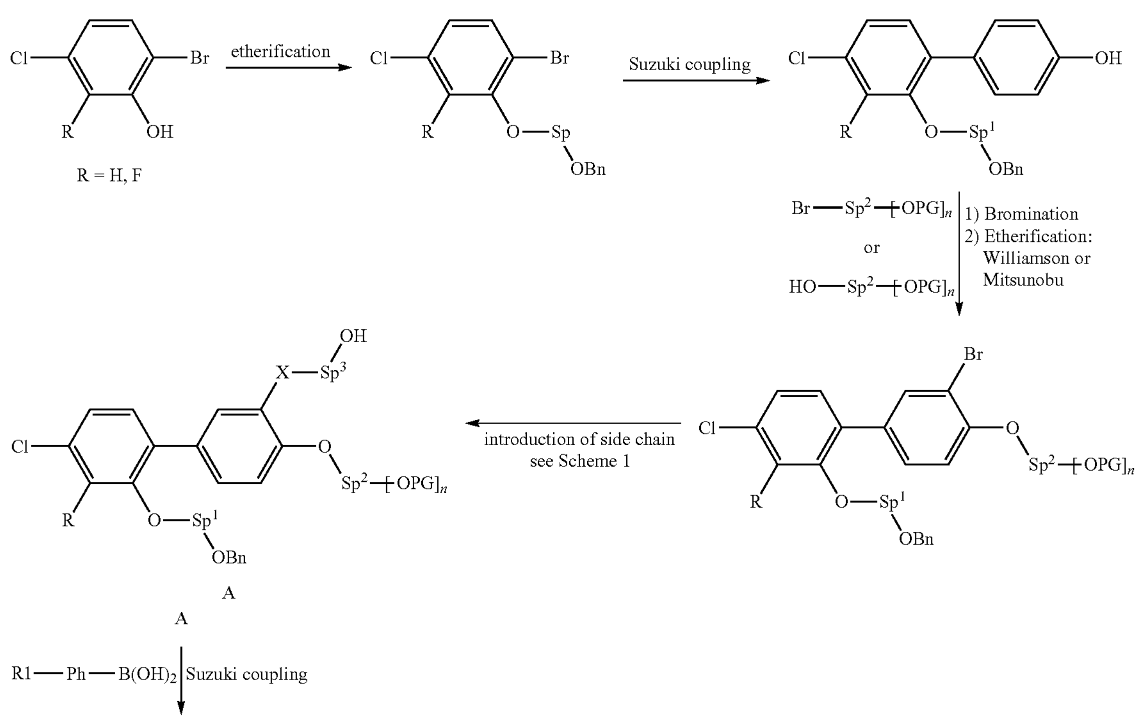

-continued

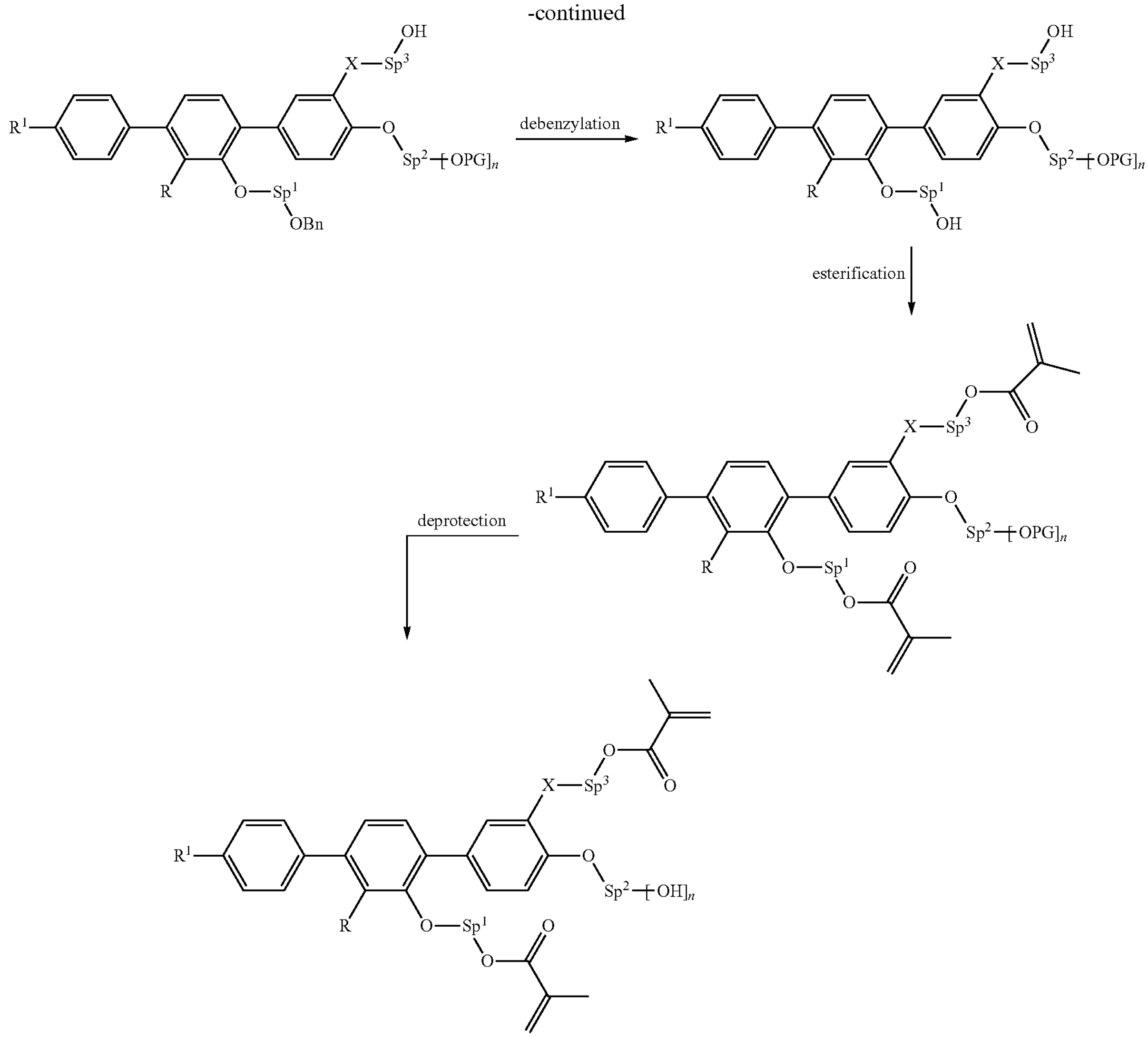

Scheme 4.

General synthetic scheme IV. Definitions: Bn=benzyl, X=$CH_2$, O or a single bond, $R^1$ has one of the meanings of $R^1$ in formula (I) (e.g., alkyl having 1 to 7 C atoms such as propyl), $Sp^{1,2,3}$=spacer having, for example, 0-5 C atoms, n=for example 1-3, PG=protecting group for OH (for example TBDMS).

Besides the compounds of the formula I, the polymerizable component of the LC medium according to the invention preferably comprises further polymerizable or (partially) polymerized compounds. These are preferably conventional polymerizable compounds without an anchor group, preferably mesogenic compounds, in particular those which are suitable for the PSA technique. Polymerizable compounds which are preferred for this purpose are the structures indicated below for formula M and the subformulae thereof. The polymer formed therefrom is able to stabilize the alignment of the LC medium, optionally form a passivation layer and optionally generate a pre-tilt.

The LC media according to the invention therefore preferably comprise >0 to <5% by weight, particularly preferably 0.05 to 1% by weight and very particularly preferably 0.2 to 1% by weight of polymerizable compounds without an anchor group $R^a$, in particular compounds of the formula M as defined below and the preferred formulae falling thereunder.

The polymerization of the polymerizable components is carried out together or in part-steps under different polymerization conditions. The polymerization is preferably carried out under the action of UV light. In general, the polymerization is initiated with the aid of a polymerization initiator and UV light. In the case of the preferred acrylates, virtually complete polymerization is achieved in this way. During the polymerization, a voltage can optionally be applied to the electrodes of the cell or another electric field can be applied in order additionally to influence the alignment of the LC medium.

Particular preference is given to LC media according to the invention which, besides the compounds of the formula I, comprise further polymerizable or (partially) polymerized compounds (without an anchor group) and further self-alignment additives which are not polymerizable. These further non-polymerizable self-alignment additives are preferably those as described above, cf. formulae I', IA', IB', IC', ID', IE'.

The optionally present further monomers of the polymerizable component of the LC medium are preferably described by the following formula M:

$$P^1\text{-}Sp^1\text{-}A^2\text{-}(Z^1\text{-}A^1)_n\text{-}Sp^2\text{-}P^2 \qquad M$$

in which the individual radicals have the following meanings:

$P^1$, $P^2$ each, independently of one another, denote a polymerizable group, $Sp^1$, $Sp^2$ on each occurrence, identically or differently, denote a spacer group or a single bond, $A^1$, $A^2$ each, independently of one another, denote a radical selected from the following groups:

a) the group consisting of trans-1,4-cyclohexylene, 1,4-cyclohexenylene and 4,4'-bicyclohexylene, in which, in addition, one or more non-adjacent $CH_2$ groups may each be replaced by —O— or —S— and in which, in addition, one or more H atoms may each be replaced by a group L, or a radical of the formula

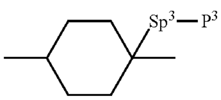

b) the group consisting of 1,4-phenylene and 1,3-phenylene, in which, in addition, one or two CH groups may each be replaced by N and in which, in addition, one or more H atoms may each be replaced by a group L or $-Sp^3-P$, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

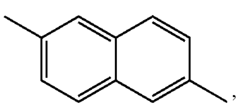

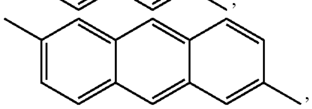

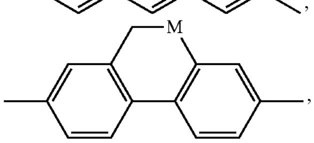

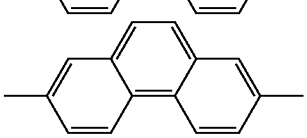

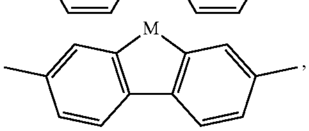

-continued

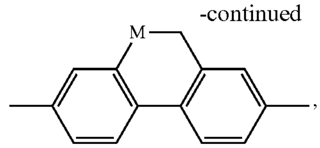

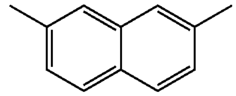

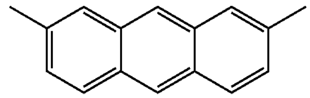

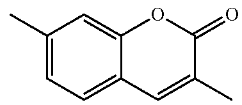

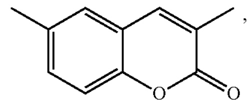

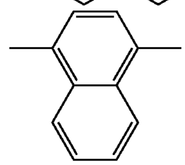

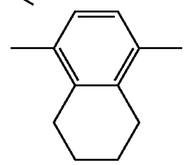

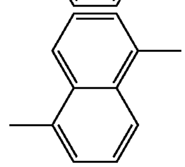

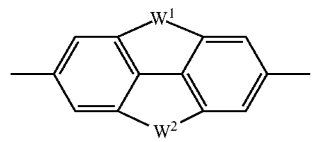

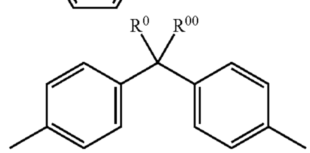

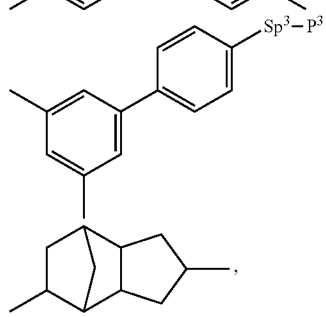

where, in addition, one or more H atoms in these radicals may each be replaced by a group L or $-Sp^3-P$, and/or one or more double bonds may each be replaced by single bonds, and/or one or more CH groups may each be replaced by N, $P^3$ denotes a polymerizable group, $Sp^3$ denotes a spacer group, n denotes 0, 1, 2 or 3, preferably 1 or 2, $Z^1$ in each case, independently of one another, denotes —CO—O—, —O—CO—, —$CH_2O$—, —$OCH_2$—, —$CF_2O$—, —$OCF_2$—, —$(CH_2)_n$— where n is 2, 3 or 4, —O—, —CO—, —$C(R^cR^d)$—, —$CH_2CF_2$—, —$CF_2CF_2$— or a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, M denotes —O—, —S—, —$CH_2$—, —$CHY^1$— or —$CY^1Y^2$—, and $Y^1$ and $Y^2$ each, independently of one another, denote H, F or straight-chain or branched alkyl having 1 to 12 C atoms, in which, in addition, one or more H atoms may each be replaced by F, or denote Cl or CN, and preferably denote H, F, Cl, CN, $OCF_3$ or $CF_3$, $W^1$, $W^2$ each, independently of one another, denote —$CH_2CH_2$—, —CH═CH—, —$CH_2$—O—, —O—$CH_2$—, —C($R^cR^d$)— or —O—, $R^c$ and $R^d$ each, independently of one another, denote H, F, $CF_3$, or alkyl having 1 to 6 C atoms, preferably H, methyl or ethyl.

where one or more of the groups $P^1$-$Sp^1$-, -$Sp^2$-$P^2$ and -$Sp^3$-$P^3$ may denote a radical $R^{aa}$, with the proviso that at least one of the groups $P^1$-$Sp^1$-, -$Sp^2$-$P^2$ and -$Sp^3$-$P^3$ present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by C($R^0$)═C($R^{00}$)—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals contain at least two C atoms and the branched radicals contain at least three C atoms), where the groups —OH, —$NH_2$, —SH, —NHR, —C(O)OH and —CHO are not present in $R^{aa}$, and $R^0$, $R^{00}$ each, independently of one another, denote H, F or straight-chain or branched alkyl having 1 to 12 C atoms, in which, in addition, one or more H atoms may each be replaced by F.

The polymerizable group P, $P^1$, $P^2$ or $P^3$ in the formulae above and below is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C-triple bond, and groups which are suitable for polymerization with ring opening, such as, for example, oxetane or epoxide groups.

Preferred groups $P/P^1/P^2/P^3$ are selected from the group consisting of $CH_2$═$CW^1$—CO—O—,

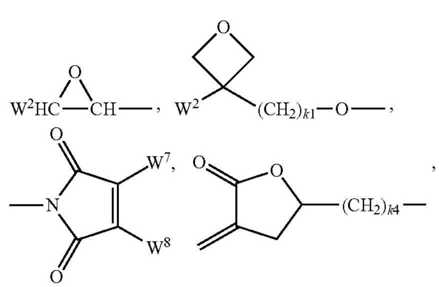

$CH_2$═$CW^2$—$(O)_{k3}$—, $CW^1$═CH—CO—$(O)_{k3}$—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, k1, k2 and k3 each, independently of one another, denote 0 or 1, k3 preferably denotes 1, and k4 denotes an integer from 1 to 10.

Particularly preferred groups $P/P^1/P^2/P^3$ are selected from the group consisting of $CH_2$═$CW^1$—CO—O—, $CH_2$═$CW^1$—CO—,

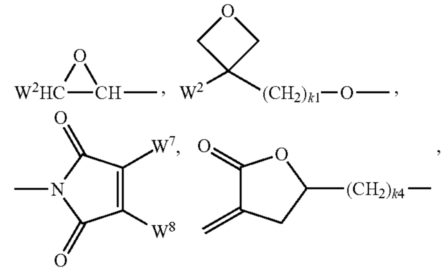

$CH_2$═$CW^2$—O—, $CW^1$═CH—CO—$(O)_{k3}$—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P/P^1/P^2/P^3$ are selected from the group consisting of $CH_2$═$CW^1$—CO—O—, in particular $CH_2$═CH—CO—O—, $CH_2$═C($CH_3$)CO—O— and $CH_2$═CF—CO—O—, furthermore $CH_2$═CH—O—, $(CH_2$═$CH)_2$CH—O—CO—, $(CH_2$═$CH)_2$CH—O—,

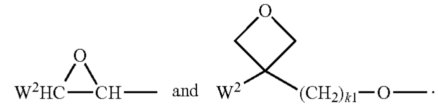

Very particularly preferred groups $P/P^1/P^2/P^3$ are therefore selected from the group consisting of acrylate, methacrylate, fluoroacrylate, furthermore vinyloxy, chloroacrylate, oxetane and epoxide groups, and of these in turn preferably an acrylate or methacrylate group.

Preferred spacer groups Sp, $Sp^1$ or $Sp^2$ are a single bond or selected from the formula Sp"-X", so that the radical $P^{1/2}$-$Sp^{1/2}$-conforms to the formula $P^{1/2}$-Sp"-X"—, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$═$CY^3$—, —C≡C—, —CH═CH—CO—O—, —O—CO—CH═CH— or a single bond, $R^0$ in each case independently denotes H, F or straight-chain or branched alkyl having 1 to 12 C atoms, in which, in addition, one or more H atoms may each be replaced by F, $R^{00}$ in each case independently denotes alkyl having 1 to 12 C atoms, $R^{000}$ in each case independently denotes H or alkyl having 1 to 12 C atoms, and $Y^2$ and $Y^3$ each, independently of one another, denote H, F, Cl or CN.

X" is preferably —O—, —S—, —CO—, —COO—, —OCO—, —O—COO— or a single bond.

Typical spacer groups Sp" are, for example, a single bond, —$(CH_2)_{p1}$—, —$(CH_2CH_2O)_{q1}$—$CH_2CH_2$—, —$CH_2CH_2$—S—$CH_2CH_2$—, or —($SiR^{00}R^{000}$—O)$_{p1}$—, in which p1 is an integer from 1 to 12, q1 is an integer from 1 to 3, and $R^{00}$ and $R^{000}$ have the meanings indicated above.

Particularly preferred groups -Sp"-X"— are —$(CH_2)_{p1}$—, —$(CH_2)_{p1}$—O—, —$(CH_2)_{p1}$—O—CO—, —$(CH_2)_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The substances of the formula M contain no —OH, —$NH_2$, —SH, —$NHR^{11}$, —C(O)OH and —CHO radicals.

Suitable and preferred (co)monomers for use in displays according to the invention are selected, for example, from the following formulae:

M1

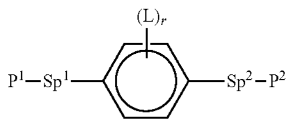

M2

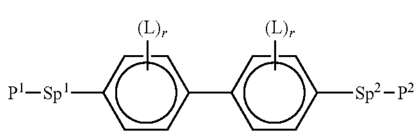

-continued

M3

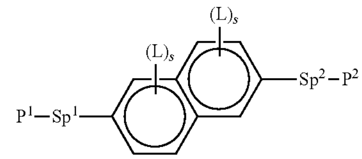

M4

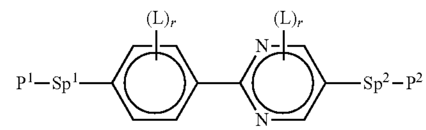

M5

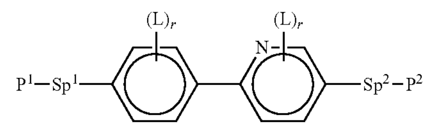

M6

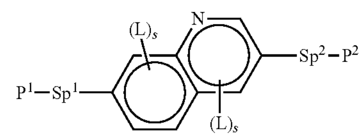

M7

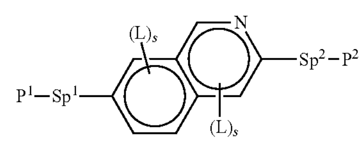

M8

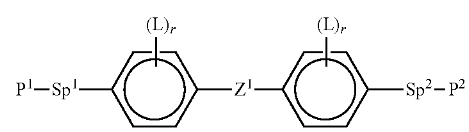

M9

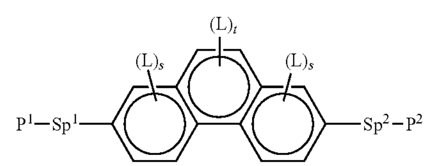

M10

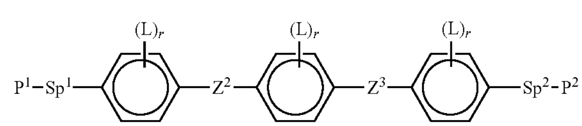

M11

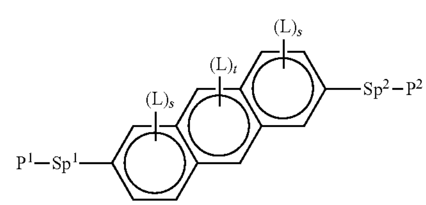

M12

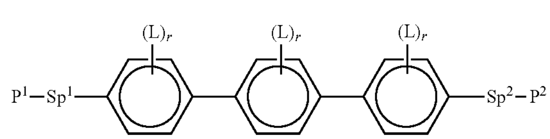

-continued
M13
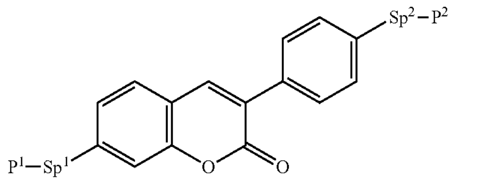
M14
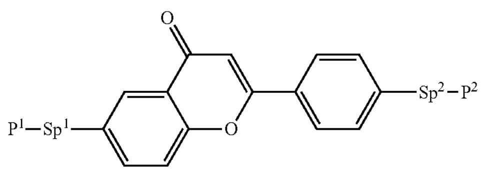
M15
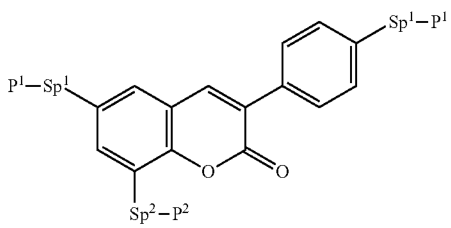
M16
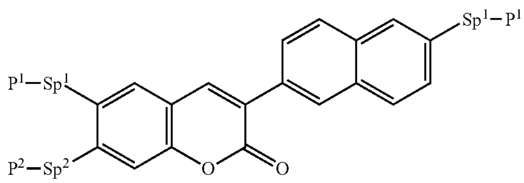
M17
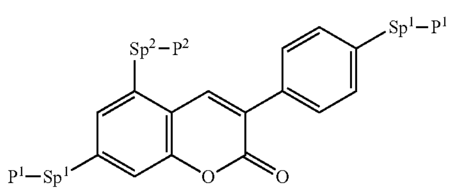
M18
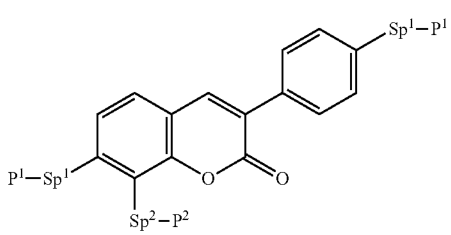
M19
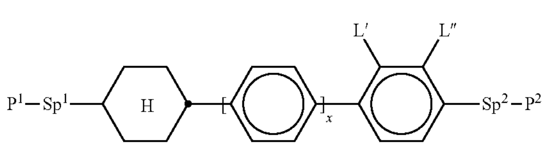
-continued
M20
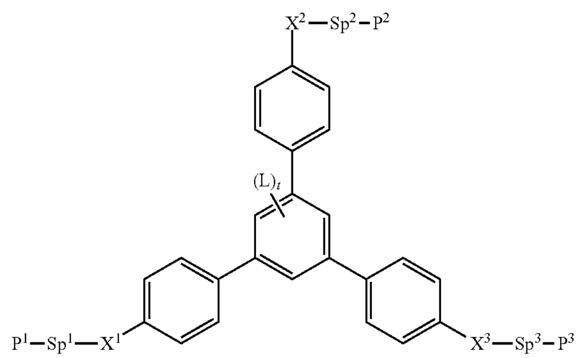
M21
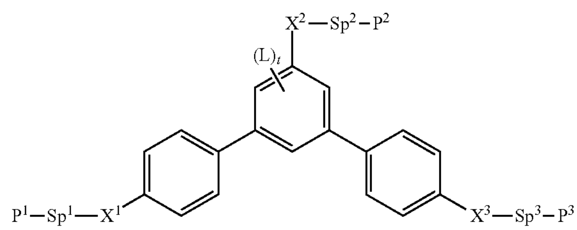
M22
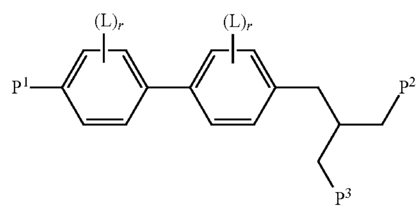
M23
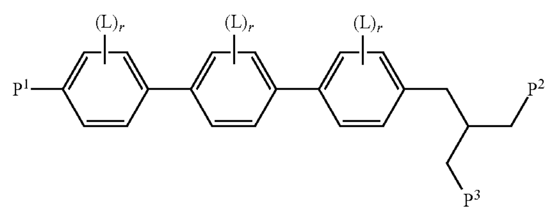
M24
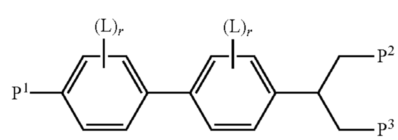
M25
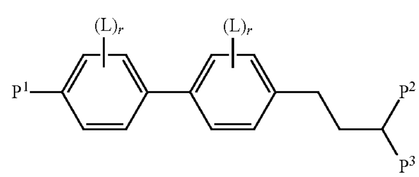
M26
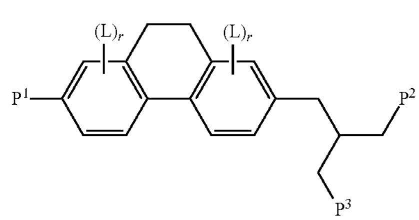

-continued

M27

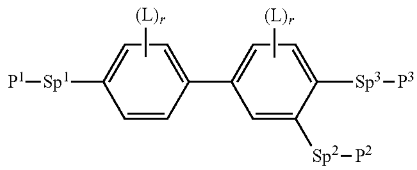

M28

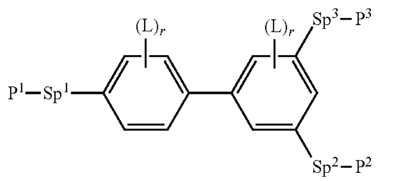

M29

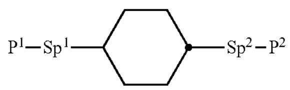

M30

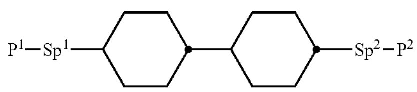

M31

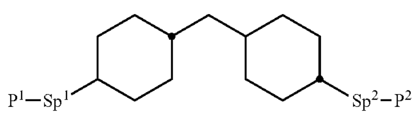

M32

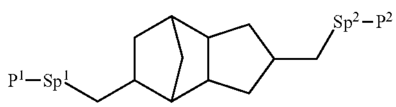

M33

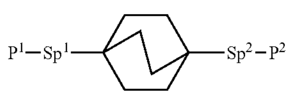

M34

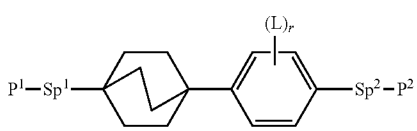

M35

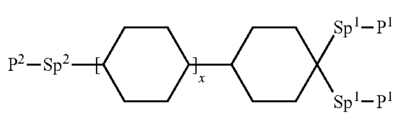

M36

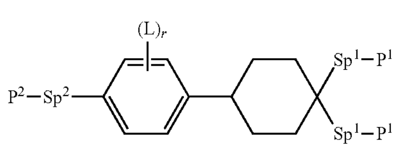

M37

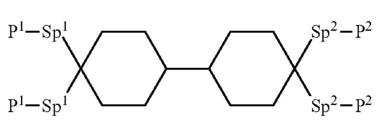

M38

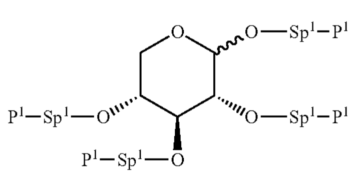

-continued

M39

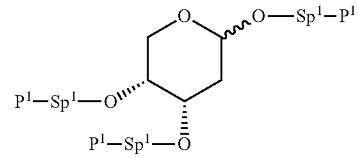

M40

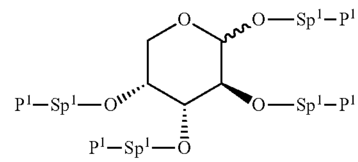

M41

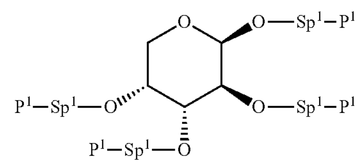

M42

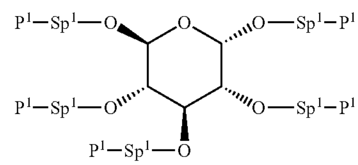

in which the individual radicals have the following meanings:

$P^1$, $P^2$ and $P^3$ each, independently of one another, denote a polymerizable group, preferably having one of the meanings indicated above and below for P, preferably an acrylate, methacrylate, fluoroacrylate, oxetane, vinyloxy or epoxide group, $Sp^1$, $Sp^2$ and $Sp^3$ each, independently of one another, denote a single bond or a spacer group, preferably having one of the meanings as indicated above and below for formula M, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and wherein the bonding between groups —$(CH_2)_{p1}$—O—, —$(CH_2)_{p1}$—CO—O— and —$(CH_2)_{p1}$—O—CO—O— and the adjacent ring occurs via the O atom, where, in addition, one or more of the radicals $P^1$-$Sp^1$-, $P^2$-$Sp^2$- and $P^3$-$Sp^3$- may denote a radical $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$-$Sp^1$-, preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), where —OH, —$NH_2$, —SH, —NHR, —C(O)OH and —CHO are not present in the group $R^{aa}$, $R^0$, $R^{00}$ each, independently of one another and on each occurrence identically or differently, denote H or alkyl having 1 to 12 C atoms, $X^1$, $X^2$ and $X^3$ each, independently of one another, denote —CO—O—, O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$— where n is 2, 3 or 4, $R^y$ and $R^z$ each, independently of one another, denote H, F, $CH_3$ or $CF_3$, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M42, the ring group

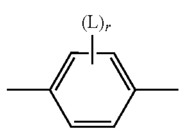

preferably denotes

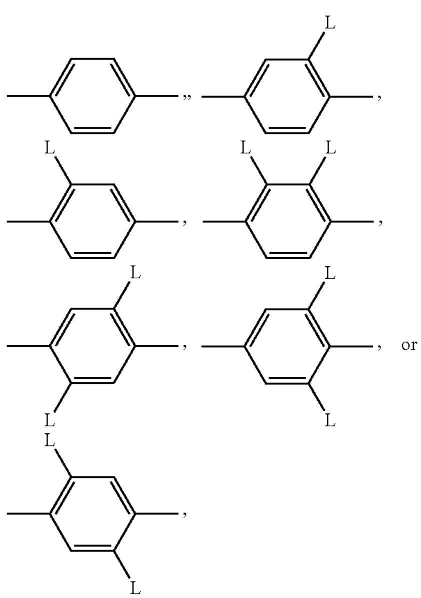

in which L, on each occurrence identically or differently, has one of the above meanings and preferably denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, particularly preferably F, Cl, CN, $CH_3$, $C_2H_5$, $OCH_3$, $COCH_3$, $OCF_3$ or P-Sp-, very particularly preferably F, Cl, $CH_3$, $OCH_3$, $COCH_3$ or $OCF_3$, in particular F or $CH_3$.

The LC medium or the polymerizable component preferably comprises one or more compounds selected from the group of the formulae M1-M28, particularly preferably from the group of the formulae M2-M15, very particularly preferably from the group of the formulae M2, M3, M9, M14 and M15. The LC medium or the polymerizable component preferably comprises no compounds of the formula M10 in which either of $Z^2$ and $Z^3$ denote —(CO)O— or —O(CO)—.

For the production of PSA displays, the polymerizable compounds are polymerized or crosslinked (if a polymerizable compound contains two or more polymerizable groups) by in-situ polymerization in the LC medium between the substrates of the LC display, optionally with application of a voltage. The polymerization can be carried out in one step. It is also possible firstly to carry out the polymerization with application of a voltage in a first step in order to produce a pretilt angle, and subsequently, in a second polymerization step, to polymerize or crosslink the compounds which have not fully reacted in the first step without an applied voltage ("end curing").

Suitable and preferred polymerization methods are, for example, thermal or photopolymerization, preferably photopolymerization, in particular UV photopolymerization. One or more initiators can optionally also be added here. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerizable component or the LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of the RMs or the polymerizable component, is preferably 10 10,000 ppm, particularly preferably 50-500 ppm.

Besides the self-alignment additives described above and the optional polymerizable compounds (M) described above, the LC media for use in the LC displays according to the invention comprise an LC mixture ("host mixture") comprising one or more, preferably two or more, low-molecular-weight (i.e. monomeric or unpolymerized) compounds. The latter are stable or unreactive with respect to a polymerization reaction under the conditions used for the polymerization of the polymerizable compounds. In principle, any dielectrically negative or positive LC mixture which is suitable for use in conventional VA and VA-IPS displays is suitable as host mixture. The proportion of the host mixture for liquid-crystal displays is generally 95% by weight or more, preferably 97% by weight or more Suitable LC mixtures are known to the person skilled in the art and are described in the literature. LC media for VA displays having negative dielectric anisotropy are described in EP 1 378 557 A1 or WO 2013/004372.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521.

Preferred embodiments of the liquid-crystalline medium having negative dielectric anisotropy according to the invention are indicated below: LC medium which additionally comprises one or more compounds selected from the group of the compounds of the formulae A, B and C,

A

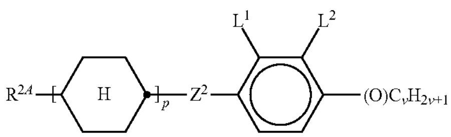

B

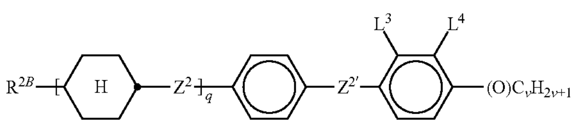

C

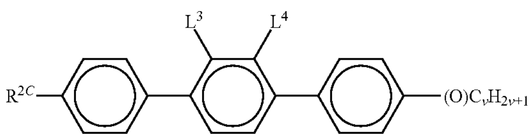

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

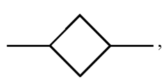,

—C≡—, —$CF_2O$—, —$OCF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, or —CH═$CHCH_2O$—, (O) denotes —O— or a single bond, p denotes 1 or 2, preferably 1, q denotes 0 or 1, and v denotes 1 to 6.

In the compounds of the formula B, $Z^2$ can have identical or different meanings. In the compounds of the formula B, $Z^2$ and $Z^{2'}$ can have identical or different meanings. In the compounds of the formulae A, B and C, $R^{2A}$, $R^{2B}$ and $R^{2c}$ each preferably denote alkyl having 1-6 C atoms, in particular $CH_3$, $C_2H_5$, n-$C_3H_7$, n-$C_4H_9$, n-$C_5H_{11}$.

In the compounds of the formulae A and B, L', $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae A and B preferably each, independently of one another, denote a single bond, furthermore a —$C_2H_4$— bridge.

If $Z^2$=—$C_2H_4$— in the formula B, $Z^{2'}$ is preferably a single bond, or if $Z^{2'}$=—$C_2H_4$—, $Z^2$ is preferably a single bond. In the compounds of the formulae A and B, $(O)C_vH_{2v+1}$ preferably denotes $OC_vH_{2v+1}$, furthermore $C_vH_{2v+1}$. In the compounds of the formula C, $(O)C_vH_{2v+1}$ preferably denotes $C_vH_{2v+1}$. In the compounds of the formula C, $L^3$ and $L^4$ preferably each denote F.

Preferred compounds of the formulae A, B and C are, for example:

A-1

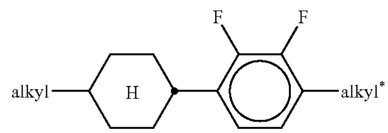

A-2

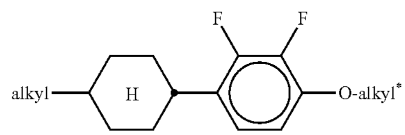

A-7

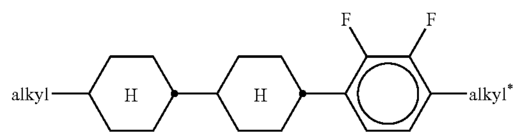

A-8

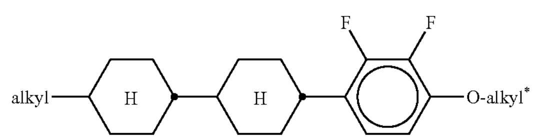

B-1

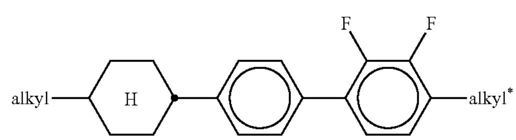

B-2

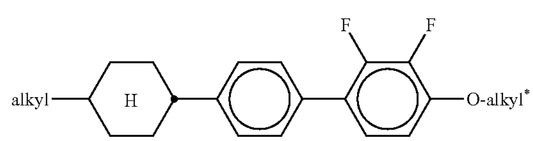

B-11

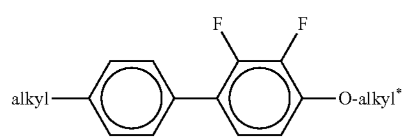

C-1

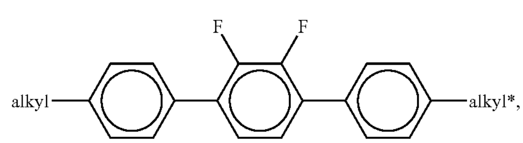

in which alkyl and alkyl* each, independently of one another, denote a straight-chain alkyl radical having 1-6 C atoms.

The LC medium preferably has a Δε of −1.5 to −8.0, in particular −2.5 to −6.0.

The values of the birefringence Δn in the liquid-crystal mixture are generally between 0.07 and 0.16, preferably between 0.08 and 0.12. The rotational viscosity $\gamma_1$ at 20° C. before the polymerization is preferably ≤165 mPa·s, in particular ≤140 mPa·s.

Preferred embodiments of the liquid-crystalline medium according to the invention having negative or positive dielectric anisotropy are indicated below:

LC medium which additionally comprises one or more compounds of the formulae II and/or III:

II

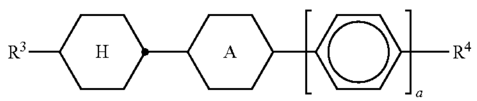

III

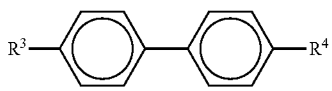

in which ring A denotes 1,4-phenylene or trans-1,4-cyclohexylene, a is 0 or 1, $R^3$ in each case, independently of one another, denotes alkyl having 1 to 9 C atoms or alkenyl having 2 to 9 C atoms, preferably alkenyl having 2 to 9 C atoms, and $R^4$ in each case, independently of one another, denotes an unsubstituted or halogenated alkyl radical having 1 to 12 C atoms, where, in addition, one or two non-adjacent $CH_2$ groups may each be replaced by —O—, —CH═CH—, —CH═CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

IIa

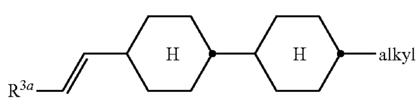

IIb

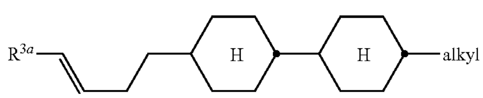

IIc

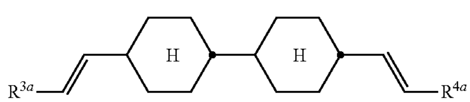

IId

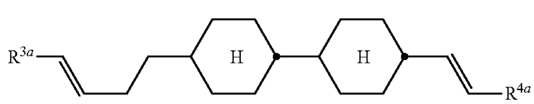

IIe

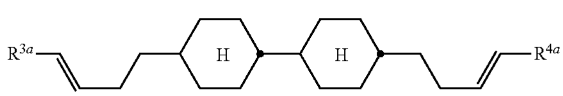

IIf

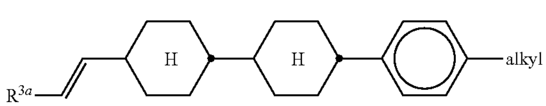

-continued

IIg

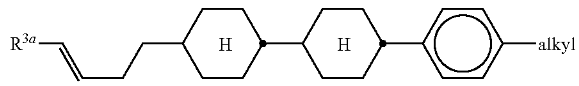

IIh

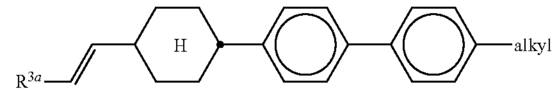

IIi

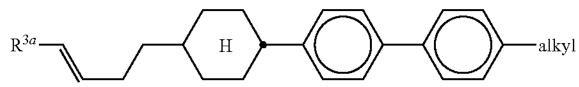

in which $R^{3a}$ and $R^{4a}$ each, independently of one another, denote H, $CH_3$, $C_2H_5$ or $C_3H_7$, and "alkyl" denotes a straight-chain alkyl group having 1 to 8, preferably 1, 2, 3, 4 or 5, C atoms. Particular preference is given to compounds of the formulae IIa and IIf, in particular those in which $R^{3a}$ denotes H or $CH_3$, preferably H, and compounds of the formula IIc, in particular those in which $R^{3a}$ and $R^{4a}$ denote H, $CH_3$ or $C_2H_5$.

Preferred embodiments of the liquid-crystalline medium according to the invention having positive dielectric anisotropy are given below:

The LC medium preferably comprises one or more compounds of the formulae IV and V:

IV

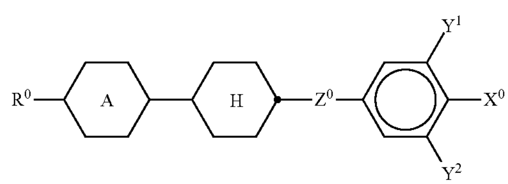

V

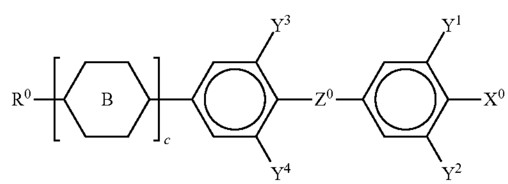

in which $R^0$ denotes an alkyl or alkoxy radical having 1 to 15 C atoms, in which, in addition, one or more $CH_2$ groups in these radicals are each optionally, independently of one another, replaced by —C≡C—, —$CF_2$O—, —CH═CH—,

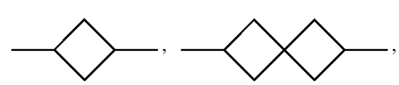

—O—, —(CO)O— or —O(CO)— in such a way that O atoms are not linked directly to one another, and in which, in addition, one or more H atoms may each optionally be replaced by halogen, ring A denotes

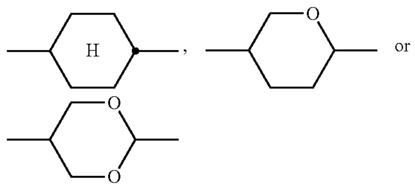

ring B, independently of one another, denotes 1,4-phenylene, optionally substituted by one or two F or Cl,

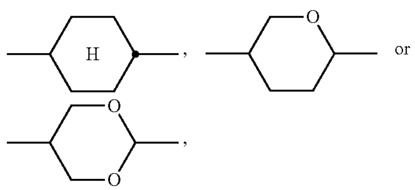

$X^0$ denotes F, Cl, CN, $SF_5$, SCN, NCS, a halogenated alkyl group, a halogenated alkenyl group, a halogenated alkoxy group or a halogenated alkenyloxy group, each having up to 6 C atoms, $Y^{1-4}$ each, independently of one another, denote H or F, $Z^0$ denotes —$CF_2O$—, —(CO)O— or a single bond, and c denotes 0, 1 or 2, preferably 1 or 2,

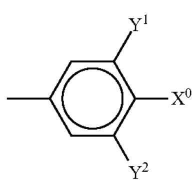

preferably denotes

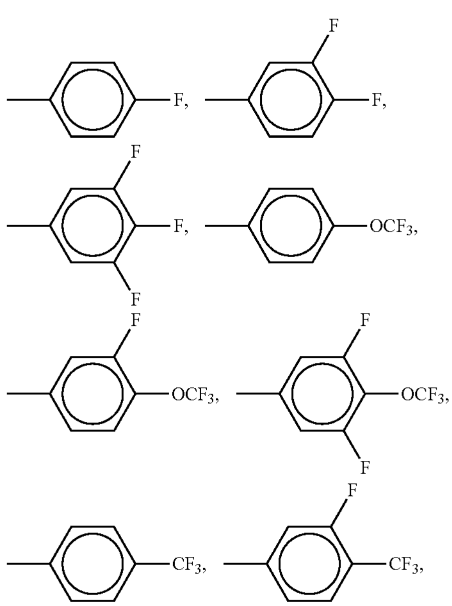

-continued

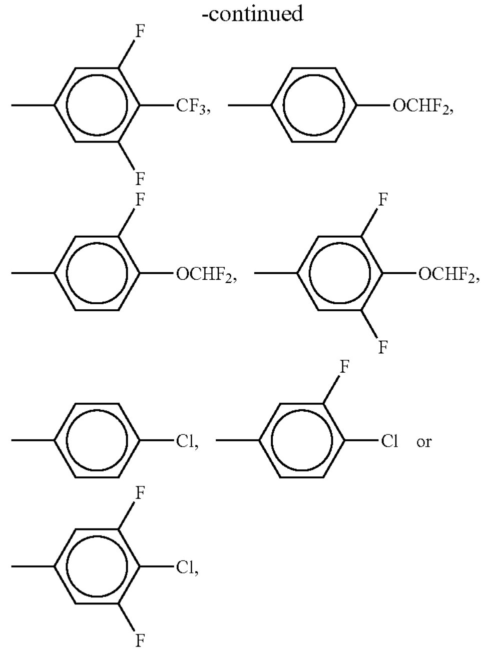

$R^0$ preferably denotes straight-chain alkyl or alkenyl having 2 to 7 C atoms, $X^0$ preferably denotes F, $OCF_3$, Cl or $CF_3$, in particular F.

The nematic phase of the dielectrically negative or positive LC medium in accordance with the invention preferably has a nematic phase in a temperature range from 10° C. or less to 60° C. or more, particularly preferably from 0 or less to 70° C. or more.

For the purposes of the present application, the two formulae for substituted benzene rings

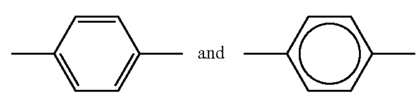

are equivalent. 1,4-substituted cyclohexane is represented by

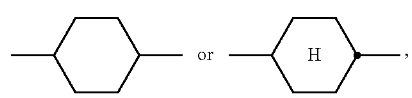

which is preferably in the 1,4-trans-configuration.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF3 | $C_nH_{2n+1}$ | $OCF_3$ | H | H |
| nOCF3.F | $C_nH_{2n+1}$ | $OCF_3$ | F | H |
| n-Vm | $C_nH_{2n+1}$ | —CH═CH—$C_mH_{2m+1}$ | H | H |
| nV-Vm | $C_nH_{2n+1}$—CH═CH— | —CH═CH—$C_mH_{2m+1}$ | H | H |

Preferred mixture components are found in Tables A and B.

TABLE A

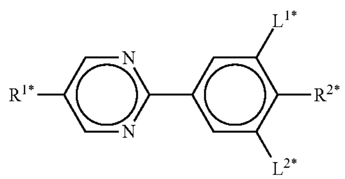

PYP

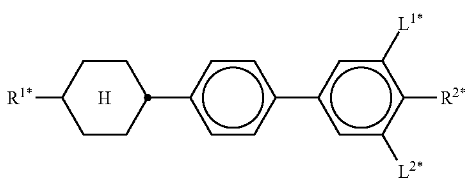

BCH

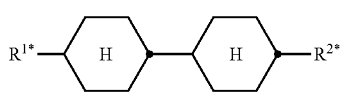

CCH

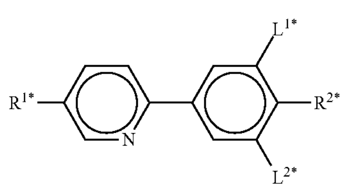

PYRP

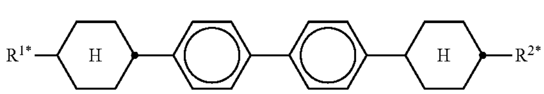

CBC

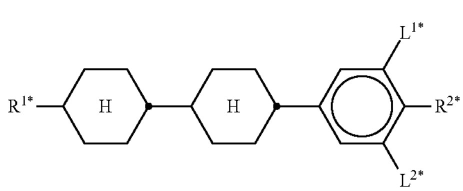

CCP

TABLE A-continued

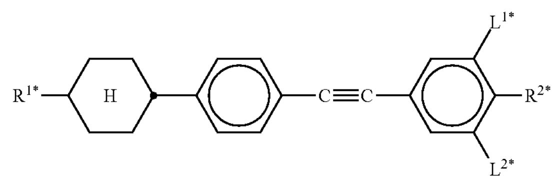

CPTP

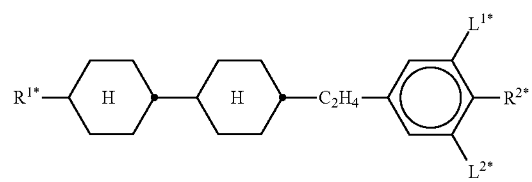

ECCP

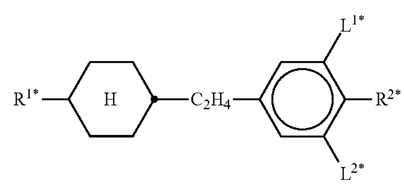

EPCH

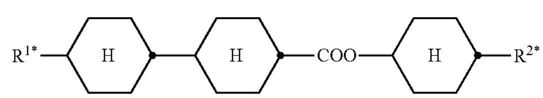

CH

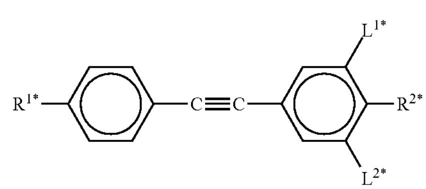

PTP

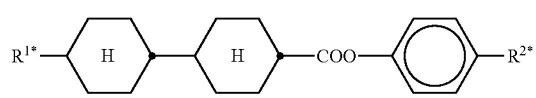

CP

TABLE A-continued
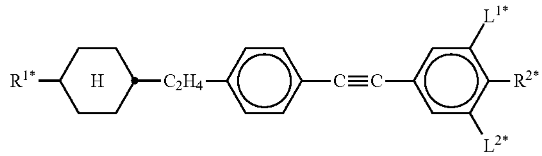
CEPTP
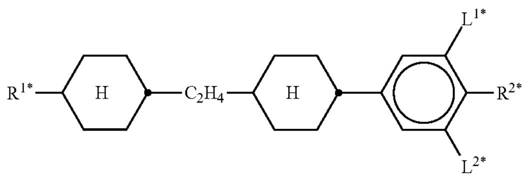
CECP
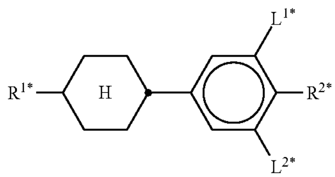
PCH
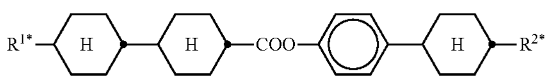
CCPC
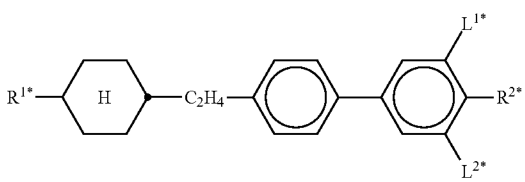
BECH
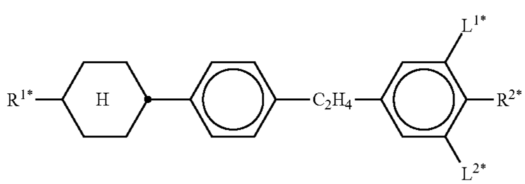
EBCH
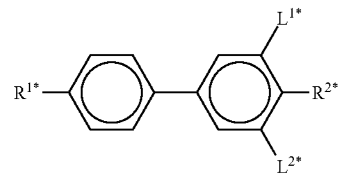
B
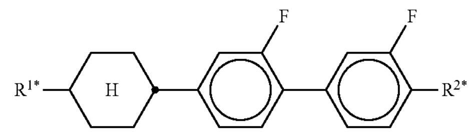
CGG
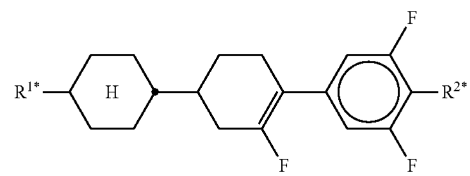
CFU
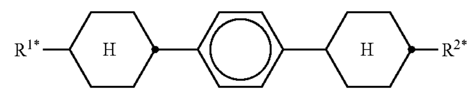
CPC
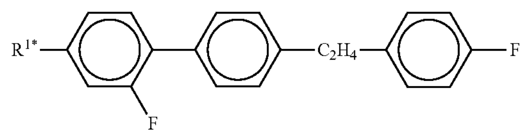
FET-nF
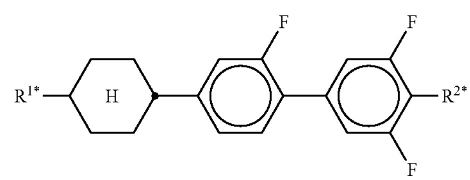
CGU
TABLE B
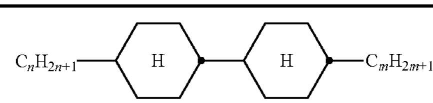
CCH-nm
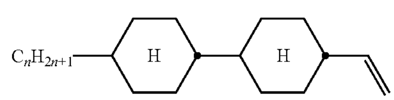
CC-n-V
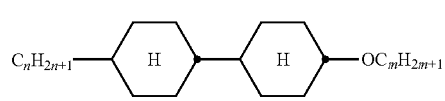
CCH-nOm TABLE B-continued
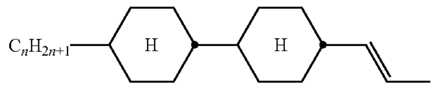
CC-n-V1
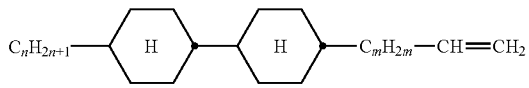
CC-n-mV
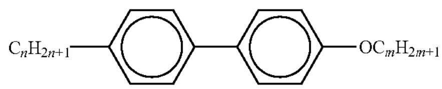
PP-n-Om
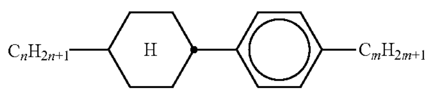
PCH-nm
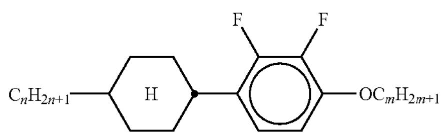
CY-n-Om
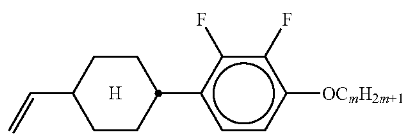
CY-V-Om
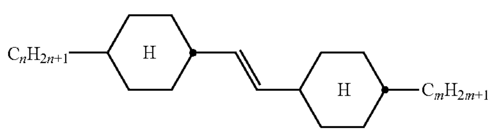
CVC-n-m
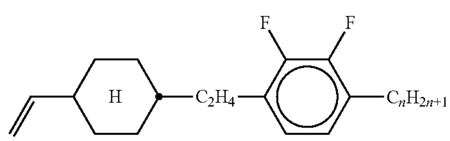
CEY-V-m
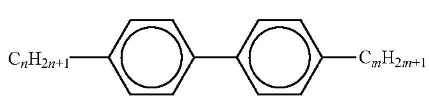
PP-n-m
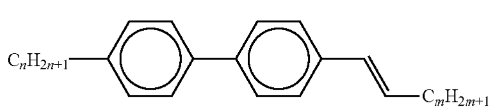
PP-n-Vm
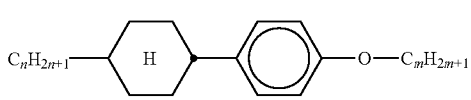
PCH-n-Om TABLE B-continued
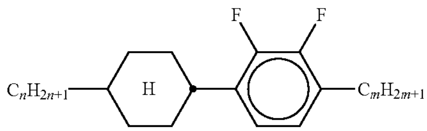
CY-n-m
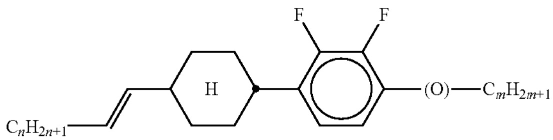
CY-nV-(O)m
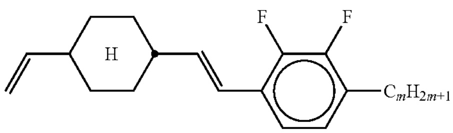
CVY-V-m
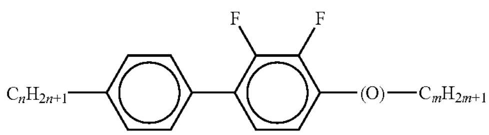
PY-n-(O)m
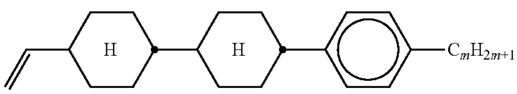
CCP-V-m
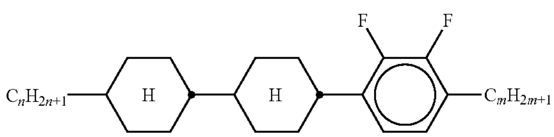
CCY-n-m
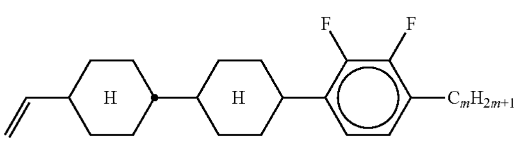
CCY-V-m
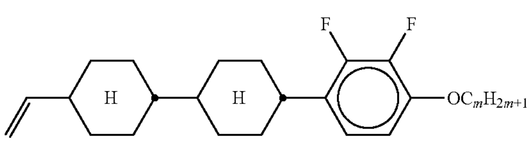
CCY-V-Om
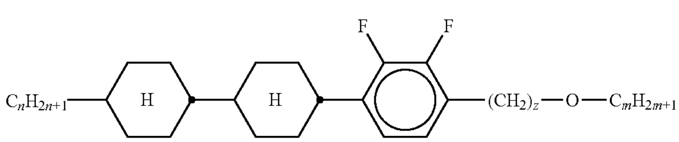
CCY-n-zOm TABLE B-continued
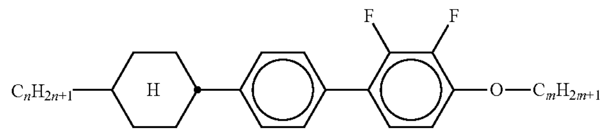
CPY-n-(O)m
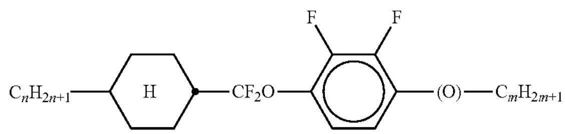
CQY-n-(O)m
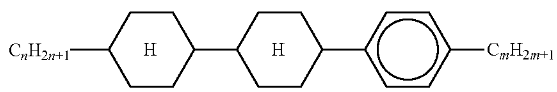
CCP-n-m
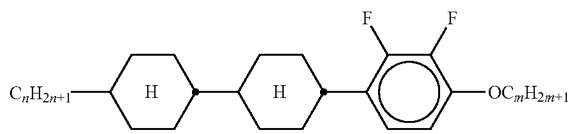
CCY-n-Om
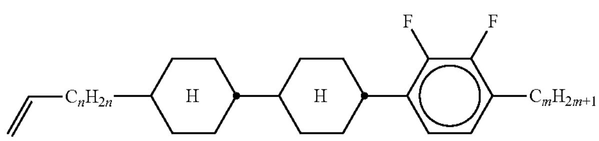
CCY-Vn-m
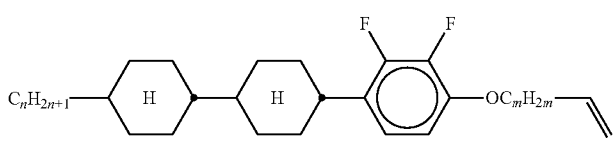
CCY-n-OmV
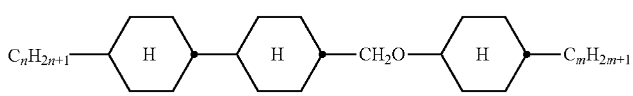
CCOC-n-m
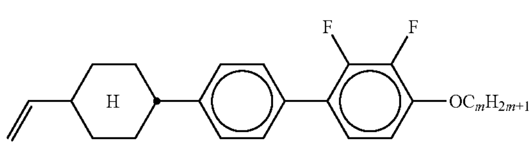
CPY-V-Om
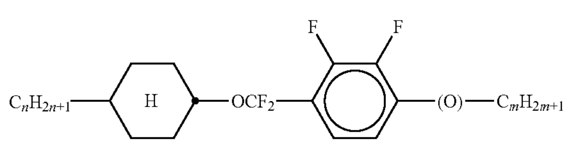
CQIY-n-(O)m
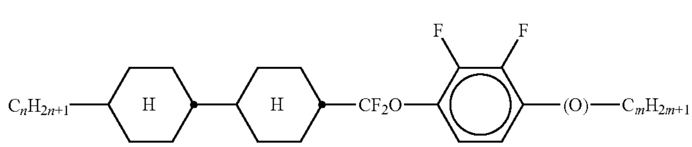
CCQY-n-(O)m TABLE B-continued
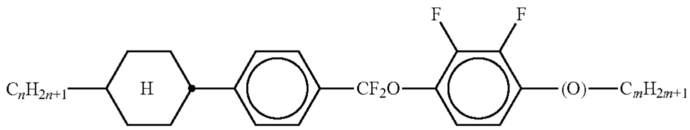
CPQY-n-(O)m
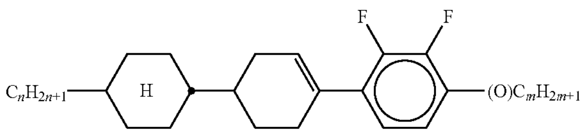
CLY-n-(O)m
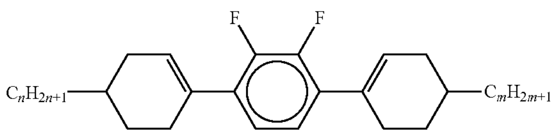
LYLI-n-m
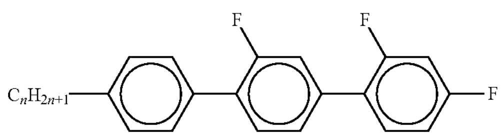
PGIGI-n-F
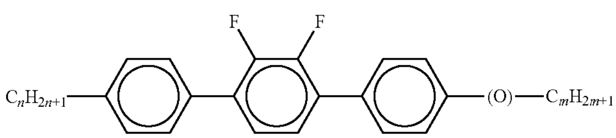
PYP-n-(O)m
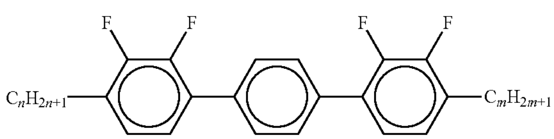
YPY-n-m
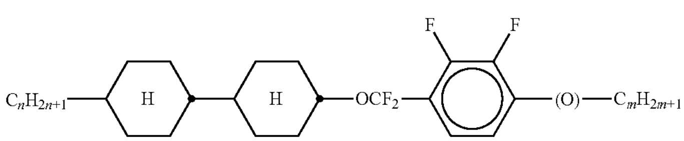
CCQIY-n-(O)m
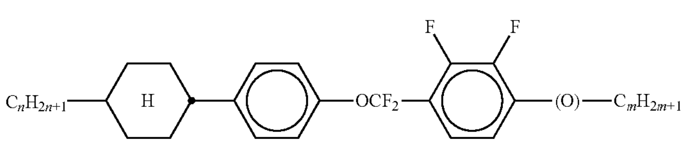
CPQIY-n-Om
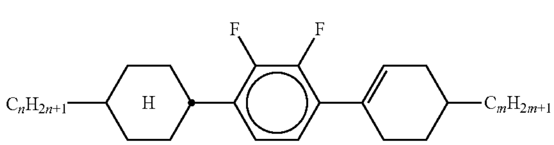
CYLI-n-m TABLE B-continued
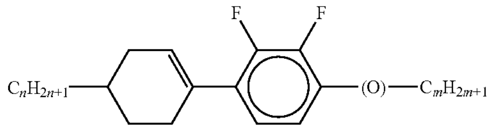
LY-n-(O)m
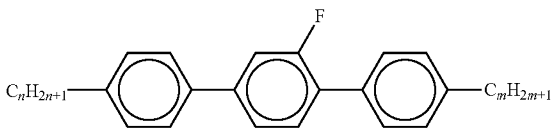
PGP-n-m
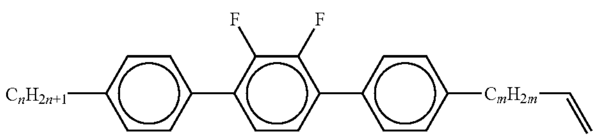
PYP-n-mV
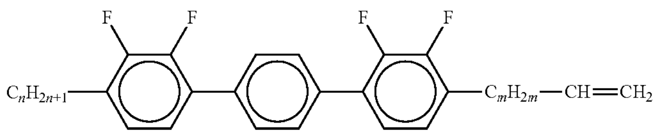
YPY-n-mV
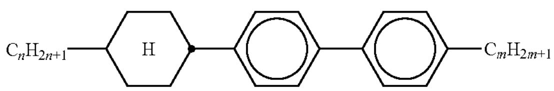
BCH-nm
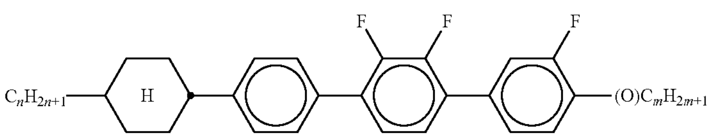
CPYP-n-(O)m
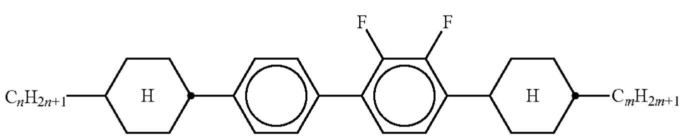
CPYC-n-m
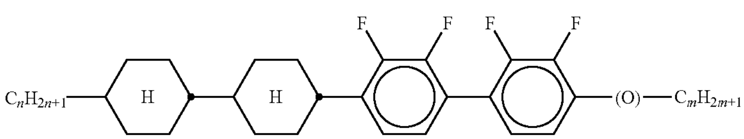
CCYY-n-m
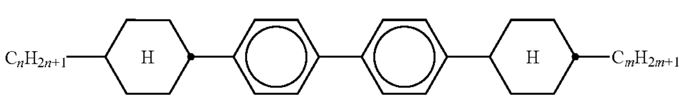
CBC-nm TABLE B-continued
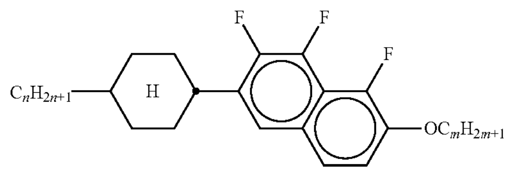
CNap-n-Om
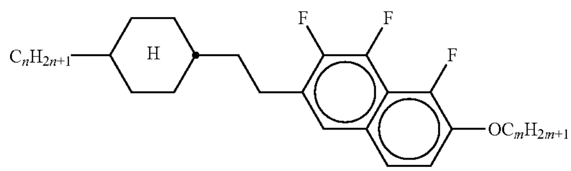
CENap-n-Om
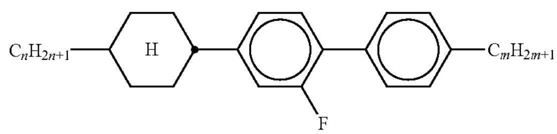
BCH-nmF
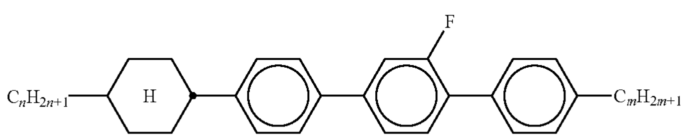
CPGP-n-m
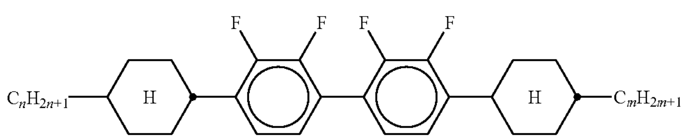
CYYC-n-m
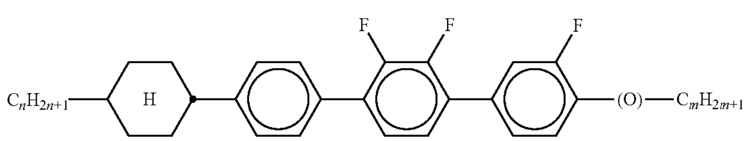
CPYG-n-(O)m
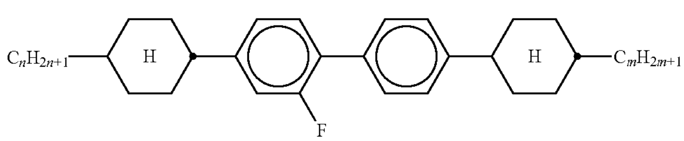
CBC-nmF
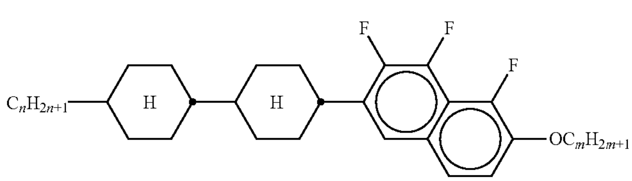
CCNap-n-Om TABLE B-continued
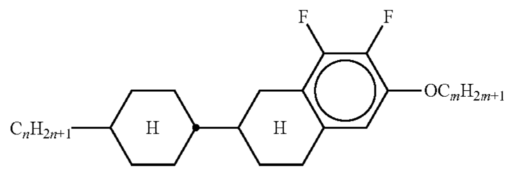
CTNap-n-Om
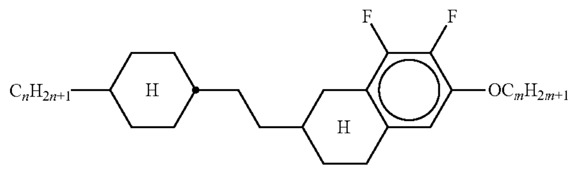
CETNap-n-Om
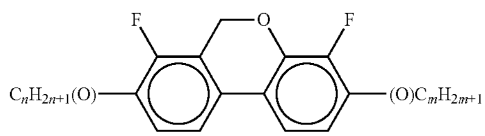
DFDBC-n(O)-(O)m
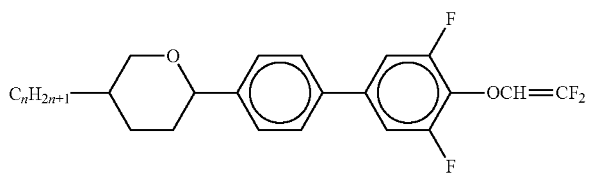
APU-n-OXF
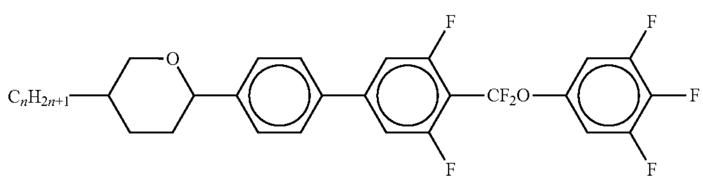
APUQU-n-F
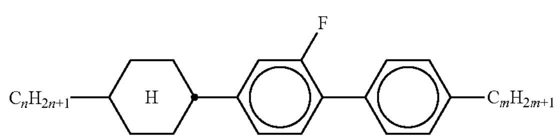
BCH-n.Fm
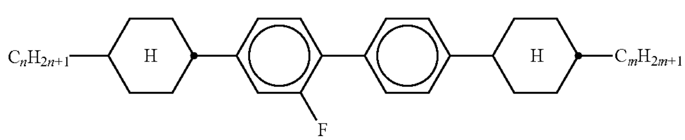
CBC-nmF
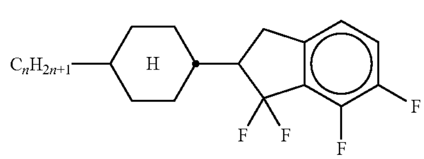
CK-n-F TABLE B-continued
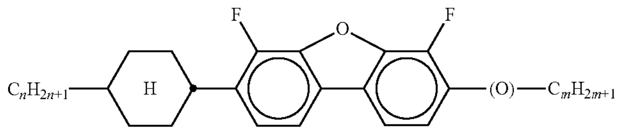
C-DFDBF-n-(O)m
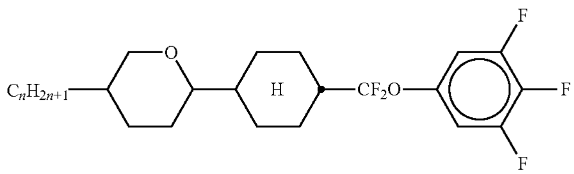
ACQU-n-F
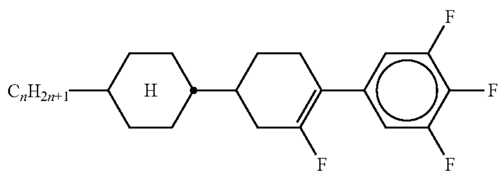
CFU-n-F
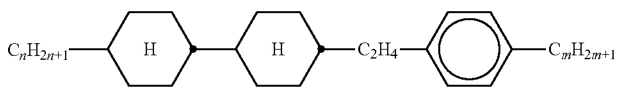
ECCP-nm
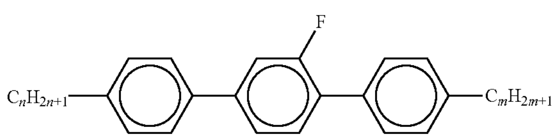
PGP-n-m
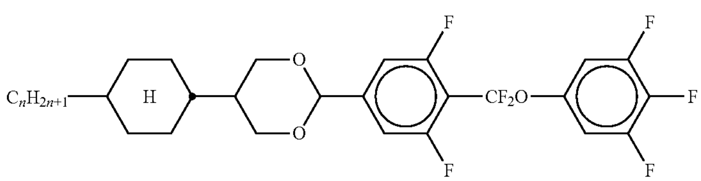
CDUQU-n-F
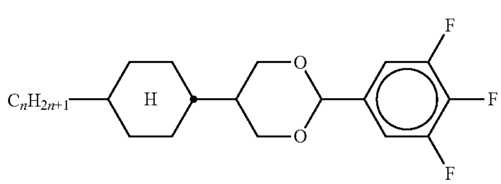
CDU-n-F
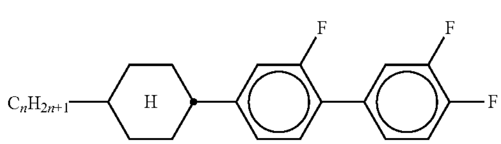
CGG-n-F TABLE B-continued
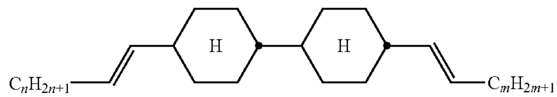
CC-nV-Vm
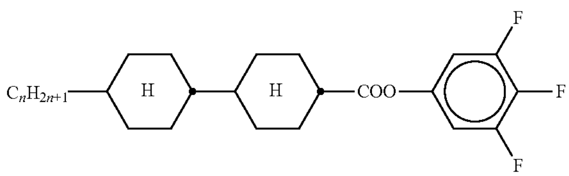
CCZU-n-F
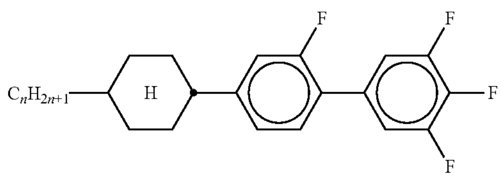
CGU-n-F
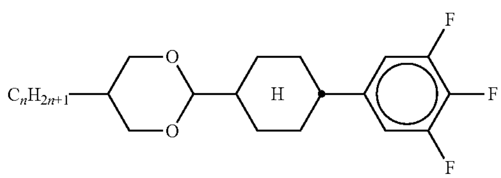
DCU-n-F
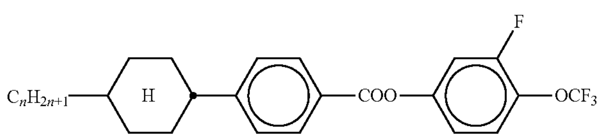
CPZG-n-OT
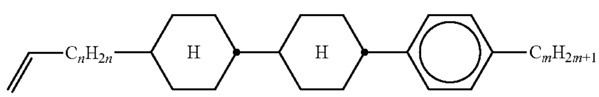
CCP-Vn-m
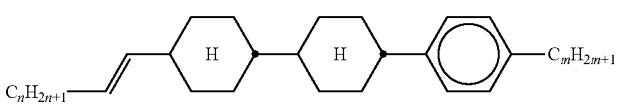
CCP-nV-m
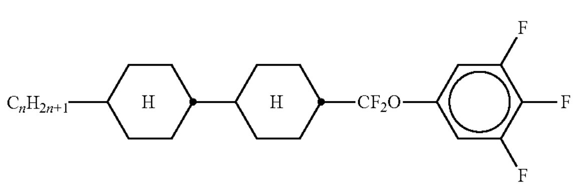
CCQU-n-F
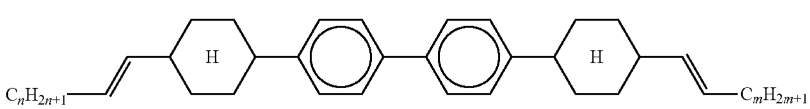
CPPC-nV-Vm TABLE B-continued
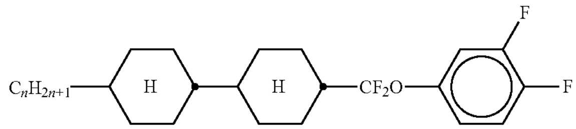
CCQG-n-F
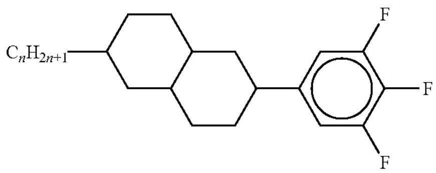
Dec-U-n-F
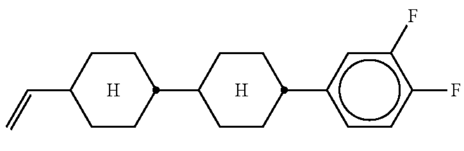
CCG-V-F
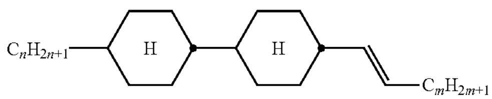
CC-n-Vm
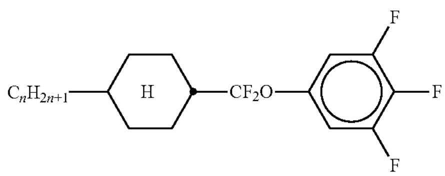
CQU-n-F
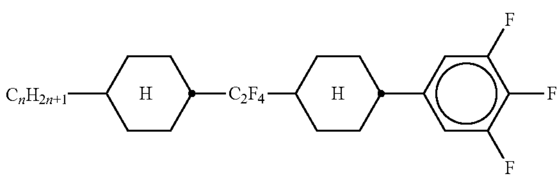
CWCU-n-F
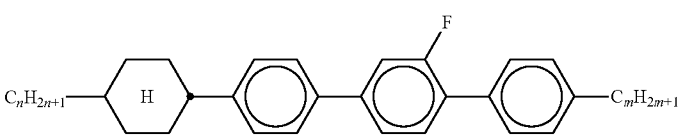
CPGP-n-m
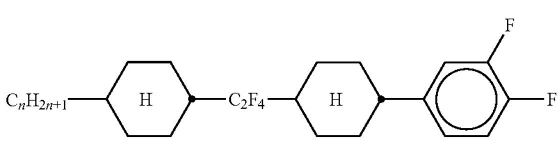
CWCG-n-F
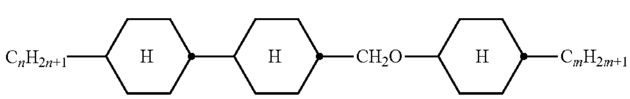
CCOC-n-m TABLE B-continued
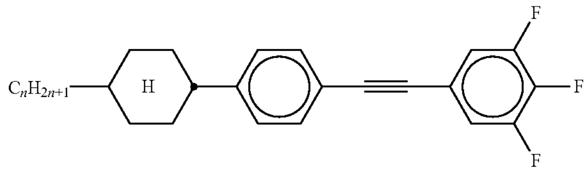
CPTU-n-F
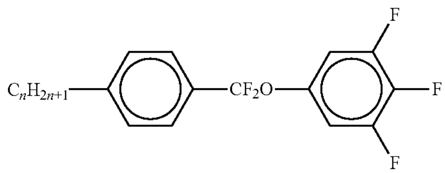
PQU-n-F
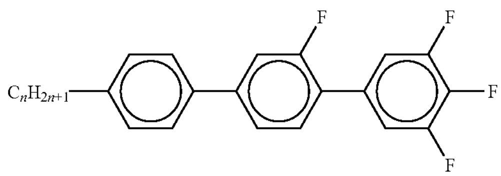
PGU-n-F
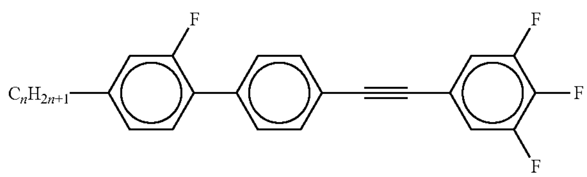
GPTU-n-F
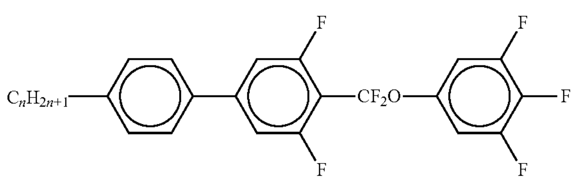
PUQU-n-F
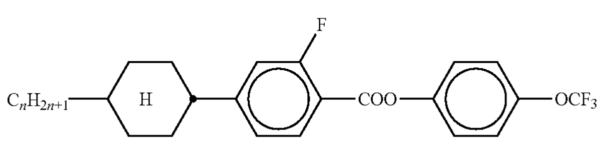
CGZP-n-OT
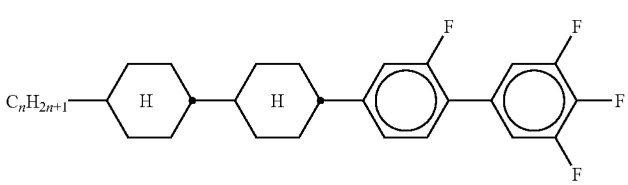
CCGU-n-F TABLE B-continued
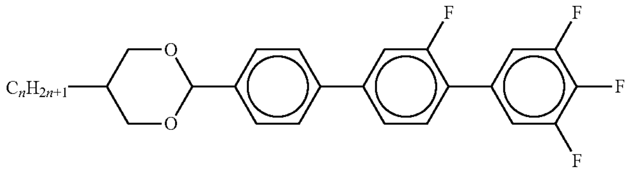
DPGU-n-F
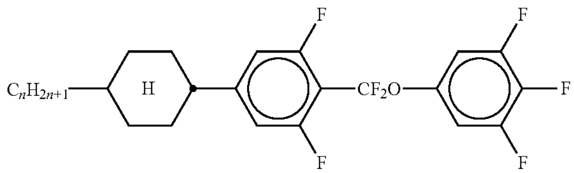
CUQU-n-F
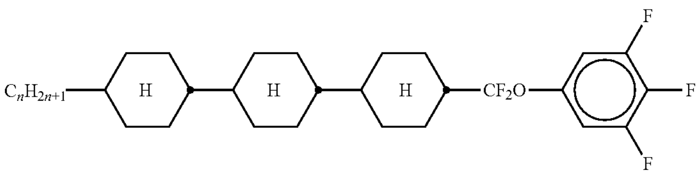
CCCQU-n-F
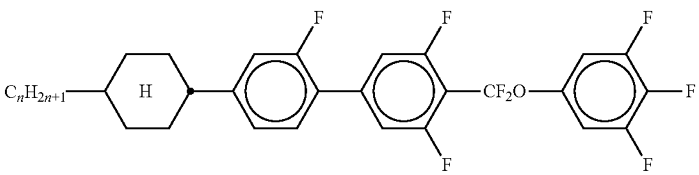
CGUQU-n-F
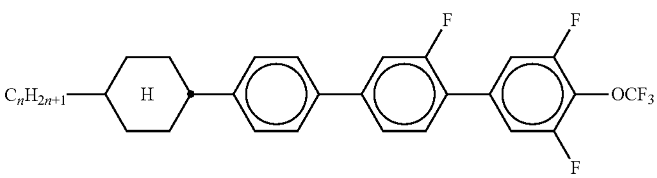
CPGU-n-OT
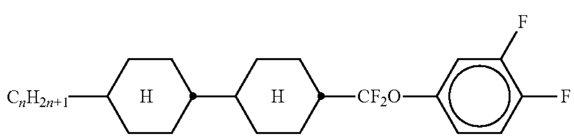
CCQG-n-F
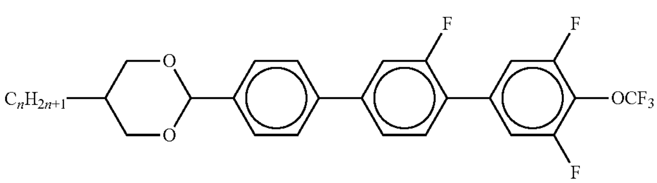
DPGU-n-OT
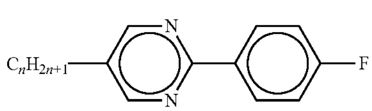
PYP-n-F TABLE B-continued
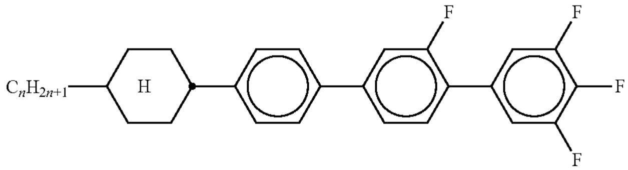
CPGU-n-F
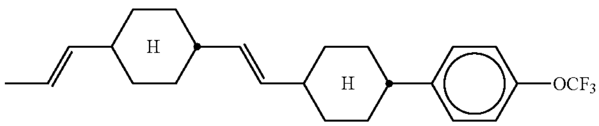
CVCP-1V-OT
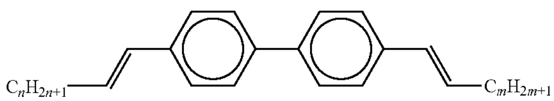
PP-nV-Vm
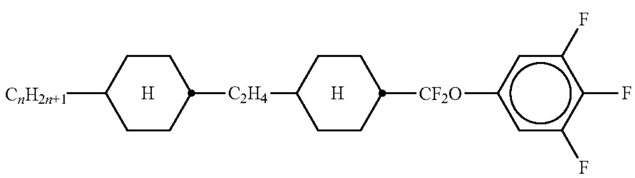
CWCQU-n-F
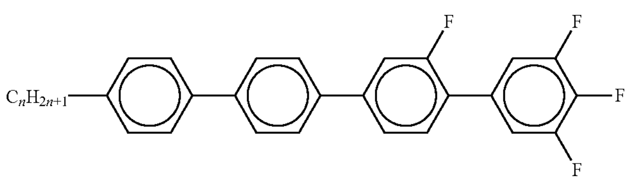
PPGU-n-F
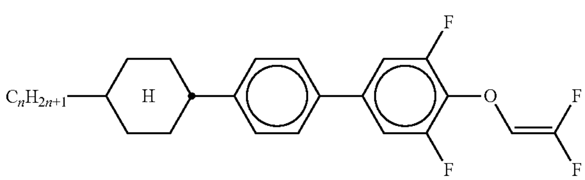
CPU-n-OXF
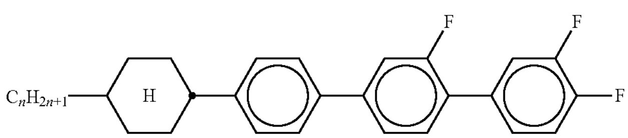
CPGG-n-F
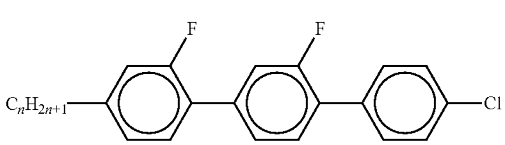
GGP-n-Cl TABLE B-continued
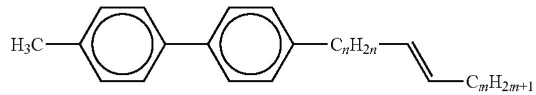
PP-1-nVm
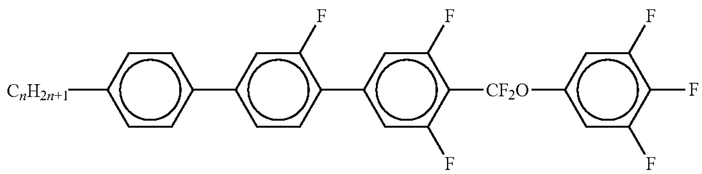
PGUQU-n-F
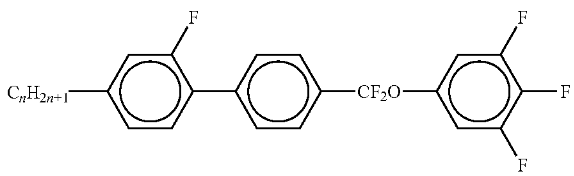
GPQU-n-F
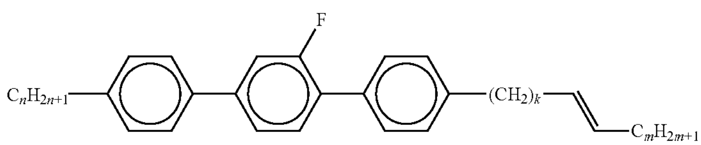
PGP-n-kVm
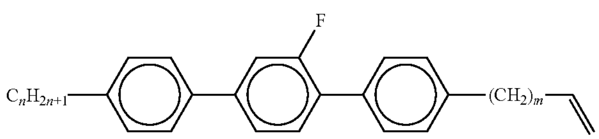
PGP-n-mV
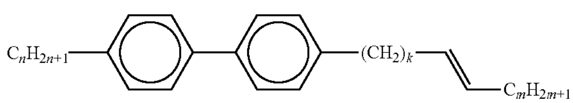
PP-n-kVm
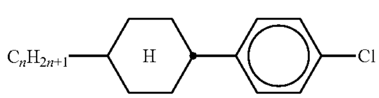
PCH-nCl
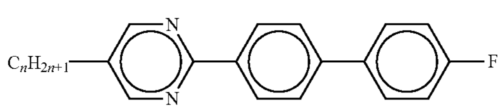
MPP-n-F
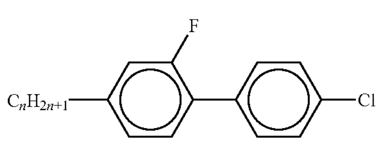
GP-n-Cl TABLE B-continued
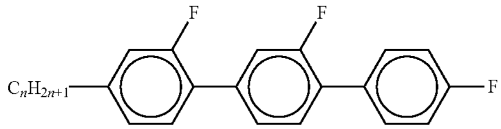
GGP-n-F
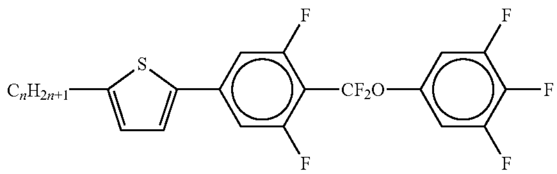
SUQU-n-F
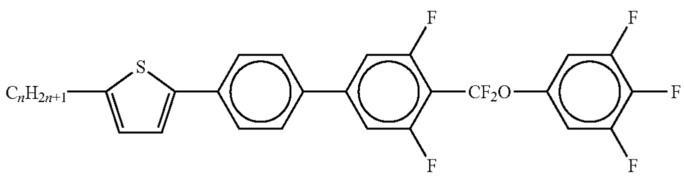
SPUQU-n-F
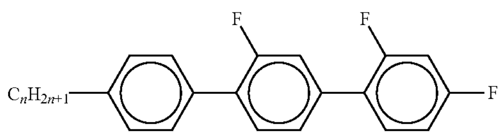
PGIGI-n-F
n, m, z, independently of one another, preferably denote 1, 2, 3, 4, 5 or 6.
In a preferred embodiment of the present invention, the LC media according to the invention comprise one or more compounds selected from the group consisting of compounds from Tables A and B.
TABLE C
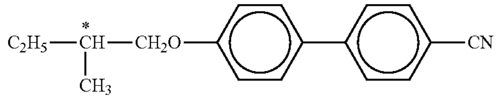
C 15
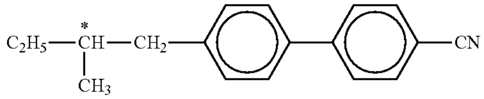
CB 15
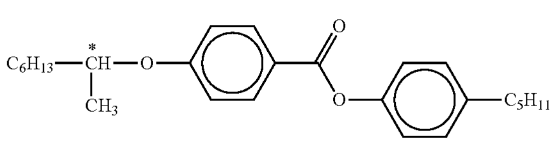
CM 21

TABLE C-continued
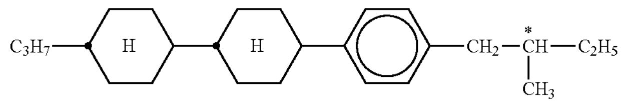
CM 44
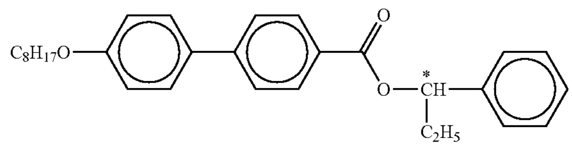
CM 47
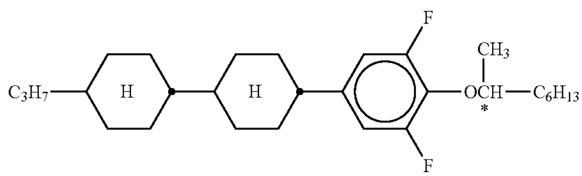
R/S-2011
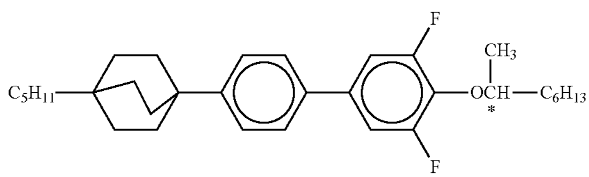
R/S-4011
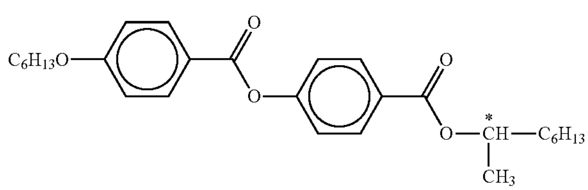
R/S-811
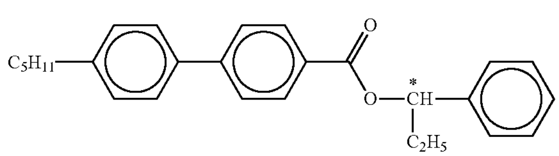
CM 45
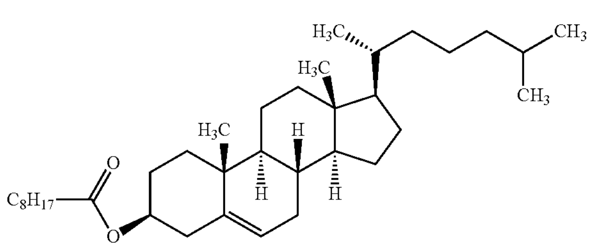
CN TABLE C-continued
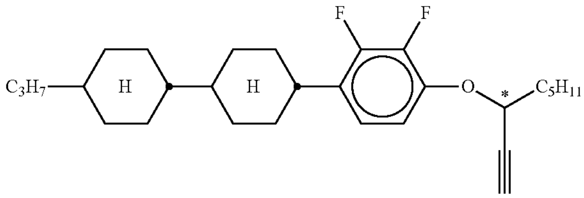
R/S-3011
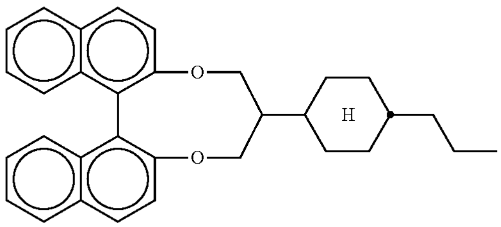
R/S-5011
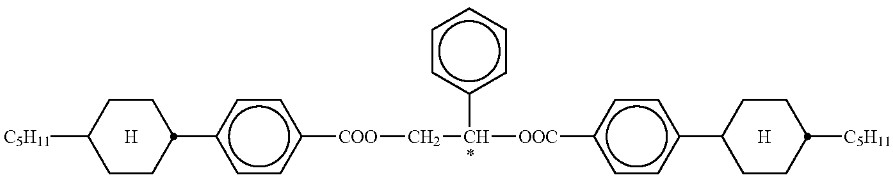
R/S-1011
Table C indicates possible chiral dopants which can be added to the LC media according to the invention.
The LC media optionally comprise 0 to 10% by weight, in particular 0.01 to 5% by weight, particularly preferably 0.1 to 3% by weight, of dopants, preferably selected from the group consisting of compounds from Table C.
TABLE D
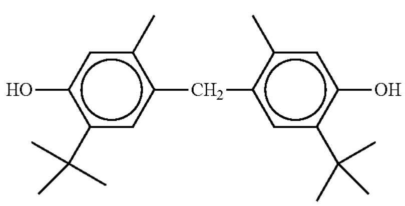
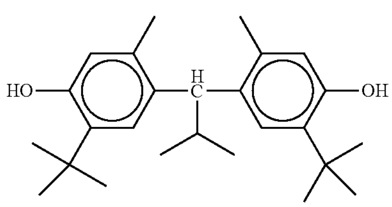
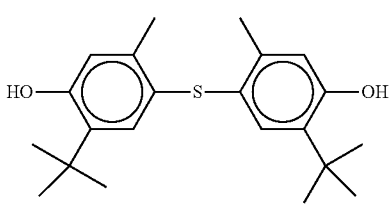

TABLE D-continued
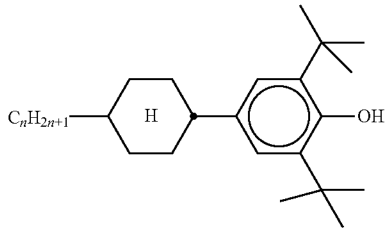
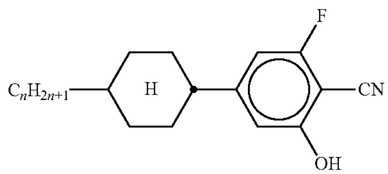
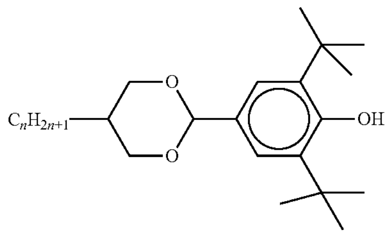
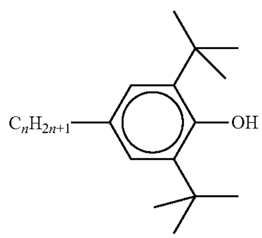
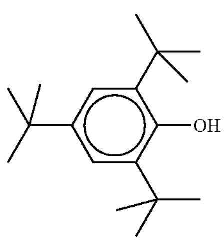
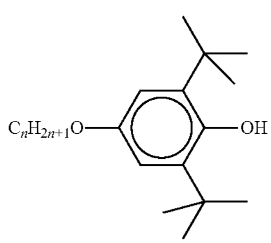
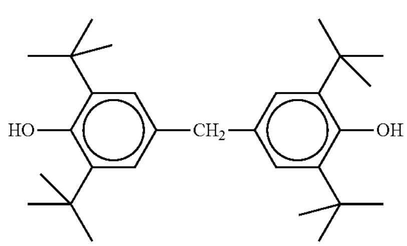

TABLE D-continued
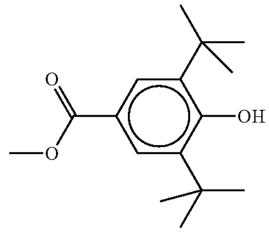
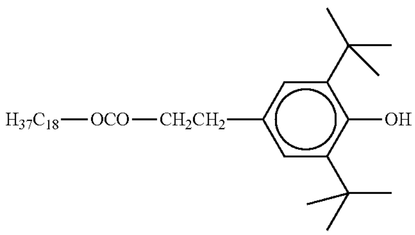
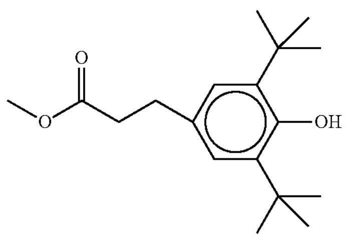
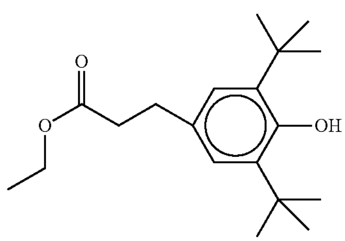
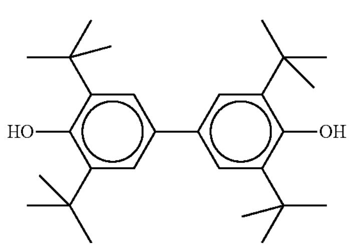

TABLE D-continued
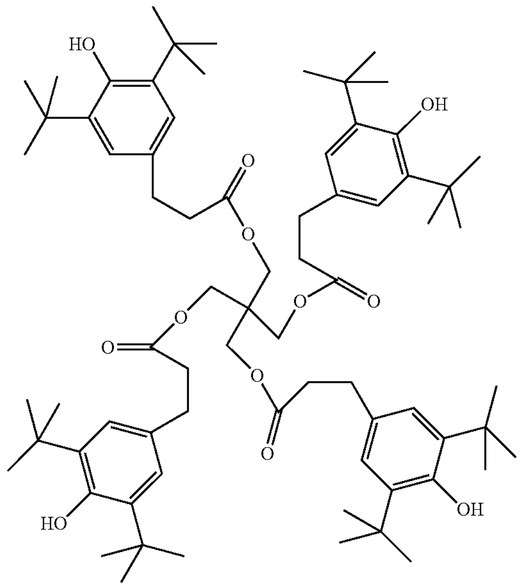 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
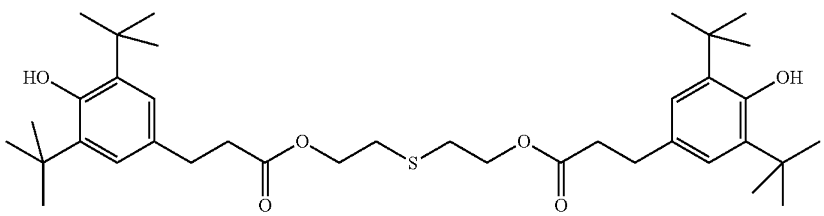 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
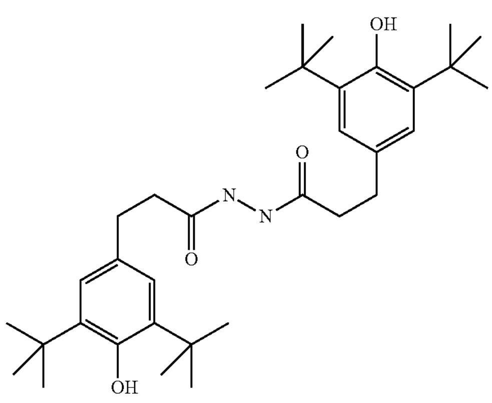 [SMILES: CC(C)(C)c1cc(CCC(=O)NNC(=O)CCc2cc(C(C)(C)C)c(O)c(C(C)(C)C)c2)cc(C(C)(C)C)c1O]
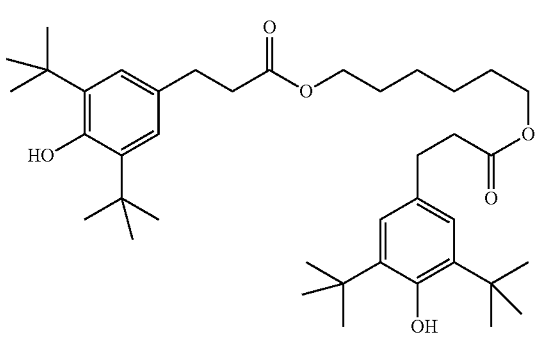 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE D-continued
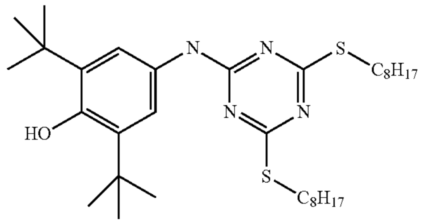
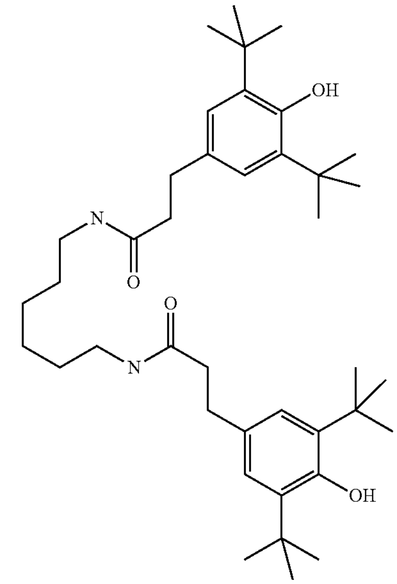 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
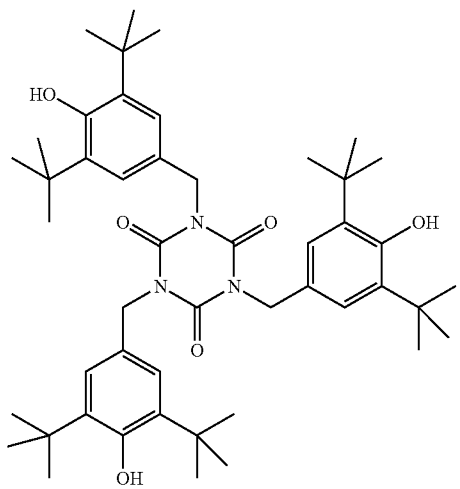 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
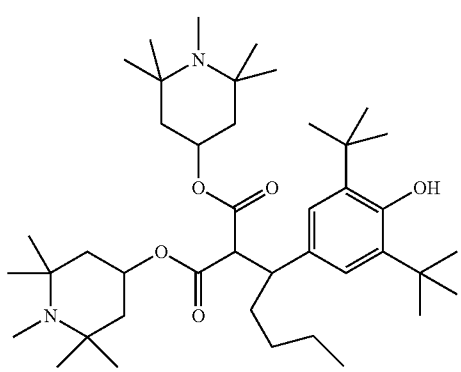 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
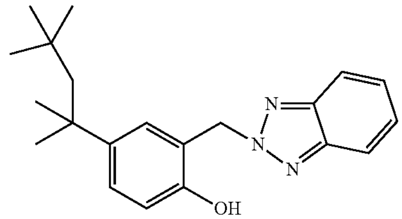 [SMILES: CC(C)(C)CC(C)(C)c1ccc(O)c(Cn2nc3ccccc3n2)c1]
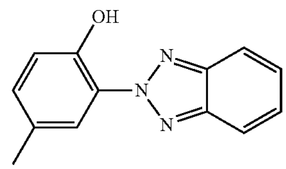 [SMILES: Cc1ccc(O)c(-n2nc3ccccc3n2)c1]
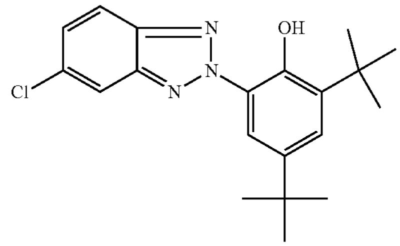 [SMILES: CC(C)(C)c1cc(-n2nc3ccc(Cl)cc3n2)c(O)c(C(C)(C)C)c1]
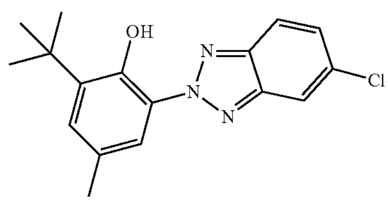 [SMILES: Cc1cc(-n2nc3ccc(Cl)cc3n2)c(O)c(C(C)(C)C)c1]
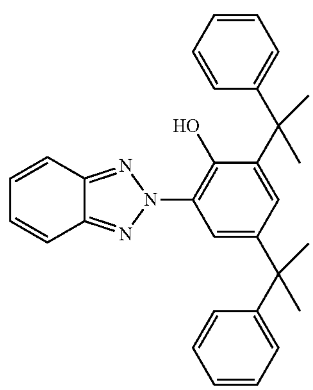 [SMILES: CC(C)(c1ccccc1)c1cc(-n2nc3ccccc3n2)c(O)c(C(C)(C)c2ccccc2)c1]
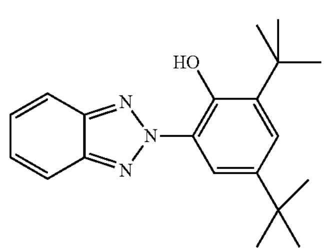 [SMILES: CC(C)(C)c1cc(-n2nc3ccccc3n2)c(O)c(C(C)(C)C)c1]

TABLE D-continued
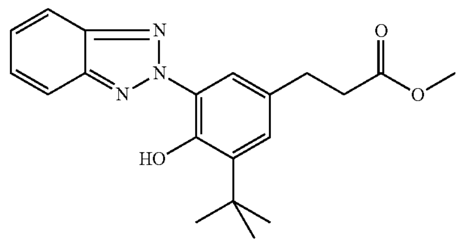 [SMILES: COC(=O)CCc1cc(-n2nc3ccccc3n2)c(O)c(C(C)(C)C)c1]
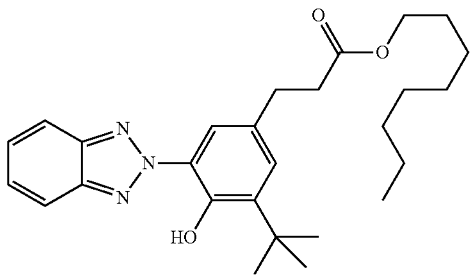 [SMILES: CCCCCCCCOC(=O)CCc1cc(-n2nc3ccccc3n2)c(O)c(C(C)(C)C)c1]
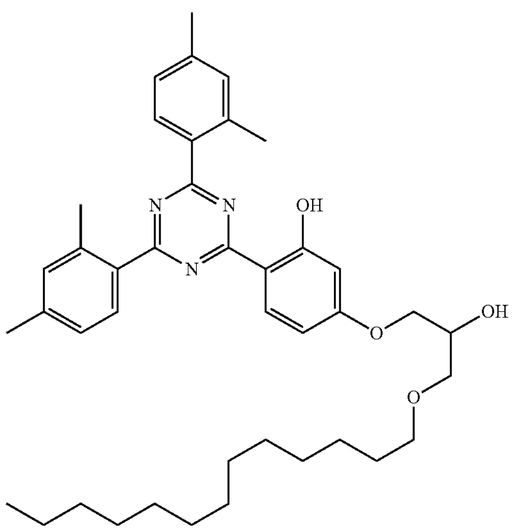 [SMILES: CCCCCCCCCCCCCOCC(O)COc1ccc(-c2nc(-c3ccc(C)cc3C)nc(-c3ccc(C)cc3C)n2)c(O)c1]
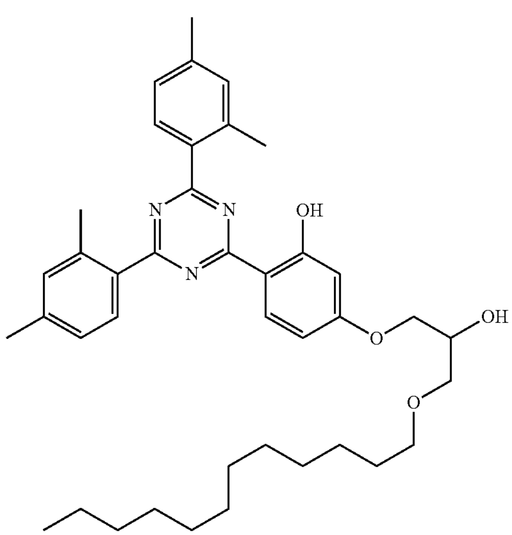 [SMILES: CCCCCCCCCCCCOCC(O)COc1ccc(-c2nc(-c3ccc(C)cc3C)nc(-c3ccc(C)cc3C)n2)c(O)c1]

TABLE D-continued

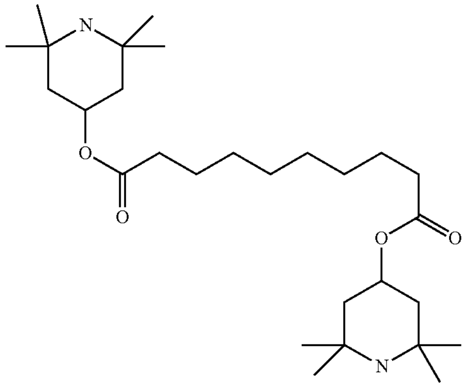

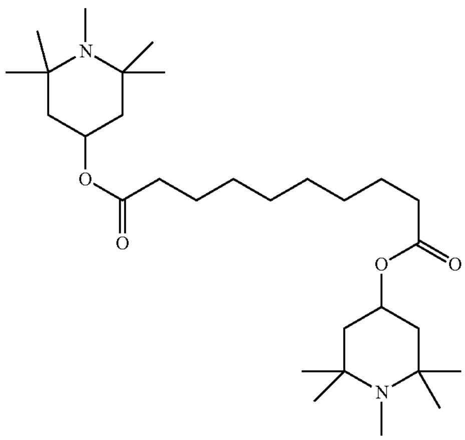

Table D indicates possible stabilizers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table D.

TABLE E

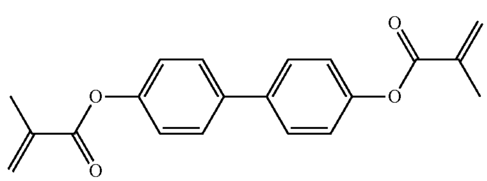 [SMILES: C=C(C)C(=O)Oc1ccc(-c2ccc(OC(=O)C(=C)C)cc2)cc1]

RM-1

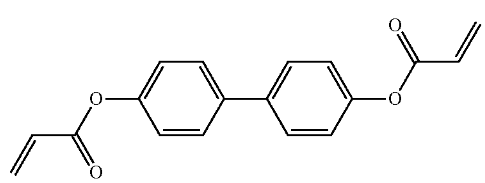

RM-2

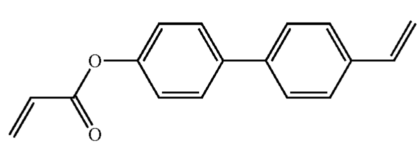 [SMILES: C=CC(=O)Oc1ccc(-c2ccc(C=C)cc2)cc1]

RM-3

TABLE E-continued
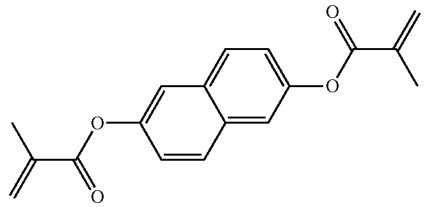 [SMILES: C=C(C)C(=O)Oc1ccc2cc(OC(=O)C(=C)C)ccc2c1]
RM-4
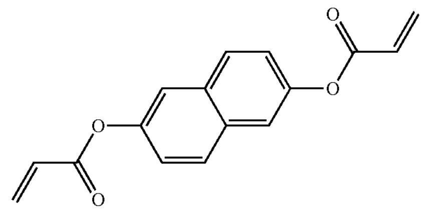 [SMILES: C=CC(=O)Oc1ccc2cc(OC(=O)C=C)ccc2c1]
RM-5
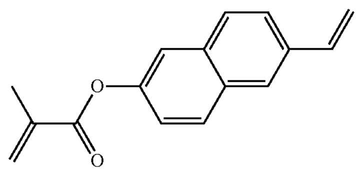 [SMILES: C=Cc1ccc2cc(OC(=O)C(=C)C)ccc2c1]
RM-6
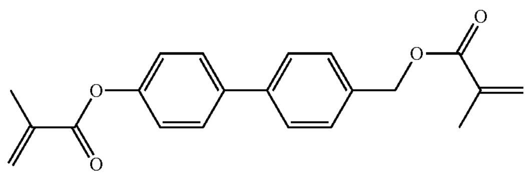 [SMILES: C=C(C)C(=O)OCc1ccc(-c2ccc(OC(=O)C(=C)C)cc2)cc1]
RM-7
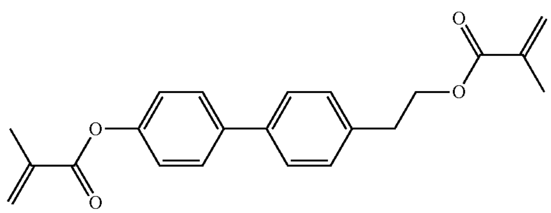 [SMILES: C=C(C)C(=O)OCCc1ccc(-c2ccc(OC(=O)C(=C)C)cc2)cc1]
RM-8
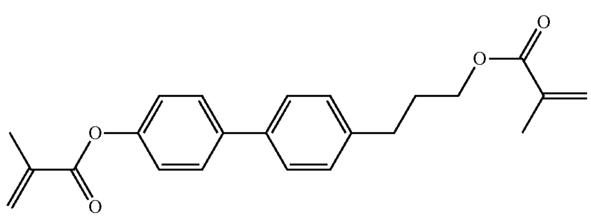 [SMILES: C=C(C)C(=O)OCCCc1ccc(-c2ccc(OC(=O)C(=C)C)cc2)cc1]
RM-9
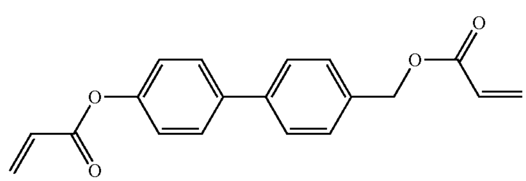 [SMILES: C=CC(=O)OCc1ccc(-c2ccc(OC(=O)C=C)cc2)cc1]
RM-10
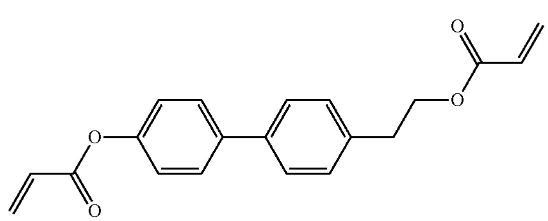 [SMILES: C=CC(=O)OCCc1ccc(-c2ccc(OC(=O)C=C)cc2)cc1]
RM-11

TABLE E-continued
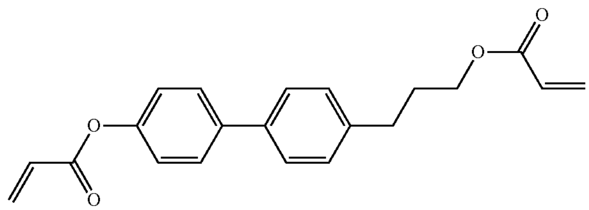 [SMILES: C=CC(=O)OCCCc1ccc(-c2ccc(OC(=O)C=C)cc2)cc1]
RM-12
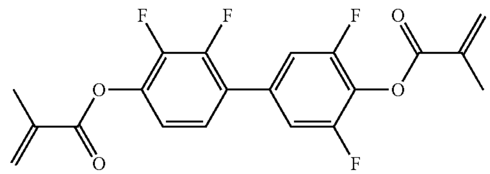 [SMILES: C=C(C)C(=O)Oc1ccc(-c2cc(F)c(OC(=O)C(=C)C)c(F)c2)c(F)c1F]
RM-13
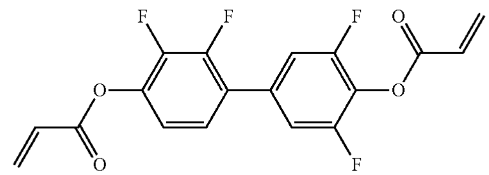 [SMILES: C=CC(=O)Oc1ccc(-c2cc(F)c(OC(=O)C=C)c(F)c2)c(F)c1F]
RM-14
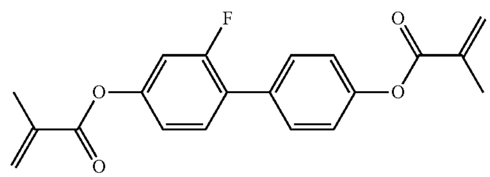
RM-15
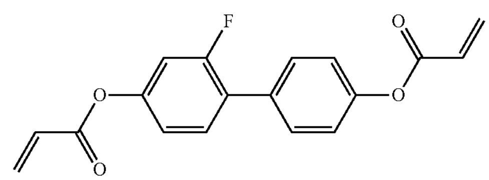 [SMILES: C=CC(=O)Oc1ccc(-c2ccc(OC(=O)C=C)cc2F)cc1]
RM-16
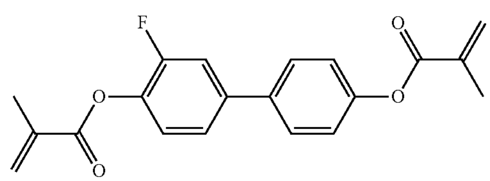
RM-17
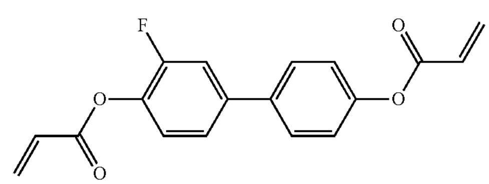
RM-18
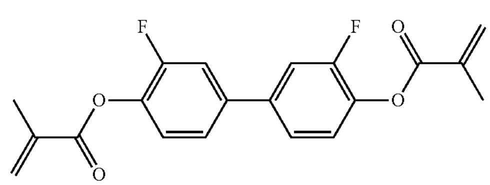 [SMILES: C=C(C)C(=O)Oc1ccc(-c2ccc(OC(=O)C(=C)C)c(F)c2)cc1]
RM-19

TABLE E-continued
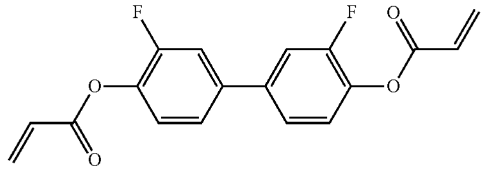 [SMILES: C=CC(=O)Oc1ccc(-c2ccc(OC(=O)C=C)c(F)c2)cc1]
RM-20
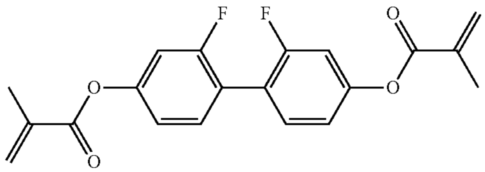
RM-21
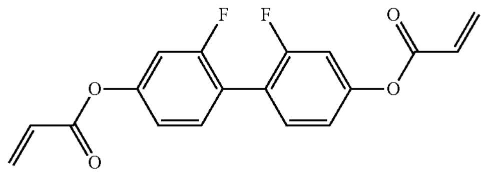
RM-22
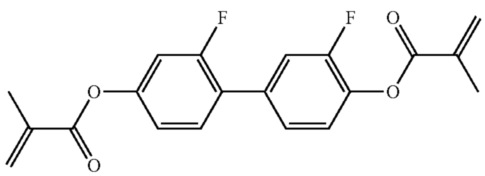
RM-23
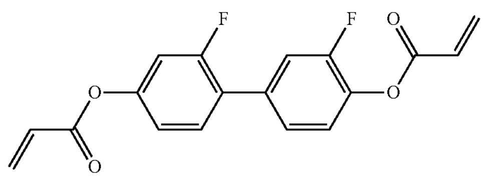 [SMILES: C=CC(=O)Oc1ccc(-c2ccc(OC(=O)C=C)c(F)c2)c(F)c1]
RM-24
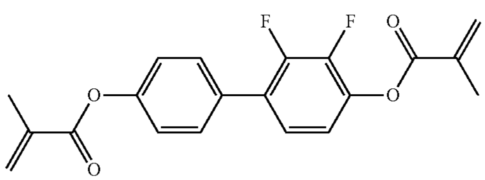
RM-25
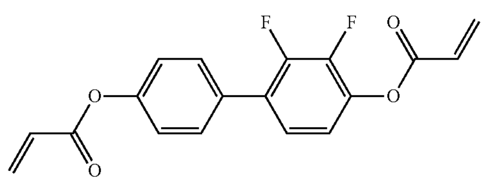 [SMILES: C=CC(=O)Oc1ccc(-c2ccc(OC(=O)C=C)c(F)c2F)cc1]
RM-26
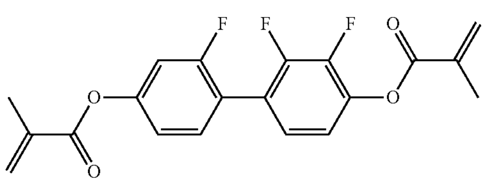 [SMILES: C=C(C)C(=O)Oc1ccc(-c2ccc(OC(=O)C(=C)C)c(F)c2F)c(F)c1]
RM-27
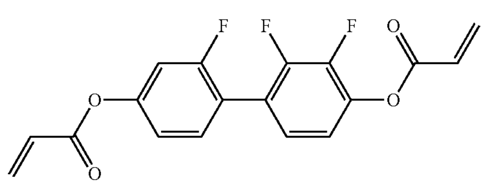 [SMILES: C=CC(=O)Oc1ccc(-c2ccc(OC(=O)C=C)c(F)c2F)c(F)c1]
RM-28

TABLE E-continued
RM-29
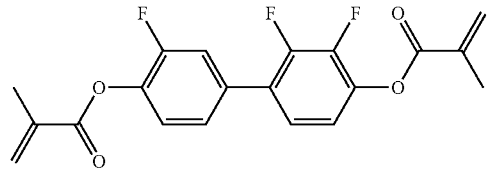 [SMILES: C=C(C)C(=O)Oc1ccc(-c2ccc(OC(=O)C(=C)C)c(F)c2F)cc1F]
RM-30
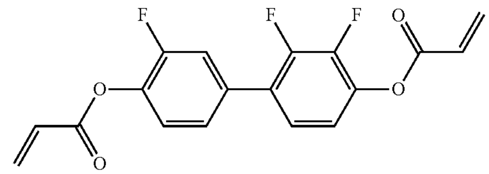 [SMILES: C=CC(=O)Oc1ccc(-c2ccc(OC(=O)C=C)c(F)c2F)cc1F]
RM-31
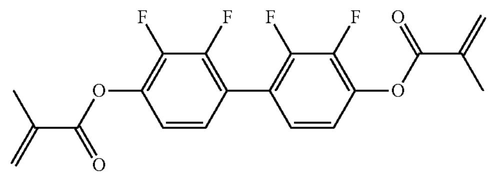 [SMILES: C=C(C)C(=O)Oc1ccc(-c2ccc(OC(=O)C(=C)C)c(F)c2F)c(F)c1F]
RM-32
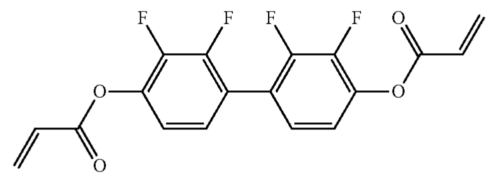 [SMILES: C=CC(=O)Oc1ccc(-c2ccc(OC(=O)C=C)c(F)c2F)c(F)c1F]
RM-33
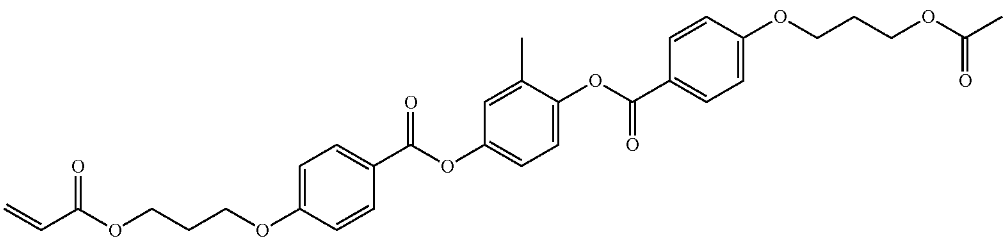 [SMILES: C=CC(=O)OCCCOc1ccc(C(=O)Oc2ccc(OC(=O)c3ccc(OCCCOC(C)=O)cc3)c(C)c2)cc1]
RM-34
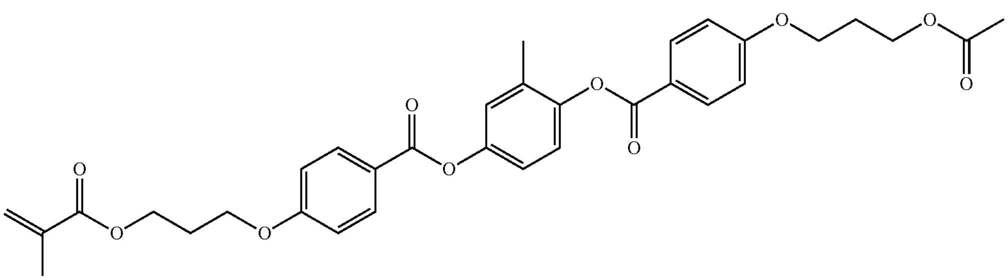 [SMILES: C=C(C)C(=O)OCCCOc1ccc(C(=O)Oc2ccc(OC(=O)c3ccc(OCCCOC(C)=O)cc3)c(C)c2)cc1]
RM-35
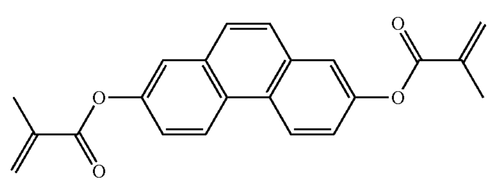 [SMILES: C=C(C)C(=O)Oc1ccc2c(ccc3cc(OC(=O)C(=C)C)ccc32)c1]
RM-36
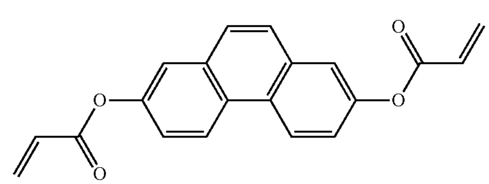 [SMILES: C=CC(=O)Oc1ccc2c(ccc3cc(OC(=O)C=C)ccc32)c1]

TABLE E-continued
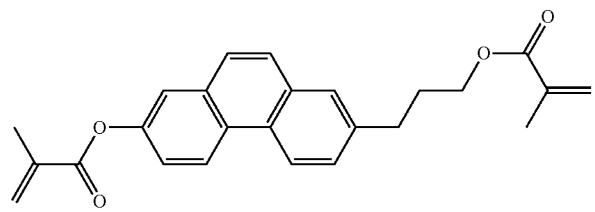 [SMILES: C=C(C)C(=O)OCCCc1ccc2c(ccc3cc(OC(=O)C(=C)C)ccc32)c1]
RM-37
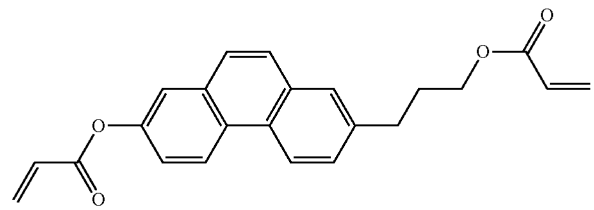 [SMILES: C=CC(=O)OCCCc1ccc2c(ccc3cc(OC(=O)C=C)ccc32)c1]
RM-38
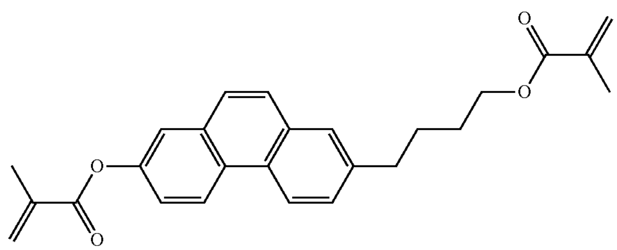 [SMILES: C=C(C)C(=O)OCCCCc1ccc2c(ccc3cc(OC(=O)C(=C)C)ccc32)c1]
RM-39
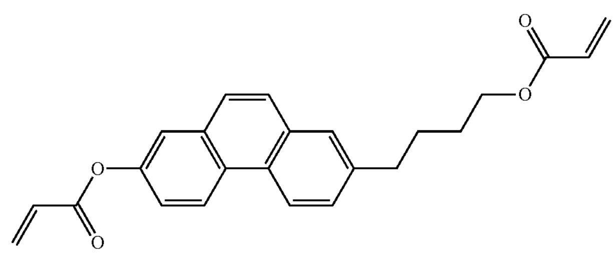 [SMILES: C=CC(=O)OCCCCc1ccc2c(ccc3cc(OC(=O)C=C)ccc32)c1]
RM-40
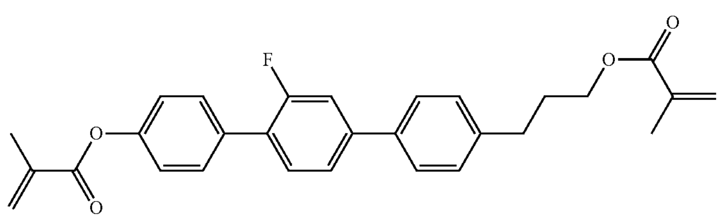 [SMILES: C=C(C)C(=O)OCCCc1ccc(-c2ccc(-c3ccc(OC(=O)C(=C)C)cc3)c(F)c2)cc1]
RM-41
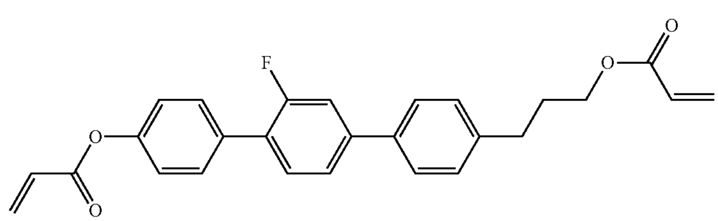 [SMILES: C=CC(=O)OCCCc1ccc(-c2ccc(-c3ccc(OC(=O)C=C)cc3)c(F)c2)cc1]
RM-42
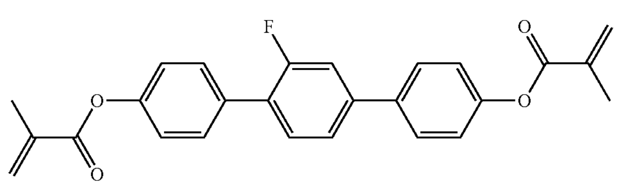 [SMILES: C=C(C)C(=O)Oc1ccc(-c2ccc(-c3ccc(OC(=O)C(=C)C)cc3)c(F)c2)cc1]
RM-43

TABLE E-continued
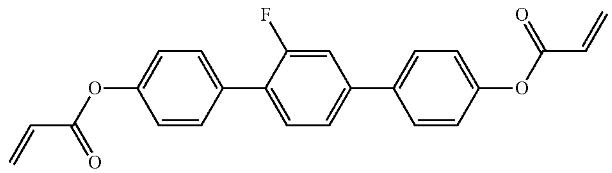 [SMILES: C=CC(=O)Oc1ccc(-c2ccc(-c3ccc(OC(=O)C=C)cc3)c(F)c2)cc1]
RM-44
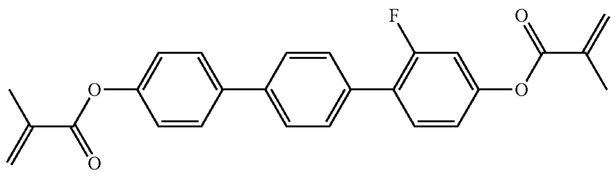
RM-45
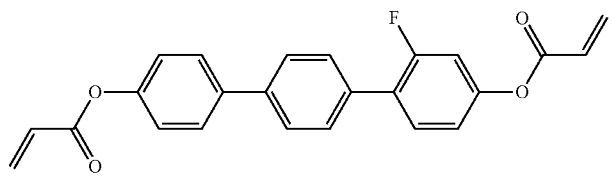
RM-46
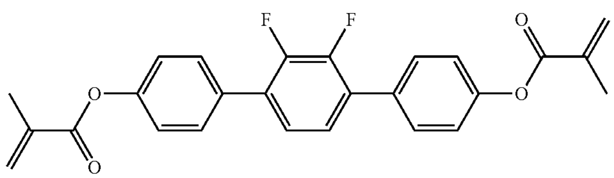 [SMILES: C=C(C)C(=O)Oc1ccc(-c2ccc(-c3ccc(OC(=O)C(=C)C)cc3F)cc2)cc1]
RM-47
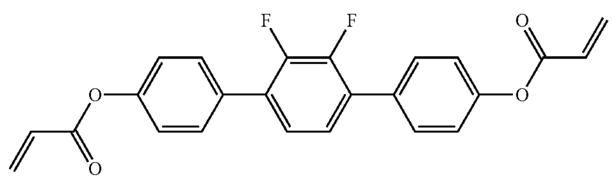 [SMILES: C=CC(=O)Oc1ccc(-c2ccc(-c3ccc(OC(=O)C=C)cc3)c(F)c2F)cc1]
RM-48
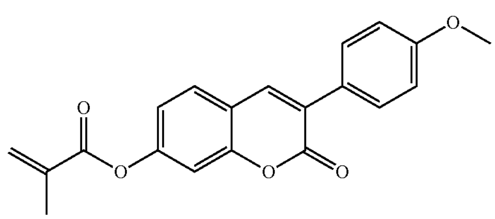 [SMILES: C=C(C)C(=O)Oc1ccc2cc(-c3ccc(OC)cc3)c(=O)oc2c1]
RM-49
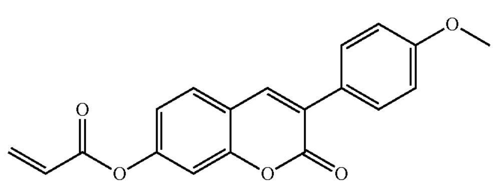 [SMILES: C=CC(=O)Oc1ccc2cc(-c3ccc(OC)cc3)c(=O)oc2c1]
RM-50
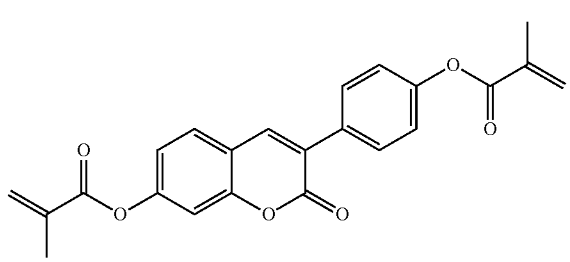 [SMILES: C=C(C)C(=O)Oc1ccc(-c2cc3ccc(OC(=O)C(=C)C)cc3oc2=O)cc1]
RM-51

TABLE E-continued
RM-52
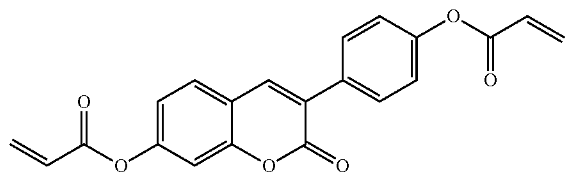 [SMILES: C=CC(=O)Oc1ccc(-c2cc3ccc(OC(=O)C=C)cc3oc2=O)cc1]
RM-53
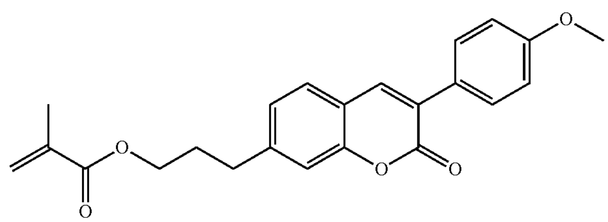 [SMILES: C=C(C)C(=O)OCCCc1ccc2cc(-c3ccc(OC)cc3)c(=O)oc2c1]
RM-54
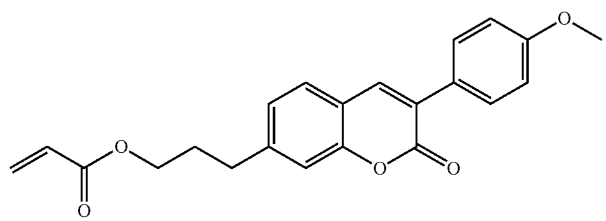 [SMILES: C=CC(=O)OCCCc1ccc2cc(-c3ccc(OC)cc3)c(=O)oc2c1]
RM-55
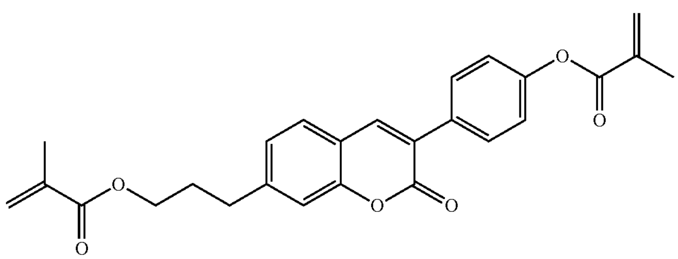 [SMILES: C=C(C)C(=O)OCCCc1ccc2cc(-c3ccc(OC(=O)C(=C)C)cc3)c(=O)oc2c1]
RM-56
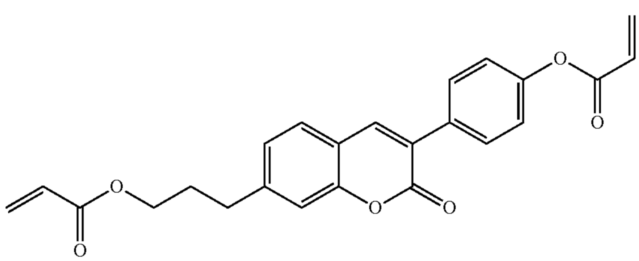 [SMILES: C=CC(=O)OCCCc1ccc2cc(-c3ccc(OC(=O)C=C)cc3)c(=O)oc2c1]
RM-57
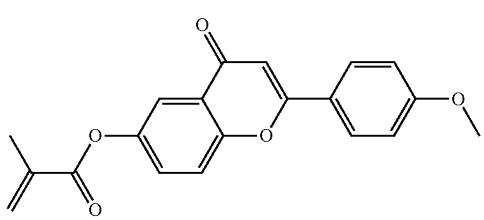 [SMILES: C=C(C)C(=O)Oc1ccc2oc(-c3ccc(OC)cc3)cc(=O)c2c1]
RM-58
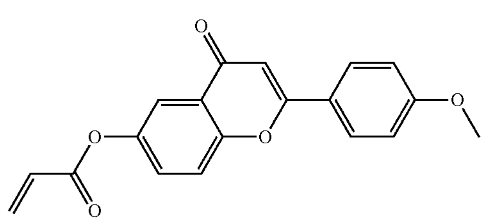 [SMILES: C=CC(=O)Oc1ccc2oc(-c3ccc(OC)cc3)cc(=O)c2c1]

TABLE E-continued
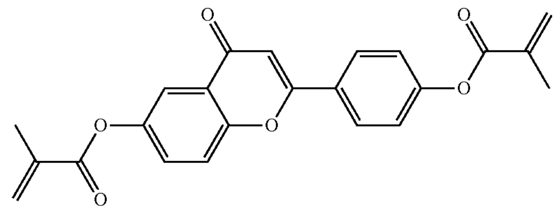 [SMILES: C=C(C)C(=O)Oc1ccc(-c2cc(=O)c3cc(OC(=O)C(=C)C)ccc3o2)cc1]
RM-59
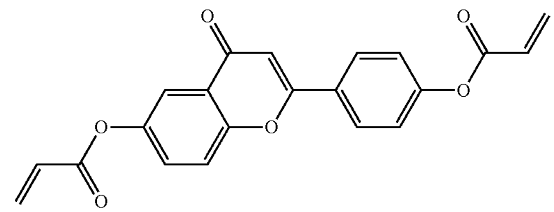 [SMILES: C=CC(=O)Oc1ccc(-c2cc(=O)c3cc(OC(=O)C=C)ccc3o2)cc1]
RM-60
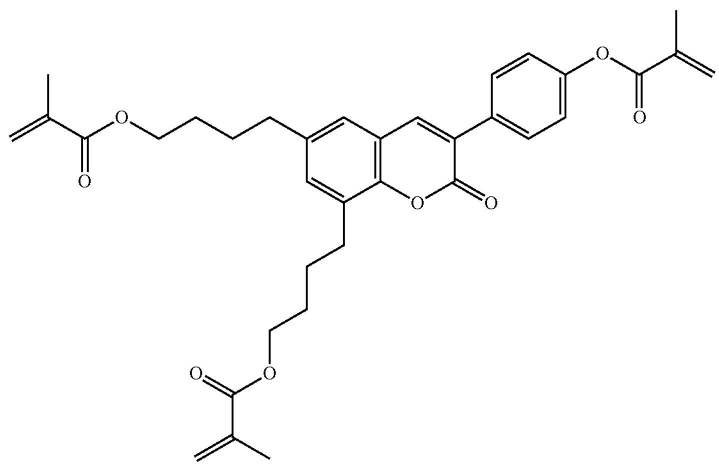 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61
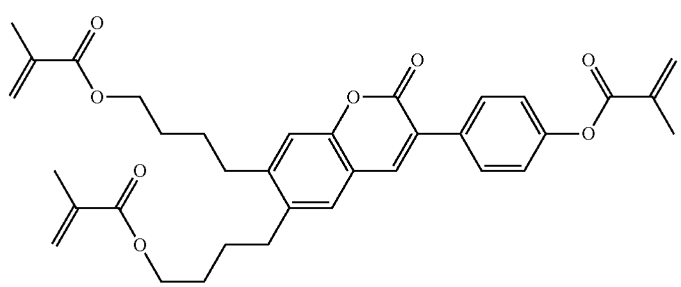 [SMILES: C=C(C)C(=O)OCCCCc1cc2cc(-c3ccc(OC(=O)C(=C)C)cc3)c(=O)oc2cc1CCCCOC(=O)C(=C)C]
RM-62
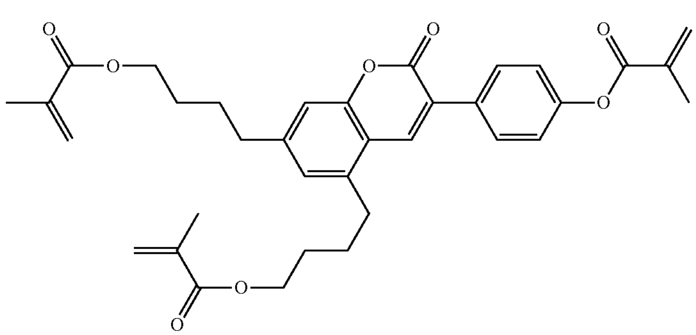 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63

TABLE E-continued
RM-64
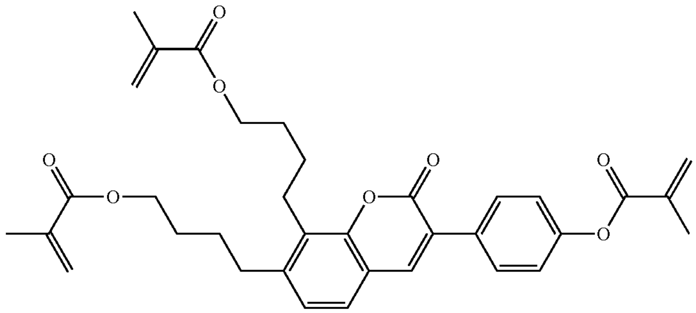 [SMILES: C=C(C)C(=O)OCCCCc1ccc2cc(-c3ccc(OC(=O)C(=C)C)cc3)c(=O)oc2c1CCCCOC(=O)C(=C)C]
RM-68
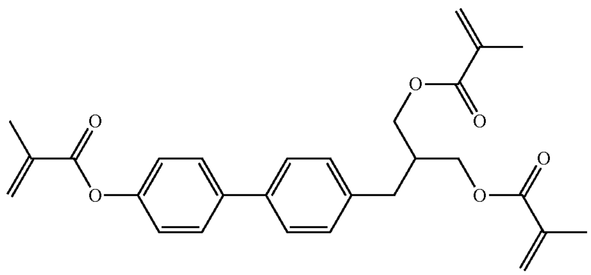 [SMILES: C=C(C)C(=O)OCC(COC(=O)C(=C)C)Cc1ccc(-c2ccc(OC(=O)C(=C)C)cc2)cc1]
RM-69
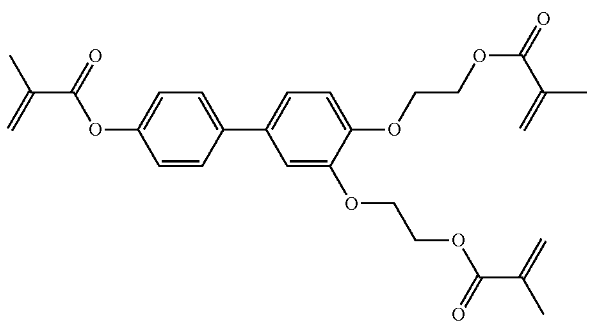 [SMILES: C=C(C)C(=O)OCCOc1ccc(-c2ccc(OC(=O)C(=C)C)cc2)cc1OCCOC(=O)C(=C)C]
RM-70
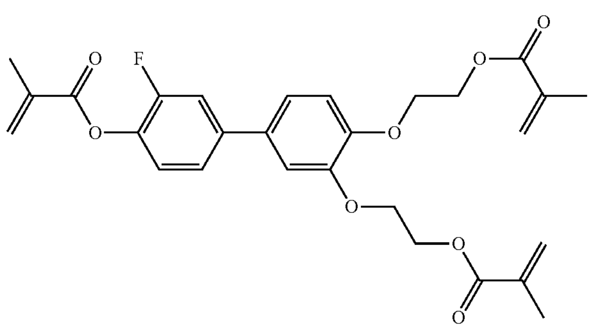 [SMILES: C=C(C)C(=O)OCCOc1ccc(-c2ccc(OC(=O)C(=C)C)c(F)c2)cc1OCCOC(=O)C(=C)C]
RM-71
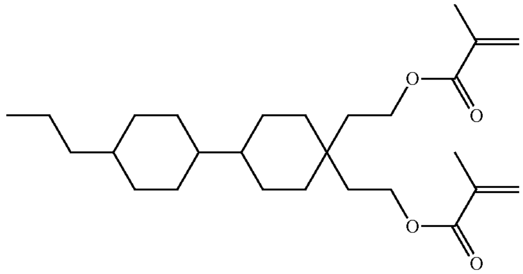 [SMILES: C=C(C)C(=O)OCCC1(CCOC(=O)C(=C)C)CCC(C2CCC(CCC)CC2)CC1]

TABLE E-continued
RM-72
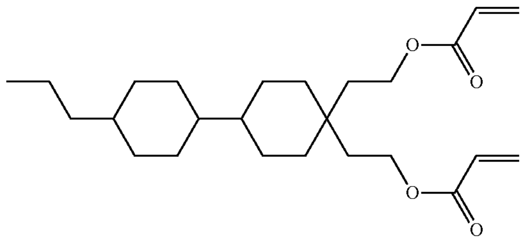 [SMILES: C=CC(=O)OCCC1(CCOC(=O)C=C)CCC(C2CCC(CCC)CC2)CC1]
RM-73
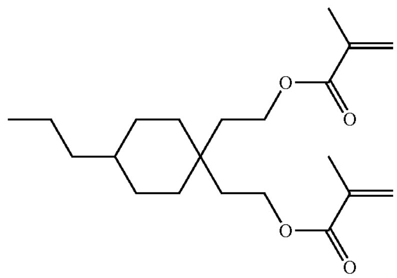 [SMILES: C=C(C)C(=O)OCCC1(CCOC(=O)C(=C)C)CCC(CCC)CC1]
RM-74
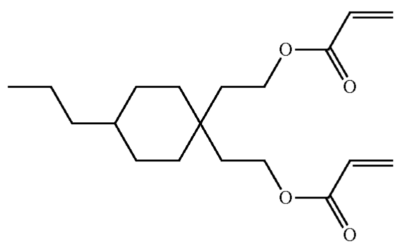 [SMILES: C=CC(=O)OCCC1(CCOC(=O)C=C)CCC(CCC)CC1]
RM-75
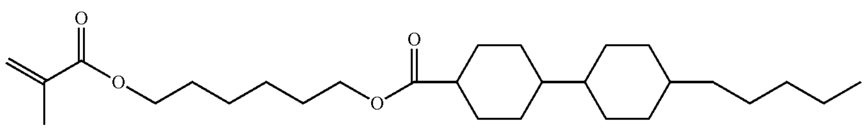 [SMILES: C=C(C)C(=O)OCCCCCCOC(=O)C1CCC(C2CCC(CCCCC)CC2)CC1]
RM-76
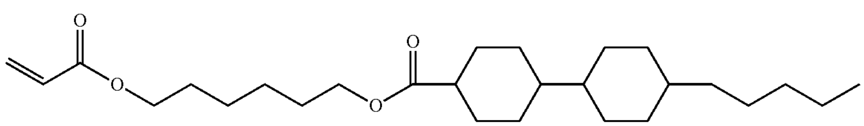 [SMILES: C=CC(=O)OCCCCCCOC(=O)C1CCC(C2CCC(CCCCC)CC2)CC1]
RM-77
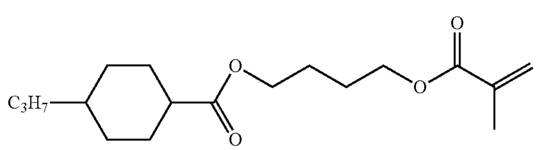
RM-78
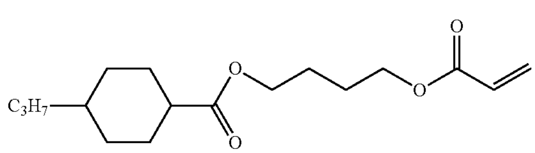

TABLE E-continued
RM-79
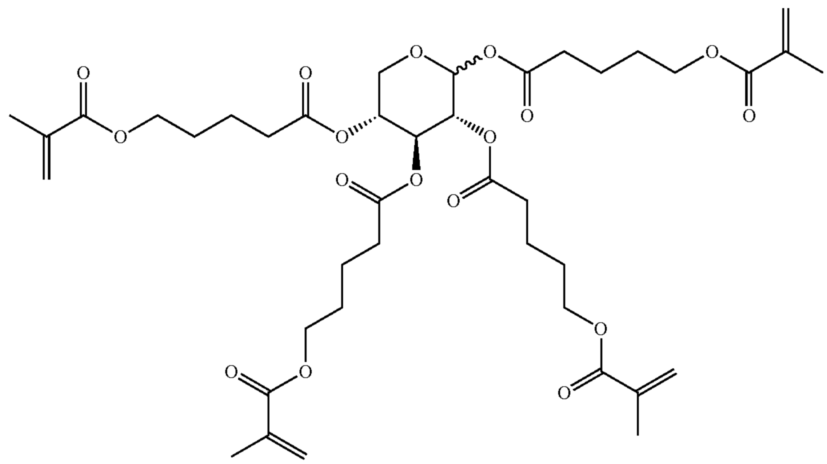 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-80
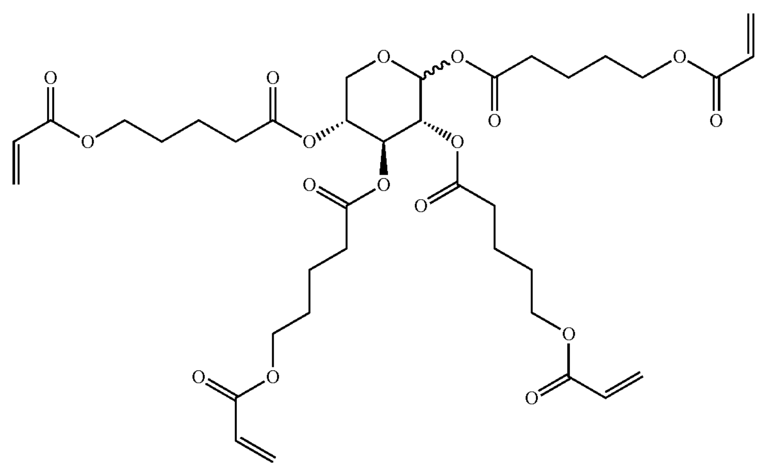 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-81
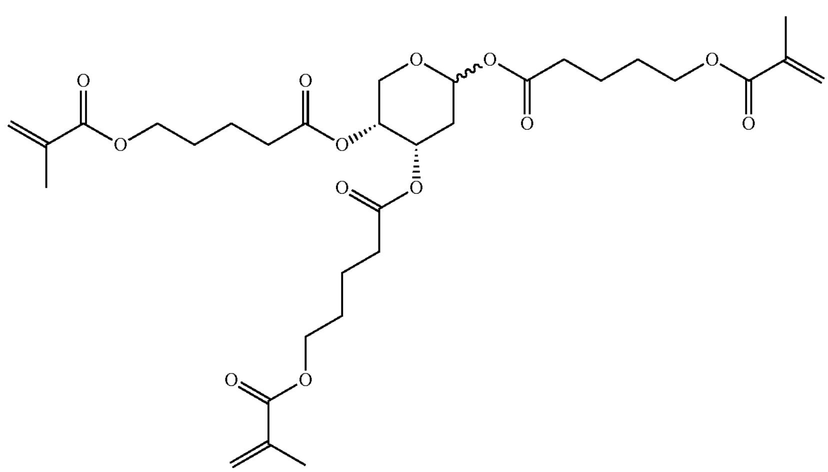 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]

TABLE E-continued
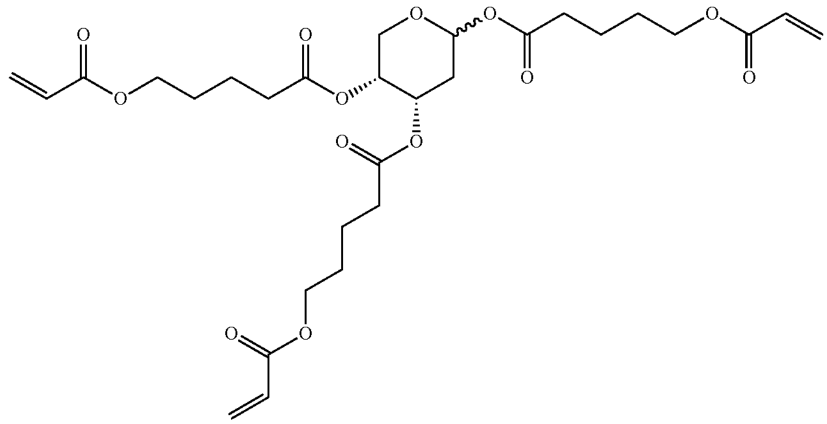 [SMILES: C=CC(=O)OCCCCC(=O)OC1C[C@H](OC(=O)CCCCOC(=O)C=C)[C@H](OC(=O)CCCCOC(=O)C=C)CO1]
RM-82
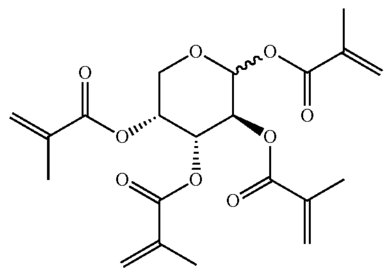 [SMILES: C=C(C)C(=O)OC1OC[C@@H](OC(=O)C(=C)C)[C@@H](OC(=O)C(=C)C)[C@@H]1OC(=O)C(=C)C]
RM-83
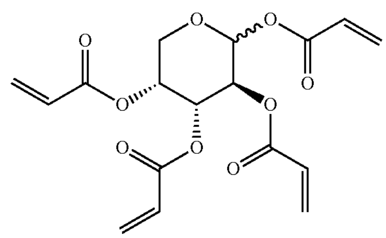 [SMILES: C=CC(=O)OC1OC[C@@H](OC(=O)C=C)[C@@H](OC(=O)C=C)[C@@H]1OC(=O)C=C]
RM-84
Table E shows illustrative compounds which can be used in the LC media in accordance with the present invention, preferably as polymerizable compounds.
In a preferred embodiment of the present invention, the mesogenic media comprise one or more compounds selected from the group of the compounds from Table E.
TABLE F
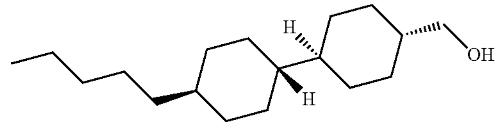 [SMILES: CCCCC[C@H]1CC[C@H]([C@H]2CC[C@H](CO)CC2)CC1]
A-1
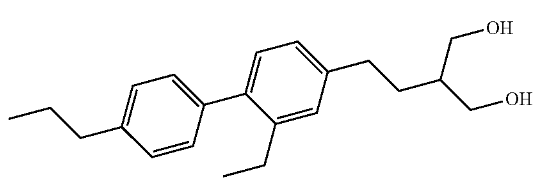 [SMILES: CCCc1ccc(-c2ccc(CCC(CO)CO)cc2CC)cc1]
A-2
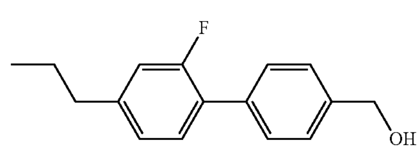 [SMILES: CCCc1ccc(-c2ccc(CO)cc2)c(F)c1]
A-3

TABLE F-continued

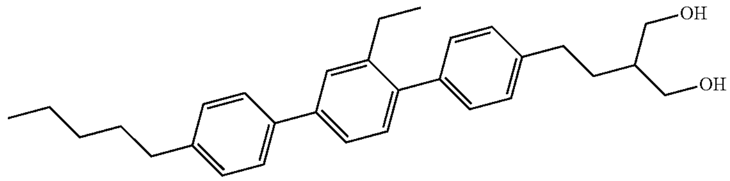 [SMILES: CCCCCc1ccc(-c2ccc(-c3ccc(CCC(CO)CO)cc3)c(CC)c2)cc1]

A-4

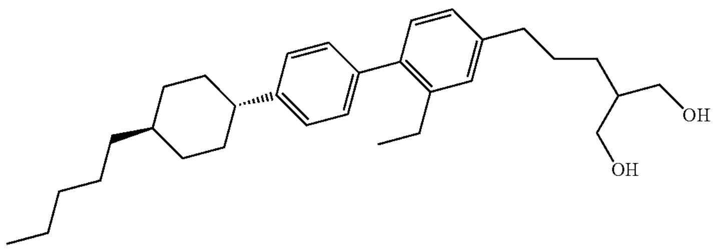 [SMILES: CCCCC[C@H]1CC[C@H](c2ccc(-c3ccc(CCCC(CO)CO)cc3CC)cc2)CC1]

A-5

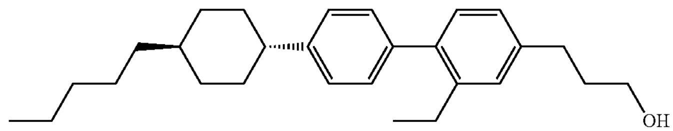 [SMILES: CCCCC[C@H]1CC[C@H](c2ccc(-c3ccc(CCCO)cc3CC)cc2)CC1]

A-6

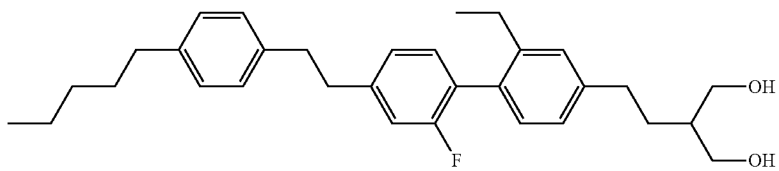 [SMILES: CCCCCc1ccc(CCc2ccc(-c3ccc(CCC(CO)CO)cc3CC)c(F)c2)cc1]

A-7

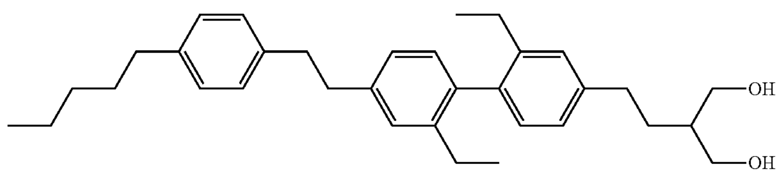 [SMILES: CCCCCc1ccc(CCc2ccc(-c3ccc(CCC(CO)CO)cc3CC)c(CC)c2)cc1]

A-8

Table F shows illustrative compounds which can be employed in the LC media in accordance with the present invention, preferably as non-polymerizable self-alignment additives.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz, cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 2000 [pN],
$K_3$ elastic constant, "bend" deformation at 20° C. [pN]
$V_0$ capacitive threshold (Freedericks threshold) at 20° C. [V].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The polymerizable compounds are polymerized in the display or test cell by irradiation with UVA light (usually 365 nm) of defined intensity for a prespecified time, with a voltage optionally being applied simultaneously to the display (usually 10 to 30 V alternating current, 1 kHz). In the examples, unless indicated otherwise, a 100 mW/cm$^2$ mercury vapor lamp is used, and the intensity is measured using a standard UV meter (Ushio UNI meter) fitted with a 320 nm (optionally 340 nm) band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

EXAMPLES

The compounds employed, if not commercially available, are synthesized by standard laboratory procedures. The LC media originate from Merck KGaA, Germany.

A) Synthesis Examples

Example 1

Synthesis of 2-methylacrylic acid 2-[2'-ethyl-4-(2-hydroxyethoxy)-4"-pentyl[1,1';4',1"]terphenyl-3-yl] ethyl ester 1

1

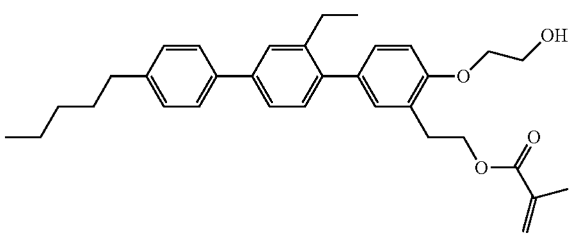

1) Synthesis of 4'-bromo-2'-ethylbiphenyl-4-ol A

A

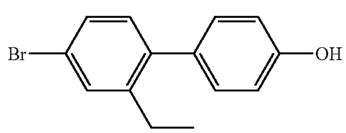

223 ml of water are added to 110.3 g (1.04 mol) of $Na_2CO_3$, and 154 g (0.49 mol) of 4-bromo-2-ethyl-1-iodobenzene, 75.1 g (0.54 mol) of 4-hydroxyphenylboronic acid and 850 ml of 1,4-dioxane are added, and the mixture is degassed. 14.5 g (19.8 mmol) of bis(1,1-diphenylphosphinoferrocene)palladium(II) chloride are added, and the mixture is stirred at 80° C. for 18 h. When the reaction is complete (check by thin-layer chromatography with heptane/ethyl acetate 1:1), the reaction mixture is cooled to room temperature, diluted with water and methyl tert-butyl ether and acidified to pH 1-2 using 2 N HCl. The phases are separated, and the water phase is extracted with methyl tert-butyl ether, and the combined organic phases are dried over $Na_2SO_4$, filtered and evaporated in vacuo. The crude product obtained is filtered through silica gel with heptane/ethyl acetate (8:2), giving 96 g of the product A as a brown oil.

2) Synthesis of 2'-ethyl-4"-pentyl-[1,1';4',1"]terphenyl-4-ol B

B

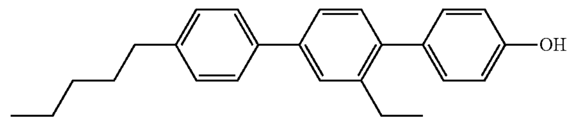

102 g (514 mmol) of 4-pentylphenylboronic acid and 135 g (467 mmol) of bromide A are dissolved in a mixture of 743 ml of toluene, 270 ml of ethanol and 350 ml of 2 N $Na_2CO_2$ and degassed. 8.1 g (7.0 mmol) of tetrakis(triphenylphosphine)palladium are added, and the mixture is refluxed for 18 h. When the reaction is complete, the reaction mixture is cooled to room temperature, the water phase is separated off, the organic phase is washed with methyl tert-butyl ether (MTB ether), and the combined organic phases are dried over $Na_2SO_4$, filtered and evaporated in vacuo. The crude product is filtered through silica gel with dichloromethane, and the product fractions are recrystallized from heptane, giving 76.9 g of the product as colorless crystals.

$^1$H NMR (500 MHz, DMSO-d6)

δ=0.89 ppm (t, 6.88 Hz, 3H, $CH_3$), 1.08 (t, 7.51 Hz, 3H, $CH_3$), 1.31 ($m_c$, 4H, $CH_2$), 1.61 (q, 7.58 Hz, 2H, $CH_2$), 2.62 (q superimposed with t, 4H, benzylic $CH_2$), 6.83 (d, 8.5 Hz, 2H, arom. H), 7.13 (d, 8.5 Hz, 2H, arom. H), 7.17 (d, 7.9 Hz, 1H, arom. H), 7.28 (d, 8.2 Hz, 2H, arom. H), 7.46 (dd, 7.93, 1.97 Hz, 1H, arom. H), 7.54 (d, 1.88 Hz, 1H, arom. H), 7.59 (d, 8.17 Hz, 2H, arom. H), 9.44 (s, 1H, arom. OH).

3) Synthesis of 3-bromo-2'-ethyl-4"-pentyl-[1,1';4',1"]terphenyl-4-ol C

C

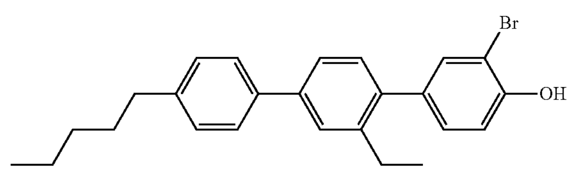

30.0 g (85.9 mmol) of alcohol B are dissolved in 1100 ml of dichloromethane and cooled to −48° C., and 5.28 ml (103 mmol) of bromine in 1100 ml of dichloromethane are slowly added at this temperature over the course of 40 min. The mixture is stirred at this temperature for a further 1 h and checked by thin-layer chromatography (toluene). The excess bromine is reduced using saturated $NaHSO_3$ solution, and the phases are separated. The aqueous phase is extracted with dichloromethane, and the combined organic phases are dried over $Na_2SO_4$ and evaporated in vacuo. The crude product is filtered through silica gel with toluene, giving 35.3 g of the product as a white solid.

$^1$H NMR (500 MHz, $CDCl_3$)

δ=0.91 ppm (t, 6.99 Hz, 3H, $CH_3$), 1.15 (t, 7.53 Hz, 3H, $CH_3$), 1.36 ($m_c$, 4H, $CH_2$), 1.66 ($m_c$, 2H, $CH_2$), 2.65 ($m_c$, 4H, benzylic $CH_2$), 5.5 (s, 1H, arom. OH), 7.06 (d, 8.3 Hz, 1H, arom. H), 7.20 (dd, 8.28, 2.07 Hz superimposed with d 7.85 Hz, 2H, arom. H), 7.26 (d, 8.1 Hz, 2H, arom. H), 7.43 (dd, 7.87, 1.87 Hz, 2H, arom. H), 7.46 (d, 2.01 Hz, 1H, arom. H), 7.503 (d, 1.71 Hz, 1H, arom. H), 7.54 (d, 8.1 Hz, 2H, arom. H).

4) Synthesis of [2-(3-bromo-2'-ethyl-4"-pentyl-[1,1'; 4',1"]terphenyl-4-yloxy)ethoxy]-tert-butyldimethylsilane D

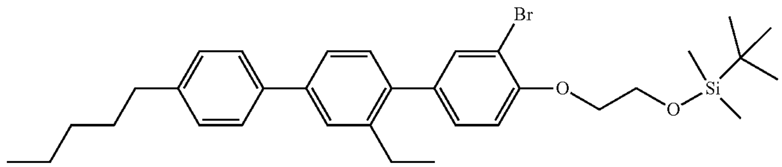

D 2.9 g (71.7 mmol) of NaH (60% suspension in paraffin oil) are initially introduced in 93 ml of dimethylformamide (DMF) and cooled to 2° C. with stirring, and a solution of alcohol C in DMF is slowly added at such a rate that the temperature does not exceed 12° C. When the addition is complete, the mixture is allowed to rise to room temperature (RT) and is stirred for a further 2 h (yellowish solution). 17.2 g (71.7 mmol) of (2-bromoethoxy)-tert-butyldimethylsilane, dissolved in DMF, are then slowly added, and the mixture is stirred at 50° C. for 18 h. The reaction solution is carefully added to ice-water and extracted with MTB ether. The combined organic phases are washed with water, dried over $Na_2SO_4$, filtered and evaporated in vacuo. The crude product obtained is filtered through silica gel with toluene, and the product fractions are evaporated in vacuo, giving 27.9 g of the desired product.

MS (EI): 582.4 [$M^+$]

$^1H$ NMR (500 MHz, $CDCl_3$)

δ=0.00 ppm (s, 6H, Si—$CH_3$), 0.78 (s, 12H, Si—$C(CH_3)_3$), 1.01 (t, 7.52 Hz, $CH_3$), 1.23 ($m_c$, 4H, $CH_2$), 1.52 ($m_c$, 2H, $CH_2$), 2.51 ($m_c$, 4H, benzylic $CH_2$), 3.91 (t, 5.24 Hz, 2H, $CH_2O$), 4.02 (t, 5.24 Hz, 2H $CH_2O$), 6.84 (d, 8.45 Hz, 1H, arom. H), 7.08 (dd, 8.37, 2.33 Hz superimposed with d 7.66 Hz, 2H, arom. H), 7.12 (d, 8.2 Hz, 2H, arom. H), 7.29 (dd, 7.86, 1.9 Hz, 2H, arom. H) 7.36 (d, 1.79 Hz, 1H, arom. H), 7.41 (d, 8.12 Hz superimposed with d, 2.15 Hz, 3H, arom. H).

5) Synthesis of 2-{4-[2-(tert-butyldimethylsilanyloxy)ethoxy]-2'-ethyl-4"-pentyl[1,1';4',1"]terphenyl-3-yl}ethanol E

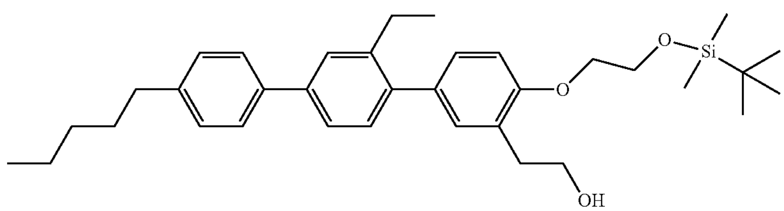

E 8.5 g (14 mmol) of bromide D are dissolved in 41 ml of tetrahydrofuran (THF) and cooled to −78° C., and 10.6 ml (17 mmol) of butyllithium (1.6 molar solution in THF) are slowly added. 6.23 ml (16 mmol) of ethylene oxide (2.5-3.3 molar in THF) are subsequently added, and the mixture is stirred for a further 30 min. 2.13 ml (17 mmol) of boron trifluoride/diethyl ether complex in 10 ml of cooled THF are then slowly added at −78° C. (exothermic), and the mixture is stirred at this temperature for 2 h. The reaction solution is subsequently allowed to warm to room temperature (RT) over the course of 2 h and is poured into ice-water. The mixture is extracted with MTB ether, and the organic phase is dried over $Na_2SO_4$, filtered and evaporated in vacuo. The crude product obtained is purified over silica gel with heptane/ethyl acetate (H/EA) 9:1 and subsequently with H/EA (4:1), and the product fractions are evaporated in vacuo, giving 3.61 g of the product as an oil.

MS (EI): 546.4 [$M^+$]

$^1H$ NMR (500 MHz, $CDCl_3$)

δ=0.00 ppm (s, 6H, Si—$CH_3$), 0.81 (s, 12H, Si—$C(CH_3)_3$), 1.03 (t, 7.53 Hz, $CH_3$), 1.24 ($m_c$, 4H, $CH_2$), 1.54 ($m_c$, 2H, $CH_2$), 1.73 (t, 6.25 Hz, 1H, OH), 2.54 (me, 4H, benzylic $CH_2$), 2.85 (t, 6.3 Hz, 2H, $CH_2$—O), 3.76 (q, 6.15 Hz, 2H, CH2-OH) 3.88 (t, 5.18 Hz, 2H, $CH_2O$), 3.99 (t, 5.18 Hz, 2H $CH_2O$), 6.81 (d, 8.26 Hz, 1H, arom. H), 7.01-7.08 (m 2H, arom. H), 7.10-7.16 (d superimposed with singlet, 3H, arom. H), 7.30 (dd, 7.86, 1.92 Hz, 2H, arom. H), 7.38 (d, 1.8 Hz, 1H, arom. H), 7.42 (d, 8.14, 2H, arom. H).

6) Synthesis of 2-methylacrylic acid 2-{4-[2-(tert-butyldimethylsilanyloxy)ethoxy]-2'-ethyl-4"-pentyl-[1,1';4',1"]terphenyl-3-yl}ethyl ester F

F

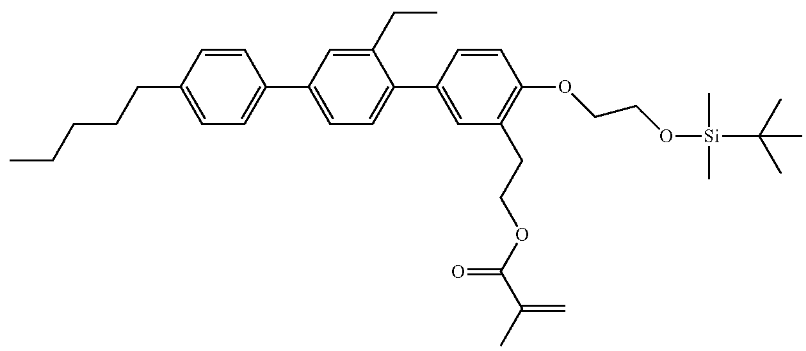

8.50 g (15.5 mmol) of alcohol E, 1.84 ml (21.8 mmol) of methacrylic acid and 0.19 g (1.55 mmol) of 4-(dimethylamino)pyridine are dissolved in 100 ml of dichloromethane and cooled to 5° C. 3.37 g (21.8 mmol) of 4-N-(3-dimethylaminopropyl)-N'-ethylcarbodiimide hydrochloride, dissolved in 40 ml of dichloromethane, are slowly added, and the mixture is stirred at room temperature for 72 h. The reaction mixture is diluted with dichloromethane and filtered through silica gel, and the product fractions are evaporated in vacuo at max. 30° C., giving 7.5 g of the product as a clear oil.

MS (EI): 614.5 [$M^+$]

$^1$H NMR (500 MHz, $CDCl_3$)

δ=0.00 ppm (s, 6H, Si—$CH_3$), 0.81 (s, 12H, Si—$C(CH_3)_3$), 1.02 (t, 7.49 Hz, $CH_3$), 1.24 ($m_c$, 4H, $CH_2$), 1.55 ($m_c$, 2H, $CH_2$), 1.79 (s, 3H, $CH_3$), 2.53 ($m_c$, 4H, benzylic $CH_2$), 2.95 (t, 6.89 Hz, 2H, $CH_2$—O), 3.89 (t, 5.11 Hz, 2H, $CH_2O$), 3.99 (t, 5.14 Hz, 2H $CH_2O$), 4.28 (t, 6.94, 2H, $CH_2$—O), 5.39 (s, 1H, olefin. H), 5.95, (s, 1H, olefin. H), 6.8 (d, 8.24 Hz, 1H, arom. H), 7.03-7.06 (m 2H, arom. H), 7.10 (d, 7.86 Hz, 1H, arom. H), 7.14 (d, 8.76 Hz, 2H, arom. H), 7.30 (dd, 7.86, 1.82 Hz, 2H, arom. H), 7.38 (d, 1.63 Hz, 1H, arom. H), 7.43 (d, 8.07, 2H, arom. H).

7) Synthesis of 2-methylacrylic acid 2-[2'-ethyl-4-(2-hydroxyethoxy)-4"-pentyl[1,1';4',1"]terphenyl-3-yl]ethyl ester G

G

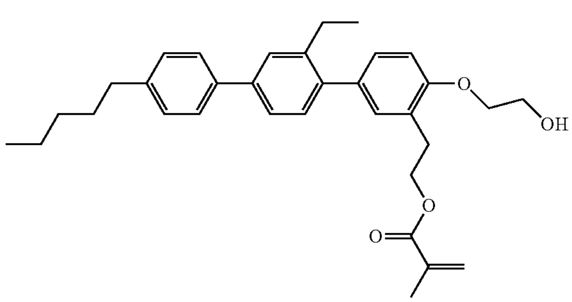

7.60 g (12.2 mmol) of compound F are dissolved in 150 ml of THF and cooled to 2° C. 7.01 ml (14.0 mmol) of HCl (2 N) are then slowly added, and the mixture is stirred at 2-4° C. for 1 h. The reaction solution is subsequently allowed to warm to RT over the course of 3 h and is carefully adjusted to pH 7 using $NaHCO_3$ solution. The mixture is extracted with MTB ether, and the organic phases are dried over $Na_2SO_4$ and evaporated in vacuo. The crude product is purified on silica gel with heptane/ethyl acetate (1:1), and the product fractions are combined and recrystallized twice from acetonitrile (1:4) at −20° C. The product obtained is dried at 60° C. in a bulb-tube distillation apparatus (removal of acetonitrile), giving 3.2 g of the product as a white solid.

Phases: Tg −16 C 58 I

MS (EI) 500.3 [$M^+$]

$^1$H NMR (500 MHz, $CDCl_3$)

δ=0.91 ppm (t, 6.88 Hz, $CH_3$), 1.14 (t, 7.52 Hz, 3H, $CH_3$), 1.37 ($m_c$, 4H, $CH_2$), 1.67 (m, 2H, $CH_2$), 1.04 (s, 3H, $CH_3$), 2.65 ($m_c$, 4H, benzylic $CH_2$), 3.04 (t, 7.74 Hz, 2H, $CH_2$—O), 3.19 (t, 6.81 Hz, 1H, OH), 4.03 ($m_c$, 2H, $CH_2O$), 4.15 (t, 4.02 Hz, 2H $CH_2O$), 4.42 (t, 7.5 Hz, 2H, $CH_2$—O), 5.56 (s, 1H, olefin. H), 6.12, (s, 1H, olefin. H), 6.91 (d, 8.32 Hz, 1H, arom. H), 7.30-7.13 (m 5H (superimposed with $CHCl_3$), arom. H), 7.42 (dd, 7.87, 1.91 Hz, 1H, arom. H), 7.506 (d, 1.76 Hz, 1H, arom. H), 7.54 (d, 8.15 Hz, 2H, arom. H).

Example 2

Synthesis of 2-methylacrylic acid 2'-ethyl-4"-(2-hydroxyethyl)-6"-(2-methyl-acryloyloxy)-4-pentyl-[1,1';4',1"]terphenyl-3"-yl ester 2

2

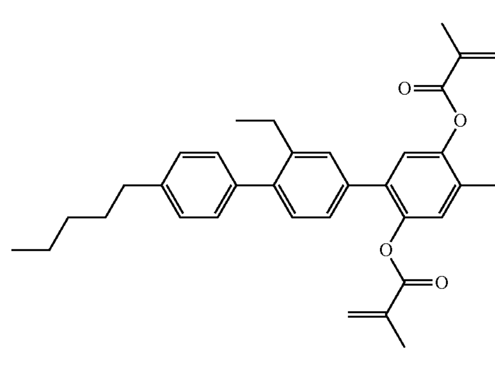

1) Synthesis of 4-bromo-2-ethyl-4'-pentylbiphenyl

A2

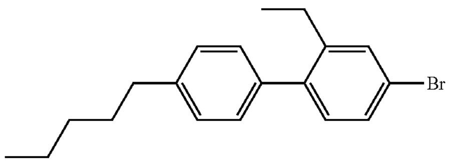

45.0 g (234 mmol) of 4-pentylphenylboronic acid, 70.0 g (225 mmol) of 4-bromo-2-ethyl-1-iodobenzene are dissolved in a mixture of 300 ml of toluene, 200 ml of ethanol and 200 ml of $Na_2CO_3$ solution (2 molar) and blanketed with argon. 8.00 g (6.92 mmol) of tetrakis(triphenylphosphine) palladium(0) are subsequently added, and the reaction mixture is refluxed for 18 h. When the reaction is complete, the mixture is allowed to cool to room temperature, and water is added, the phases are separated, the organic phase is washed with water and dried over $Na_2SO_4$, filtered and evaporated in vacuo. The crude product (orange oil) is filtered through silica gel with heptane, giving 56.2 g of the product as a colorless oil.

$^1$H NMR (500 MHz, $CDCl_3$)

δ=0.91 ppm (t, 6.97 Hz. 3H, $CH_3$), 1.09 (t, 7.58 Hz, 3H. $CH_3$), 1.36 ($m_c$, 4H, $CH_2$), 1.66, ($m_c$, 2H, $CH_2$), 2.56 (q, 7.55 Hz, 2H, benz. $CH_2$), 2.64 (dd, 7.71 Hz, 2H, benz. $CH_2$), 7.05 (d, 8.15 Hz, 1H, arom. H), 7.16 (d, 8.21 Hz, 2H, arom. H), 7.21 (d, 8.14 Hz, 2H, arom. H), 7.3 (dd, 8.14, 2.12 Hz, 1H, arom. H), 7.42 (d, 1H, 2.08 Hz, 1H, benz. H), 7.24 (d, 8.2 Hz, 2H, arom. H), 7.27 (d, 8.2 Hz, 2H, arom. H), 7.35 (dd, 7.87, 1.71 Hz, 1H, arom. H), 7.42 (d, 1.53 Hz, 1H, arom. H).

2) Synthesis of 2-ethyl-4'-pentylbiphenyl-4-boronic acid B2

B2

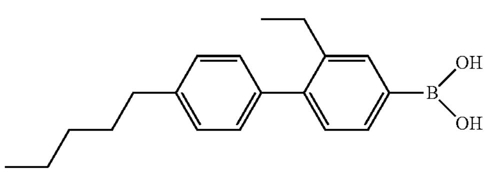

65.0 g (196 mmol) of bromide A2 are dissolved in 475 ml of tetrahydrofuran (THF) and cooled to −78° C., and 128.8 ml (206 mmol, 1.6 molar in n-hexane) of n-butyllithium are added dropwise. The reaction mixture is stirred at −78° C. for a further 60 min, and 24.5 ml (216 mmol) of trimethyl borate are added dropwise at this temperature. The mixture is stirred at this temperature for a further one hour, then allowed to thaw slowly to 0° C. and carefully rendered acidic using 2 N hydrochloric acid at 0° C., stirred briefly, and the phases are separated. The aqueous phase is extracted with MTB ether, and the combined organic phases are washed with saturated sodium chloride solution, dried over sodium sulfate, filtered and evaporated. The crude product is filtered through silica gel firstly by means of dichloromethane and then with MTB ether and evaporated in vacuo, giving 43.7 g of the product as a smectic solid.

3) Synthesis of 2-(4-bromo-2,5-dimethoxyphenyl)ethanol C2

C2

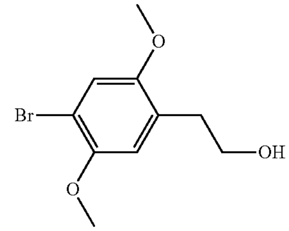

10.0 g (33.8 mmol) of 1,4-dibromo-2,5-dimethoxybenzene are dissolved in 300 ml of THF and cooled to −78° C., and 23.0 ml (36.8 mmol, 1.6 molar in n-hexane) of n-butyllithium are added dropwise, and the mixture is stirred for a further 5 min. 1.70 g (38.6 mmol) of ethylene oxide in 20 ml of THF cooled to 2° C. are then allowed to run into the reaction mixture. 5.00 ml (39.8 mmol) of boron trifluoride/diethyl ether complex are then carefully added dropwise at −78° C., and stirring is continued at this temperature for a further 15 min. After checking the reaction by means of thin-layer chromatography, the reaction is quenched with 5.0 ml of isopropanol while cold, allowed to thaw to 0° C., water and MTB ether are carefully added, and stirring is continued. The phases are separated, the water phase is extracted with MTB ether, the organic phases are combined, washed with saturated sodium chloride solution and dried over sodium sulfate and evaporated in vacuo. The crude product is filtered through silica gel with dichloromethane/MTB ether (9:1), giving 5.8 g of the product as a slightly yellow oil.

4) Synthesis of 2-(2'-ethyl-2",5"-dimethoxy-4-pentyl[1,1';4',1"]terphenyl-4")ethanol D2

D2

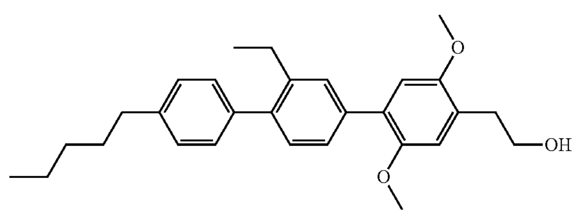

23.0 g (25% by weight in toluene, 19.4 mmol) of alcohol C2 and 5.70 g (18.7 mmol, 85%) of B2 are dissolved in a mixture of 200 ml of toluene, 100 ml of ethanol and 40 ml (1 mol/i, 40 mmol) of $Na_2CO_3$ and degassed by passing in argon. 100 mg (0.87 mmol) of tetrakis(triphenylphosphine) palladium(0) are then added, and the mixture is refluxed for 60 min. The mixture is cooled to room temperature, and water is added. The phases are separated, the organic phase is washed with water, dried over sodium sulfate, filtered and evaporated in vacuo. The crude product is filtered through silica gel with a mixture of dichloromethane and MTB ether (95:5) and evaporated in vacuo, giving 6.0 g of the product as a pale-brown oil.

$^1$H NMR (500 MHz, DMSO-d6)

δ=0.89 ppm (t, 6.8 Hz, 3H, $CH_3$), 1.06 (t, 7.54 Hz, 3H, $CH_3$), 1.33 ($m_c$, 4H, $CH_2$), 1.63 (quin., 7.51 Hz, 2H, $CH_2$), 2.67-2.54 (m, 4H, benz. $CH_2$), 2.77 (t, 7.25 Hz, 2H, benz. $CH_2$), 3.60 (dt, 7.21, 5.49 Hz, 2H, $CH_2CH_2OH$), 3.72 (s, 3H, $OCH_3$), 3.79 (s, 3H, $OCH_3$), 4.62 (t, 5.36 Hz, 1H, OH), 6.90 (s, 1H, arom. H), 6.95 (s, 1H, arom. H), 7.15 (d, 7.86 Hz, 1H, arom. H).

5) Synthesis of 2'-ethyl-4"-(2-hydroxyethyl)-4-pentyl-[1,1';4',1"]terphenyl-2",5"-diol E2

E2

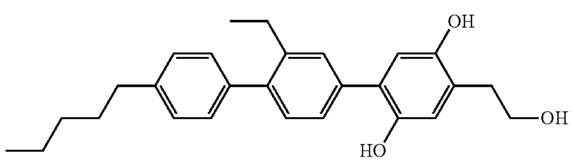

4.70 g (10.9 mmol) of alcohol D2 are dissolved in 50 ml of dichloromethane and cooled to −28° C. 2.3 ml (24.2 mmol) of boron tribromide are carefully added, and the mixture is stirred at −25° C. for 3 h. When the reaction is complete, the reaction mixture is added to ice-water with stirring and carefully neutralized using 2 N sodium hydroxide solution. The phases are separated, the water phase is extracted with dichloromethane, and the combined organic phases are washed with water and dried over sodium sulfate, filtered and evaporated. The crude product (orange oil) is filtered through silica gel firstly with dichloromethane and MTB ether (9:1) and then with (3:1), and the product fractions are evaporated in vacuo. The product formed is recrystallized from toluene at 5° C., giving 1.7 g of the product as colorless crystals.

$^1H$ NMR (500 MHz, DMSO-d6)

δ=0.89 ppm (t, 6.83 Hz, 3H, $CH_3$), 1.07 (t, 7.55 Hz, 3H, $CH_3$), 1.34 ($m_c$, 4H, $CH_2$), 1.64 (quin., 7.3 Hz, 2H, $CH_2$), 2.71-2.55 (m, 6H, benz. $CH_2$), 3.58 (dt, 7.0, 5.01 Hz, 2H, $CH_2CH_2OH$), 4.70, (t, 5.07 Hz, $CH_2OH$), 6.68 (s, 1H, arom. H), 6.74 (s, 1H, arom. H), 7.15 (d, 7.89 Hz, arom. H), 7.25 (d, 8.26 Hz, 2H, arom. H), 7.28 (d, 8.26 Hz, 2H, arom. H), 7.37 (dd, 7.9, 1.8 Hz, 1H, arom. H), 7.43 (d, 1.60 Hz, 1H, arom. H), 8.67 (s, 2H, arom. OH).

6) Synthesis of 4"-[2-(tert-butyldimethylsilanyloxy)ethyl]-2'-ethyl-4-pentyl[1,1';4',1"]terphenyl-2",5"-diol F2

F2

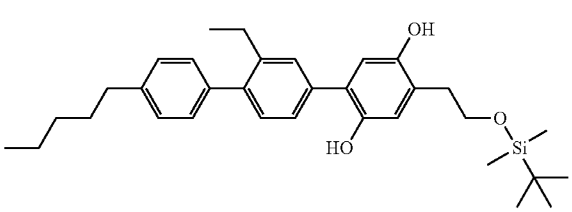

1.20 g (2.96 mmol) of alcohol E2 and 0.214 ml (3.23 mmol) of imidazole are dissolved in 9.0 ml of THF and cooled to 2° C., and 490 mg (3.25 mmol) of tert-butylchlorodimethylsilane, dissolved in 4 ml of THF, are subsequently added dropwise over the course of 30 min, and the mixture is stirred at this temperature for 60 min. Ammonium chloride solution is added to the reaction mixture, which is then extracted with MTB ether. The organic phase is separated off and dried over sodium sulfate, filtered and evaporated in vacuo, giving an orange oil, which is filtered through silica gel with toluene and toluene and ethyl acetate (98:2), giving 1.0 g of the product as a yellow oil.

$^1H$ NMR (500 MHz, $CDCl_3$)

δ=0.00 ppm (s, 6H, $Si(CH_3)_2$), 0.82 (s, 12H, $SiC(CH_3)_3$), 1.02 (t, 7.56 Hz, 3H, $CH_3$), 1.26 ($m_c$, 4H, $CH_2$), 1.57 (me, 2H, $CH_2$), 2.55 (me, 4H, benz. CH), 2.78 (t, 4.98 Hz, 2H, $CH_2CH_2OSi$), 3.85 (t, 5.1 Hz, 2H, $CH_2OSi$), 4.82 (s, 1H, arom. OH), 6.59 (s, 1H, arom. H), 6.79 (s, 1H, arom. H) 7.13 (2×d(superimposed) 4H, arom. H), 7.18 (d, 7.78 Hz, 1H, arom. H), 7.21 (dd, 7.78, 1.7 Hz, 1H, arom. H), 7.29, (d, 1.4 Hz, 1H, arom. H), 7.82 (s, 1H, arom. OH).

7) Synthesis of 2-methylacrylic acid 4"-[2-(tert-butyldimethylsilanyloxy)ethyl]-2'-ethyl-6"-(2-methylacryloyloxy)-4-pentyl-[1,1';4',1"]terphenyl-3"-yl ester G2

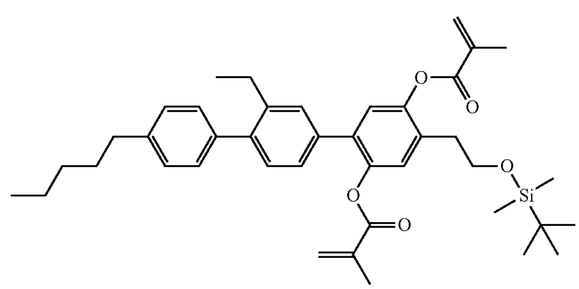 [SMILES: C=C(C)C(=O)Oc1cc(-c2ccc(-c3ccc(CCCCC)cc3)c(CC)c2)c(OC(=O)C(=C)C)cc1CCO[Si](C)(C)C(C)(C)C]

2.30 g (4.43 mmol) of phenol F2, 1.0 ml (11.8 mmol) of methacrylic acid and 30.0 mg (0.25 mmol) of 4-(dimethylamino)pyridine are dissolved in 25 ml of dichloromethane and cooled to 1° C. 1.80 g (11.6 mmol) of 1-(3-dimethylaminopropyl)-3-ethylcarbodiimide (EDC), dissolved in 20 ml of dichloromethane, are then added dropwise at 1-4° C., and the mixture is subsequently stirred at room temperature (RT) for 18 h. 0.4 ml of methacrylic acid and 0.6 g of EDC are subsequently again added at RT, and the mixture is stirred at RT for a further 18 h. The reaction solution is then filtered directly through a 100 ml silica-gel frit with dichloromethane and evaporated in vacuo, giving 3.3 g of the yellow crude product as a partially crystalline solid, which is dissolved in 10 ml of heptane/ethyl acetate (EA) (95:5), and undissolved constituents are filtered off. The mixture is subsequently filtered through 120 g of silica gel with heptane/EA (95:5), giving 2.4 g of the product as a yellow oil.

$^1H$ NMR (500 MHz, $CDCl_3$)

δ=0.00 ppm (s, 6H, $Si(CH_3)_2$), 0.86 (s, 12H, $SiC(CH_3)_3$), 1.06 (t, 7.55 Hz, 3H, $CH_3$), 1.35 ($m_c$, 4H, $CH_2$), 1.65 ($m_c$, 2H, $CH_2$), 1.93 (s, 3H, $CH_3$), 2.07 (s, 3H, $CH_3$), 2.58 (q, 7.52, 2H, benz. $CH_2$), 2.63 (t, 7.91, 2H, benz. $CH_2$), 2.78 (t, 7.23 Hz, 2H, $CH_2CH_2OSi$), 3.79 (t, 7.26 Hz, 2H, $CH_2OSi$), 5.62 (s, 1H, olefin. H), 5.77 (s, 1H, olefin. H), 6.18 (s, 1H, olefin. H), 6.37 (s, 1H, olefin. H), 7.12 (s, 1H, arom. H), 7.16 (d, 7.86 Hz, 1H, arom. H), 7.18 (s, 1H, arom. H), 7.19, (s, 4H, arom. H), 7.24 (dd, (superimposed with $CHCl_3$, 1H, arom. H), 7.32, (d, 1.39 Hz, 1H, arom. H).

Synthesis of 2-methylacrylic acid 2'-ethyl-4"-(2-hydroxyethyl)-6"-(2-methylacryloyloxy)-4-pentyl-[1,1';4',1"]terphenyl-3"-yl ester 2

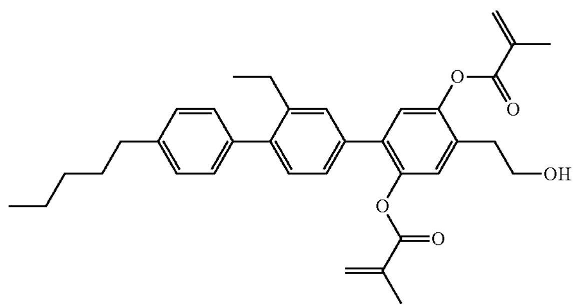 [SMILES: C=C(C)C(=O)Oc1cc(-c2ccc(-c3ccc(CCCCC)cc3)c(CC)c2)c(OC(=O)C(=C)C)cc1CCO]

2.20 g (3.36 mmol) of compound G2 are dissolved in 50 ml of THF and cooled to 2° C. 2.00 ml (4.00 mmol) of hydrochloric acid (2N) are then slowly added dropwise, and the mixture is stirred at up to room temperature (RT) for 3 h. The mixture is then neutralized using sodium hydrogencarbonate solution with cooling, and water and MTB ether are added. The phases are separated, and the water phase is subsequently extracted with MTB ether. The combined organic phases are washed with water, dried over sodium sulfate, filtered and evaporated in vacuo, giving the crude product as a yellow oil, which is filtered through 200 g of silica gel with dichloromethane/MTB ether (98:2). The product obtained (colorless oil) is evaporated in vacuo and then dried at 60° C. and 0.09 mbar until solvent no longer escapes, giving the product (700 mg) as a colorless, viscous resin.

$^1$H NMR (500 MHz, $CDCl_3$)

δ=0.92 (t, 6.63 Hz, 3H, $CH_3$), 1.08 (t, 7.54 Hz, 3H, $CH_3$), 1.37 ($m_c$, 4H, $CH_2$), 1.67 ($m_c$, 3H, $CH_2$, OH), 1.94 (s, 3H, $CH_3$), 2.09 (s, 3H, $CH_3$), 2.60 (q, 7.53 Hz, 2H, benz. $CH_2$), 2.70 (t, 7.9 Hz, 2H, benz. H), 2.85, (t, 6.4 Hz, 2H, $CH_2CH_2OH$), 3.87 (q., 6.24 Hz, 2H, $CH_2OH$), 5.66 (s, 1H, olefin. H), 5.79 (s, 1H, olefin. H), 6.21 (s, 1H, olefin. H), 6.39 (s, 1H, olefin. H), 7.17 (s, 1H, arom. H), 7.19 (d, 7.87 Hz, 1H, arom. H), 7.21, 7.22 (2×S (superimposed) 5H, arom. H), 7.26 (dd (superimposed with $CHCl_3$), 1H, arom. H), 7.33 (d, 1.59 Hz, 1H, arom. H).

Example 3

Synthesis of 2-{5-[2-ethyl-4-(4-pentylphenyl)phenyl]-2-[4-hydroxy-3-(hydroxymethyl)butoxy]phenyl}ethyl 2-methylprop-2-enoate 4

4

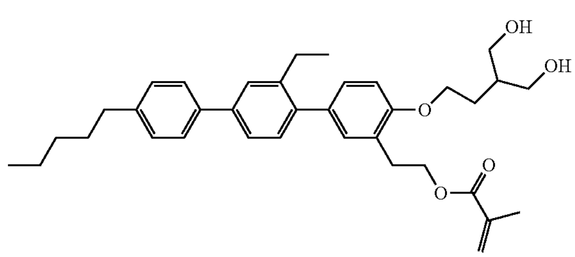

1) Synthesis of 4'-bromo-2'-ethylbiphenyl-4-ol A

A

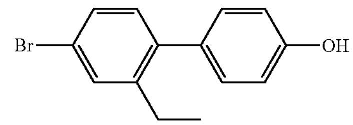

223 ml of water are added to 110.3 g (1.04 mol) of $Na_2CO_3$, and 154 g (0.49 mol) of 4-bromo-2-ethyl-1-iodobenzene, 75.1 g (0.54 mol) of 4-hydroxy-phenolboronic acid and 850 ml of 1,4-dioxane are added, and the mixture is degassed. 14.5 g (19.8 mmol) of bis(1,1-diphenylphosphinoferrocene)palladium(II) chloride are added, and the mixture is stirred at 80° C. for 18 h. When the reaction is complete (check by thin-layer chromatography with heptane/ethyl acetate 1:1), the reaction mixture is cooled to room temperature, diluted with water and methyl tert-butyl ether and acidified to pH 1-2 using 2 N HCl. The phases are separated, and the water phase is extracted with methyl tert-butyl ether, and the combined organic phases are dried over $Na_2SO_4$, filtered and evaporated in vacuo. The crude product obtained is filtered through silica gel with heptane/ethyl acetate (8:2), giving 96 g of the product A as a brown oil.

2) Synthesis of 2'-ethyl-4"-pentyl-[1,1';4',1"]terphenyl-4-ol

B

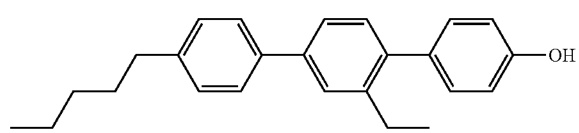

102 g (514 mmol) of 4-pentyl-1-benzeneboronic acid and 135 g (467 mmol) of bromide A are dissolved in a mixture of 743 ml of toluene, 270 ml of ethanol and 350 ml of 2 N $Na_2CO_2$ and degassed. 8.1 g (7.0 mmol) of tetrakis(triphenylphosphine)palladium are added, and the mixture is refluxed for 18 h. When the reaction is complete, the reaction mixture is cooled to room temperature, the water phase is separated off, the organic phase is washed with methyl tert-butyl ether (MTB ether), and the combined organic phases are dried over $Na_2SO_4$, filtered and evaporated in vacuo. The crude product is filtered through silica gel with dichloromethane, and the product fractions are recrystallized from heptane, giving 76.9 g of the product as colorless crystals.

$^1$H NMR (500 MHz, DMSO-$d_6$)

δ=0.89 ppm (t, 6.88 Hz, 3H, $CH_3$), 1.08 (t, 7.51 Hz, 3H, $CH_3$), 1.31 ($m_c$, 4H, $CH_2$), 1.61 (q, 7.58 Hz, 2H, $CH_2$), 2.62 (q. superimposed with t, 4H, benzylic $CH_2$), 6.83 (d, 8.5 Hz, 2H, arom. H), 7.13 (d, 8.5 Hz, 2H, arom. H), 7.17 (d, 7.9 Hz, 1H, arom. H), 7.28 (d, 8.2 Hz, 2H, arom. H), 7.46 (dd, 7.93, 1.97 Hz, 1H, arom. H), 7.54 (d, 1.88 Hz, 1H, arom. H), 7.59 (d, 8.17 Hz, 2H, arom. H), 9.44 (s, 1H, arom. OH).

3) Synthesis of 3-bromo-2'-ethyl-4"-pentyl-[1,1';4',1"]terphenyl-4-ol C

C

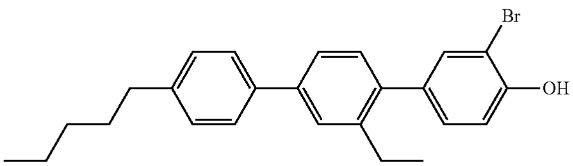

30.0 g (85.9 mmol) of alcohol B are dissolved in 1100 ml of dichloromethane and cooled to −48° C., and 5.28 ml (103 mmol) of bromine in 1100 ml of dichloromethane are slowly added at this temperature over the course of 40 min. The mixture is stirred at this temperature for a further 1 h and checked by thin-layer chromatography (toluene). The excess bromine is reduced using saturated $NaHSO_3$ solution, and the phases are separated. The aqueous phase is extracted with dichloromethane, and the combined organic phases are dried over $Na_2SO_4$ and evaporated in vacuo. The crude product is filtered through silica gel with toluene, giving 35.3 g of the product as a white solid.

$^1H$ NMR (500 MHz, $CDCl_3$)

δ=0.91 ppm (t, 6.99 Hz, 3H, $CH_3$), 1.15 (t, 7.53 Hz, 3H, $CH_3$), 1.36 ($m_c$, 4H, $CH_2$), 1.66 ($m_c$, 2H, $CH_2$), 2.65 ($m_c$, 4H, benzylic $CH_2$), 5.5 (s, 1H, arom. OH), 7.06 (d, 8.3 Hz, 1H, arom. H), 7.20 (dd, 8.28, 2.07 Hz superimposed with d 7.85 Hz, 2H, arom. H), 7.26 (d, 8.1 Hz, 2H, arom. H), 7.43 (dd, 7.87, 1.87 Hz, 2H, arom. H), 7.46 (d, 2.01 Hz, 1H, arom. H), 7.503 (d, 1.71 Hz, 1H, arom. H), 7.54 (d, 8.1 Hz, 2H, arom. H).

4) Synthesis of 6-(2-{2-bromo-4-[2-ethyl-4-(4-pentylphenyl)phenyl]phenoxy}-ethyl)-2,2,3,3,9,9,10,10-octamethyl-4,8-dioxa-3,9-disilaundecane D

D

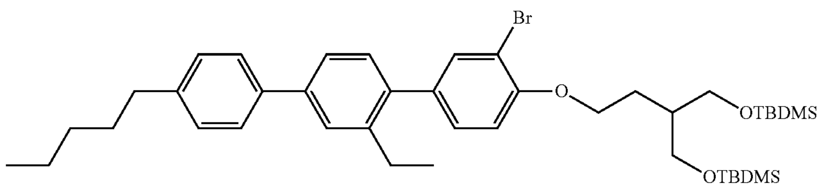

10.0 g (24.0 mmol) of bromide C, 8.64 g (25.0 mmol) of 4-[(tert-butyldimethylsilyl)oxy]-3-{[(tert-butyldimethylsilyl)oxy]methyl}butan-1-ol K and 7.03 g (26.81 mmol) of triphenylphosphine are dissolved in 76.5 ml of tetrahydrofuran (THF). 5.46 ml (27.9 mmol) of diisopropyl azodicarboxylate are then added dropwise to the reaction solution at room temperature (RT). The clear and slightly yellow reaction solution formed is stirred at RT for 20 h. The reaction mixture is then evaporated in vacuo and filtered through silica gel with heptane/dichloromethane, giving 17.45 g of the desired product.

$^1H$ NMR (500 MHz, $CDCl_3$)

δ=0.00 ppm (s, 12H $Si(CH_3)_2$), 0.854 ($m_c$, 21H, $2\times Si(C(CH_3)_3)$, $CH_3$), 1.09 (t, 7.5 Hz, 3H, $CH_3$), 1.31 ($m_c$, 4H), 1.61 ($m_c$, 2H, $CH_2$), 1.83 (q, 6.58 Hz, 2H, benz. $CH_2$), 1.91 (sept., 5.64 Hz, 1H, $CH_2CH_1(CH_2OTBDMS)_2$), 2.59 ($m_c$, 4H, $2\times CH_2$), 3.62 ($m_c$, 4H, $CH_2OTBDMS$), 4.12 (t, 6.49 Hz, $OCH_2$), 6.87 (d, 8.43 Hz, 1H, arom. H), 7.15 ($dd_{(superimposed)}$, 7.83, 2.54 Hz, 1H, arom. H), 7.16 (d, 7.83 Hz, 1H, arom. H), 7.21 (d, 7.25 Hz, 2H, arom. H), 7.37 (dd, 7.86, 1.84 Hz, 1H, arom. H), 7.44 (d, 1.68 Hz, 1H, arom. H), 7.47 ($d_{(superimposed)}$, 1.90 Hz, 1H, arom. H), 7.49 ($d_{(superimposed)}$, 8.22 Hz, 2H, arom. H).

5) Synthesis of 2-(2-{4-[(tert-butyldimethylsilyl)oxy]-3-{[(tert-butyldimethylsilyl)oxy]methyl}butoxy}-5-[2-ethyl-4-(4-pentylphenyl)phenyl]phenyl)ethanol E

E

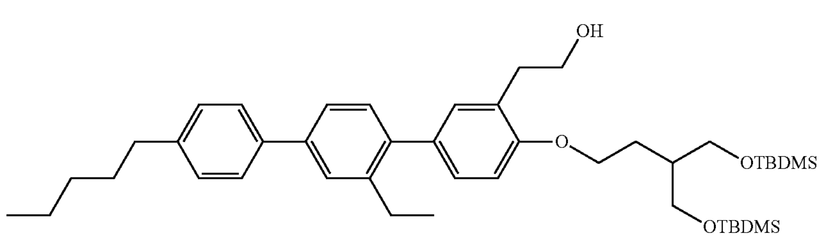

17.5 g (23.0 mmol) of bromide D are dissolved in 65.0 ml of tetrahydrofuran (THF) and cooled to −70° C., and 17.1 ml (27.0 mmol) of butyllithium (1.6 M solution in hexane) are added dropwise at this temperature. A solution of 8.70 ml (25.0 mmol) of ethylene oxide in 10.0 ml of cooled (−25° C.) THF is then added rapidly. The reaction mixture is stirred at −70° C. for 45 minutes, and a solution of 3.45 ml (27.0 mmol) of boron trifluoride in THF at −25° C. is subsequently carefully added dropwise. The reaction mixture is then stirred at −70° C. for 3 h, diluted with 20 ml of MTB ether and allowed to come to room temperature over the course of 2 h. It is then carefully poured into ice-water and extracted with MTB ether. The combined org. phases are washed with saturated sodium chloride solution, dried over sodium sulfate, filtered and evaporated. The crude product obtained is filtered through silica gel with heptane/ethyl acetate (9:1, then 4:1), and the product fractions are evaporated in vacuo, giving 7.5 g of the product having a purity of 99.4% according to HPLC.

6) Synthesis of 2-(2-{4-[(tert-butyldimethylsilyl)oxy]-3-{[(tert-butyldimethylsilyl)oxy]methyl}butoxy}-5-[2-ethyl-4-(4-pentylphenyl)phenyl]phenyl)ethyl 2-methylprop-2-enoate F

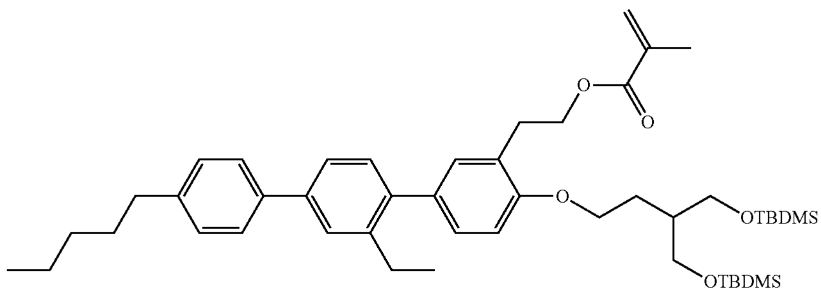

F 17.2 g (24.0 mmol) of alcohol E, 4.50 ml (53.1 mmol) of methacrylic acid (stabilized) and 0.33 g (2.71 mmol) of 4-(dimethylamino)pyridine are dissolved in 150 ml of dichloromethane (DCM) at room temperature and cooled to 2° C. 9.20 ml (53.3 mmol) of 1-(3-dimethylaminopropyl)-3-ethylcarbodiimide as a solution in 50 ml of dichloromethane are then added dropwise at 2-5° C., and the mixture is stirred at room temperature for 20 h. The reaction solution is then filtered directly through silica gel with DCM, giving 15.5 g of the product having a purity of 99.6% (HPLC).

7) Synthesis of 2-{5-[2-ethyl-4-(4-pentylphenyl)phenyl]-2-[4-hydroxy-3-(hydroxymethyl)butoxy]phenyl}ethyl 2-methylprop-2-enoate G

G

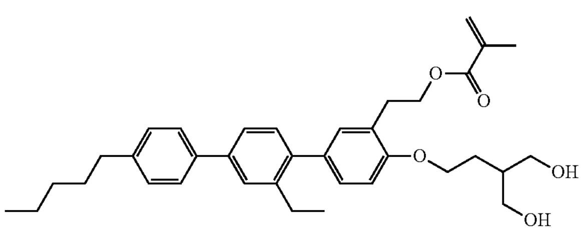

15.5 g (19.6 mmol) of ester F are dissolved in 225 ml of tetrahydrofuran (THF) and cooled to 2° C., and 23.5 ml (47.0 mmol) of HCl (2 mol/l) are slowly added dropwise. The reaction mixture is subsequently stirred at room temperature for a further 3 h and carefully neutralized using saturated sodium hydrogencarbonate solution. The reaction product is extracted with MTB ether, and the combined organic phases are washed with water and dried over sodium sulfate, filtered and evaporated at 30° C. in vacuo. The crude product is filtered through silica gel with heptane/ethyl acetate (2:1, 1:1 and finally with 1:2), and the product fractions are evaporated at 30° C. in vacuo, giving 10.9 g of a colorless solid, which is dissolved in 200 ml of pentane and 105 ml of MTB ether under reflux and is subsequently crystallized using acetone/dry ice. Drying at room temperature in vacuo gives 9.0 g of the desired product as a colorless solid having a purity of 99.8% (HPLC).

Phase Behavior

Tg=−18° C./C (melting point)=72° C./I (isotropic)

$^{1}$H NMR (500 MHz, $CDCl_3$)

δ=0.95 ppm (t, 6.9 Hz, 3H, $CH_3$), 1.17 (t, 7.56 Hz, 3H, $CH_3$), 1.39 ($m_c$, 4H), 1.70 (quin. 7.33 Hz, 2H, $CH_2$), 1.92 (q, 6.35 Hz, 2H, benz. $CH_2$), 1.95 (s, 3H, $CH_3$), 2.17 ($m_c$, 1H,), 2.48 ($S_{(broad)}$, 2H, 2×OH), 2.68 (me, 4H), 3.08 (t, 7.25 Hz, 2H), 3.82 (dd, 10.69, 6.84 Hz 2H $CH_2$ $HOCH_{a2}CH$), 3.93 (dd, 10.77, 3.99 Hz, 2H, $HOCH_{b2}CH$), 4.15 (t, 5.95 Hz, 2H, $CH_2$), 4.44 (t, 7.26 Hz, 2H, $CH_2$), 5.57 (s, 1H,), 6.11 (s, 1H), 6.93 (d, 8.27 Hz, 1H, arom. H), 7.19 (d, 2.05 Hz, 1H, arom. H), 7.21 (dd, 8.23, 2.28 Hz, 1H, arom. H), 7.29 (d, 7.98 Hz, 2H, arom. H) 7.45, (dd, 8.07, 2.02 Hz, 1H, arom. H), 7.53 (d, 1.68 Hz, 1H, arom. H), 7.58 (8.09 Hz, 2H, arom. H).

8) Synthesis of 1,3-diethyl 2-[2-(benzyloxy)ethyl]propanedioate H

H

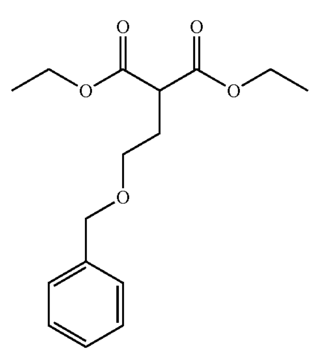

240.0 ml (0.628 mol) of sodium methoxide (20% solution in ethanol) are initially introduced in 300 ml of ethanol and heated to 81° C. 180.0 ml (1.180 mol) of diethyl malonate are then added rapidly over the course of 10 minutes (min.), and immediately thereafter 100.0 g (0.451 mol) of 2-bromoethoxy-methylbenzene are added over the course of 15 min. The reaction mixture is stirred under reflux for 4 h, subsequently cooled to room temperature (RT) and poured into a mixture of ice-water and MTB ether. The mixture is carefully adjusted to pH 4 to 5 using 25% hydrochloric acid, and the organic phase is separated off. The water phase is extracted a number of times with MTB ether. The combined organic phases are washed with water and dried over sodium sulfate, filtered and evaporated, giving 223.6 g of an orange liquid, from which the excess diethyl malonate is separated off by distillation at a bath temperature of 100-150° C. (top temperature 70-77° C.) and a vacuum of 5 mbar. The crude product obtained (133.2 g of orange liquid) is filtered through 2 I of silica gel with dichloromethane/MTB ether (8:2), giving the product as a yellow liquid.

9) Synthesis of 2-[2-(benzyloxy)ethyl]propane-1,3-diol I

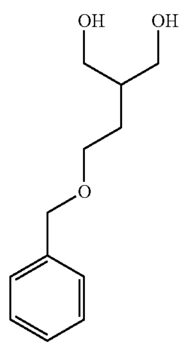

I 170.0 ml (340 mmol) of lithium aluminum hydride solution (2 molar in THF) are initially introduced, and a solution of 66.5 g (225.9 mmol) of ester H in 350.0 ml of tetrahydrofuran (THF) is added with cooling (up to a maximum reaction temperature of 50° C.). The reaction mixture is subsequently stirred at 66° C. for 5 h. The reaction mixture is cooled to room temperature (RT), and 100 ml of ethyl acetate are carefully added dropwise. 20 ml of water and a hot solution of 27.8 ml (377.4 mmol) of sodium carbonate decahydrate (Emprove®) in 30 ml of water are then carefully added, and the mixture is stirred for 15 min. The colorless precipitate is filtered off with suction and washed with copious THF. The filtrate is evaporated, giving 45.4 g of the product as a colorless, slightly cloudy oil, which is filtered through 1.2 liters of silica gel with ethyl acetate (EA) and EA/methanol (95:5 and 9:1). The product fractions are evaporated, giving 23.8 g of the product as a colorless oil.

$^1$H NMR (500 MHz, $CDCl_3$)

δ=1.74 ppm (q, 6.38 Hz, 2H $CH_2CH_2CH_1$), 1.91 (sept., 5.17 Hz, 1H, $CH_2CH_1(CH_2OTBDMS)_2$), 2.46 ($s_{(broad)}$, 1H, 2×OH), 3.61 (t, 5.77 Hz, 2H, $CH_2OCH_2CH_2$), 3.72 (dd, 10.9, 5.86 Hz, 2H, 3.76 $CH_1CH_2OTBDMS$), (dd, 4.71, 10.9 Hz, 2H, $CH_1CH_2OTBDMS$), 4.55 (s, 2H, $CH_2$-benzyl.), 7.41-7.30 (m, 5H, arom. H).

10) Synthesis of 6-[2-(benzyloxy)ethyl]-2,2,3,3,9,9,10,10-octamethyl-4,8-dioxa-3,9-disilaundecane J

J

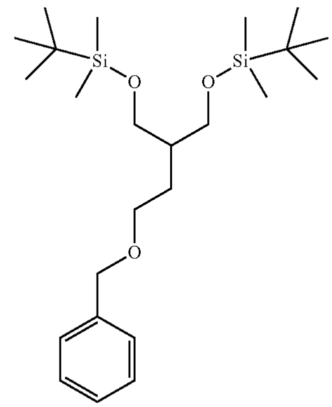

53.7 g (255.39 mmol) of diol I and 3.0 g (24.56 mmol) of 4-(dimethylamino)pyridine are dissolved in 600 ml of dichloromethane and cooled to 5° C. 110.0 ml (0.79 mmol) of triethylamine are then added, and a solution of 100.0 g (0.66 mol) of tert-butyldimethylchlorosilane in 400 ml of dichloromethane (DCM) is subsequently added dropwise at 2-7° C., and the mixture is stirred at room temperature for 20 h. The ammonium salts which have precipitated out are filtered off with suction, washed with DCM, and the organic phase is washed with saturated sodium chloride solution and water, dried over sodium sulfate, filtered and evaporated, giving the crude product (130.1 g) as an orange oil, which is filtered through 2 I of silica gel with toluene, giving, after evaporation of the product fractions, 113.2 g of the product as a slightly yellow oil.

11) Synthesis of 4-[(tert-butyldimethylsilyl)oxy]-3-{[(tert-butyldimethylsilyl)oxy]methyl}butan-1-ol

K

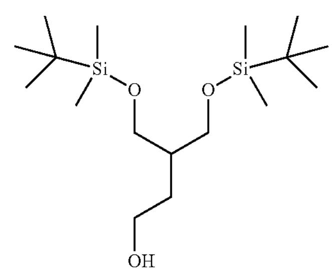

60.0 g (110.8 mmol) of J are dissolved in 600 ml of ethyl acetate, 30.0 g of Pd/C (basic, 50% of water) are added, and the starting material is debenzylated for 24 h under a hydrogen atmosphere (1 bar, 50° C.). The reaction mixture (50% of product) is filtered off with suction and debenzylated again for a further 40 h using 15.0 g of Pd/C (basic, 50% of water) under a hydrogen atmosphere (1 bar, 50° C.). The reaction mixture is filtered at room temperature and evaporated, giving the crude product (50.0 g) as a colorless oil, which is filtered through 1 I of silica gel with pentane/MTB ether (9:1 to 7:3), giving 41.6 g of the product as a colorless oil.

$^{1}$H NMR (500 MHz, $CDCl_3$)

δ=0.00 ppm (2, 12H, 2×Si$(CH_3)_2$), 0.83 (s, 18H, 2×Si(C$(CH_3)_3$), 1.53 (q, 6.21 Hz, 2H, $CH_2CH_2CH_1$), 1.74 (sept. 6.08 Hz, 1H, $CH_2CH_1(CH_2OTBDMS)_2$), 3.16 ($s_{(broad)}$, 1H, OH), 3.47 (dd, 10.02, 6.26 Hz, 2H, $CH_1CH_2OTBDMS$), 3.57 (dd, 10.02, 5.72, 2H, $CH_1CH_2OTBDMS$), 3.62 ($q_{(broad)}$, 5.37 Hz, 2H $CH_2OOH$).

Example 4

Synthesis of 3-{5-[2-ethyl-4-(4-pentylphenyl)phenyl]-2-(3-hydroxypropoxy)-3-{3-[(2-methylprop-2-enoyl)oxy]propyl}phenyl}propyl 2-methylprop-2-enoate 13

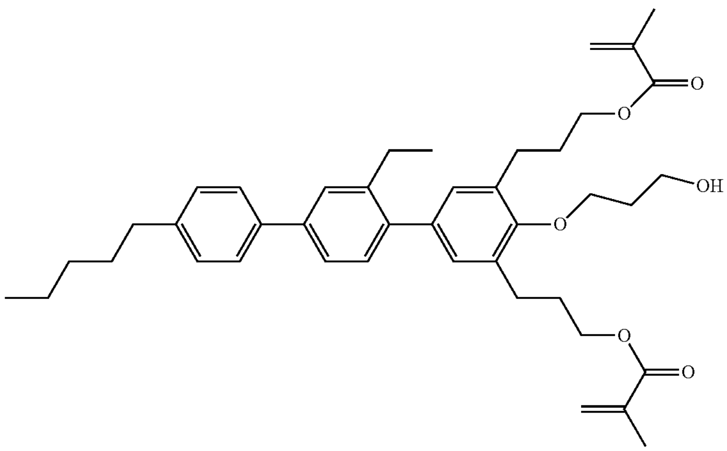 [SMILES: C=C(C)C(=O)OCCCc1cc(-c2ccc(-c3ccc(CCCCC)cc3)cc2CC)cc(CCCOC(=O)C(=C)C)c1OCCCO]

1) Synthesis of 2,6-dibromo-4-[2-ethyl-4-(4-pentylphenyl)phenyl]phenol A13

A13

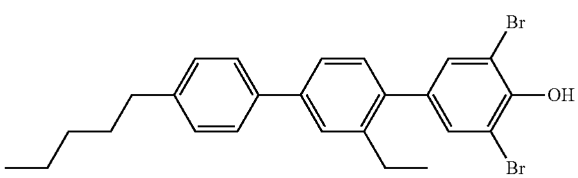

20.6 g (59.80 mmol) of 2'-ethyl-4"-pentyl-[1,1';4',1"]terphenyl-4-ol B are initially introduced in 150 ml of dichloromethane (DCM), and 1.50 ml (10.67 mmol) of diisopropylamine are added dropwise. The reaction solution is cooled to −5° C. using a dry ice/acetone bath, and a solution of 21.6 g (121.4 mmol) of N-bromosuccinimide in 300 ml of DCM is subsequently added dropwise. The reaction solution is stirred at room temperature (RT) for 18 h and acidified using 2 M HCl, water is added, and the phases are separated. The aqueous phase is extracted with DCM, dried over sodium sulfate, filtered and evaporated in vacuo. The crude product is filtered through 600 g of silica gel with toluene/heptane (1:1+1% of triethylamine). The product fractions are combined and, after evaporation, recrystallized from heptane at −30° C., giving the product as a viscous oil in a yield of 15.1 g and a purity of 99.1% (gas chromatography).

2) Synthesis of tert-butyl(2,6-dibromo-4-[2-ethyl-4-(4-pentylphenyl)phenyl]-phenoxy)dimethylsilane B13

B13

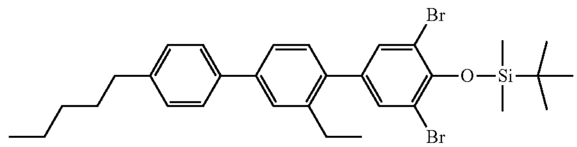

10.6 g (20.32 mmol) of bromide A13 are initially introduced in 150 ml of dichloromethane (DCM), 2.90 g (42.6 mmol) of imidazole are added, and the mixture is stirred at room temperature (RT) for 30 min. A solution of 4.00 g (26.54 mmol) of tert-butyldimethylchlorosilane in 20 ml of DCM is then added dropwise, and the mixture is stirred at RT for a further 18 h. The reaction mixture is evaporated in vacuo and dissolved in ethyl acetate (EA), water is added, and, after stirring, the phases are separated. The aqueous phase is extracted with EA, and the combined organic phases are washed with saturated sodium chloride solution, dried over sodium sulfate and evaporated in vacuo. The crude product obtained is filtered through 400 ml of silica gel with heptane, and the product fractions are combined and evaporated in vacuo, giving 6.6 g of the product as a colorless oil.

MS (EI): 616.3 [$M^+$]

$^{1}$H NMR (500 MHz, $CDCl_3$)

δ=0.38 ppm (s, 6H, Si$(CH_3)_2$), 0.88 (t, 6.6 Hz, 3H, $CH_3$), 1.06 (s, 9H, Si(C$(CH_3)_3$)), 1.13 (t, 8.06 Hz, 3H, $CH_3$), 1.38-1.27 (m, 4H, $CH_2$), 1.63 (quin., 7.7 Hz, 2H, $CH_2$), 2.66-2.59 (m, 4H, $CH_2$), 7.17 (d, 7.15 Hz, 1H, arom. H), 7.23 (d, 7.62 Hz, 2H, arom. H), 7.39 (dd, 7.86, 1.89 Hz, 1H, arom. H), 7.44 (s, 2H, arom. H), 7.462 (d, 1.75 Hz, 1H, arom. H), 7.50 (d, 8.13 Hz, 2H, arom. H).

3) Synthesis of 4-[2-ethyl-4-(4-pentylphenyl)phenyl]-2,6-bis(3-hydroxypropyl)phenol C13

C13

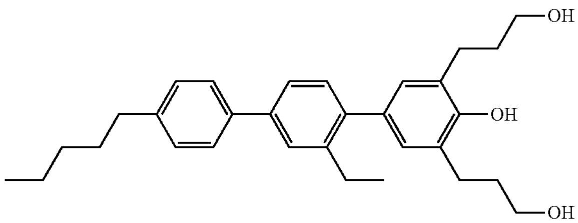

2.90 g (27.4 mmol) of sodium carbonate, 100.0 mg (0.56 mmol) of palladium(II) chloride and 180.0 mg (0.39 mmol) of 2-dicyclohexylphosphino-2',6'-diisopropoxy-1,1'-biphenyl are initially introduced in 30 ml of water, and a solution of 15.6 g (25.9 mmol) of bromide B13 and 4.10 g (28.9 mmol) of 2-butoxy-1,2-oxaborolane in 135 ml of tetrahydrofuran (THF) is added. 120 µl (0.87 mmol) of triethylamine are added, the mixture is degassed with nitrogen for 20 minutes (min.) and subsequently stirred under reflux for 18 h. The reaction mixture is cooled to room temperature, and water and MTB ether are added. After the reaction solution has been stirred, the phases are separated, the aqueous phase is extracted with MTB ether, and the combined organic phases are washed with saturated sodium chloride solution, dried using sodium sulfate, filtered and evaporated in vacuo. The crude product is filtered through 350 ml of silica gel with toluene/ethyl acetate (1:1), and the product fractions are combined and evaporated in vacuo.

$^1$H NMR (500 MHz, DMSO-d6)

δ=0.89 ppm (t, 7.08 Hz, 3H, $CH_3$), 1.05 (t, 7.92 Hz, 3H, $CH_3$), 1.33 ($m_c$, 4H, $CH_2$), 1.62 (quint, 7.29 Hz, 2H, $CH_2$), 1.73 (quint, 6.73 Hz, 2H, $CH_2$), 2.69 2.58 (m, 8H, benzyl-$CH_2$), 3.45 (q, 6.42 Hz, 4H, $CH_2$), 4.52 (t, 5.04 Hz, 2H, OH), 6.89 (s, 2H, arom. H), 7.2 (d, 7.9 Hz, 1H, arom. H), 7.29 (d, 8.98 Hz, 2H, arom. H), 7.46 (dd, 7.92, 1.90 Hz, 1H, arom. H), 7.54 (d, 1.78 Hz, 1H, arom. H), 7.59 (d, 8.12 Hz, 2H, arom. H), 8.25 (s, 1H, arom. OH).

4) Synthesis of 3-(2-{3-[(tert-butyldimethylsilyl)oxy]propoxy}-5-[2-ethyl-4-(4-pentylphenyl)phenyl]-3-(3-hydroxypropyl)phenyl)propan-1-ol D13

D13

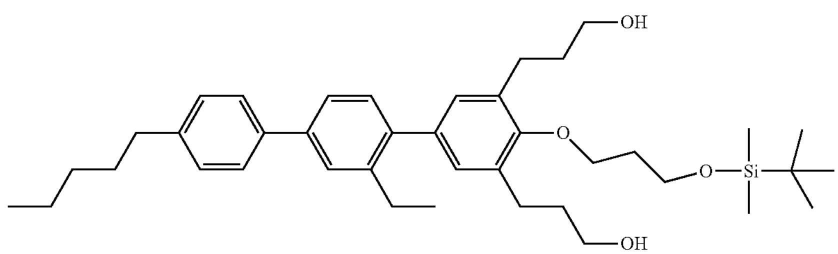

2.9 g (6.0 mmol) of trisalcohol C13, 2.40 g (9.0 mmol) of (3-bromopropoxy)(tert-butyl)dimethylsilane and 1.70 g (12.3 mmol) of potassium carbonate are added to 20 ml of N,N-dimethylformamide, and the mixture is stirred at 80° C. for 6 h. The reaction mixture is cooled to room temperature, water and MTB ether are added, and, after stirring, the phases are separated. The aqueous phase is extracted with MTB ether, and the combined organic phases are washed with saturated sodium chloride solution, dried over sodium sulfate, filtered and evaporated in vacuo. The crude product obtained is filtered through 50 ml of silica gel with toluene/ethyl acetate (4:1), and the product fractions are combined and evaporated in vacuo.

$^1$H NMR (500 MHz, $CDCl_3$)

δ=0.00 ppm (s, 6H, $Si(CH_3)_2$), 0.81 (s, 9H, $Si(C(CH_3)_3)$), 1.03 (t, 6.6 Hz, 3H, $CH_3$), 1.30-1.19 (m, 4H, $CH_2$), 1.58-1.49 (m, 2H, $CH_2$), 1.67 (quint., 5.5 Hz, 4H, $CH_2$), 1.88 (quint., 6.23 Hz, 2H, $CH_2$), 2.61-2.50 (m, 8H, $CH_2$), 3.37 (q, 6.41 Hz, 4H, $CH_2$), 3.76 (t, 6.2 Hz, 2H, $CH_2$), 3.79 (t, 5.69 Hz, 2H, $CH_2$), 4.33 (t, 5.5 Hz, 2H, OH), 6.92 (s, 2H, arom. H), 7.14 (d, 7.89 Hz, 1H, arom. H), 7.21 (d, 8.26 Hz, 2H, arom. H), 7.39 (dd, 7.93, 1.76 Hz, 1H, arom. H), 7.48 (d, 1.64 Hz, 1H, arom. H), 7.52 (d, 8.08 Hz, 2H, arom. H).

5) Synthesis of 3-(2-{3-[(tert-butyldimethylsilyl)oxy]propoxy}-5-[2-ethyl-4-(4-pentylphenyl)phenyl]-3-{3-[(2-methylprop-2-enoyl)oxy]propyl}phenyl)propyl 2-methylprop-2-enoate E13

E13

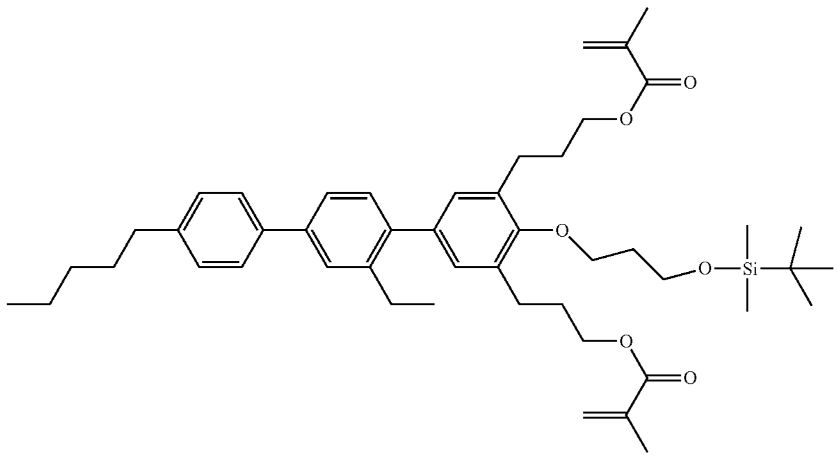

2.5 g (4.0 mmol) of bisalcohol D13, 1.40 ml (16.5 mmol) of methacrylic acid (stabilized using hydroquinone monomethyl ether) and 55.0 mg (0.45 mmol) of 4-(dimethylamino)pyridine are dissolved in 25 ml of dichloromethane (DCM) and cooled to 2° C. A solution of 2.48 ml (16.52 mmol) of 1-(3-dimethylaminopropyl)-3-ethylcarbodiimide in 25 ml of DCM is then added dropwise at 2-5° C., and the mixture is stirred for a further 18 h. The reaction mixture is filtered directly through 100 ml of silica gel with DCM, and the product fractions are combined. The crude product obtained is filtered through 200 ml of silica gel and 20 ml of basic aluminum oxide with DCM/heptane (4:1), and the product fractions are evaporated in vacuo.

6) Synthesis of 3-{5-[2-ethyl-4-(4-pentylphenyl)phenyl]-2-(3-hydroxypropoxy)-3-{3-[(2-methylprop-2-enoyl)oxy]propyl}phenyl}propyl 2-methylprop-2-enoate 13

13

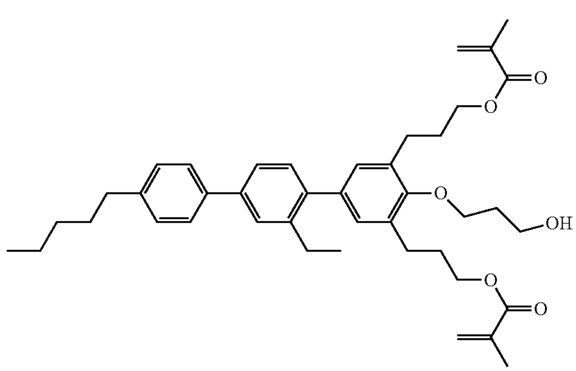

3.1 g (4.0 mmol) of ester E13 are initially introduced in 40 ml of tetrahydrofuran (THF) and cooled to 2° C. 2.40 ml (4.80 mmol) of hydrochloric acid (2 N) are then added slowly, and the mixture is subsequently stirred at room temperature (RT) for 4 h. When the reaction is complete, the reaction mixture is carefully neutralized using sodium hydrogencarbonate, MTB ether is added, and the mixture is stirred. The organic phase is separated off, the water phase is extracted with MTB ether, and the organic phases are combined, washed with water, dried over sodium sulfate, filtered and evaporated at a maximum of 30° C. in vacuo. The crude product obtained (viscous oil) is filtered through 150 ml of silica gel with heptane/ethyl acetate (2:1), and the product fractions are evaporated at a maximum of 30° C. in vacuo. The product obtained (highly viscous oil) is dried at room temperature in an oil-pump vacuum ($10^{-2}$ mbar) for 72 h.

Melting point: highly viscous oil at room temperature.

Tg (glass transition temperature) −39° C.

MS (EI): 654.5 [$M^+$]

$^1$H NMR (500 MHz, $CDCl_3$)

δ=0.94 ppm (t, 7.02 Hz, 3H, $CH_3$), 1.18 (t, 7.56 Hz, 3H, $CH_3$), 1.44-1.36 (m, 4H, $CH_2$), 1.57 ($s_{(broad)}$, 1H, OH), 1.69 (quint., 8.25 Hz, 2H, $CH_2$), 1.98 (s, 6H, $CH_3$), 2.14-2.04 (m, 6H, $CH_2$), 2.67 (q, 7.49 Hz, 4H, $CH_2$), 2.81 (t, 7.72 Hz, 4H, $CH_2$), 3.97 (t(broad), 5.77 Hz, 2H, $CH_2$), 4.03 (t, 5.94 Hz, 2H, $CH_2$), 4.26 (t, 6.47 Hz, 4H, $CH_2$), 5.58 (t, 1.58 Hz, 1H), 6.13 (s, 1H), 7.06 (s, 2H, arom. H), 7.26 (d, 7.87 Hz, 1H, arom. H), 7.29 (d, 2H, arom. H), 7.46 (dd, 7.87, 1.9 Hz, 1H, arom. H), 7.53 (d, 1.78 Hz, 1H, arom. H), 7.57 (d, 8.12 Hz, 2H, arom. H).

Examples 5 to 165

The following compounds are prepared analogously to Examples 1 to 3 and Schemes 1 to 3.

| Example | Structure |
| --- | --- |
| 5. | 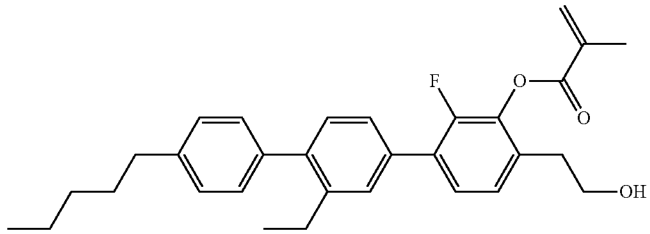 |
| 6. | 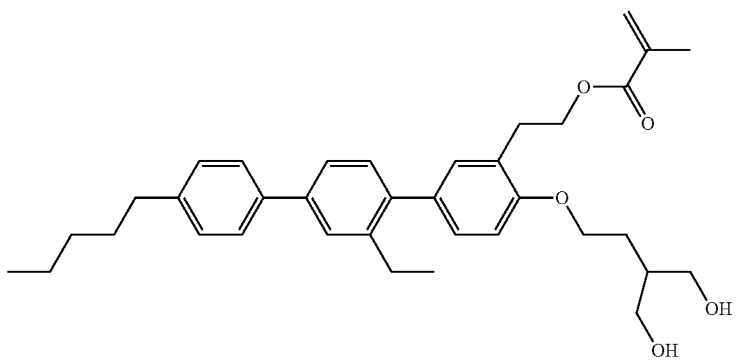 [SMILES: C=C(C)C(=O)OCCc1cc(-c2ccc(-c3ccc(CCCCC)cc3)cc2CC)ccc1OCCC(CO)CO] |
| 7. | 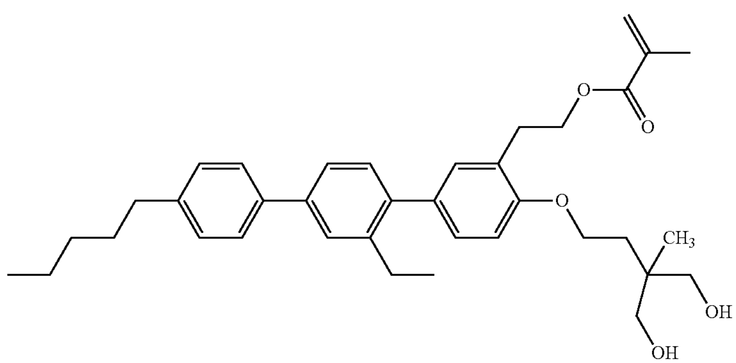 [SMILES: C=C(C)C(=O)OCCc1cc(-c2ccc(-c3ccc(CCCCC)cc3)cc2CC)ccc1OCCC(C)(CO)CO] |
| 8. | 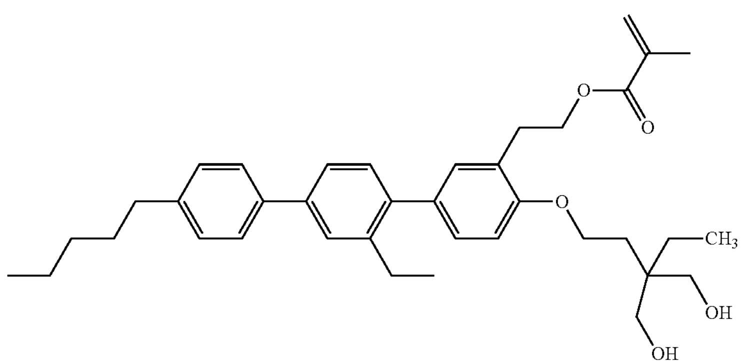 [SMILES: C=C(C)C(=O)OCCc1cc(-c2ccc(-c3ccc(CCCCC)cc3)cc2CC)ccc1OCCC(CC)(CO)CO] |

-continued
| Example | Structure |
|---|---|
| 9. | 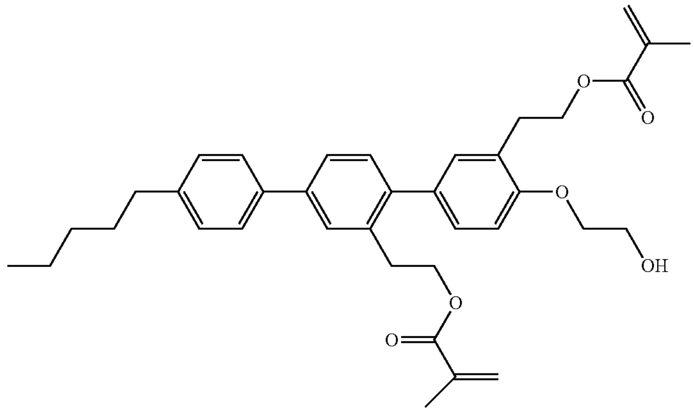 [SMILES: C=C(C)C(=O)OCCc1cc(-c2ccc(-c3ccc(CCCCC)cc3)cc2CCOC(=O)C(=C)C)ccc1OCCO] |
| 10. | 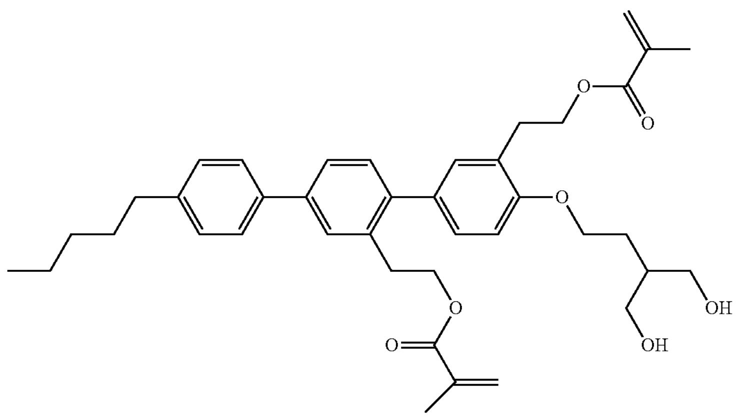 [SMILES: C=C(C)C(=O)OCCc1cc(-c2ccc(-c3ccc(CCCCC)cc3)cc2CCOC(=O)C(=C)C)ccc1OCCC(CO)CO] |
| 11. | 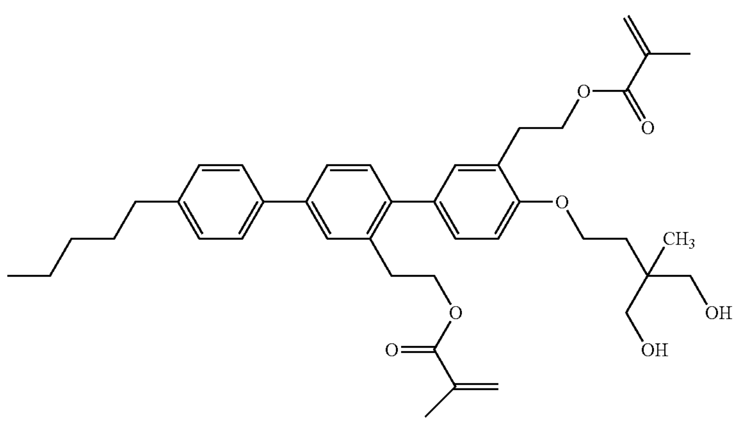 [SMILES: C=C(C)C(=O)OCCc1cc(-c2ccc(-c3ccc(CCCCC)cc3)cc2CCOC(=O)C(=C)C)ccc1OCCC(C)(CO)CO] |

-continued
| Example | Structure |
|---|---|
| 12. | 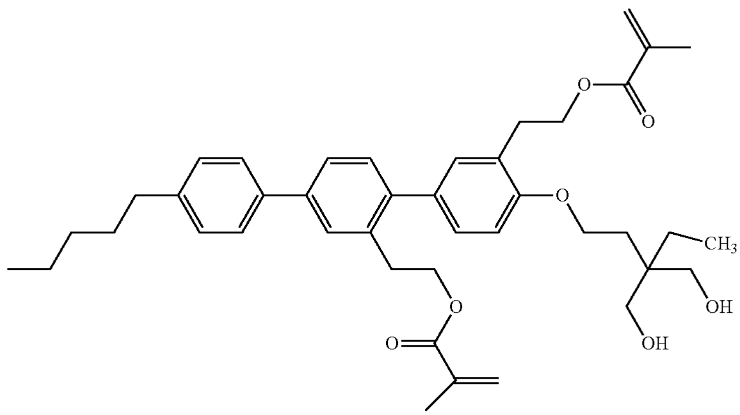 [SMILES: C=C(C)C(=O)OCCc1cc(-c2ccc(-c3ccc(CCCCC)cc3)cc2CCOC(=O)C(=C)C)ccc1OCCC(CC)(CO)CO] |
| 13. | 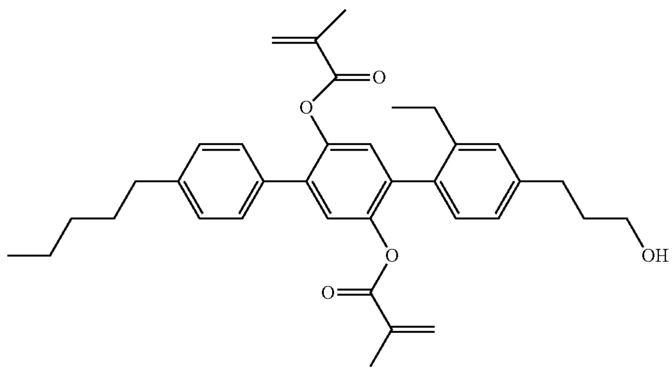 [SMILES: C=C(C)C(=O)Oc1cc(-c2ccc(CCCO)cc2CC)c(OC(=O)C(=C)C)cc1-c1ccc(CCCCC)cc1] |
| 14. | 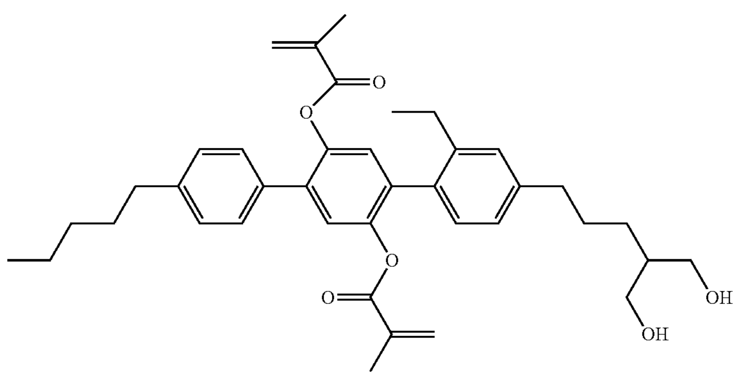 [SMILES: C=C(C)C(=O)Oc1cc(-c2ccc(CCCC(CO)CO)cc2CC)c(OC(=O)C(=C)C)cc1-c1ccc(CCCCC)cc1] |
| 15. | 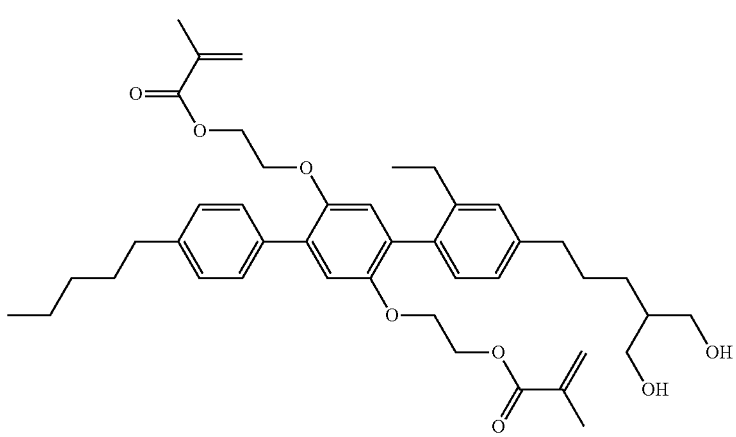 [SMILES: C=C(C)C(=O)OCCOc1cc(-c2ccc(CCCC(CO)CO)cc2CC)c(OCCOC(=O)C(=C)C)cc1-c1ccc(CCCCC)cc1] |

-continued
| Example | Structure |
|---|---|
| 16. | 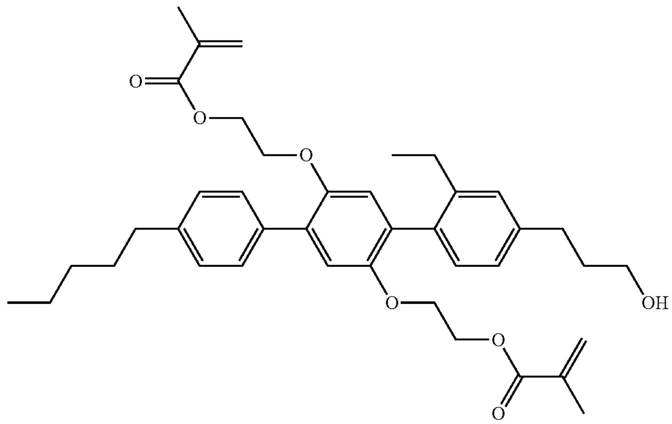 [SMILES: C=C(C)C(=O)OCCOc1cc(-c2ccc(CCCO)cc2CC)c(OCCOC(=O)C(=C)C)cc1-c1ccc(CCCCC)cc1] |
| 17. | 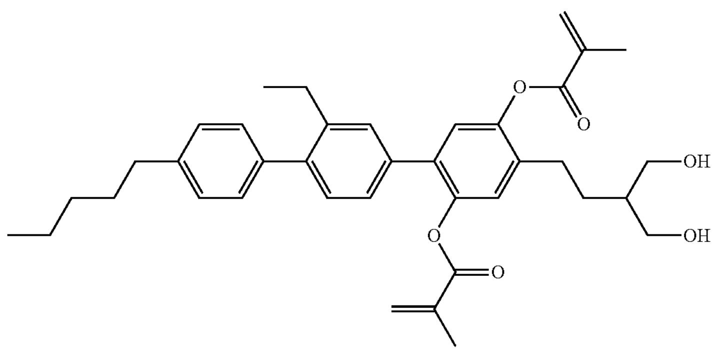 [SMILES: C=C(C)C(=O)Oc1cc(-c2ccc(-c3ccc(CCCCC)cc3)c(CC)c2)c(OC(=O)C(=C)C)cc1CCC(CO)CO] |
| 18. | 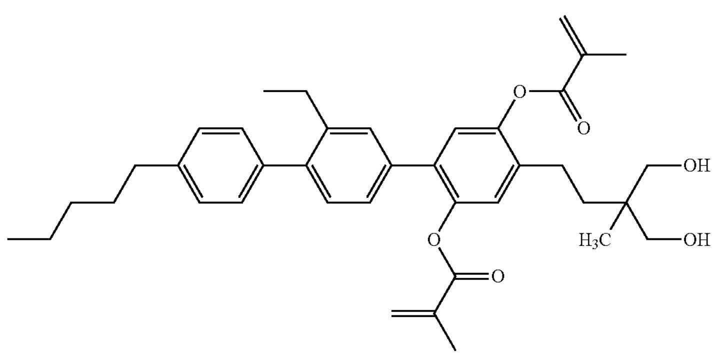 [SMILES: C=C(C)C(=O)Oc1cc(-c2ccc(-c3ccc(CCCCC)cc3)c(CC)c2)c(OC(=O)C(=C)C)cc1CCC(C)(CO)CO] |
| 19. | 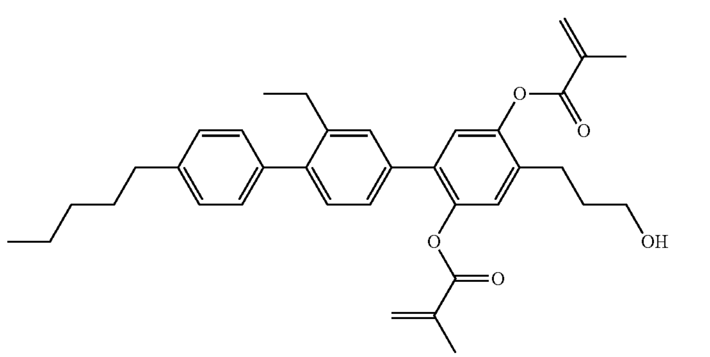 [SMILES: C=C(C)C(=O)Oc1cc(-c2ccc(-c3ccc(CCCCC)cc3)c(CC)c2)c(OC(=O)C(=C)C)cc1CCCO] |

-continued
| Example | Structure |
| --- | --- |
| 20. | 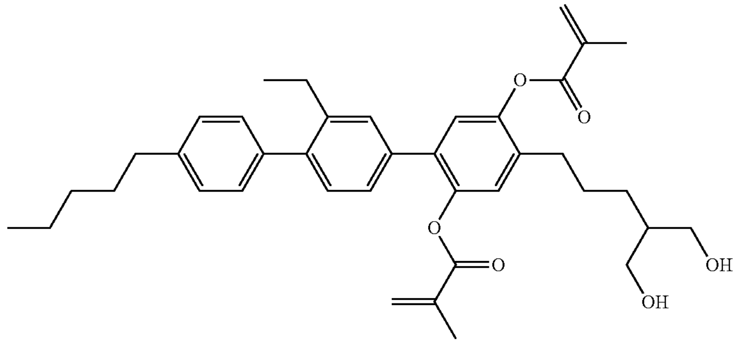 [SMILES: C=C(C)C(=O)Oc1cc(-c2ccc(-c3ccc(CCCCC)cc3)c(CC)c2)c(OC(=O)C(=C)C)cc1CCCC(CO)CO] |
| 21. | 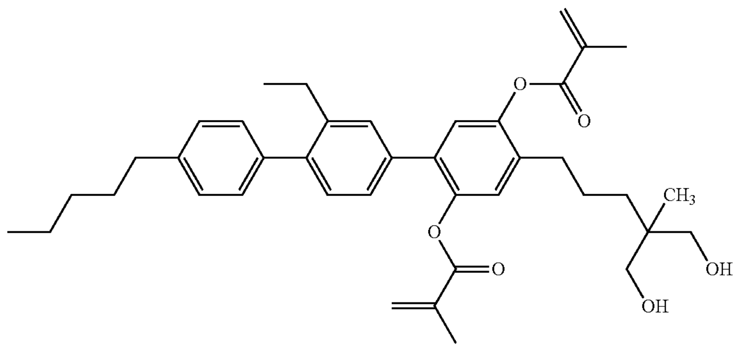 |
| 22. | 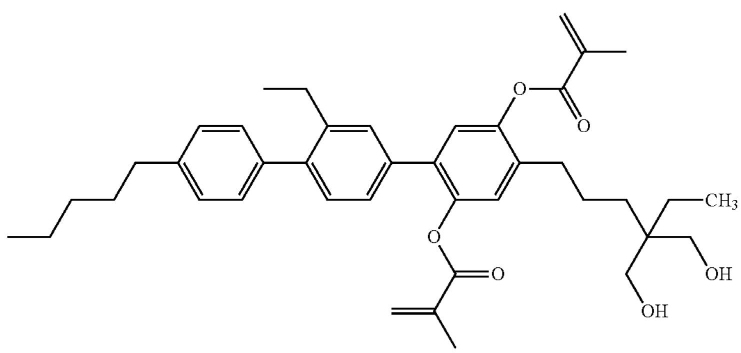 [SMILES: C=C(C)C(=O)Oc1cc(-c2ccc(-c3ccc(CCCCC)cc3)c(CC)c2)c(OC(=O)C(=C)C)cc1CCCC(CC)(CO)CO] |
| 23. | 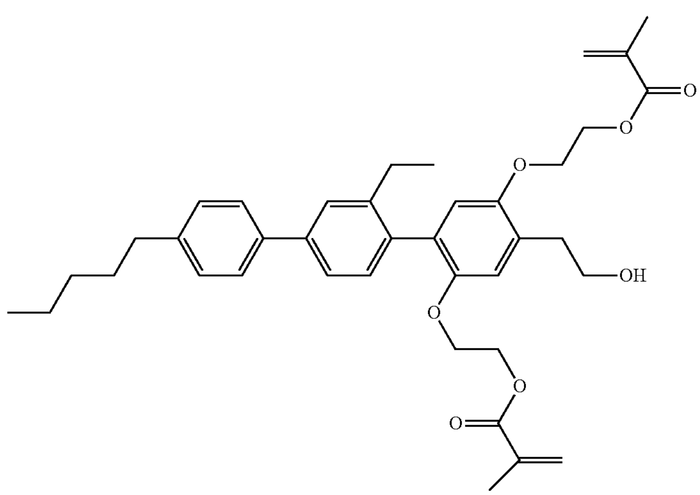 [SMILES: C=C(C)C(=O)OCCOc1cc(-c2ccc(-c3ccc(CCCCC)cc3)cc2CC)c(OCCOC(=O)C(=C)C)cc1CCO] |

-continued
| Example | Structure |
|---|---|
| 24. | 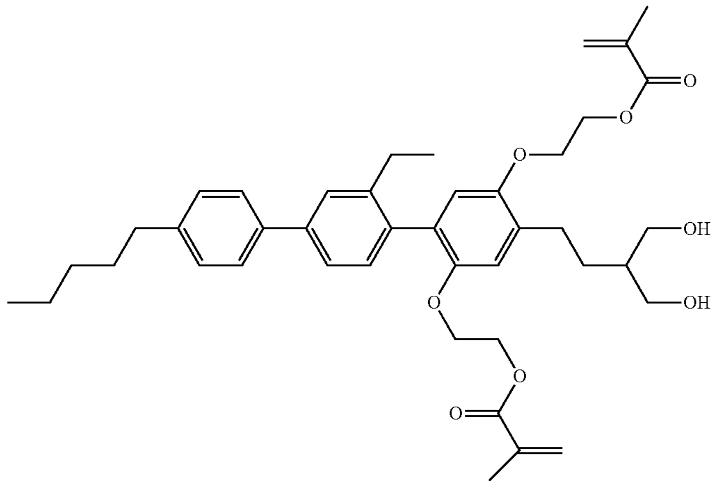 [SMILES: C=C(C)C(=O)OCCOc1cc(-c2ccc(-c3ccc(CCCCC)cc3)cc2CC)c(OCCOC(=O)C(=C)C)cc1CCC(CO)CO] |
| 25. | 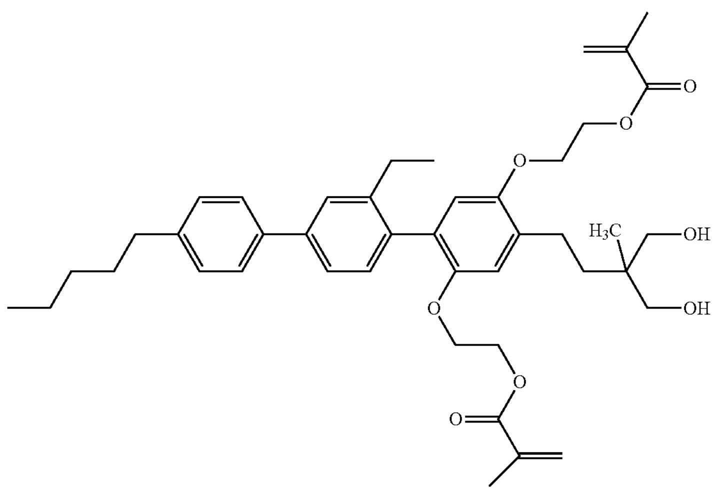 [SMILES: C=C(C)C(=O)OCCOc1cc(-c2ccc(-c3ccc(CCCCC)cc3)cc2CC)c(OCCOC(=O)C(=C)C)cc1CCC(C)(CO)CO] |
| 26. | 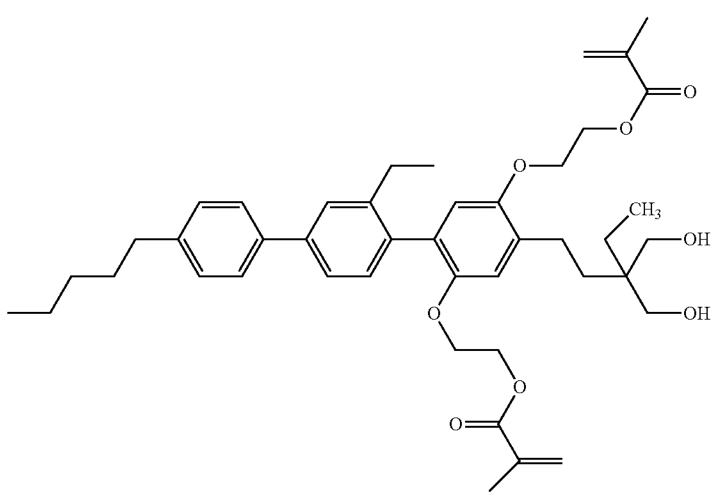 [SMILES: C=C(C)C(=O)OCCOc1cc(-c2ccc(-c3ccc(CCCCC)cc3)cc2CC)c(OCCOC(=O)C(=C)C)cc1CCC(CC)(CO)CO] |

-continued
| Example | Structure |
| --- | --- |
| 27. | 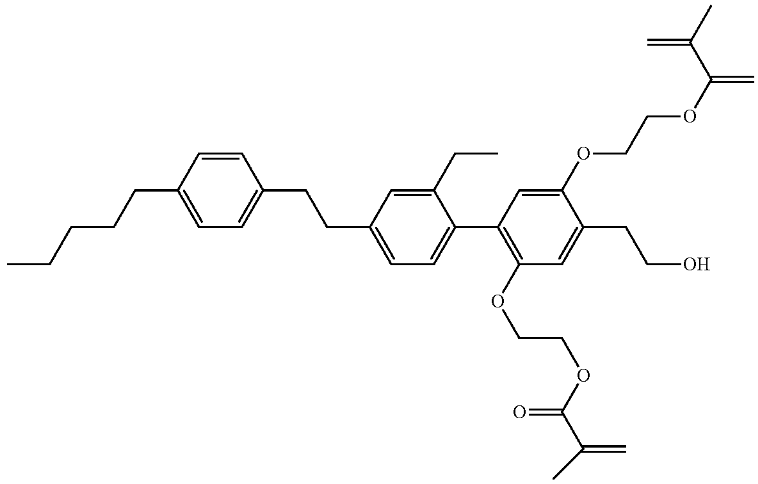 [SMILES: C=C(C)C(=C)OCCOc1cc(-c2ccc(CCc3ccc(CCCCC)cc3)cc2CC)c(OCCOC(=O)C(=C)C)cc1CCO] |
| 28. | 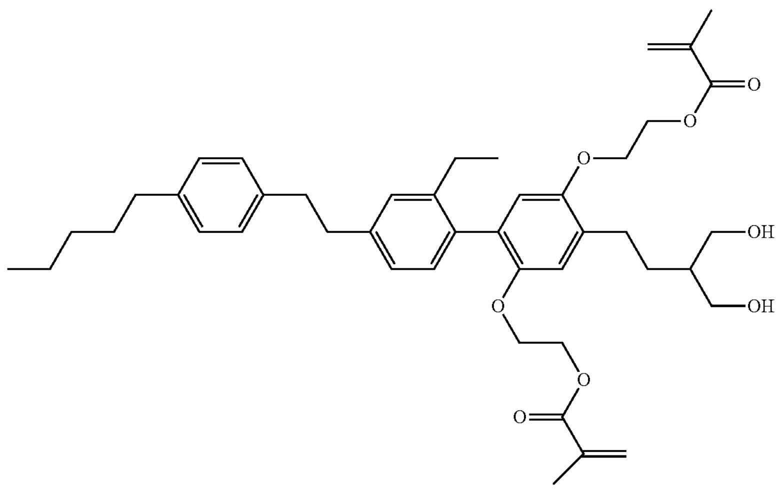 [SMILES: C=C(C)C(=O)OCCOc1cc(-c2ccc(CCc3ccc(CCCCC)cc3)cc2CC)c(OCCOC(=O)C(=C)C)cc1CCC(CO)CO] |
| 29. | 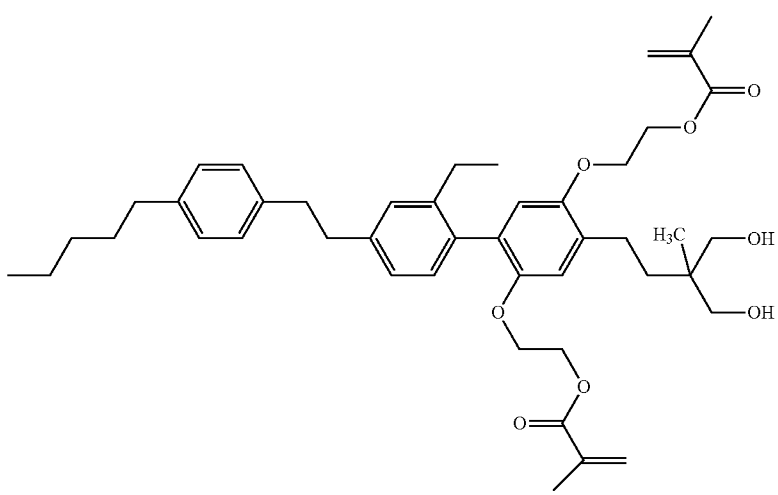 [SMILES: C=C(C)C(=O)OCCOc1cc(-c2ccc(CCc3ccc(CCCCC)cc3)cc2CC)c(OCCOC(=O)C(=C)C)cc1CCC(C)(CO)CO] |

-continued
| Example | Structure |
|---|---|
| 30. | 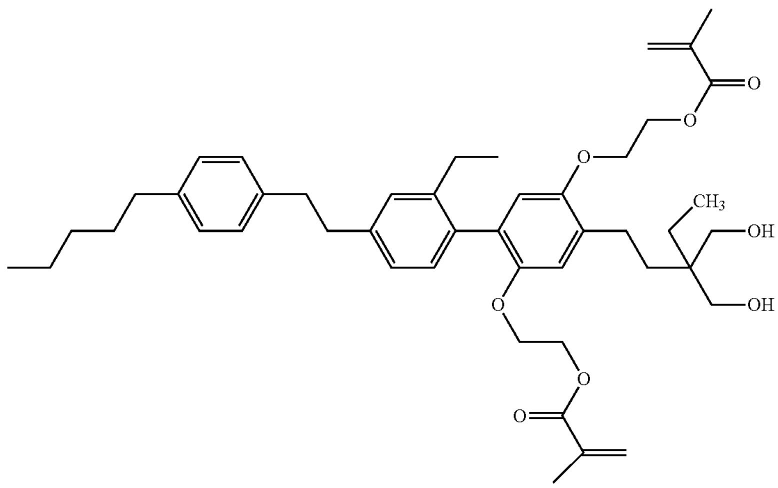 [SMILES: C=C(C)C(=O)OCCOc1cc(-c2ccc(CCc3ccc(CCCCC)cc3)cc2CC)c(OCCOC(=O)C(=C)C)cc1CCC(CC)(CO)CO] |
| 31. | 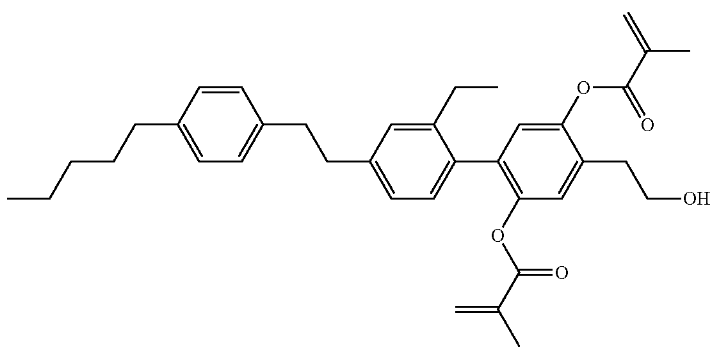 [SMILES: C=C(C)C(=O)Oc1cc(-c2ccc(CCc3ccc(CCCCC)cc3)cc2CC)c(OC(=O)C(=C)C)cc1CCO] |
| 32. | 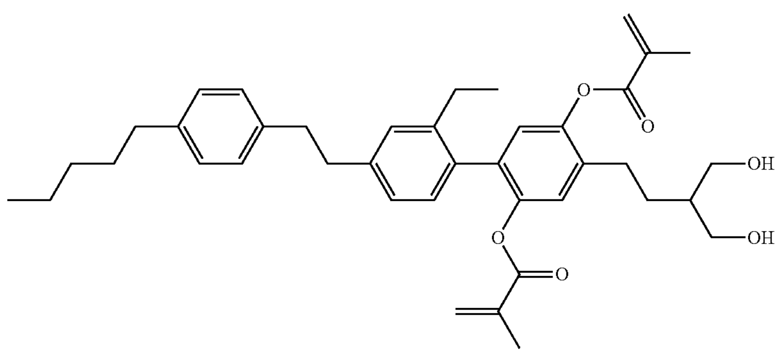 [SMILES: C=C(C)C(=O)Oc1cc(-c2ccc(CCc3ccc(CCCCC)cc3)cc2CC)c(OC(=O)C(=C)C)cc1CCC(CO)CO] |
| 33. | 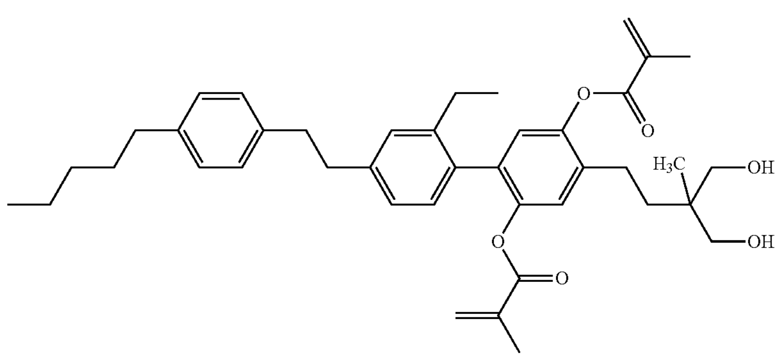 [SMILES: C=C(C)C(=O)Oc1cc(-c2ccc(CCc3ccc(CCCCC)cc3)cc2CC)c(OC(=O)C(=C)C)cc1CCC(C)(CO)CO] |

-continued
| Example | Structure |
|---|---|
| 34. | 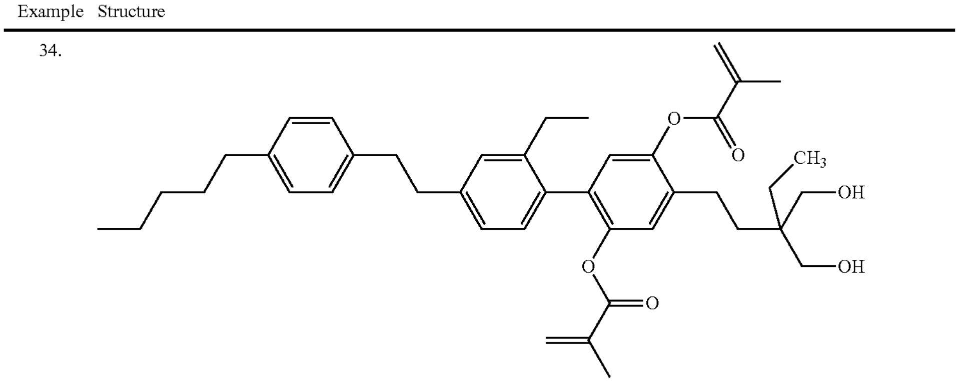 |
| 35. | 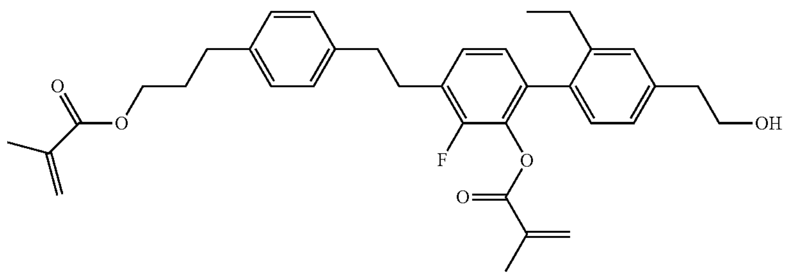 [SMILES: C=C(C)C(=O)OCCCc1ccc(CCc2ccc(-c3ccc(CCO)cc3CC)c(OC(=O)C(=C)C)c2F)cc1] |
| 36. | 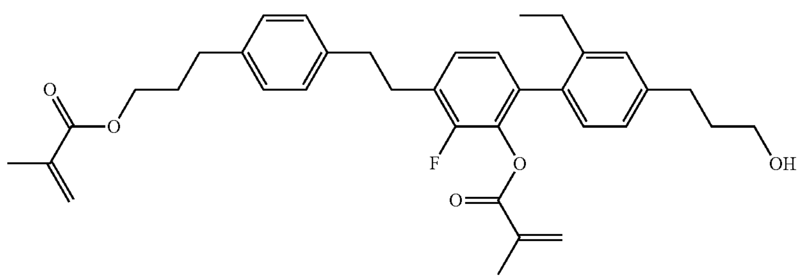 |
| 37. | 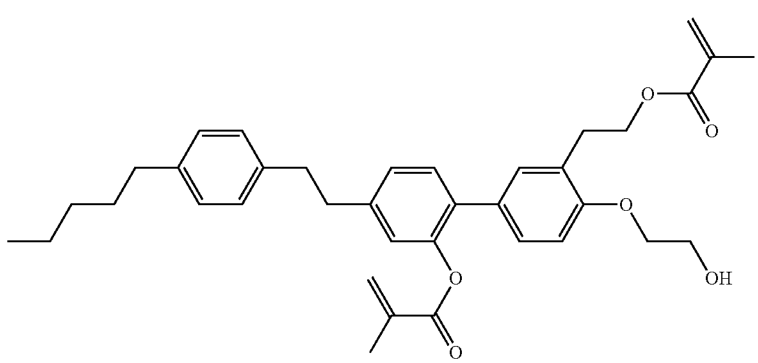 [SMILES: C=C(C)C(=O)OCCc1cc(-c2ccc(CCc3ccc(CCCCC)cc3)cc2OC(=O)C(=C)C)ccc1OCCO] |

-continued
| Example | Structure |
|---|---|
| 38. | 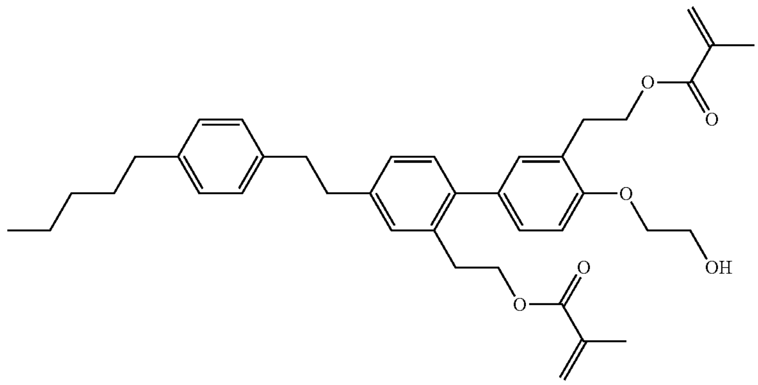 [SMILES: C=C(C)C(=O)OCCc1cc(-c2ccc(CCc3ccc(CCCCC)cc3)cc2CCOC(=O)C(=C)C)ccc1OCCO] |
| 39. | 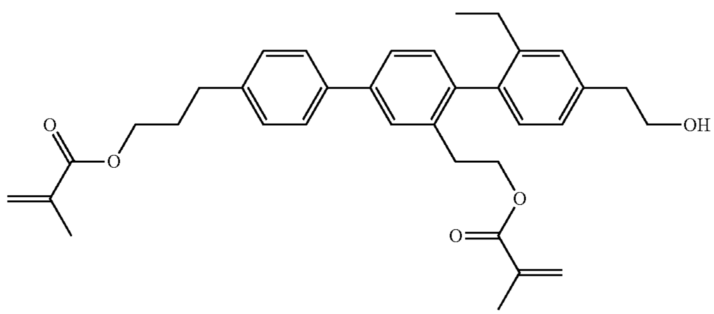 [SMILES: C=C(C)C(=O)OCCCc1ccc(-c2ccc(-c3ccc(CCO)cc3CC)c(CCOC(=O)C(=C)C)c2)cc1] |
| 40. | 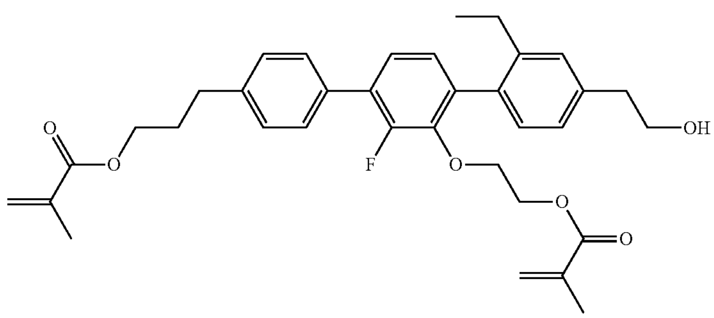 [SMILES: C=C(C)C(=O)OCCCc1ccc(-c2ccc(-c3ccc(CCO)cc3CC)c(OCCOC(=O)C(=C)C)c2F)cc1] |
| 41. | 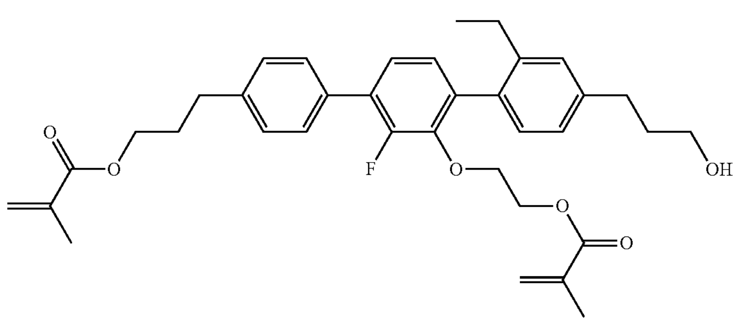 [SMILES: C=C(C)C(=O)OCCCc1ccc(-c2ccc(-c3ccc(CCCO)cc3CC)c(OCCOC(=O)C(=C)C)c2F)cc1] |

-continued
| Example | Structure |
|---|---|
| 42. | 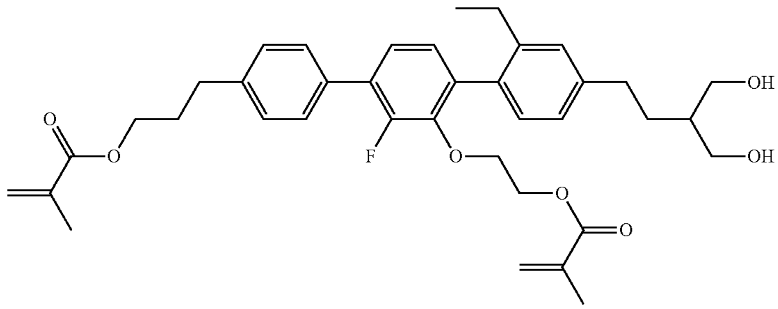 [SMILES: C=C(C)C(=O)OCCCc1ccc(-c2ccc(-c3ccc(CCC(CO)CO)cc3CC)c(OCCOC(=O)C(=C)C)c2F)cc1] |
| 43. | 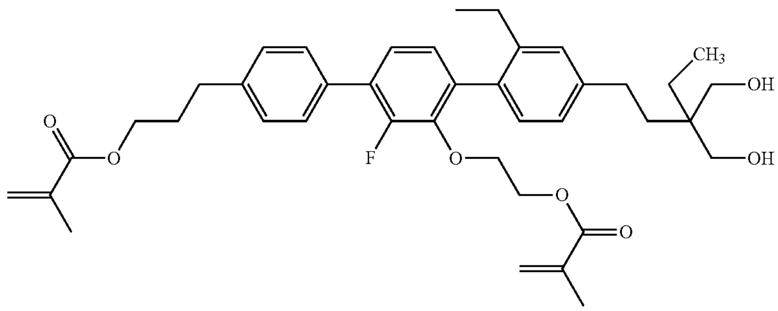 [SMILES: C=C(C)C(=O)OCCCc1ccc(-c2ccc(-c3ccc(CCC(CC)(CO)CO)cc3CC)c(OCCOC(=O)C(=C)C)c2F)cc1] |
| 44. | 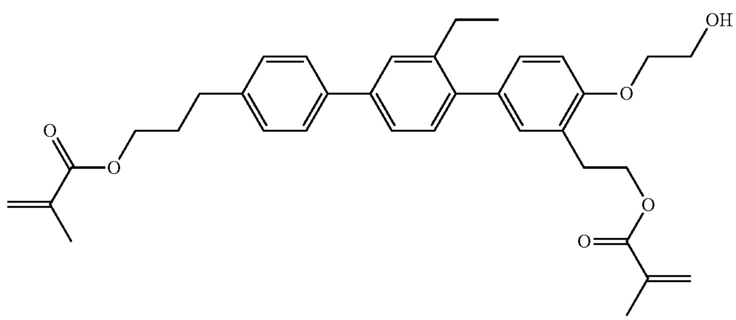 [SMILES: C=C(C)C(=O)OCCCc1ccc(-c2ccc(-c3ccc(OCCO)c(CCOC(=O)C(=C)C)c3)c(CC)c2)cc1] |
| 45. | 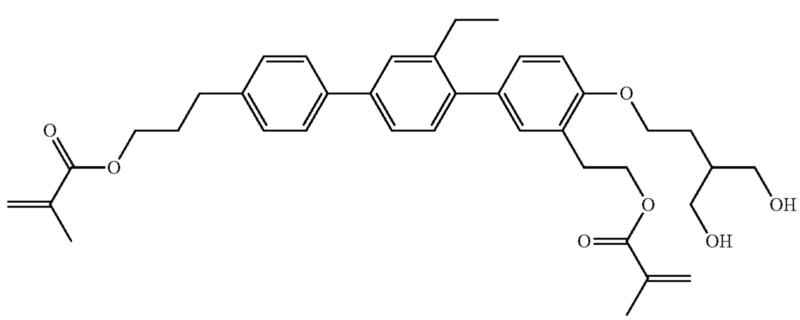 |
| 46. | 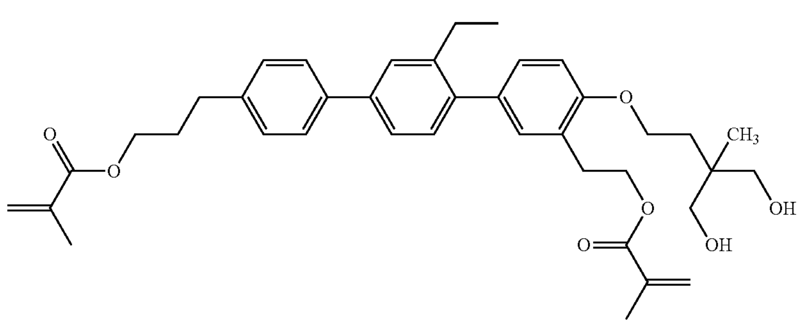 [SMILES: C=C(C)C(=O)OCCCc1ccc(-c2ccc(-c3ccc(OCCC(CO)CO)c(CCOC(=O)C(=C)C)c3)c(CC)c2)cc1] |

-continued
| Example | Structure |
|---|---|
| 47. | 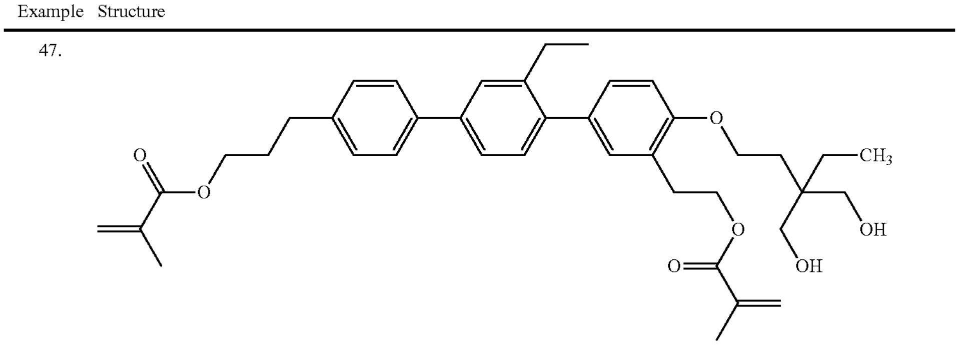 |
| 48. | 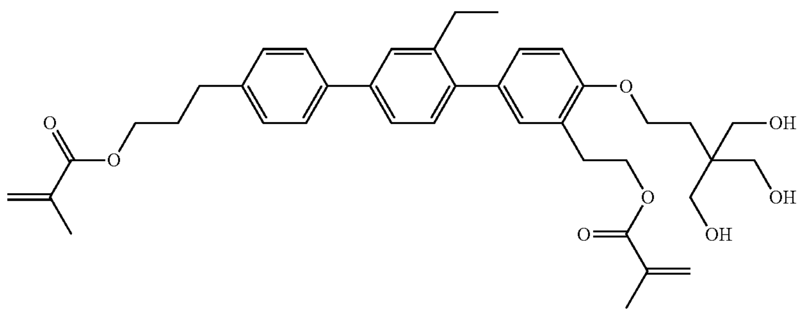 [SMILES: C=C(C)C(=O)OCCCc1ccc(-c2ccc(-c3ccc(OCCC(CO)(CO)CO)c(CCOC(=O)C(=C)C)c3)c(CC)c2)cc1] |
| 49. | 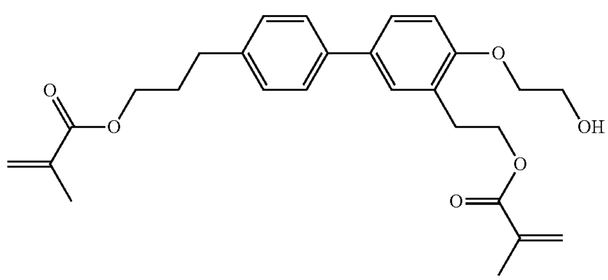 [SMILES: C=C(C)C(=O)OCCCc1ccc(-c2ccc(OCCO)c(CCOC(=O)C(=C)C)c2)cc1] |
| 50. | 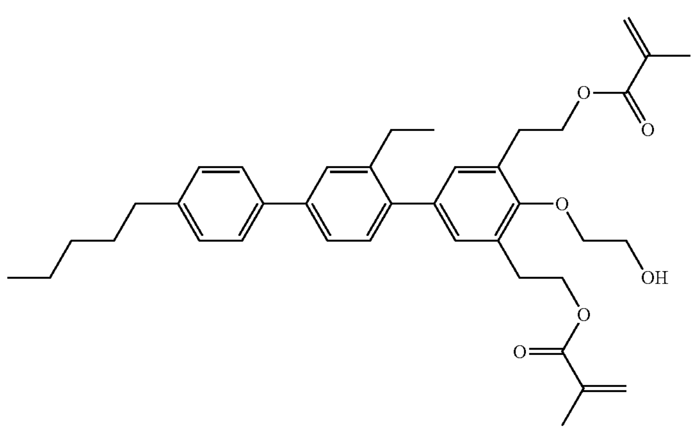 [SMILES: C=C(C)C(=O)OCCc1cc(-c2ccc(-c3ccc(CCCCC)cc3)cc2CC)cc(CCOC(=O)C(=C)C)c1OCCO] |

-continued
| Example | Structure |
|---|---|
| 51. | 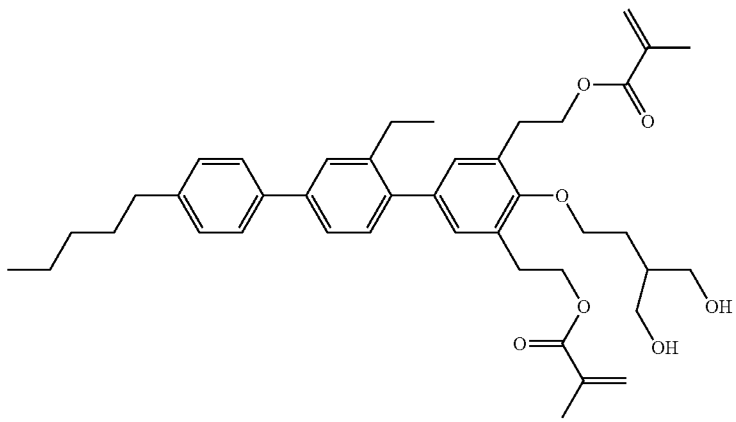 [SMILES: C=C(C)C(=O)OCCc1cc(-c2ccc(-c3ccc(CCCCC)cc3)cc2CC)cc(CCOC(=O)C(=C)C)c1OCCC(CO)CO] |
| 52. | 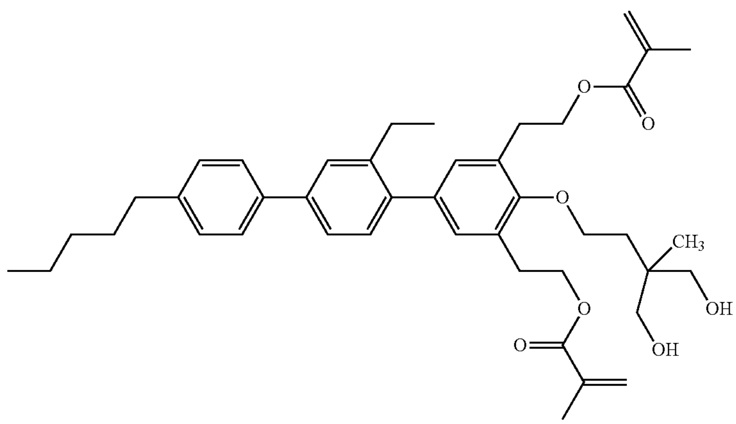 [SMILES: C=C(C)C(=O)OCCc1cc(-c2ccc(-c3ccc(CCCCC)cc3)cc2CC)cc(CCOC(=O)C(=C)C)c1OCCC(C)(CO)CO] |
| 53. | 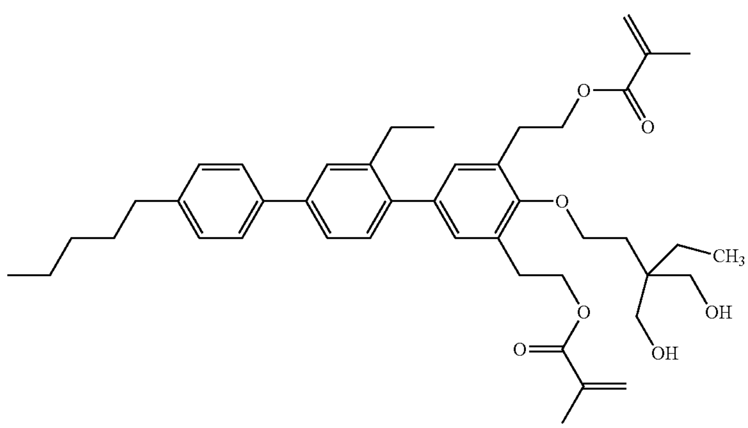 [SMILES: C=C(C)C(=O)OCCc1cc(-c2ccc(-c3ccc(CCCCC)cc3)cc2CC)cc(CCOC(=O)C(=C)C)c1OCCC(CC)(CO)CO] |
| 54. | 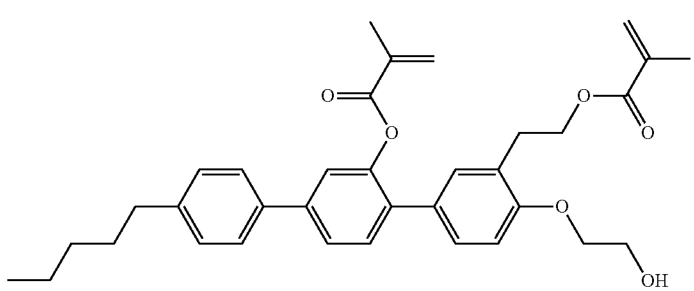 [SMILES: C=C(C)C(=O)OCCc1cc(-c2ccc(-c3ccc(CCCCC)cc3)cc2OC(=O)C(=C)C)ccc1OCCO] |

-continued
| Example | Structure |
|---|---|
| 55. | 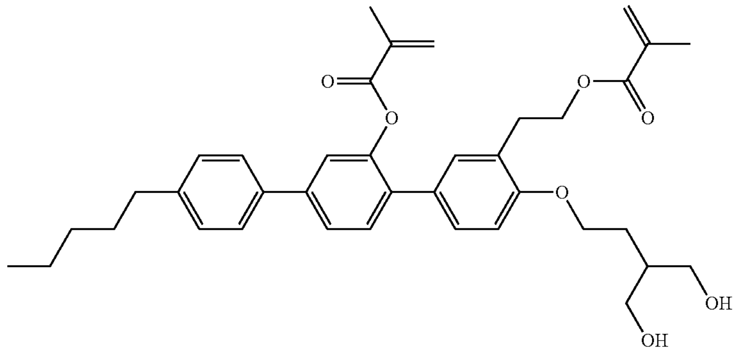 [SMILES: C=C(C)C(=O)OCCc1cc(-c2ccc(-c3ccc(CCCCC)cc3)cc2OC(=O)C(=C)C)ccc1OCCC(CO)CO] |
| 56. | 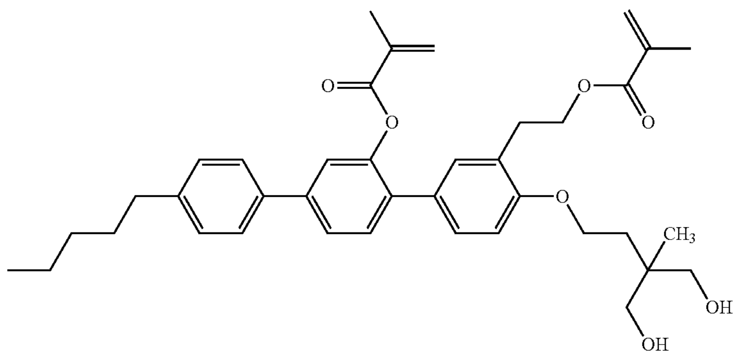 [SMILES: C=C(C)C(=O)OCCc1cc(-c2ccc(-c3ccc(CCCCC)cc3)cc2OC(=O)C(=C)C)ccc1OCCC(C)(CO)CO] |
| 57. | 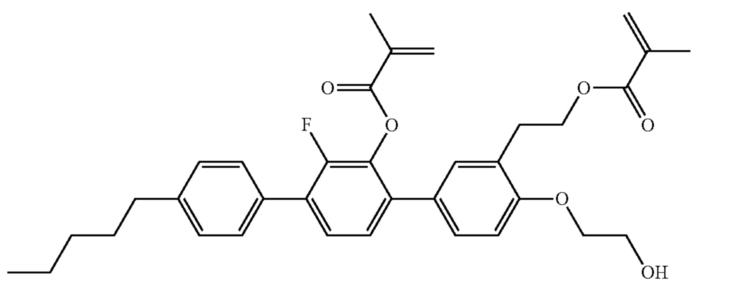 [SMILES: C=C(C)C(=O)OCCc1cc(-c2ccc(-c3ccc(CCCCC)cc3)c(F)c2OC(=O)C(=C)C)ccc1OCCO] |
| 58. | 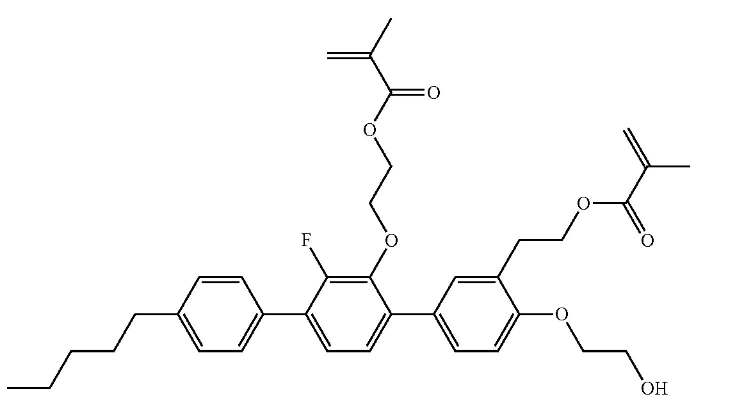 [SMILES: C=C(C)C(=O)OCCOc1c(-c2ccc(OCCO)c(CCOC(=O)C(=C)C)c2)ccc(-c2ccc(CCCCC)cc2)c1F] |

-continued
| Example | Structure |
|---|---|
| 59. | 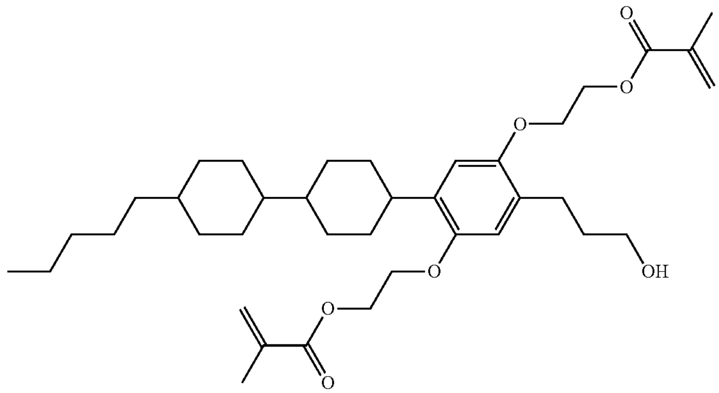 [SMILES: C=C(C)C(=O)OCCOc1cc(C2CCC(C3CCC(CCCCC)CC3)CC2)c(OCCOC(=O)C(=C)C)cc1CCCO] |
| 60. | 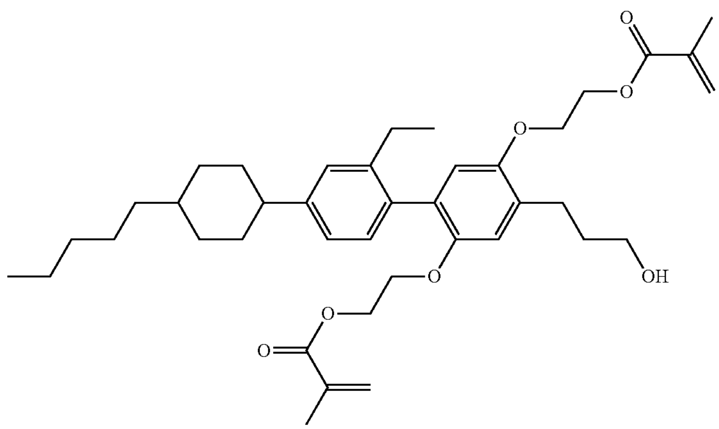 [SMILES: C=C(C)C(=O)OCCOc1cc(-c2ccc(C3CCC(CCCCC)CC3)cc2CC)c(OCCOC(=O)C(=C)C)cc1CCCO] |
| 61. | 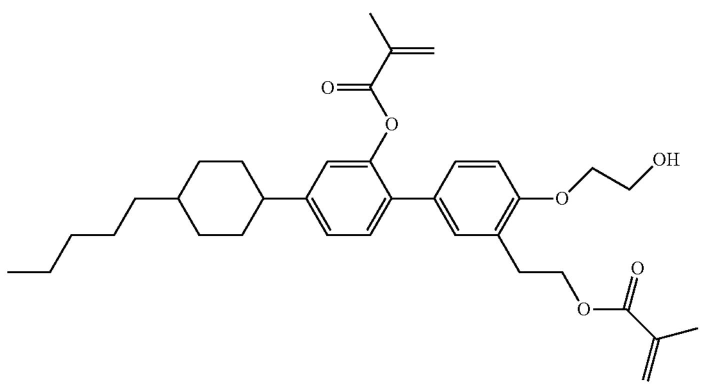 [SMILES: C=C(C)C(=O)OCCc1cc(-c2ccc(C3CCC(CCCCC)CC3)cc2OC(=O)C(=C)C)ccc1OCCO] |
| 62. | 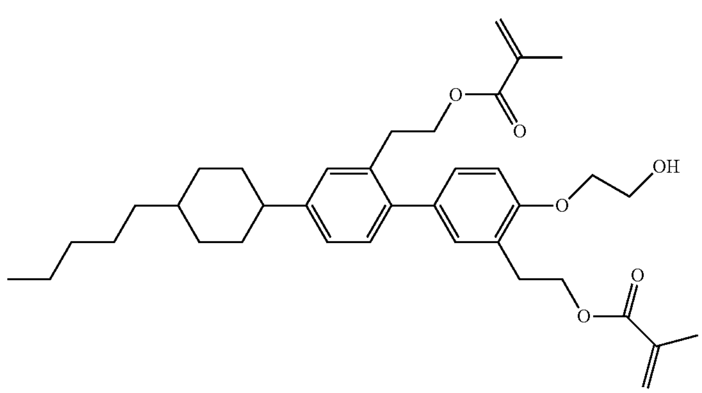 [SMILES: C=C(C)C(=O)OCCc1cc(-c2ccc(C3CCC(CCCCC)CC3)cc2CCOC(=O)C(=C)C)ccc1OCCO] |

-continued
| Example | Structure |
|---|---|
| 63. | 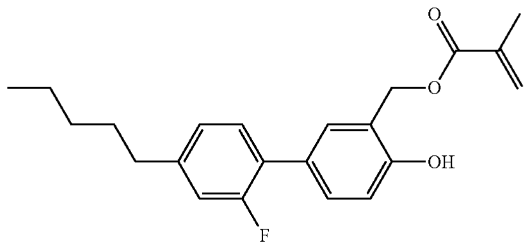 [SMILES: C=C(C)C(=O)OCc1cc(-c2ccc(CCCCC)cc2F)ccc1O] |
| 64. | 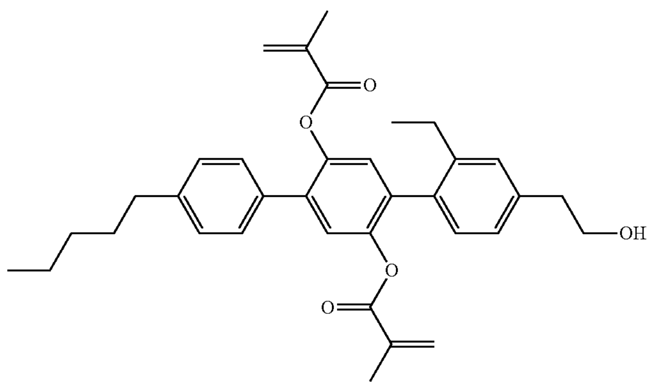 [SMILES: C=C(C)C(=O)Oc1cc(-c2ccc(CCO)cc2CC)c(OC(=O)C(=C)C)cc1-c1ccc(CCCCC)cc1] |
| 65. | 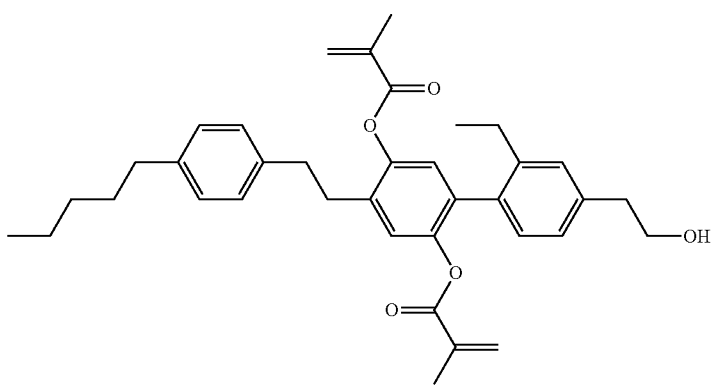 [SMILES: C=C(C)C(=O)Oc1cc(-c2ccc(CCO)cc2CC)c(OC(=O)C(=C)C)cc1CCc1ccc(CCCCC)cc1] |
| 66. | 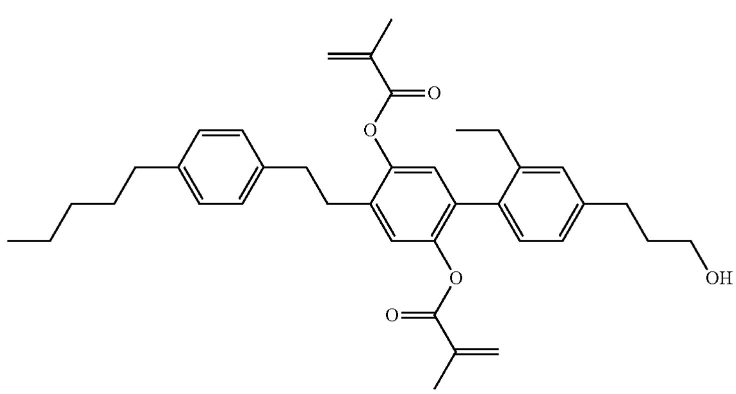 [SMILES: C=C(C)C(=O)Oc1cc(-c2ccc(CCCO)cc2CC)c(OC(=O)C(=C)C)cc1CCc1ccc(CCCCC)cc1] |

-continued
| Example | Structure |
|---|---|
| 67. | 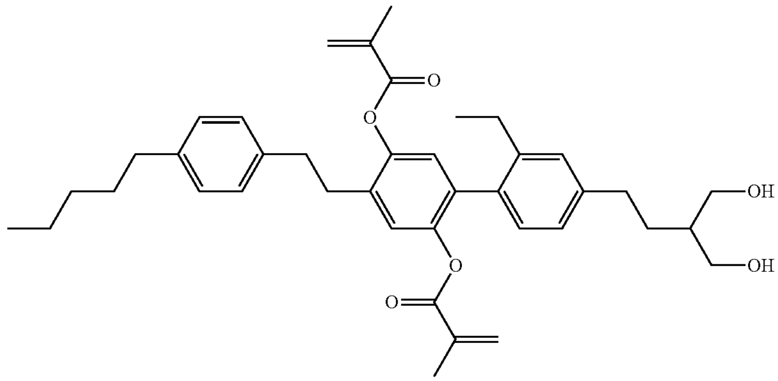 [SMILES: C=C(C)C(=O)Oc1cc(-c2ccc(CCC(CO)CO)cc2CC)c(OC(=O)C(=C)C)cc1CCc1ccc(CCCCC)cc1] |
| 68. | 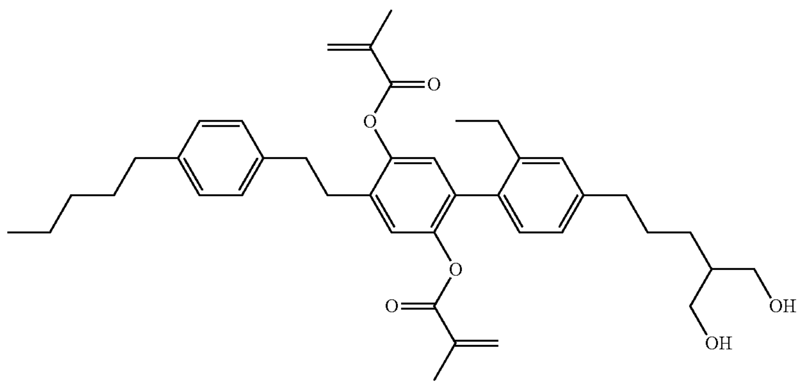 [SMILES: C=C(C)C(=O)Oc1cc(-c2ccc(CCCC(CO)CO)cc2CC)c(OC(=O)C(=C)C)cc1CCc1ccc(CCCCC)cc1] |
| 69. | 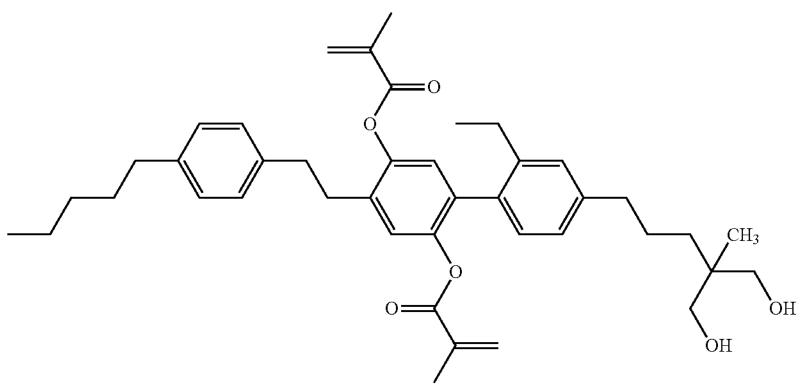 |
| 70. | 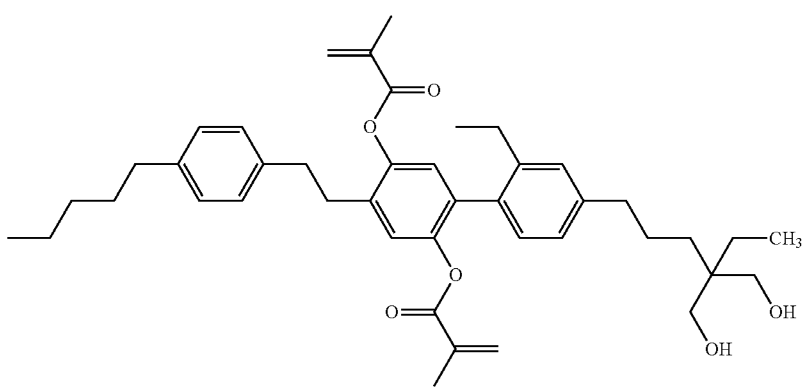 [SMILES: C=C(C)C(=O)Oc1cc(-c2ccc(CCCC(CC)(CO)CO)cc2CC)c(OC(=O)C(=C)C)cc1CCc1ccc(CCCCC)cc1] |

-continued
| Example | Structure |
| --- | --- |
| 71. | 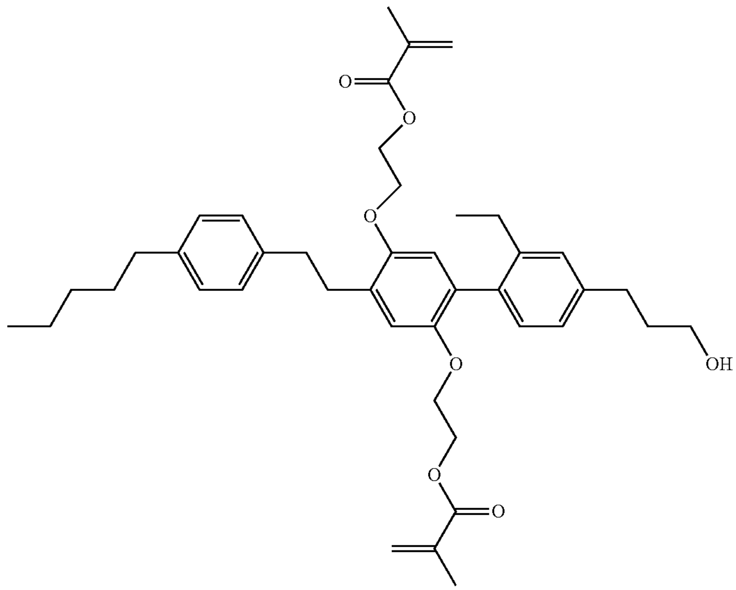 [SMILES: C=C(C)C(=O)OCCOc1cc(-c2ccc(CCCO)cc2CC)c(OCCOC(=O)C(=C)C)cc1CCc1ccc(CCCCC)cc1] |
| 72. | 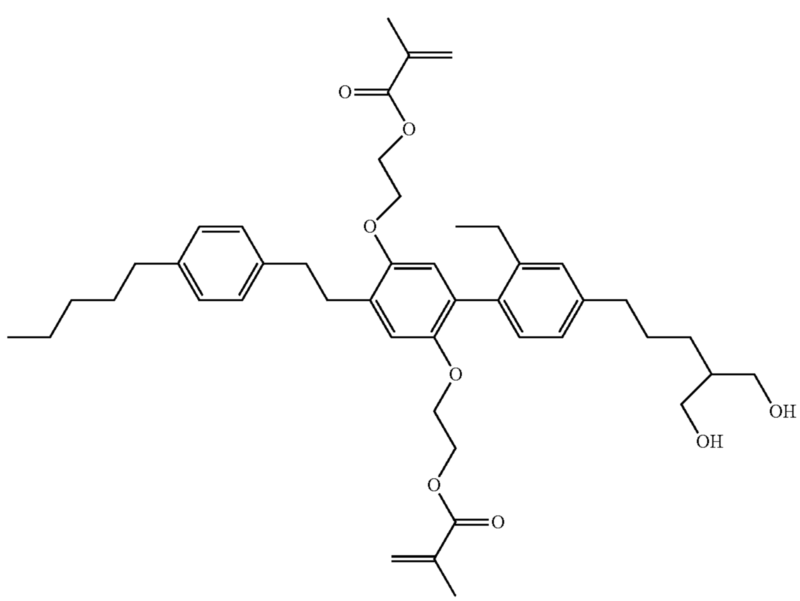 [SMILES: C=C(C)C(=O)OCCOc1cc(-c2ccc(CCCC(CO)CO)cc2CC)c(OCCOC(=O)C(=C)C)cc1CCc1ccc(CCCCC)cc1] |

-continued
| Example | Structure |
|---|---|
| 73. | 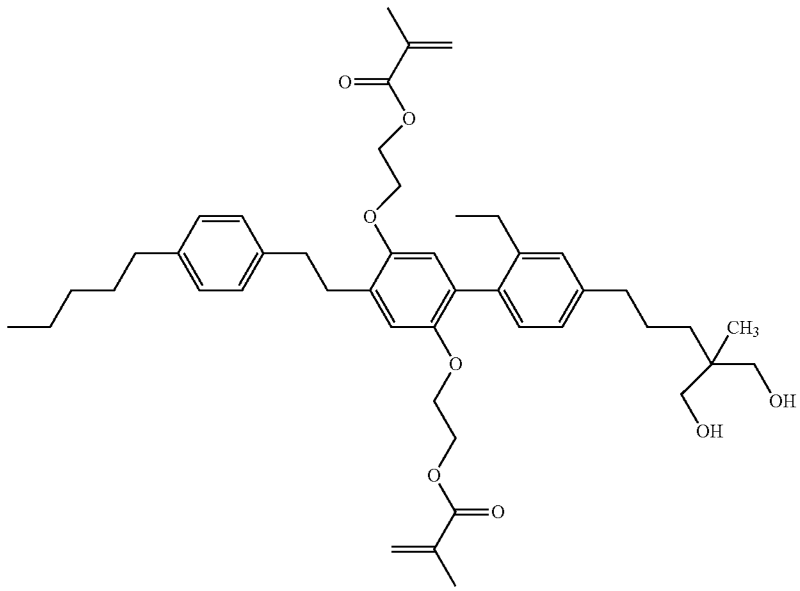 [SMILES: C=C(C)C(=O)OCCOc1cc(-c2ccc(CCCC(C)(CO)CO)cc2CC)c(OCCOC(=O)C(=C)C)cc1CCc1ccc(CCCCC)cc1] |
| 74. | 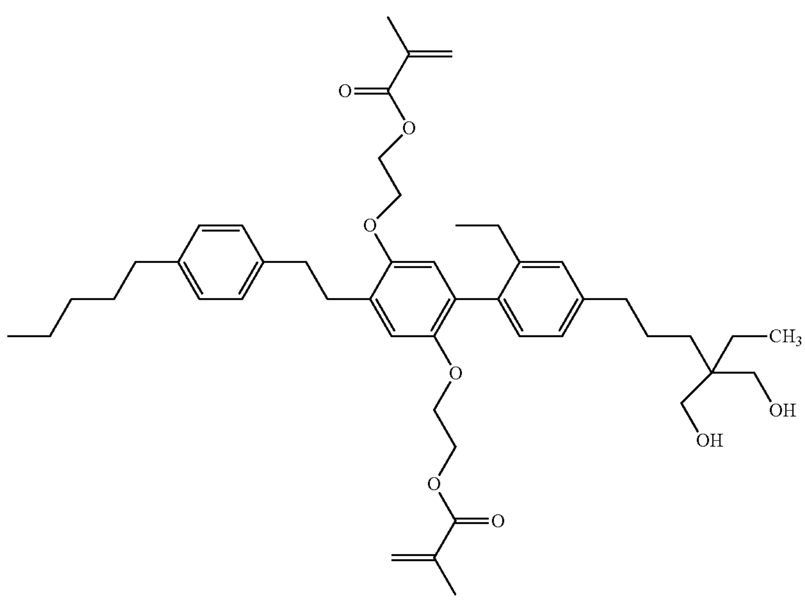 [SMILES: C=C(C)C(=O)OCCOc1cc(-c2ccc(CCCC(CC)(CO)CO)cc2CC)c(OCCOC(=O)C(=C)C)cc1CCc1ccc(CCCCC)cc1] |

-continued
| Example | Structure |
|---|---|
| 75. | 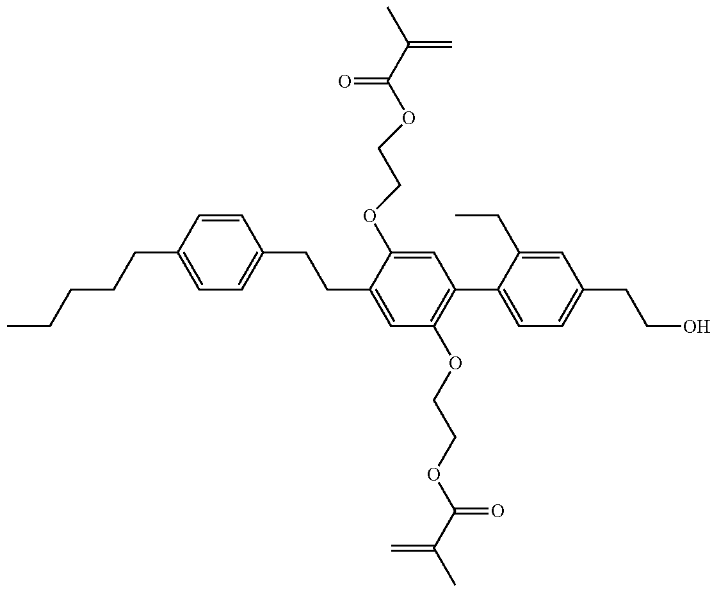 [SMILES: C=C(C)C(=O)OCCOc1cc(-c2ccc(CCO)cc2CC)c(OCCOC(=O)C(=C)C)cc1CCc1ccc(CCCCC)cc1] |
| 76. | 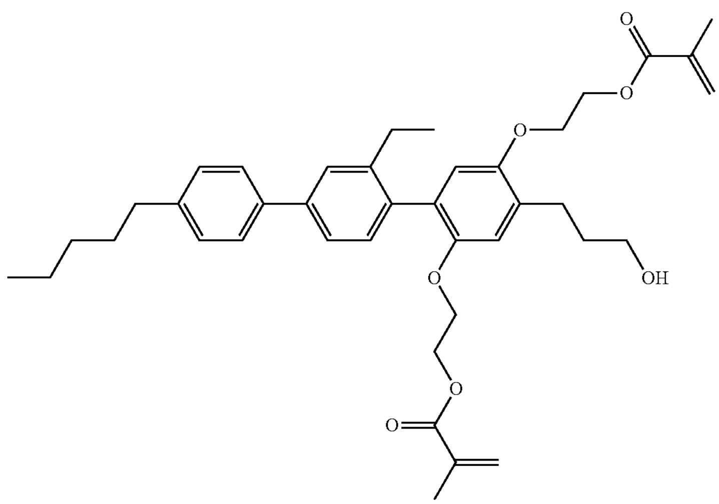 [SMILES: C=C(C)C(=O)OCCOc1cc(-c2ccc(-c3ccc(CCCCC)cc3)cc2CC)c(OCCOC(=O)C(=C)C)cc1CCCO] |
| 77. | 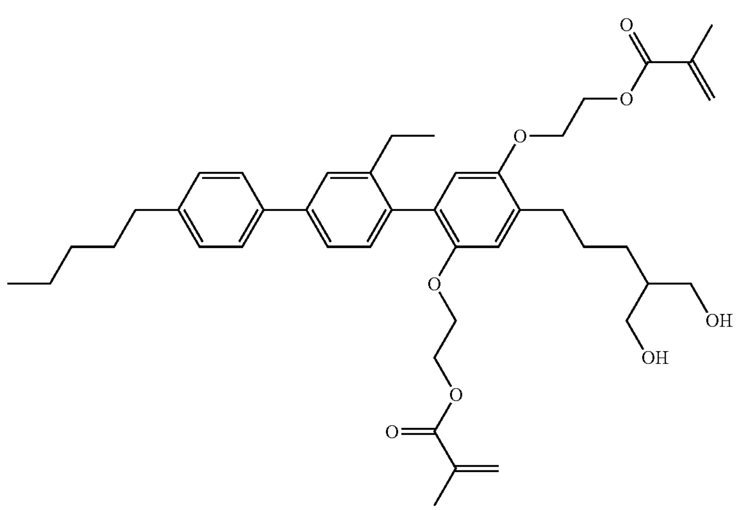 [SMILES: C=C(C)C(=O)OCCOc1cc(-c2ccc(-c3ccc(CCCCC)cc3)cc2CC)c(OCCOC(=O)C(=C)C)cc1CCCC(CO)CO] |

-continued
| Example | Structure |
| --- | --- |
| 78. | 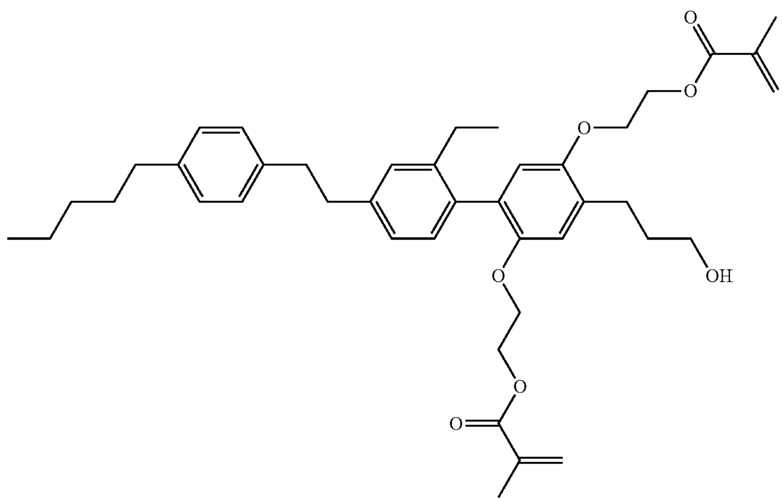 [SMILES: C=C(C)C(=O)OCCOc1cc(-c2ccc(CCc3ccc(CCCCC)cc3)cc2CC)c(OCCOC(=O)C(=C)C)cc1CCCO] |
| 79. | 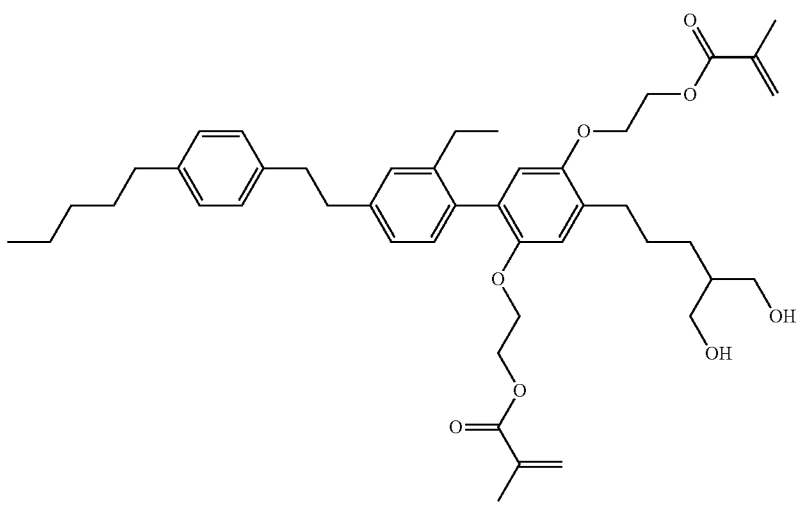 [SMILES: C=C(C)C(=O)OCCOc1cc(-c2ccc(CCc3ccc(CCCCC)cc3)cc2CC)c(OCCOC(=O)C(=C)C)cc1CCCC(CO)CO] |
| 80. | 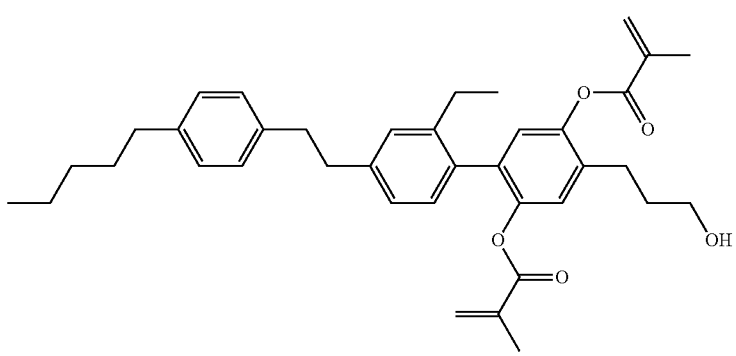 [SMILES: C=C(C)C(=O)Oc1cc(-c2ccc(CCc3ccc(CCCCC)cc3)cc2CC)c(OC(=O)C(=C)C)cc1CCCO] |

-continued
| Example | Structure |
| --- | --- |
| 81. | 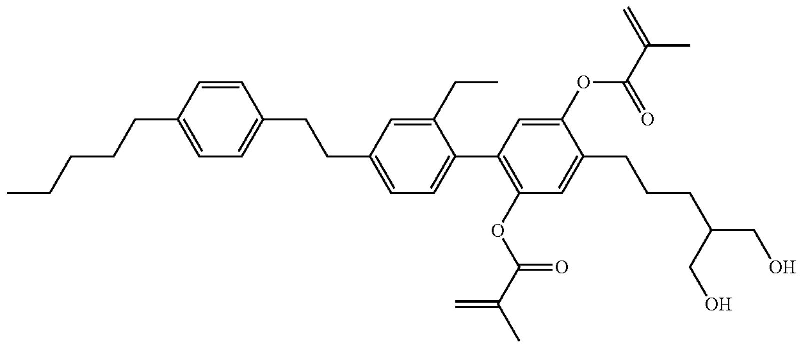 [SMILES: C=C(C)C(=O)Oc1cc(-c2ccc(CCc3ccc(CCCCC)cc3)cc2CC)c(OC(=O)C(=C)C)cc1CCCC(CO)CO] |
| 82. | 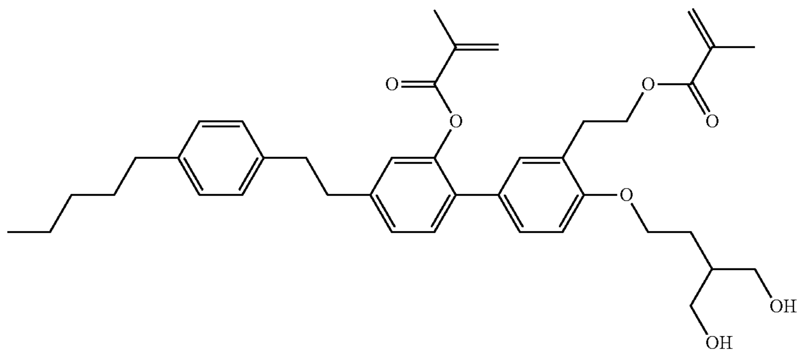 [SMILES: C=C(C)C(=O)OCCc1cc(-c2ccc(CCc3ccc(CCCCC)cc3)cc2OC(=O)C(=C)C)ccc1OCCC(CO)CO] |
| 83. | 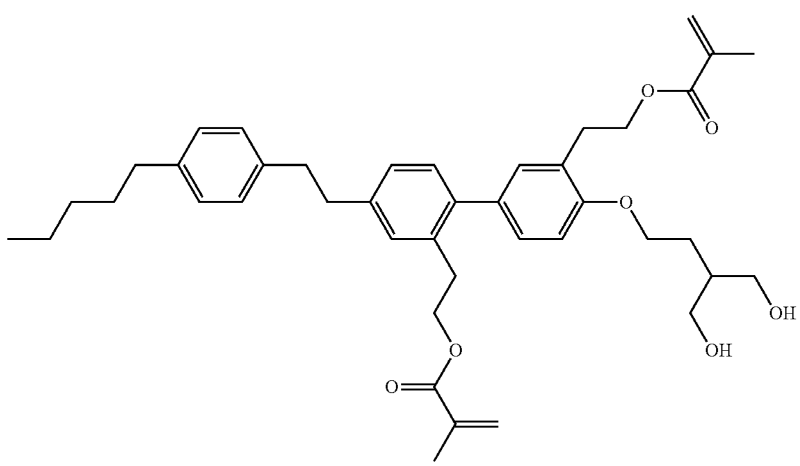 [SMILES: C=C(C)C(=O)OCCc1cc(-c2ccc(CCc3ccc(CCCCC)cc3)cc2CCOC(=O)C(=C)C)ccc1OCCC(CO)CO] |
| 84. | 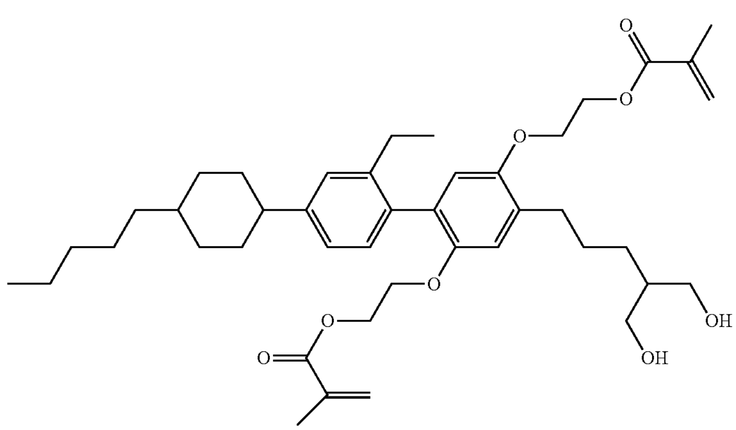 [SMILES: C=C(C)C(=O)OCCOc1cc(-c2ccc(C3CCC(CCCCC)CC3)cc2CC)c(OCCOC(=O)C(=C)C)cc1CCCC(CO)CO] |

-continued
| Example | Structure |
|---|---|
| 85. | 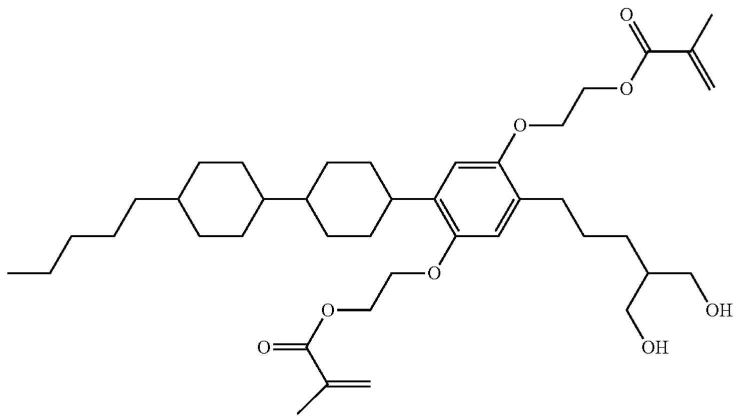 [SMILES: C=C(C)C(=O)OCCOc1cc(C2CCC(C3CCC(CCCCC)CC3)CC2)c(OCCOC(=O)C(=C)C)cc1CCCC(CO)CO] |
| 86. | 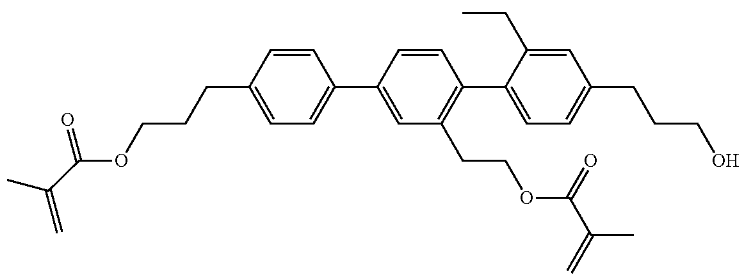 [SMILES: C=C(C)C(=O)OCCCc1ccc(-c2ccc(-c3ccc(CCCO)cc3CC)c(CCOC(=O)C(=C)C)c2)cc1] |
| 87. | 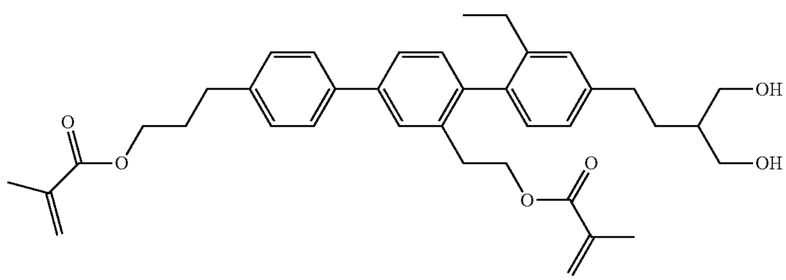 [SMILES: C=C(C)C(=O)OCCCc1ccc(-c2ccc(-c3ccc(CCC(CO)CO)cc3CC)c(CCOC(=O)C(=C)C)c2)cc1] |
| 88. | 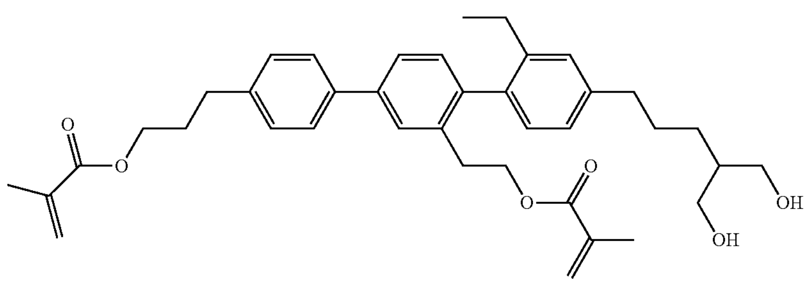 [SMILES: C=C(C)C(=O)OCCCc1ccc(-c2ccc(-c3ccc(CCCC(CO)CO)cc3CC)c(CCOC(=O)C(=C)C)c2)cc1] |
| 89. | 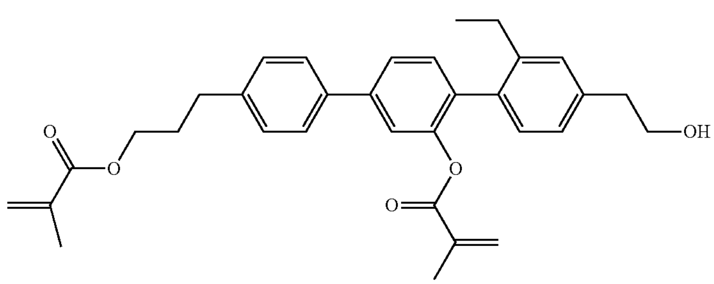 [SMILES: C=C(C)C(=O)OCCCc1ccc(-c2ccc(-c3ccc(CCO)cc3CC)c(OC(=O)C(=C)C)c2)cc1] |

-continued
| Example | Structure |
|---|---|
| 90. | 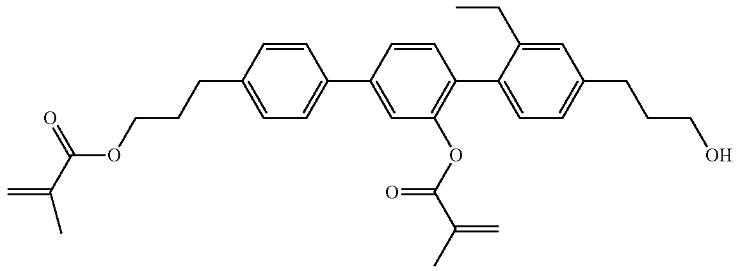 [SMILES: C=C(C)C(=O)OCCCc1ccc(-c2ccc(-c3ccc(CCCO)cc3CC)c(OC(=O)C(=C)C)c2)cc1] |
| 91. | 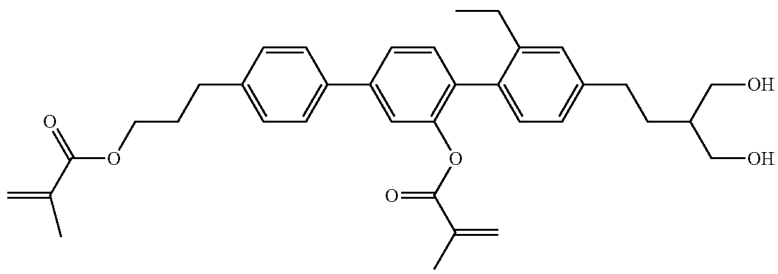 [SMILES: C=C(C)C(=O)OCCCc1ccc(-c2ccc(-c3ccc(CCC(CO)CO)cc3CC)c(OC(=O)C(=C)C)c2)cc1] |
| 92. | 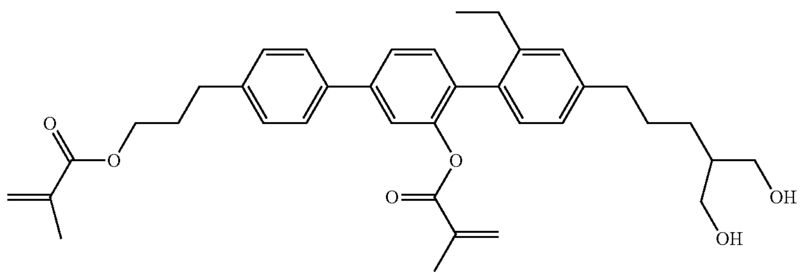 [SMILES: C=C(C)C(=O)OCCCc1ccc(-c2ccc(-c3ccc(CCCC(CO)CO)cc3CC)c(OC(=O)C(=C)C)c2)cc1] |
| 93. | 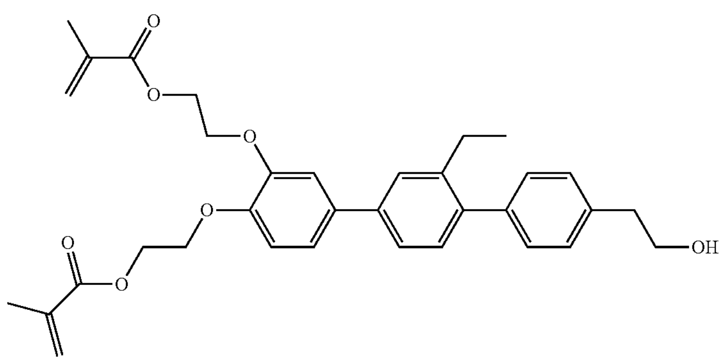 [SMILES: C=C(C)C(=O)OCCOc1ccc(-c2ccc(-c3ccc(CCO)cc3)c(CC)c2)cc1OCCOC(=O)C(=C)C] |
| 94. | 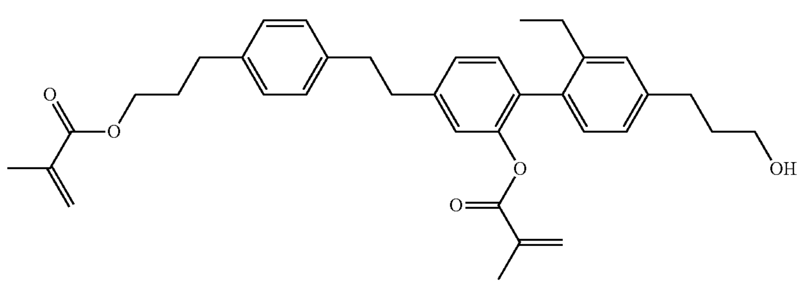 [SMILES: C=C(C)C(=O)OCCCc1ccc(CCc2ccc(-c3ccc(CCCO)cc3CC)c(OC(=O)C(=C)C)c2)cc1] |

-continued
| Example | Structure |
| --- | --- |
| 95. | 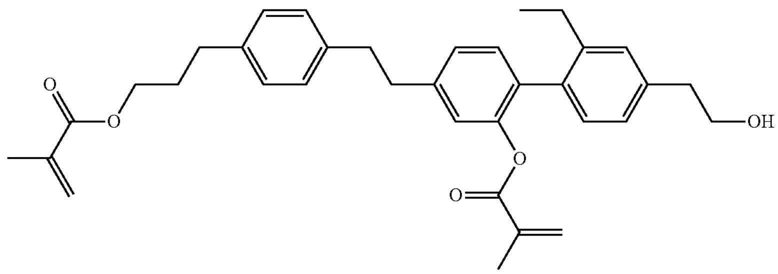 [SMILES: C=C(C)C(=O)OCCCc1ccc(CCc2ccc(-c3ccc(CCO)cc3CC)c(OC(=O)C(=C)C)c2)cc1] |
| 96. | 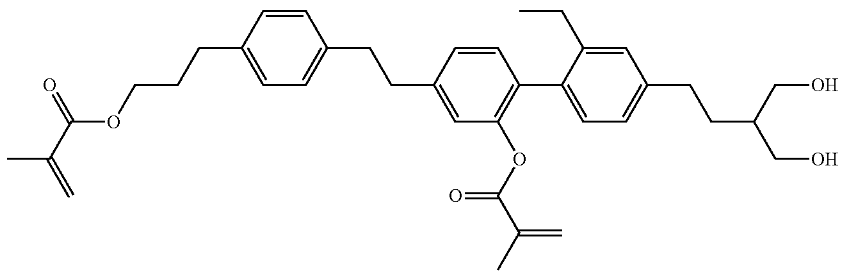 [SMILES: C=C(C)C(=O)OCCCc1ccc(CCc2ccc(-c3ccc(CCC(CO)CO)cc3CC)c(OC(=O)C(=C)C)c2)cc1] |
| 97. | 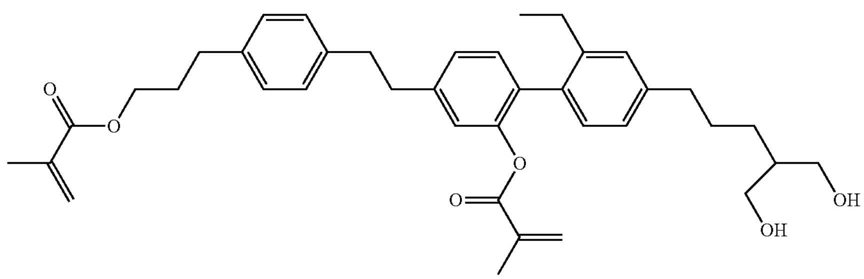 [SMILES: C=C(C)C(=O)OCCCc1ccc(CCc2ccc(-c3ccc(CCCC(CO)CO)cc3CC)c(OC(=O)C(=C)C)c2)cc1] |
| 98. | 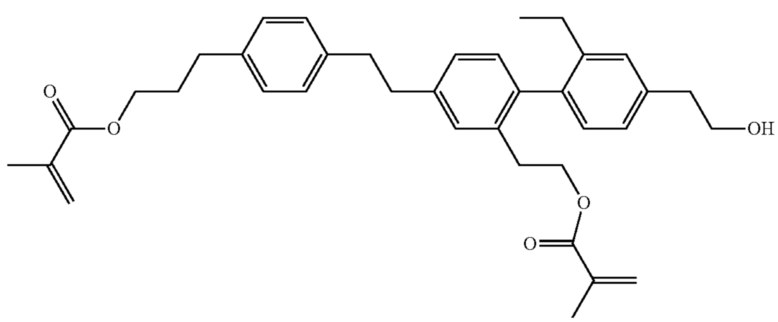 [SMILES: C=C(C)C(=O)OCCCc1ccc(CCc2ccc(-c3ccc(CCO)cc3CC)c(CCOC(=O)C(=C)C)c2)cc1] |
| 99. | 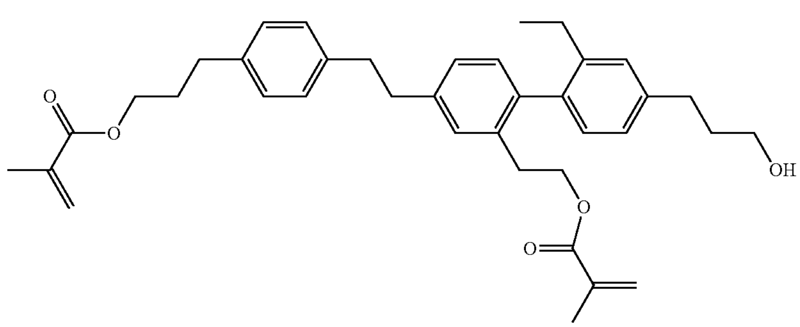 [SMILES: C=C(C)C(=O)OCCCc1ccc(CCc2ccc(-c3ccc(CCCO)cc3CC)c(CCOC(=O)C(=C)C)c2)cc1] |

-continued
| Example | Structure |
|---|---|
| 100. | 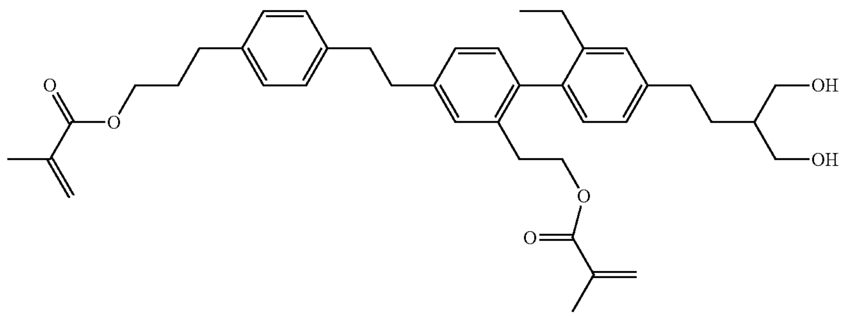 [SMILES: C=C(C)C(=O)OCCCc1ccc(CCc2ccc(-c3ccc(CCC(CO)CO)cc3CC)c(CCOC(=O)C(=C)C)c2)cc1] |
| 101. | 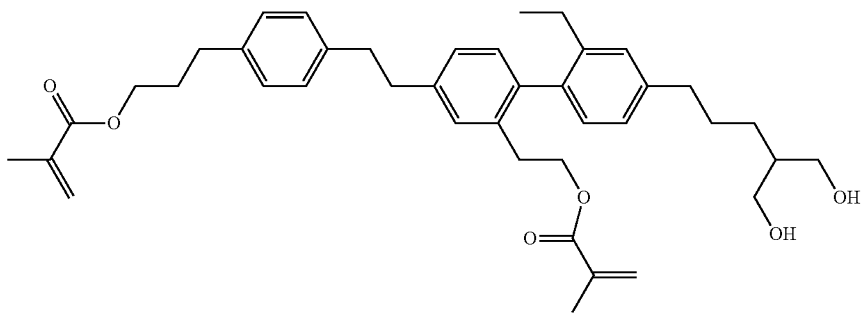 [SMILES: C=C(C)C(=O)OCCCc1ccc(CCc2ccc(-c3ccc(CCCC(CO)CO)cc3CC)c(CCOC(=O)C(=C)C)c2)cc1] |
| 102. | 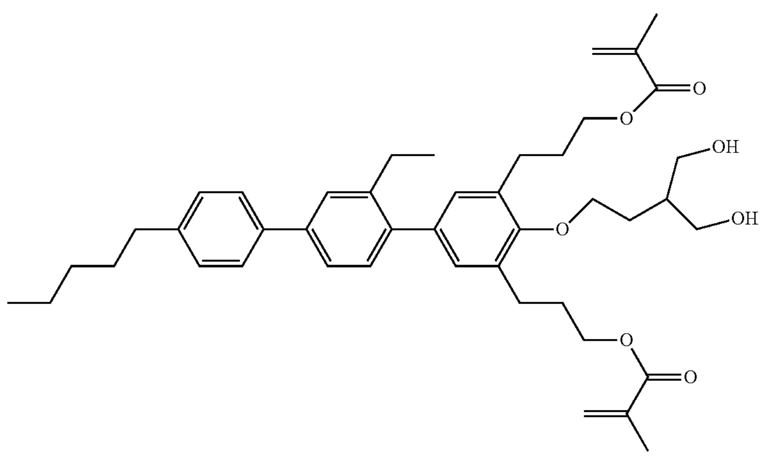 [SMILES: C=C(C)C(=O)OCCCc1cc(-c2ccc(-c3ccc(CCCCC)cc3)cc2CC)cc(CCCOC(=O)C(=C)C)c1OCCC(CO)CO] |
| 103. | 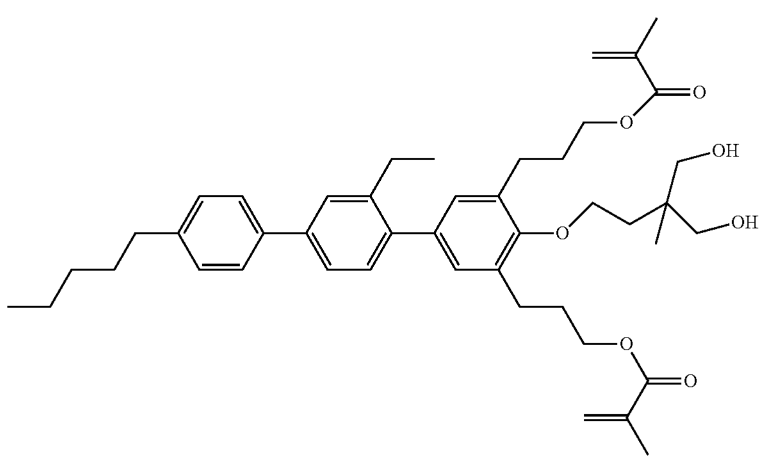 |

-continued
| Example | Structure |
|---|---|
| 104. | 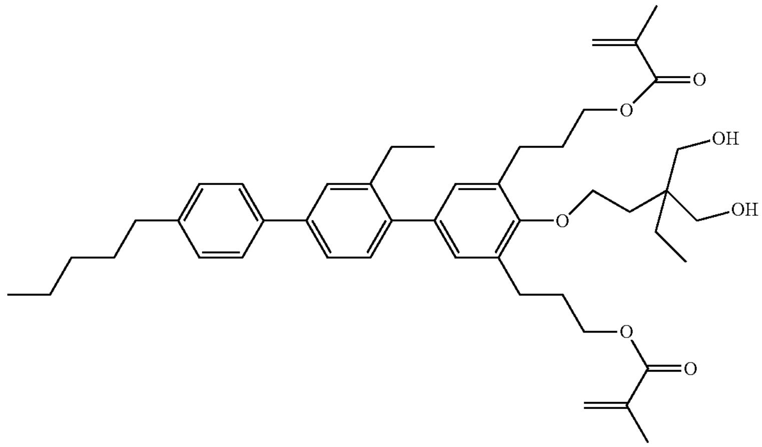 [SMILES: C=C(C)C(=O)OCCCc1cc(-c2ccc(-c3ccc(CCCCC)cc3)cc2CC)cc(CCCOC(=O)C(=C)C)c1OCCC(CC)(CO)CO] |
| 105. | 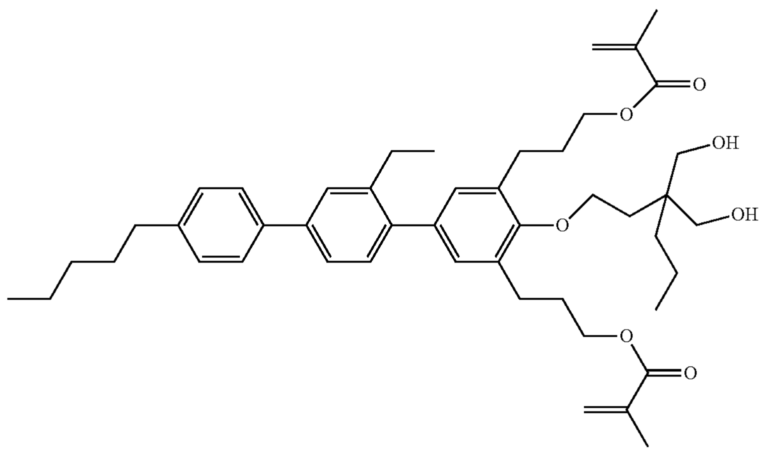 [SMILES: C=C(C)C(=O)OCCCc1cc(-c2ccc(-c3ccc(CCCCC)cc3)cc2CC)cc(CCCOC(=O)C(=C)C)c1OCCC(CO)(CO)CCC] |
| 106. | 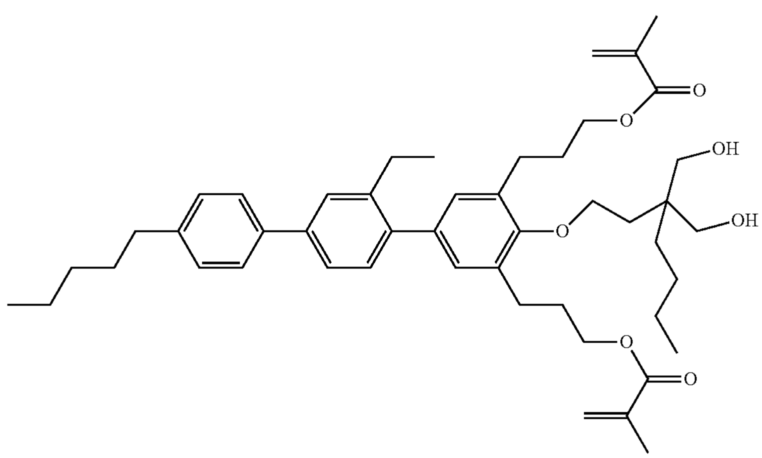 [SMILES: C=C(C)C(=O)OCCCc1cc(-c2ccc(-c3ccc(CCCCC)cc3)cc2CC)cc(CCCOC(=O)C(=C)C)c1OCCC(CO)(CO)CCCC] |

-continued
| Example | Structure |
|---|---|
| 107. | 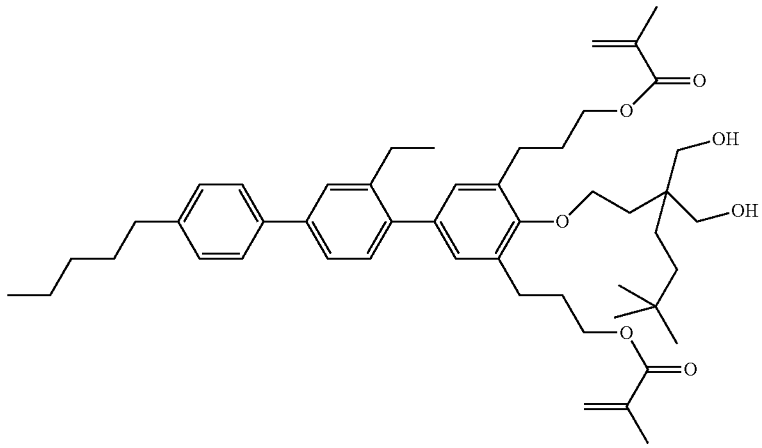 [SMILES: C=C(C)C(=O)OCCCc1cc(-c2ccc(-c3ccc(CCCCC)cc3)cc2CC)cc(CCCOC(=O)C(=C)C)c1OCCC(CO)(CO)CCC(C)(C)C] |
| 108. | 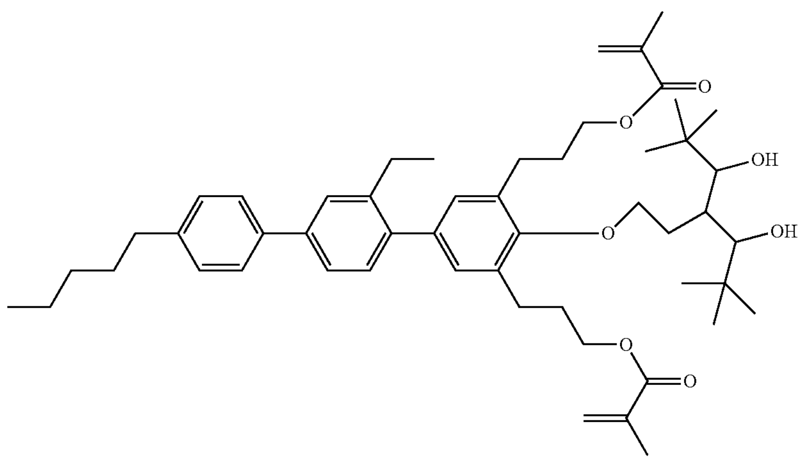 [SMILES: C=C(C)C(=O)OCCCc1cc(-c2ccc(-c3ccc(CCCCC)cc3)cc2CC)cc(CCCOC(=O)C(=C)C)c1OCCC(C(O)C(C)(C)C)C(O)C(C)(C)C] |
| 109. | 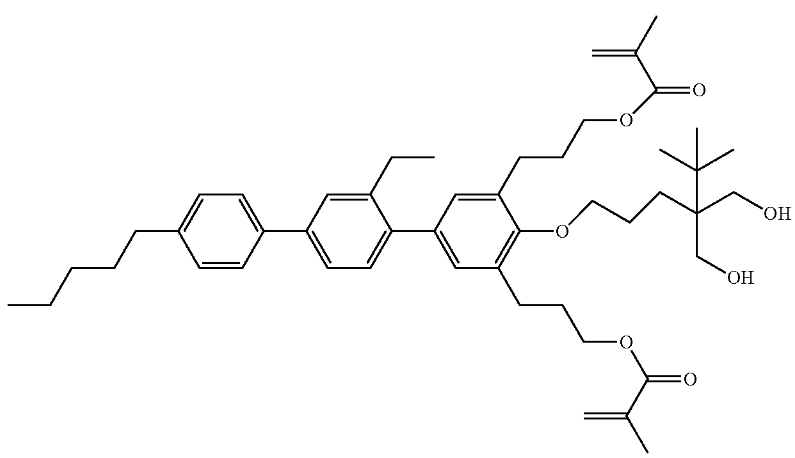 [SMILES: C=C(C)C(=O)OCCCc1cc(-c2ccc(-c3ccc(CCCCC)cc3)cc2CC)cc(CCCOC(=O)C(=C)C)c1OCCCC(CO)(CO)C(C)(C)C] |

-continued
| Example | Structure |
|---|---|
| 110. | 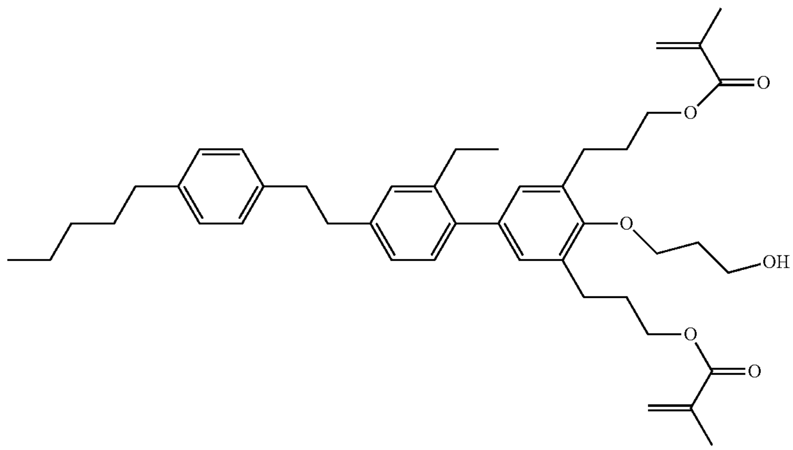 [SMILES: C=C(C)C(=O)OCCCc1cc(-c2ccc(CCc3ccc(CCCCC)cc3)cc2CC)cc(CCCOC(=O)C(=C)C)c1OCCCO] |
| 111. | 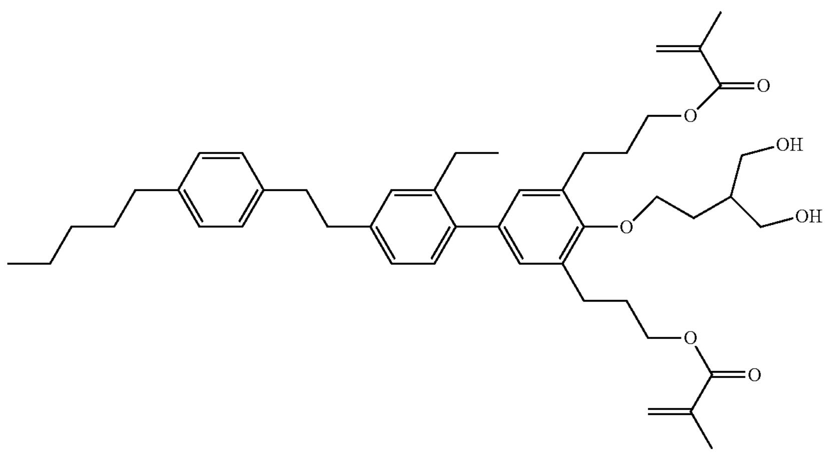 |
| 112. | 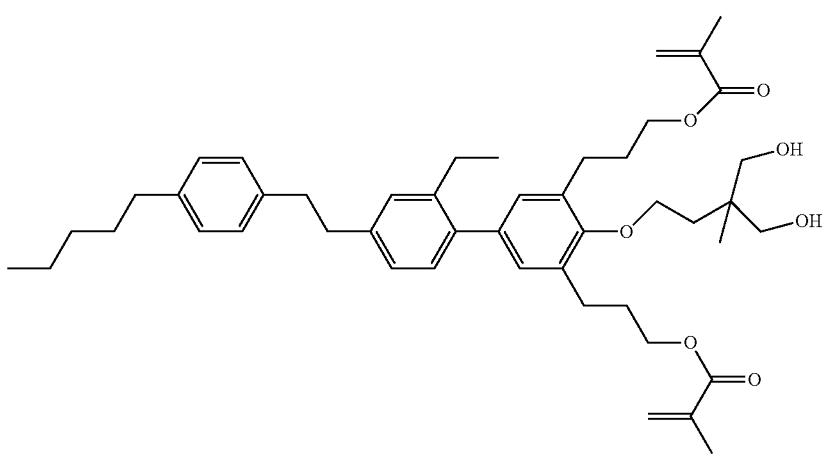 |

-continued
| Example | Structure |
|---|---|
| 113. | 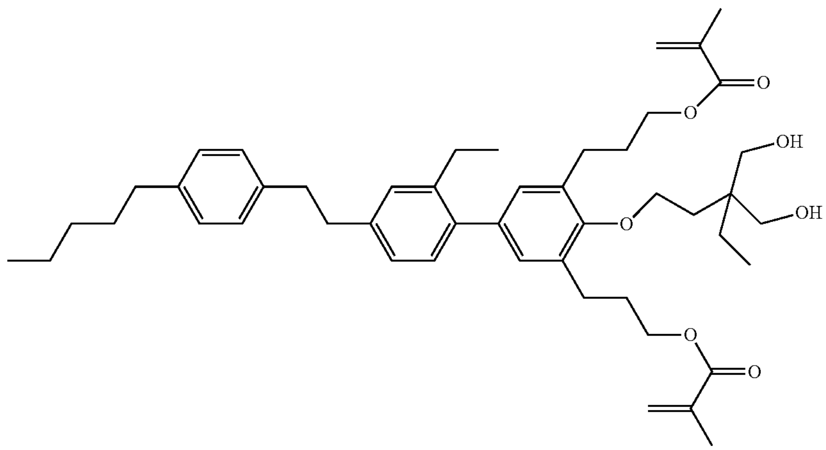 [SMILES: C=C(C)C(=O)OCCCc1cc(-c2ccc(CCc3ccc(CCCCC)cc3)cc2CC)cc(CCCOC(=O)C(=C)C)c1OCCC(CC)(CO)CO] |
| 114. | 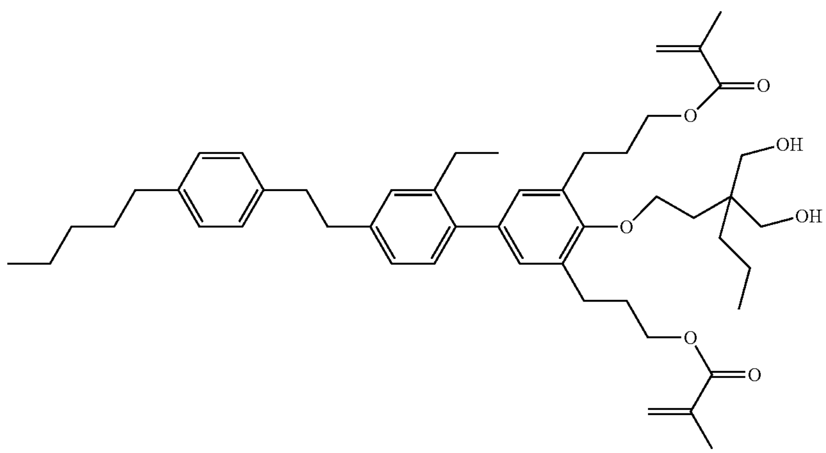 [SMILES: C=C(C)C(=O)OCCCc1cc(-c2ccc(CCc3ccc(CCCCC)cc3)cc2CC)cc(CCCOC(=O)C(=C)C)c1OCCC(CO)(CO)CCC] |
| 115. | 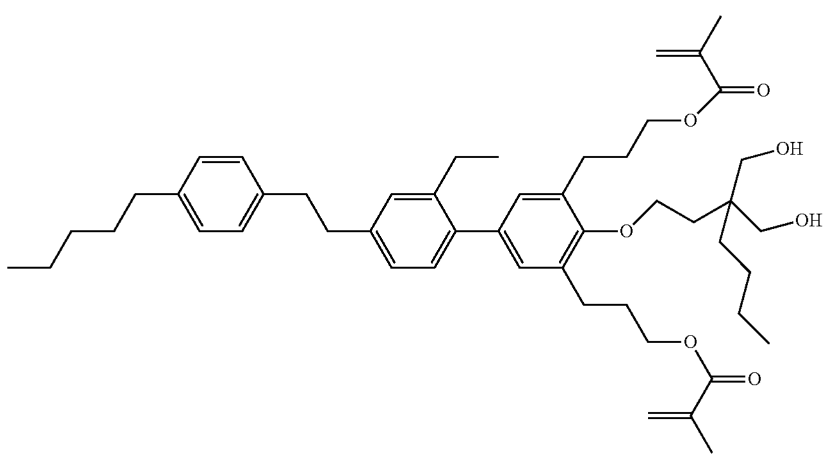 [SMILES: C=C(C)C(=O)OCCCc1cc(-c2ccc(CCc3ccc(CCCCC)cc3)cc2CC)cc(CCCOC(=O)C(=C)C)c1OCCC(CO)(CO)CCCC] |

-continued
| Example | Structure |
|---|---|
| 116. | 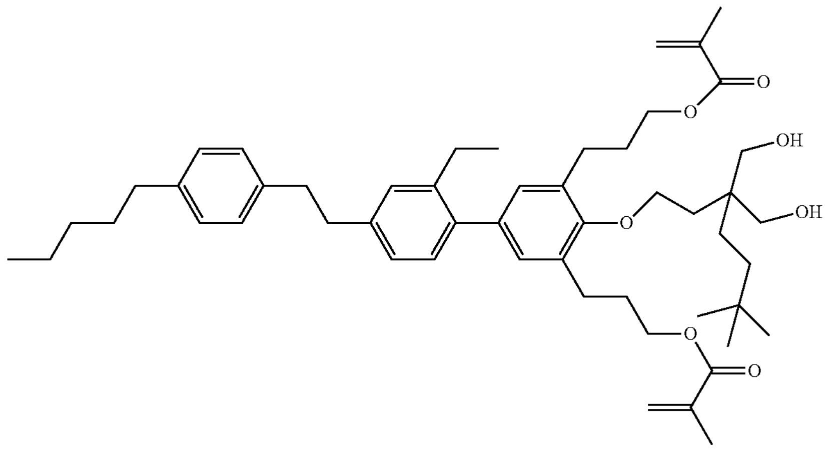 [SMILES: C=C(C)C(=O)OCCCc1cc(-c2ccc(CCc3ccc(CCCCC)cc3)cc2CC)cc(CCCOC(=O)C(=C)C)c1OCCC(CO)(CO)CCC(C)(C)C] |
| 117. | 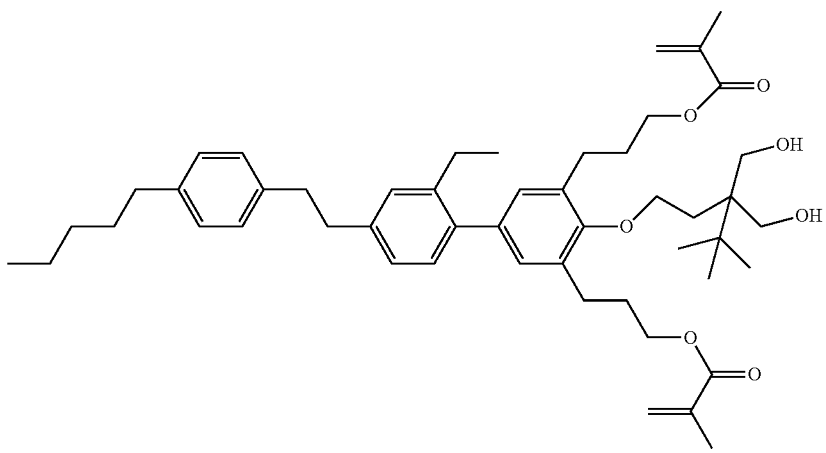 [SMILES: C=C(C)C(=O)OCCCc1cc(-c2ccc(CCc3ccc(CCCCC)cc3)cc2CC)cc(CCCOC(=O)C(=C)C)c1OCCC(CO)(CO)C(C)(C)C] |
| 118. | 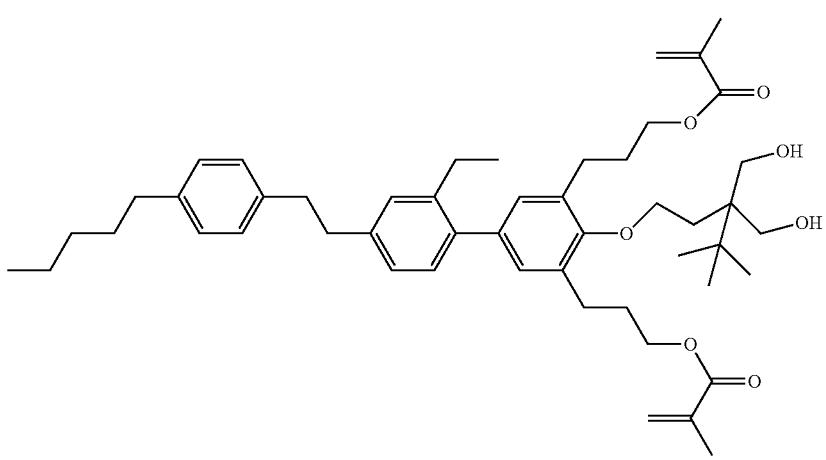 [SMILES: C=C(C)C(=O)OCCCc1cc(-c2ccc(CCc3ccc(CCCCC)cc3)cc2CC)cc(CCCOC(=O)C(=C)C)c1OCCC(CO)(CO)C(C)(C)C] |

-continued
| Example | Structure |
|---|---|
| 119. | 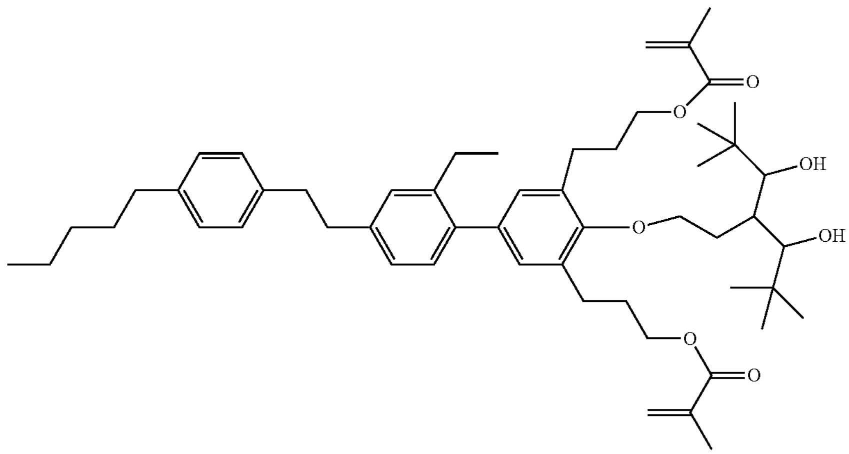 [SMILES: C=C(C)C(=O)OCCCc1cc(-c2ccc(CCc3ccc(CCCCC)cc3)cc2CC)cc(CCCOC(=O)C(=C)C)c1OCCC(C(O)C(C)(C)C)C(O)C(C)(C)C] |
| 120. | 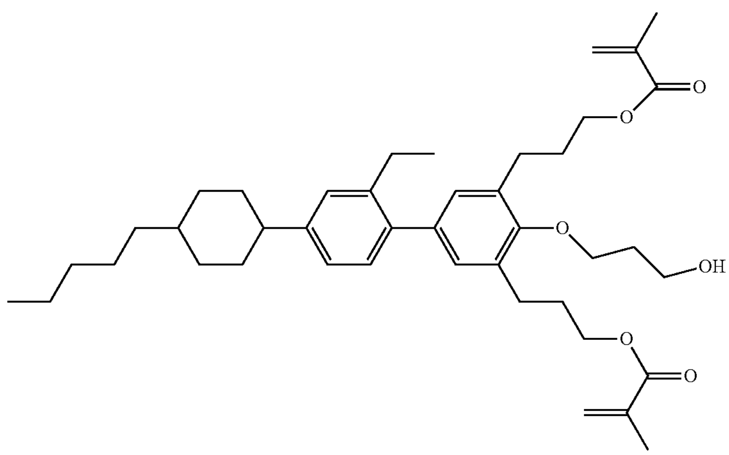 [SMILES: C=C(C)C(=O)OCCCc1cc(-c2ccc(C3CCC(CCCCC)CC3)cc2CC)cc(CCCOC(=O)C(=C)C)c1OCCCO] |
| 121. | 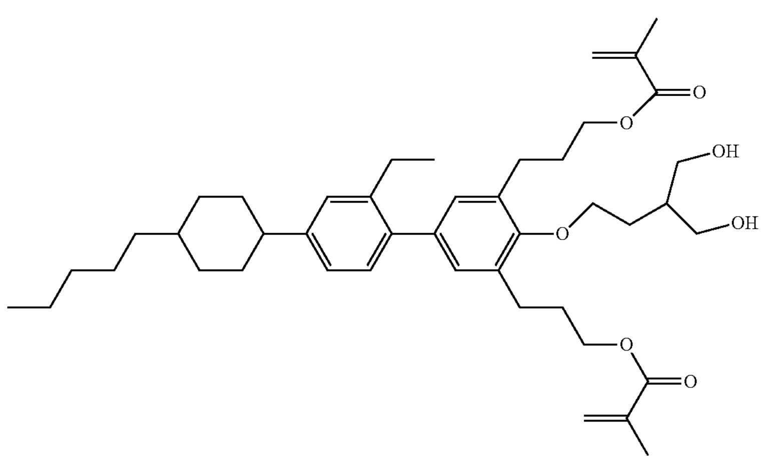 [SMILES: C=C(C)C(=O)OCCCc1cc(-c2ccc(C3CCC(CCCCC)CC3)cc2CC)cc(CCCOC(=O)C(=C)C)c1OCCC(CO)CO] |

-continued
| Example | Structure |
|---|---|
| 122. | 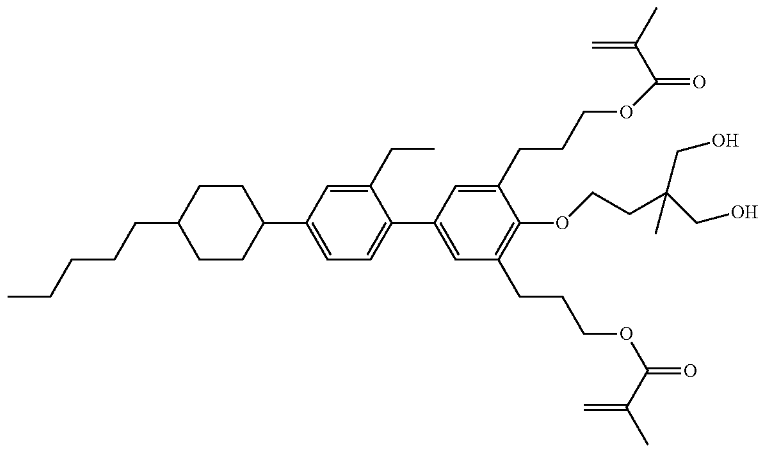 [SMILES: C=C(C)C(=O)OCCCc1cc(-c2ccc(C3CCC(CCCCC)CC3)cc2CC)cc(CCCOC(=O)C(=C)C)c1OCCC(C)(CO)CO] |
| 123. | 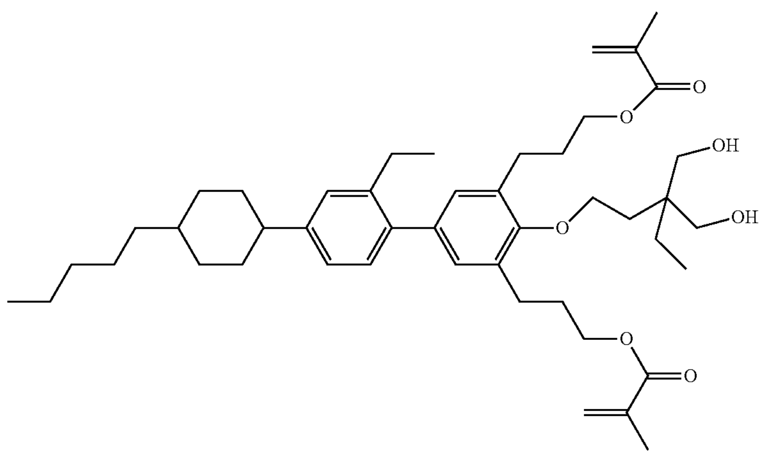 [SMILES: C=C(C)C(=O)OCCCc1cc(-c2ccc(C3CCC(CCCCC)CC3)cc2CC)cc(CCCOC(=O)C(=C)C)c1OCCC(CC)(CO)CO] |
| 124. | 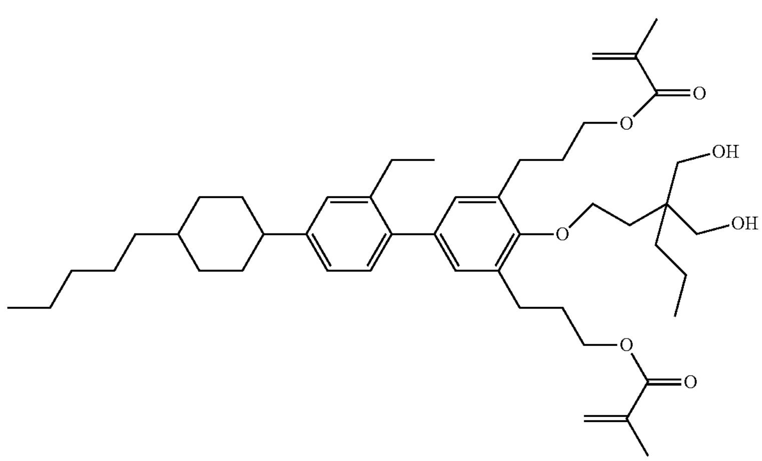 |

-continued
| Example | Structure |
|---|---|
| 125. | 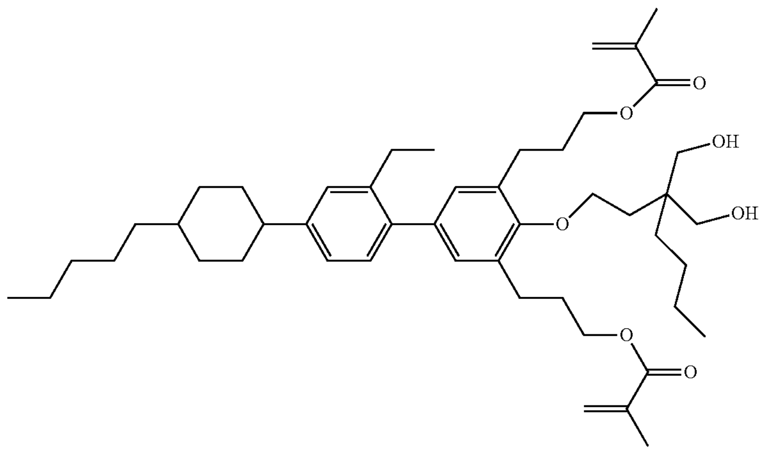 [SMILES: C=C(C)C(=O)OCCCc1cc(-c2ccc(C3CCC(CCCCC)CC3)cc2CC)cc(CCCOC(=O)C(=C)C)c1OCCC(CO)(CO)CCCC] |
| 126. | 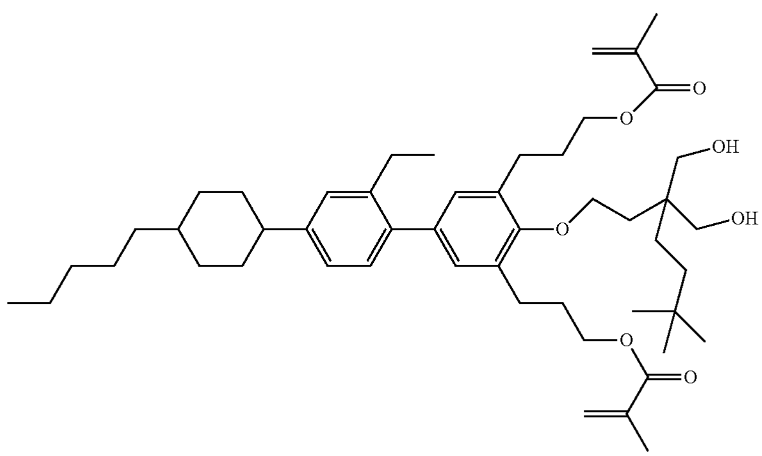 [SMILES: C=C(C)C(=O)OCCCc1cc(-c2ccc(C3CCC(CCCCC)CC3)cc2CC)cc(CCCOC(=O)C(=C)C)c1OCCC(CO)(CO)CCC(C)(C)C] |
| 127. | 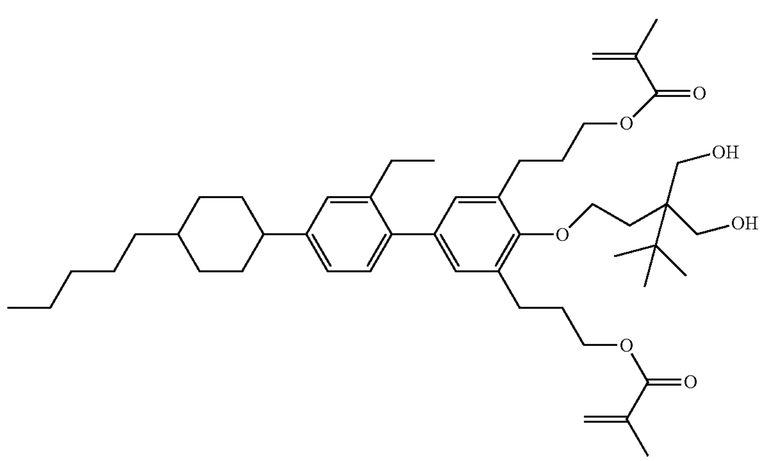 [SMILES: C=C(C)C(=O)OCCCc1cc(-c2ccc(C3CCC(CCCCC)CC3)cc2CC)cc(CCCOC(=O)C(=C)C)c1OCCC(CO)(CO)C(C)(C)C] |

-continued
| Example | Structure |
|---|---|
| 128. | 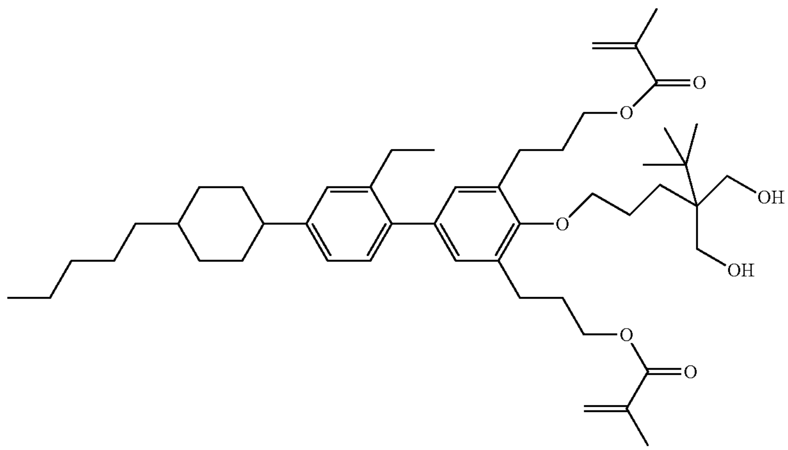 [SMILES: C=C(C)C(=O)OCCCc1cc(-c2ccc(C3CCC(CCCCC)CC3)cc2CC)cc(CCCOC(=O)C(=C)C)c1OCCCC(CO)(CO)C(C)(C)C] |
| 129. | 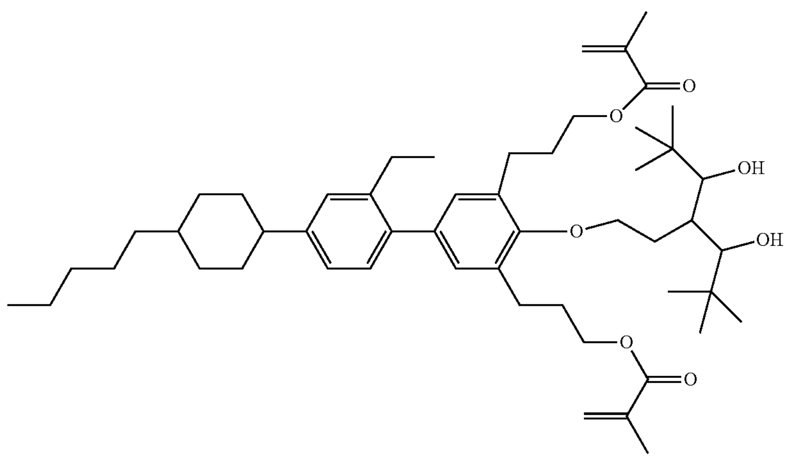 [SMILES: C=C(C)C(=O)OCCCc1cc(-c2ccc(C3CCC(CCCCC)CC3)cc2CC)cc(CCCOC(=O)C(=C)C)c1OCCC(C(O)C(C)(C)C)C(O)C(C)(C)C] |
| 130. | 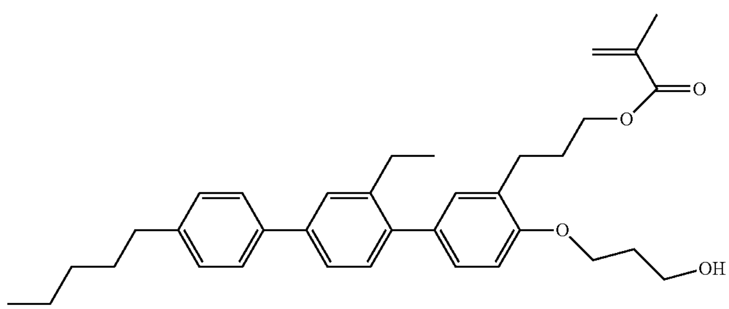 [SMILES: C=C(C)C(=O)OCCCc1cc(-c2ccc(-c3ccc(CCCCC)cc3)cc2CC)ccc1OCCCO] |
| 131. | 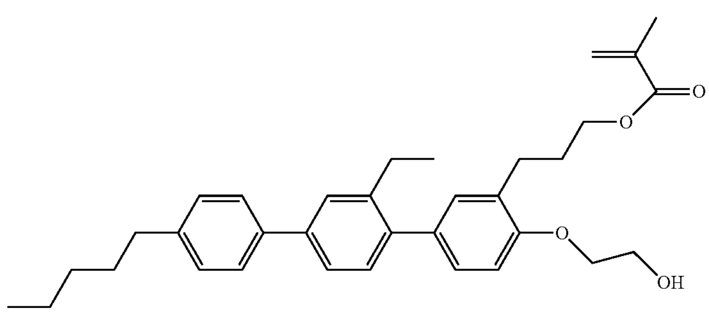 [SMILES: C=C(C)C(=O)OCCCc1cc(-c2ccc(-c3ccc(CCCCC)cc3)cc2CC)ccc1OCCO] |

-continued
| Example | Structure |
| --- | --- |
| 132. | 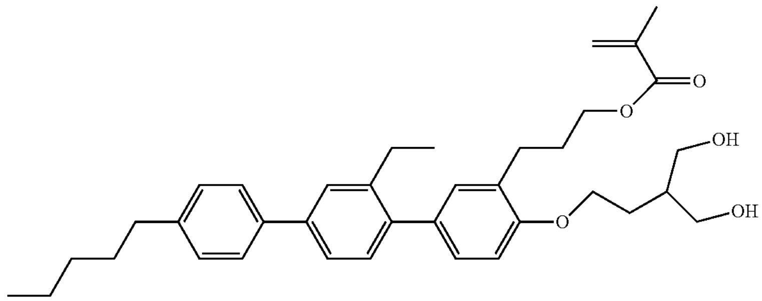 [SMILES: C=C(C)C(=O)OCCCc1cc(-c2ccc(-c3ccc(CCCCC)cc3)cc2CC)ccc1OCCC(CO)CO] |
| 133. | 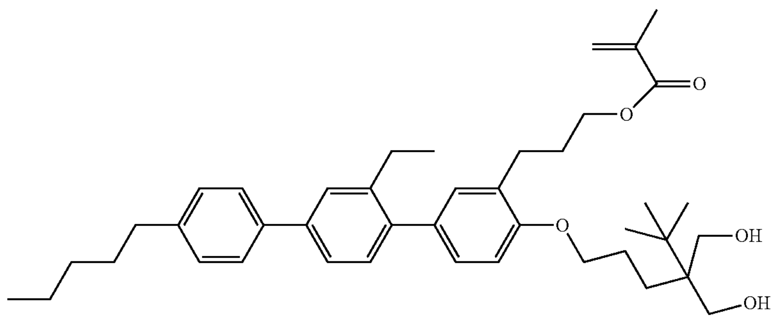 [SMILES: C=C(C)C(=O)OCCCc1cc(-c2ccc(-c3ccc(CCCCC)cc3)cc2CC)ccc1OCCCC(CO)(CO)C(C)(C)C] |
| 134. | 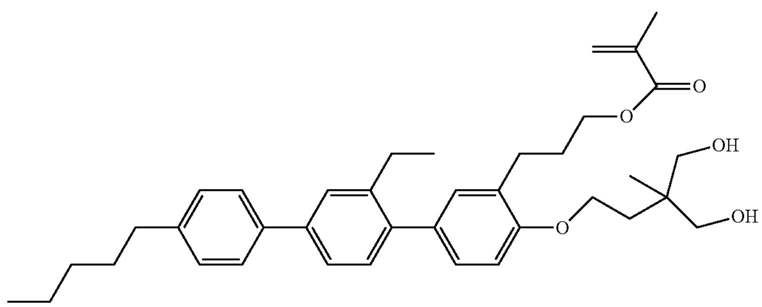 |
| 135. | 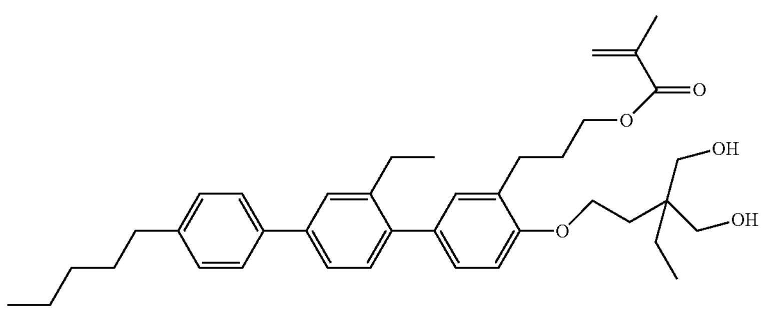 [SMILES: C=C(C)C(=O)OCCCc1cc(-c2ccc(-c3ccc(CCCCC)cc3)cc2CC)ccc1OCCC(CC)(CO)CO] |
| 136. | 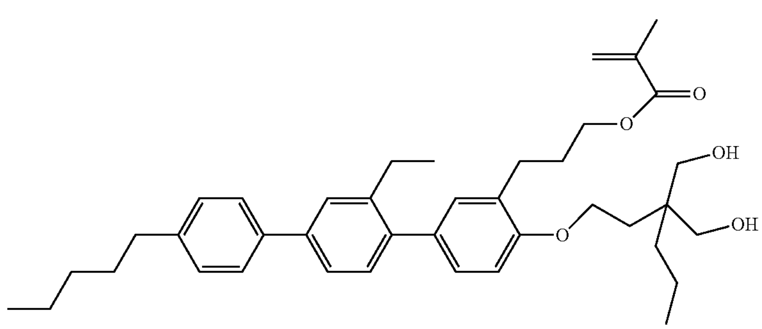 [SMILES: C=C(C)C(=O)OCCCc1cc(-c2ccc(-c3ccc(CCCCC)cc3)cc2CC)ccc1OCCC(CO)(CO)CCC] |

-continued
| Example | Structure |
|---|---|
| 137. | 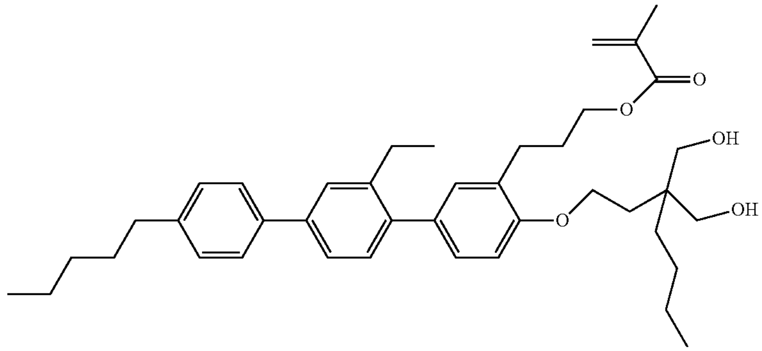 [SMILES: C=C(C)C(=O)OCCCc1cc(-c2ccc(-c3ccc(CCCCC)cc3)cc2CC)ccc1OCCC(CO)(CO)CCCC] |
| 138. | 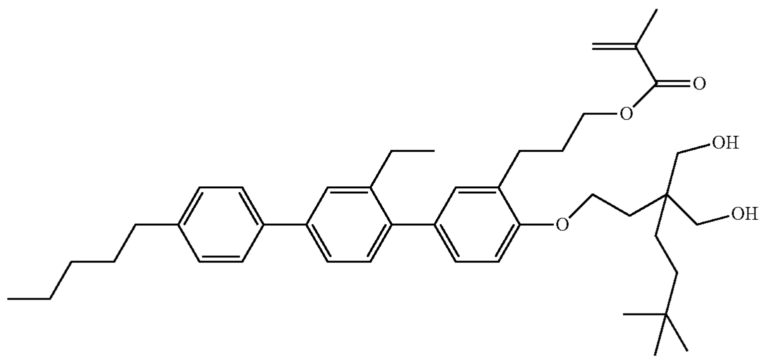 [SMILES: C=C(C)C(=O)OCCCc1cc(-c2ccc(-c3ccc(CCCCC)cc3)cc2CC)ccc1OCCC(CO)(CO)CCC(C)(C)C] |
| 139. | 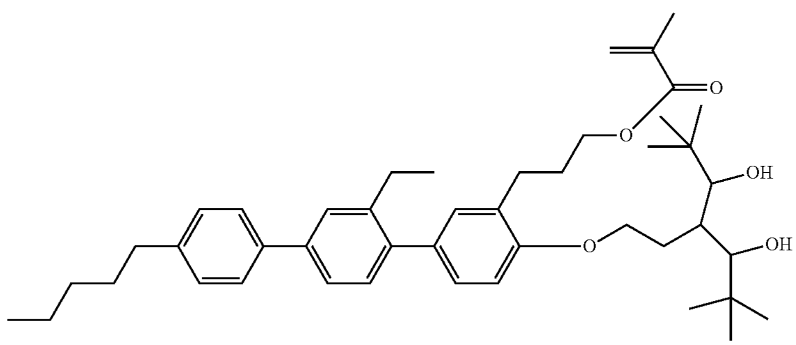 [SMILES: C=C(C)C(=O)OCCCc1cc(-c2ccc(-c3ccc(CCCCC)cc3)cc2CC)ccc1OCCC(C(O)C(C)(C)C)C(O)C(C)(C)C] |
| 140. | 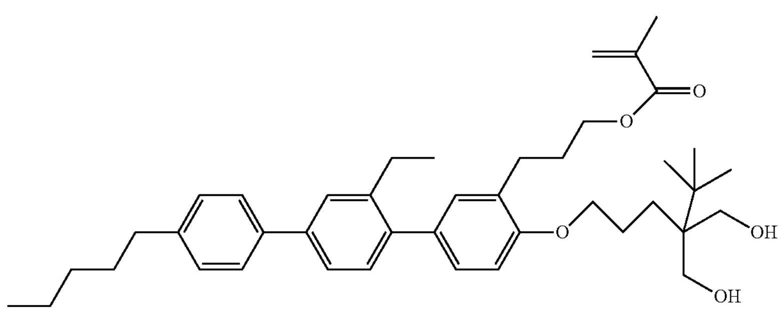 [SMILES: C=C(C)C(=O)OCCCc1cc(-c2ccc(-c3ccc(CCCCC)cc3)cc2CC)ccc1OCCCC(CO)(CO)C(C)(C)C] |

-continued
| Example | Structure |
|---|---|
| 141. | 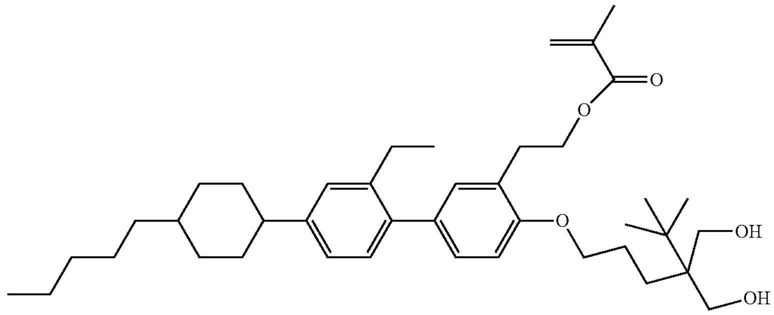 [SMILES: C=C(C)C(=O)OCCc1cc(-c2ccc(C3CCC(CCCCC)CC3)cc2CC)ccc1OCCCC(CO)(CO)C(C)(C)C] |
| 142. | 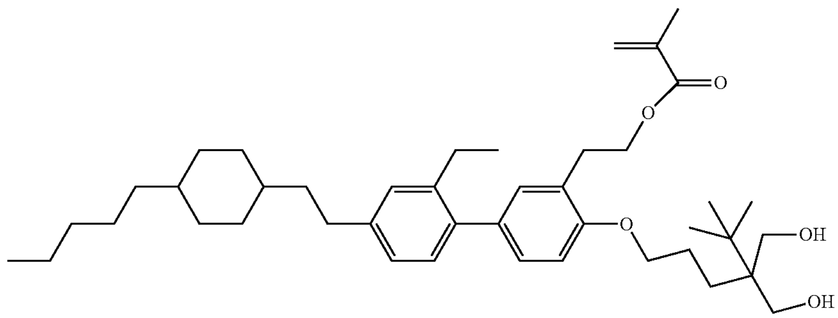 [SMILES: C=C(C)C(=O)OCCc1cc(-c2ccc(CCC3CCC(CCCCC)CC3)cc2CC)ccc1OCCCC(CO)(CO)C(C)(C)C] |
| 143. | 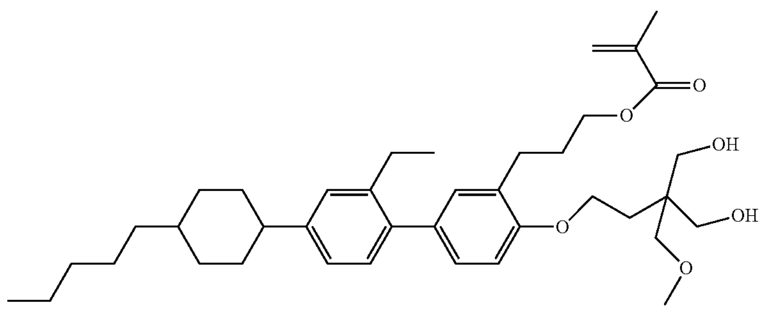 [SMILES: C=C(C)C(=O)OCCCc1cc(-c2ccc(C3CCC(CCCCC)CC3)cc2CC)ccc1OCCC(CO)(CO)COC] |
| 144. | 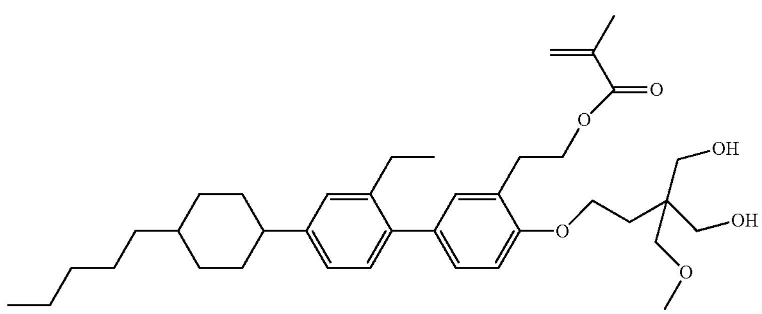 [SMILES: C=C(C)C(=O)OCCc1cc(-c2ccc(C3CCC(CCCCC)CC3)cc2CC)ccc1OCCC(CO)(CO)COC] |
| 145. | 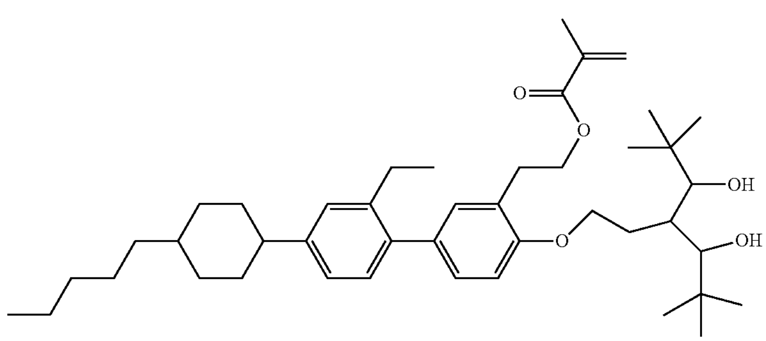 [SMILES: C=C(C)C(=O)OCCc1cc(-c2ccc(C3CCC(CCCCC)CC3)cc2CC)ccc1OCCC(C(O)C(C)(C)C)C(O)C(C)(C)C] |

-continued
| Example | Structure |
| --- | --- |
| 146. | 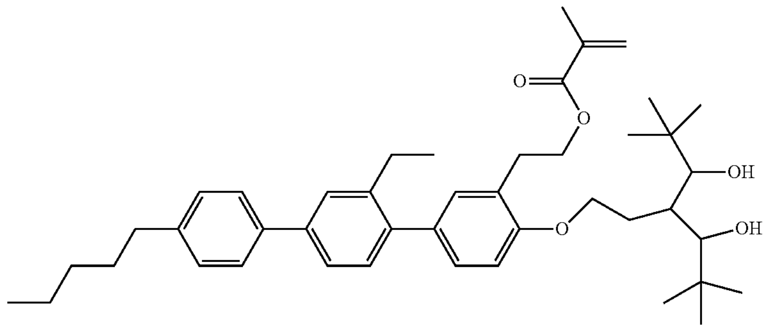 [SMILES: C=C(C)C(=O)OCCc1cc(-c2ccc(-c3ccc(CCCCC)cc3)cc2CC)ccc1OCCC(C(O)C(C)(C)C)C(O)C(C)(C)C] |
| 147. | 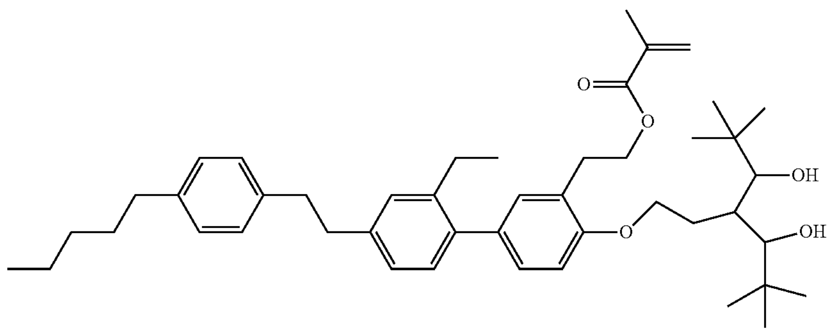 [SMILES: C=C(C)C(=O)OCCc1cc(-c2ccc(CCc3ccc(CCCCC)cc3)cc2CC)ccc1OCCC(C(O)C(C)(C)C)C(O)C(C)(C)C] |
| 148. | 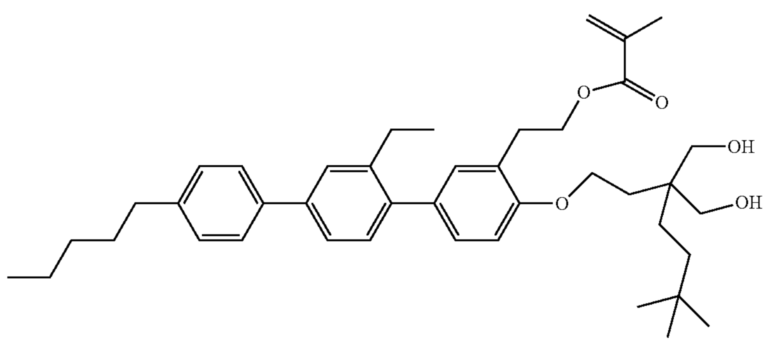 [SMILES: C=C(C)C(=O)OCCc1cc(-c2ccc(-c3ccc(CCCCC)cc3)cc2CC)ccc1OCCC(CO)(CO)CCC(C)(C)C] |
| 149. | 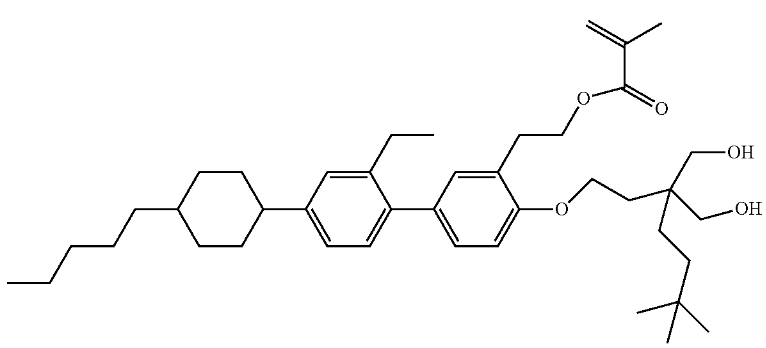 [SMILES: C=C(C)C(=O)OCCc1cc(-c2ccc(C3CCC(CCCCC)CC3)cc2CC)ccc1OCCC(CO)(CO)CCC(C)(C)C] |

-continued
| Example | Structure |
|---|---|
| 150. | 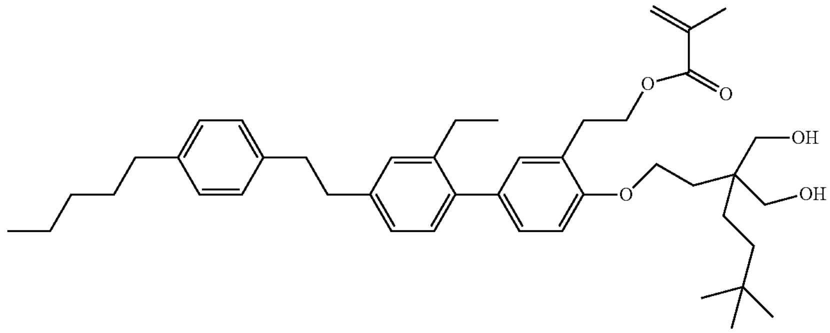 [SMILES: C=C(C)C(=O)OCCc1cc(-c2ccc(CCc3ccc(CCCCC)cc3)cc2CC)ccc1OCCC(CO)(CO)CCC(C)(C)C] |
| 151. | 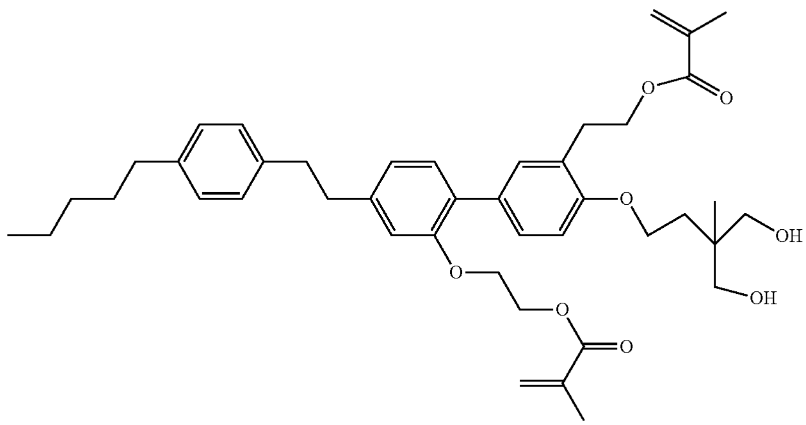 [SMILES: C=C(C)C(=O)OCCOc1cc(CCc2ccc(CCCCC)cc2)ccc1-c1ccc(OCCC(C)(CO)CO)c(CCOC(=O)C(=C)C)c1] |
| 152. | 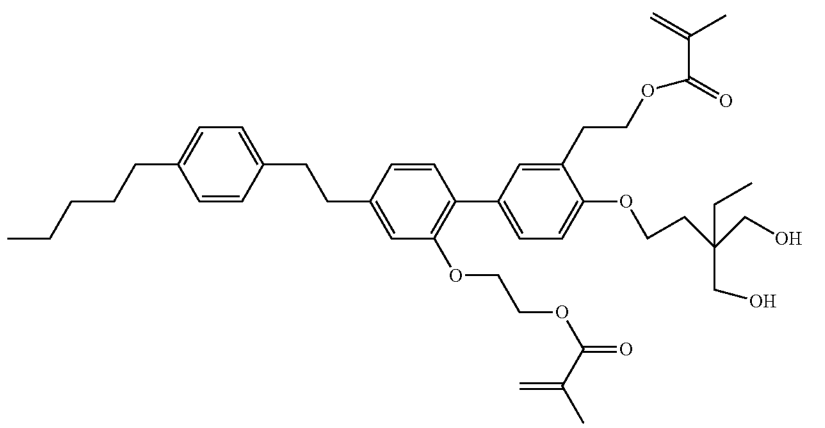 [SMILES: C=C(C)C(=O)OCCOc1cc(CCc2ccc(CCCCC)cc2)ccc1-c1ccc(OCCC(CC)(CO)CO)c(CCOC(=O)C(=C)C)c1] |
| 153. | 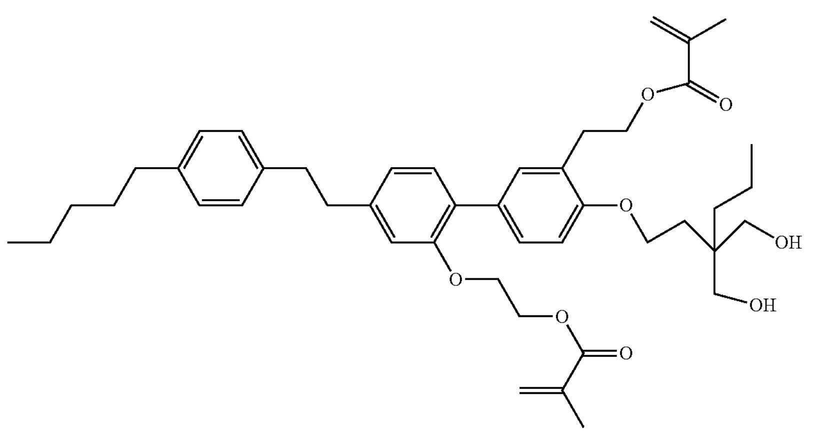 [SMILES: C=C(C)C(=O)OCCOc1cc(CCc2ccc(CCCCC)cc2)ccc1-c1ccc(OCCC(CO)(CO)CCC)c(CCOC(=O)C(=C)C)c1] |

-continued
| Example | Structure |
|---|---|
| 154. | 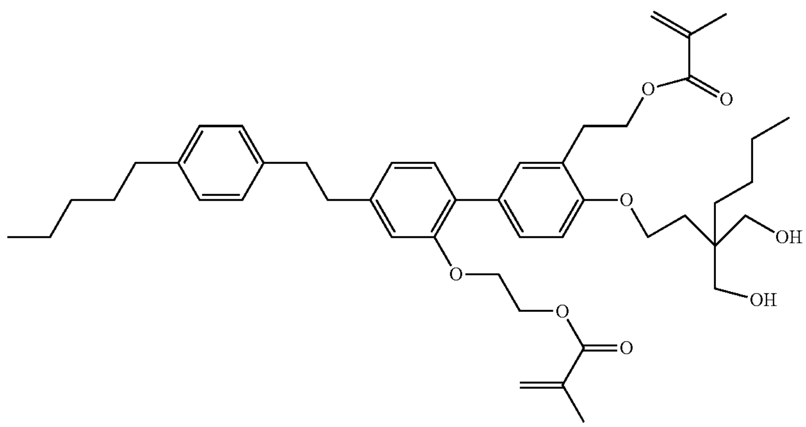 [SMILES: C=C(C)C(=O)OCCOc1cc(CCc2ccc(CCCCC)cc2)ccc1-c1ccc(OCCC(CO)(CO)CCCC)c(CCOC(=O)C(=C)C)c1] |
| 155. | 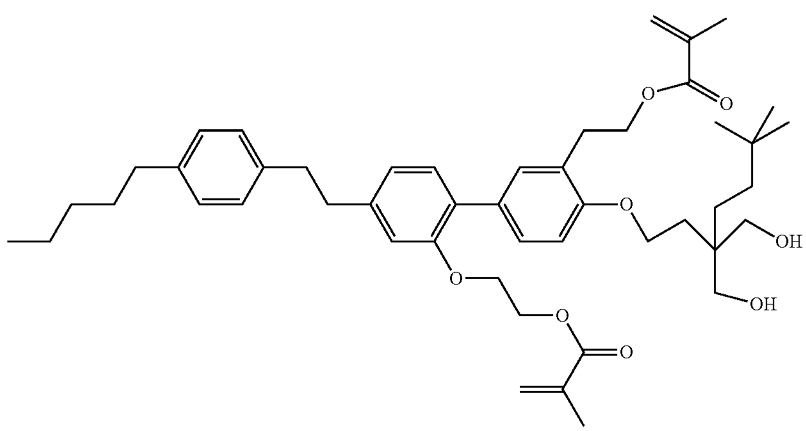 [SMILES: C=C(C)C(=O)OCCOc1cc(CCc2ccc(CCCCC)cc2)ccc1-c1ccc(OCCC(CO)(CO)CCC(C)(C)C)c(CCOC(=O)C(=C)C)c1] |
| 156. | 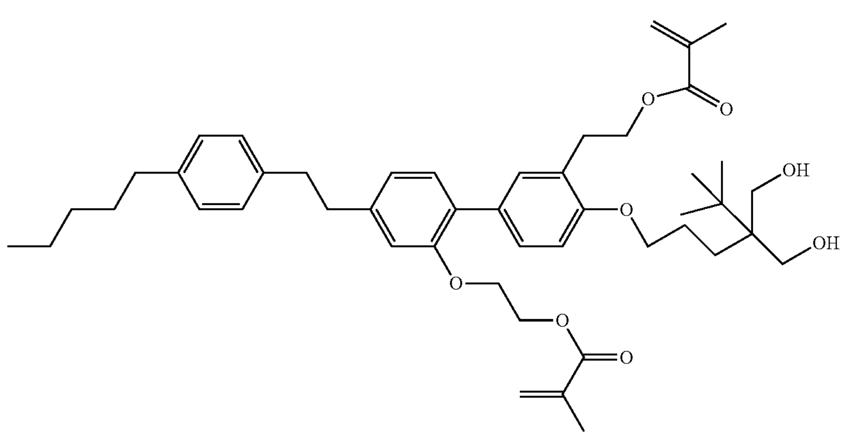 [SMILES: C=C(C)C(=O)OCCOc1cc(CCc2ccc(CCCCC)cc2)ccc1-c1ccc(OCCCC(CO)(CO)C(C)(C)C)c(CCOC(=O)C(=C)C)c1] |

-continued
| Example | Structure |
|---|---|
| 157. | 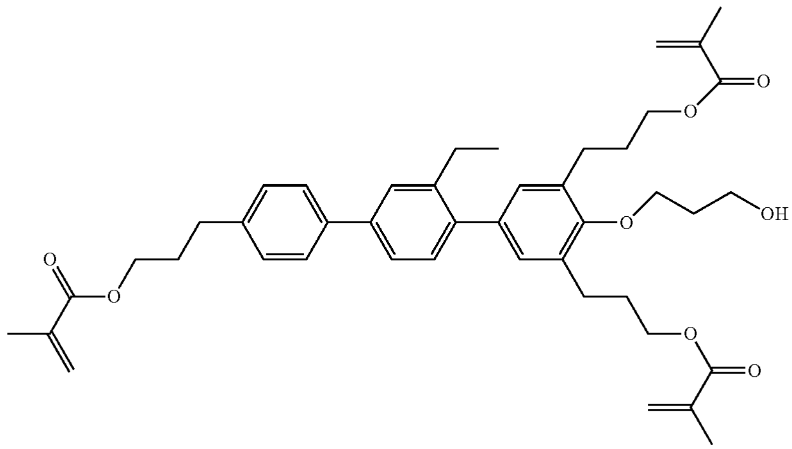 [SMILES: C=C(C)C(=O)OCCCc1ccc(-c2ccc(-c3cc(CCCOC(=O)C(=C)C)c(OCCCO)c(CCCOC(=O)C(=C)C)c3)c(CC)c2)cc1] |
| 158. | 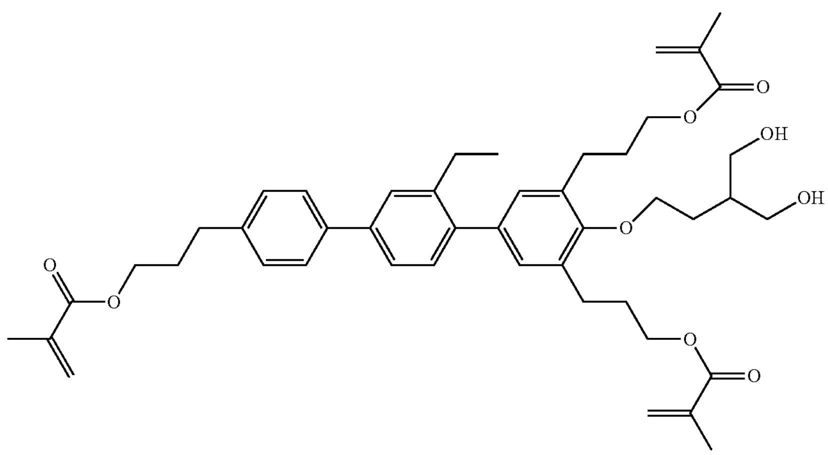 [SMILES: C=C(C)C(=O)OCCCc1ccc(-c2ccc(-c3cc(CCCOC(=O)C(=C)C)c(OCCC(CO)CO)c(CCCOC(=O)C(=C)C)c3)c(CC)c2)cc1] |
| 159. | 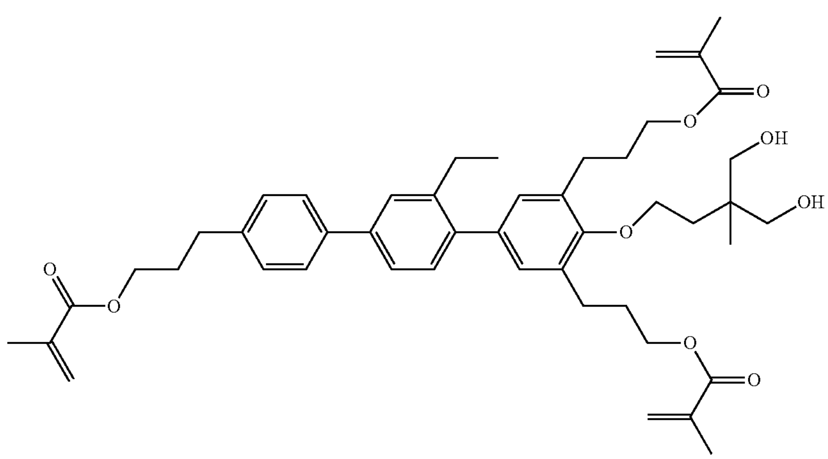 [SMILES: C=C(C)C(=O)OCCCc1ccc(-c2ccc(-c3cc(CCCOC(=O)C(=C)C)c(OCCC(C)(CO)CO)c(CCCOC(=O)C(=C)C)c3)c(CC)c2)cc1] |

-continued
| Example | Structure |
|---|---|
| 160. | 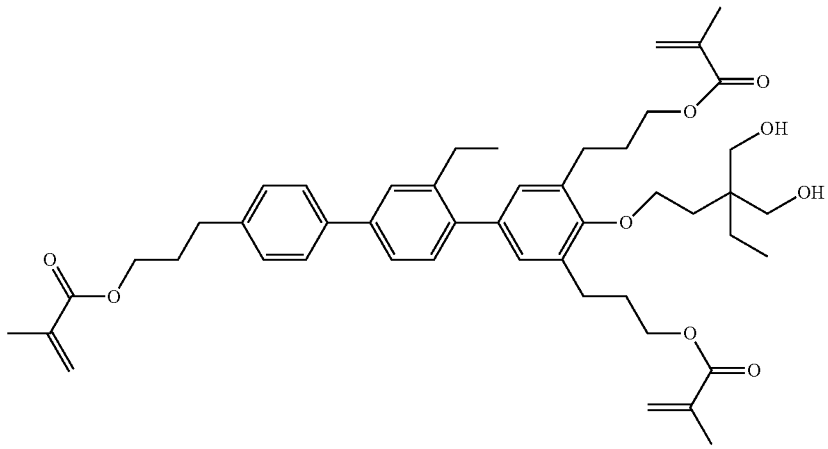 [SMILES: C=C(C)C(=O)OCCCc1ccc(-c2ccc(-c3cc(CCCOC(=O)C(=C)C)c(OCCC(CC)(CO)CO)c(CCCOC(=O)C(=C)C)c3)c(CC)c2)cc1] |
| 161. | 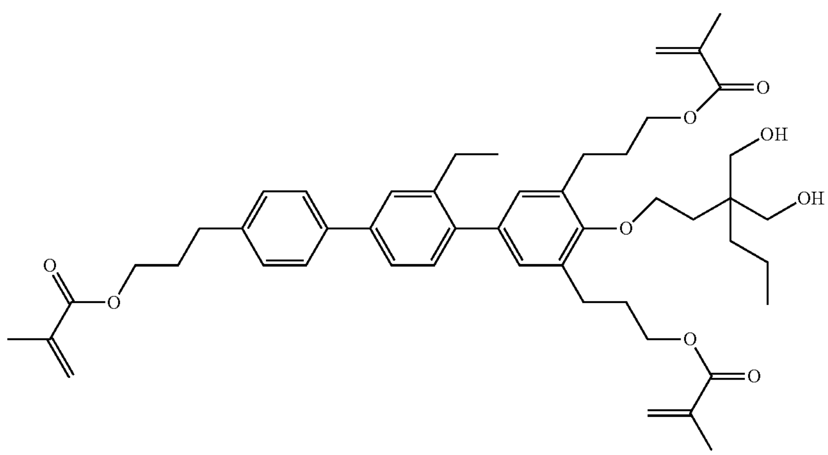 [SMILES: C=C(C)C(=O)OCCCc1ccc(-c2ccc(-c3cc(CCCOC(=O)C(=C)C)c(OCCC(CO)(CO)CCC)c(CCCOC(=O)C(=C)C)c3)c(CC)c2)cc1] |
| 162. | 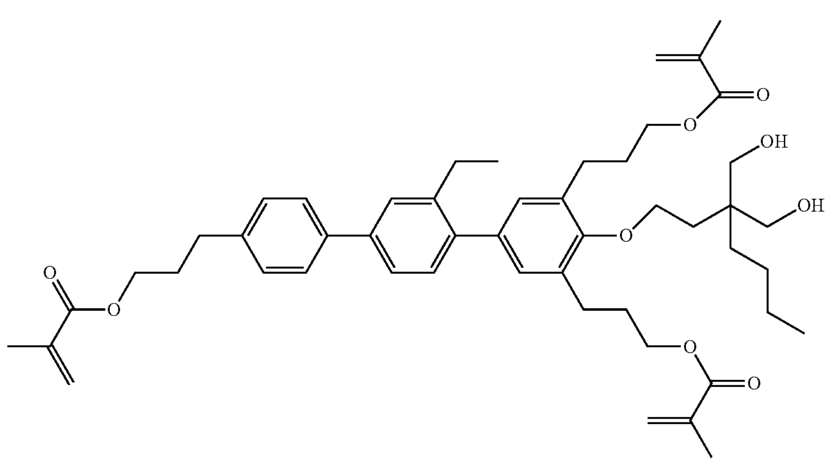 |

-continued
| Example | Structure |
|---|---|
| 163. | 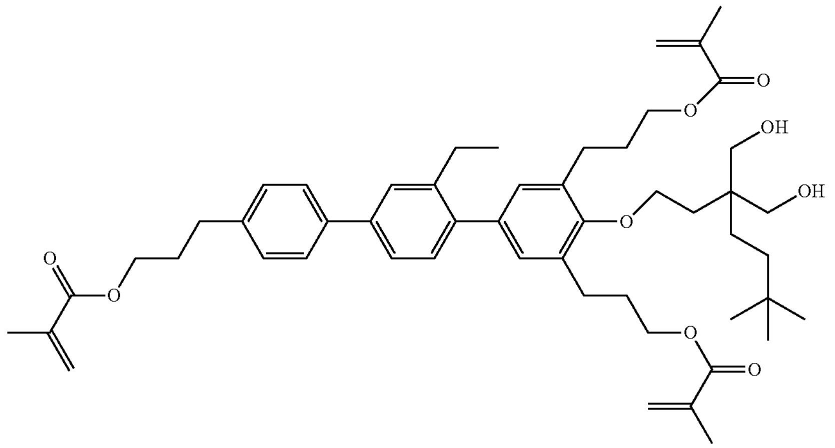 [SMILES: C=C(C)C(=O)OCCCc1ccc(-c2ccc(-c3cc(CCCOC(=O)C(=C)C)c(OCCC(CO)(CO)CCC(C)(C)C)c(CCCOC(=O)C(=C)C)c3)c(CC)c2)cc1] |
| 164. | 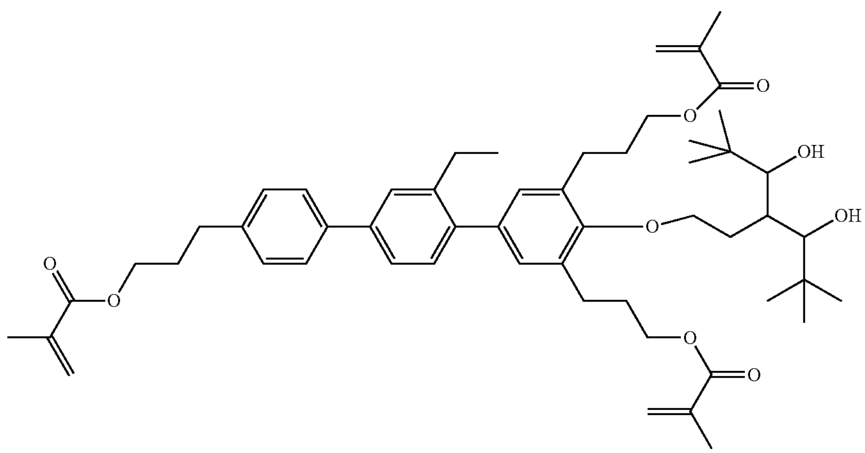 [SMILES: C=C(C)C(=O)OCCCc1ccc(-c2ccc(-c3cc(CCCOC(=O)C(=C)C)c(OCCC(C(O)C(C)(C)C)C(O)C(C)(C)C)c(CCCOC(=O)C(=C)C)c3)c(CC)c2)cc1] |
| 165. | 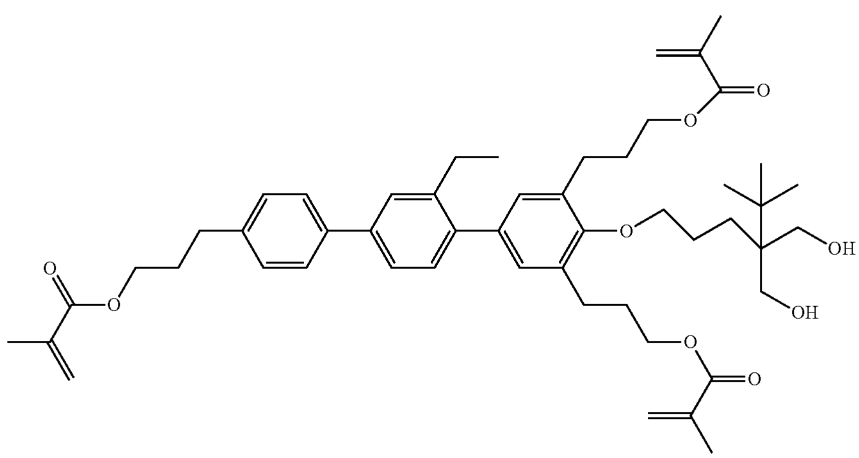 [SMILES: C=C(C)C(=O)OCCCc1ccc(-c2ccc(-c3cc(CCCOC(=O)C(=C)C)c(OCCCC(CO)(CO)C(C)(C)C)c(CCCOC(=O)C(=C)C)c3)c(CC)c2)cc1] |
B) Mixture Examples
LC media according to the invention are prepared using the following liquid-crystalline mixtures consisting of low-molecular-weight components in the percentage proportions by weight indicated.
| H1: Nematic host mixture (Δε < 0) | | | |
|---|---|---|---|
| CY-3-O2 | 15.50% | Clearing point [° C.]: | 75.1 |
| CCY-3-O3 | 8.00% | Δn [589 nm, 20° C.]: | 0.098 |

-continued

| H1: Nematic host mixture (Δε < 0) | | | |
|---|---|---|---|
| CCY-4-O2 | 10.00% | Δε [1 kHz, 20° C.]: | −3.0 |
| CPY-2-O2 | 5.50% | $\varepsilon_{\parallel}$ [1 kHz, 20° C.]: | 3.4 |
| CPY-3-O2 | 11.50% | $\varepsilon_{\perp}$ [1 kHz, 20° C.]: | 6.4 |
| CCH-34 | 9.25% | $K_1$ [pN, 20° C.]: | 13.1 |
| CCH-23 | 24.50% | $K_3$ [pN, 20° C.]: | 13.3 |
| PYP-2-3 | 8.75% | $\gamma_1$ [mPa · s, 20° C.]: | 113 |
| PCH-3O1 | 7.00% | $V_0$ [20° C., V]: | 2.22 |

| H2: Nematic host mixture (Δε < 0) | | | |
|---|---|---|---|
| CY-3-O4 | 14.00% | Clearing point [° C.]: | 80.0 |
| CCY-3-O2 | 9.00% | Δn [589 nm, 20° C.]: | 0.090 |
| CCY-3-O3 | 9.00% | Δε [1 kHz, 20° C.]: | −3.3 |
| CPY-2-O2 | 10.00% | $\varepsilon_{\parallel}$ [1 kHz, 20° C.]: | 3.4 |
| CPY-3-O2 | 10.00% | $\varepsilon_{\perp}$ [1 kHz, 20° C.]: | 6.7 |
| CCY-3-1 | 8.00% | $K_1$ [pN, 20° C.]: | 15.1 |
| CCH-34 | 9.00% | $K_3$ [pN, 20° C.]: | 14.6 |
| CCH-35 | 6.00% | $\gamma_1$ [mPa · s, 20° C.]: | 140 |
| PCH-53 | 10.00% | $V_0$ [20° C., V]: | 2.23 |
| CCH-3O1 | 6.00% | | |
| CCH-3O3 | 9.00% | | |

| H3: Nematic host mixture (Δε < 0) | | | |
|---|---|---|---|
| CC-3-V1 | 9.00% | Clearing point [° C.]: | 74.7 |
| CCH-23 | 18.00% | Δn [589 nm, 20° C.]: | 0.098 |
| CCH-34 | 3.00% | Δε [1 kHz, 20° C.]: | −3.4 |
| CCH-35 | 7.00% | $\varepsilon_{\parallel}$ [1 kHz, 20° C.]: | 3.5 |
| CCP-3-1 | 5.50% | $\varepsilon_{\perp}$ [1 kHz, 20° C.]: | 6.9 |
| CCY-3-O2 | 11.50% | $K_1$ [pN, 20° C.]: | 14.9 |
| CPY-2-O2 | 8.00% | $K_3$ [pN, 20° C.]: | 15.9 |
| CPY-3-O2 | 11.00% | $\gamma_1$ [mPa · s, 20° C.]: | 108 |
| CY-3-O2 | 15.50% | $V_0$ [20° C., V]: | 2.28 |
| PY-3-O2 | 11.50% | | |

| H4: Nematic host mixture (Δε < 0) | | | |
|---|---|---|---|
| CC-3-V | 37.50% | Clearing point [° C.]: | 74.8 |
| CC-3-V1 | 2.00% | Δn [589 nm, 20° C.]: | 0.099 |
| CCY-4-O2 | 14.50% | Δε [1 kHz, 20° C.]: | −2.9 |
| CPY-2-O2 | 10.50% | $\varepsilon_{\parallel}$ [1 kHz, 20° C.]: | 3.7 |
| CPY-3-O2 | 9.50% | $\varepsilon_{\perp}$ [1 kHz, 20° C.]: | 6.6 |
| CY-3-O2 | 15.00% | $K_1$ [pN, 20° C.]: | 12.2 |
| CY-3-O4 | 4.50% | $K_3$ [pN, 20° C.]: | 13.4 |
| PYP-2-4 | 5.50% | $\gamma_1$ [mPa · s, 20° C.]: | 92 |
| PPGU-3-F | 1.00% | $V_0$ [20° C., V]: | 2.28 |

| H5: Nematic host mixture (Δε < 0) | | | |
|---|---|---|---|
| CCH-23 | 20.00% | Clearing point [° C.]: | 74.8 |
| CCH-3O1 | 6.00% | Δn [589 nm, 20° C.]: | 0.105 |
| CCH-34 | 6.00% | Δε [1 kHz, 20° C.]: | −3.2 |
| CCP-3-1 | 3.00% | $\varepsilon_{\parallel}$ [1 kHz, 20° C.]: | 3.5 |
| CCY-3-O2 | 11.00% | $\varepsilon_{\perp}$ [1 kHz, 20° C.]: | 6.8 |
| CPY-2-O2 | 12.00% | $K_1$ [pN, 20° C.]: | 12.7 |
| CPY-3-O2 | 11.00% | $K_3$ [pN, 20° C.]: | 13.6 |
| CY-3-O2 | 14.00% | $\gamma_1$ [mPa · s, 20° C.]: | 120 |
| CY-3-O4 | 4.00% | $V_0$ [20° C., V]: | 2.16 |
| PCH-3O1 | 4.00% | | |
| PYP-2-3 | 9.00% | | |

| H6: Nematic host mixture (Δε < 0) | | | |
|---|---|---|---|
| CC-4-V | 17.00% | Clearing point [° C.]: | 106.1 |
| CCP-V-1 | 15.00% | Δn [589 nm, 20° C.]: | 0.120 |
| CCPC-33 | 2.50% | Δε [1 kHz, 20° C.]: | −3.6 |
| CCY-3-O2 | 4.00% | $\varepsilon_{\parallel}$ [1 kHz, 20° C.]: | 3.5 |
| CCY-3-O3 | 5.00% | $\varepsilon_{\perp}$ [1 kHz, 20° C.]: | 7.0 |
| CCY-4-O2 | 5.00% | $K_1$ [pN, 20° C.]: | 16.8 |
| CLY-3-O2 | 3.50% | $K_3$ [pN, 20° C.]: | 17.3 |
| CLY-3-O3 | 2.00% | $\gamma_1$ [mPa · s, 20° C.]: | 207 |
| CPY-2-O2 | 8.00% | $V_0$ [20° C., V]: | 2.33 |
| CPY-3-O2 | 10.00% | | |
| CY-3-O4 | 17.00% | | |
| PYP-2-3 | 11.00% | | |

| H7: Nematic host mixture (Δε < 0) | | | |
|---|---|---|---|
| CY-3-O2 | 15.00% | Clearing point [° C.]: | 75.5 |
| CCY-4-O2 | 9.50% | Δn [589 nm, 20° C.]: | 0.108 |
| CCY-5-O2 | 5.00% | Δε [1 kHz, 20° C.]: | −3.0 |
| CPY-2-O2 | 9.00% | $\varepsilon_{\parallel}$ [1 kHz, 20° C.]: | 3.5 |
| CPY-3-O2 | 9.00% | $\varepsilon_{\perp}$ [1 kHz, 20° C.]: | 6.5 |
| CCH-34 | 9.00% | $K_1$ [pN, 20° C.]: | 12.9 |
| CCH-23 | 22.00% | $K_3$ [pN, 20° C.]: | 13.0 |
| PYP-2-3 | 7.00% | $\gamma_1$ [mPa · s, 20° C.]: | 115 |
| PYP-2-4 | 7.50% | $V_0$ [20° C., V]: | 2.20 |
| PCH-3O1 | 7.00% | | |

| H8: Nematic host mixture (Δε < 0) | | | |
|---|---|---|---|
| CY-3-O2 | 15.00% | Clearing point [° C.]: | 74.7 |
| CY-5-O2 | 6.50% | Δn [589 nm, 20° C.]: | 0.108 |
| CCY-3-O2 | 11.00% | Δε [1 kHz, 20° C.]: | −3.0 |
| CPY-2-O2 | 5.50% | $\varepsilon_{\parallel}$ [1 kHz, 20° C.]: | 3.6 |
| CPY-3-O2 | 10.50% | $\varepsilon_{\perp}$ [1 kHz, 20° C.]: | 6.6 |
| CC-3-V | 28.50% | $K_1$ [pN, 20° C.]: | 12.9 |
| CC-3-V1 | 10.00% | $K_3$ [pN, 20° C.]: | 15.7 |
| PYP-2-3 | 12.50% | $\gamma_1$ [mPa · s, 20° C.]: | 97 |
| PPGU-3-F | 0.50% | $V_0$ [20° C., V]: | 2.42 |

| H9: Nematic host mixture (Δε < 0) | | | |
|---|---|---|---|
| CCH-35 | 9.50% | Clearing point [° C.]: | 79.1 |
| CCH-5O1 | 5.00% | Δn [589 nm, 20° C.]: | 0.091 |
| CCY-2-1 | 9.50% | Δε [1 kHz, 20° C.]: | −3.6 |
| CCY-3-1 | 10.50% | $\varepsilon_{\parallel}$ [1 kHz, 20° C.]: | 3.5 |
| CCY-3-O2 | 10.50% | $\varepsilon_{\perp}$ [1 kHz, 20° C.]: | 7.1 |
| CCY-5-O2 | 9.50% | $K_1$ [pN, 20° C.]: | 14.6 |
| CPY-2-O2 | 12.00% | $K_3$ [pN, 20° C.]: | 14.5 |
| CY-3-O4 | 9.00% | $\gamma_1$ [mPa · s, 20° C.]: | 178 |
| CY-5-O4 | 11.00% | $V_0$ [20° C., V]: | 2.12 |
| PCH-53 | 13.50% | | |

| H10: Nematic host mixture (Δε < 0) | | | |
|---|---|---|---|
| BCH-32 | 4.00% | Clearing point [° C.]: | 74.8 |
| CC-3-V1 | 8.00% | Δn [589 nm, 20° C.]: | 0.106 |
| CCH-23 | 13.00% | Δε [1 kHz, 20° C.]: | −3.5 |
| CCH-34 | 7.00% | $\varepsilon_{\parallel}$ [1 kHz, 20° C.]: | 3.6 |
| CCH-35 | 7.00% | $\varepsilon_{\perp}$ [1 kHz, 20° C.]: | 7.1 |
| CCY-3-O2 | 13.00% | $K_1$ [pN, 20° C.]: | 14.8 |
| CPY-2-O2 | 7.00% | $K_3$ [pN, 20° C.]: | 15.8 |
| CPY-3-O2 | 12.00% | $\gamma_1$ [mPa · s, 20° C.]: | 115 |
| CY-3-O2 | 12.00% | $V_0$ [20° C., V]: | 2.23 |
| PCH-3O1 | 2.00% | | |
| PY-3-O2 | 15.00% | | |

H11: Nematic host mixture (Δε < 0)

| | | | |
|---|---|---|---|
| CY-3-O4 | 22.00% | Clearing point [° C.]: | 86.9 |
| CY-5-O4 | 12.00% | Δn [589 nm, 20° C.]: | 0.111 |
| CCY-3-O2 | 6.00% | Δε [1 kHz, 20° C.]: | −4.9 |
| CCY-3-O3 | 6.00% | $\varepsilon_{\parallel}$ [1 kHz, 20° C.]: | 3.8 |
| CCY-4-O2 | 6.00% | $\varepsilon_{\perp}$ [1 kHz, 20° C.]: | 8.7 |
| CPY-2-O2 | 10.00% | $K_1$ [pN, 20° C.]: | 14.9 |
| CPY-3-O2 | 10.00% | $K_3$ [pN, 20° C.]: | 15.9 |
| PYP-2-3 | 7.00% | $\gamma_1$ [mPa · s, 20° C.]: | 222 |
| CC-3-V1 | 7.00% | $V_0$ [20° C., V]: | 1.91 |
| CC-5-V | 10.00% | | |
| CCPC-33 | 2.00% | | |
| CCPC-35 | 2.00% | | |

H12: Nematic host mixture (Δε < 0)

| | | | |
|---|---|---|---|
| CY-3-O4 | 12.00% | Clearing point [° C.]: | 86.0 |
| CY-5-O2 | 10.00% | Δn [589 nm, 20° C.]: | 0.110 |
| CY-5-O4 | 8.00% | Δε [1 kHz, 20° C.]: | −5.0 |
| CCY-3-O2 | 8.00% | $\varepsilon_{\parallel}$ [1 kHz, 20° C.]: | 3.8 |
| CCY-4-O2 | 7.00% | $\varepsilon_{\perp}$ [1 kHz, 20° C.]: | 8.8 |
| CCY-5-O2 | 6.00% | $K_1$ [pN, 20° C.]: | 14.7 |
| CCY-2-1 | 8.00% | $K_3$ [pN, 20° C.]: | 16.0 |
| CCY-3-1 | 7.00% | $\gamma_1$ [mPa · s, 20° C.]: | 250 |
| CPY-3-O2 | 9.00% | $V_0$ [20° C., V]: | 1.90 |
| CPY-3-O2 | 9.00% | | |
| BCH-32 | 6.00% | | |
| PCH-53 | 10.00% | | |

H13: Nematic host mixture (Δε < 0)

| | | | |
|---|---|---|---|
| CC-3-V1 | 10.25% | Clearing point [° C.]: | 74.7 |
| CCH-23 | 18.50% | Δn [589 nm, 20° C.]: | 0.103 |
| CCH-35 | 6.75% | Δε [1 kHz, 20° C.]: | −3.1 |
| CCP-3-1 | 6.00% | $\varepsilon_{\parallel}$ [1 kHz, 20° C.]: | 3.4 |
| CCY-3-1 | 2.50% | $\varepsilon_{\perp}$ [1 kHz, 20° C.]: | 6.4 |
| CCY-3-O2 | 12.00% | $K_1$ [pN, 20° C.]: | 15.4 |
| CPY-2-O2 | 6.00% | $K_3$ [pN, 20° C.]: | 16.8 |
| CPY-3-O2 | 9.75% | $\gamma_1$ [mPa · s, 20° C.]: | 104 |
| CY-3-O2 | 11.50% | $V_0$ [20° C., V]: | 2.46 |
| PP-1-2V1 | 3.75% | | |
| PY-3-O2 | 13.00% | | |

H14: Nematic host mixture (Δε < 0)

| | | | |
|---|---|---|---|
| CC-3-V | 27.50% | Clearing point [° C.]: | 74.7 |
| CC-3-V1 | 10.00% | Δn [589 nm, 20° C.]: | 0.104 |
| CCH-35 | 8.00% | Δε [1 kHz, 20° C.]: | −3.0 |
| CCY-3-O2 | 9.25% | $\varepsilon_{\parallel}$ [1 kHz, 20° C.]: | 3.4 |
| CLY-3-O2 | 10.00% | $\varepsilon_{\perp}$ [1 kHz, 20° C.]: | 6.4 |
| CPY-3-O2 | 11.75% | $K_1$ [pN, 20° C.]: | 15.3 |
| PY-3-O2 | 14.00% | $K_3$ [pN, 20° C.]: | 16.2 |
| PY-4-O2 | 9.00% | $\gamma_1$ [mPa · s, 20° C.]: | 88 |
| PYP-2-4 | 0.50% | $V_0$ [20° C., V]: | 2.44 |

H15: Nematic host mixture (Δε > 0)

| | | | |
|---|---|---|---|
| CC-4-V | 10.00% | Clearing point [° C.]: | 77.0 |
| CC-5-V | 13.50% | Δn [589 nm, 20° C.]: | 0.113 |
| PGU-3-F | 6.50% | Δε [1 kHz, 20° C.]: | 19.2 |
| ACQU-2-F | 10.00% | $\varepsilon_{\parallel}$ [1 kHz, 20° C.]: | 23.8 |
| ACQU-3-F | 12.00% | $\varepsilon_{\perp}$ [1 kHz, 20° C.]: | 4.6 |
| PUQU-3-F | 11.00% | $K_1$ [pN, 20° C.]: | 11.5 |
| CCP-V-1 | 12.00% | $K_3$ [pN, 20° C.]: | 11.1 |
| APUQU-2-F | 6.00% | $\gamma_1$ [mPa · s, 20° C.]: | 122 |
| APUQU-3-F | 7.00% | $V_0$ [20° C., V]: | 0.81 |
| PGUQU-3-F | 8.00% | | |
| CPGU-3-OT | 4.00% | | |

H16: Nematic host mixture (Δε > 0)

| | | | |
|---|---|---|---|
| PGU-2-F | 3.50% | Clearing point [° C.]: | 77.0 |
| PGU-3-F | 7.00% | Δn [589 nm, 20° C.]: | 0.105 |
| CC-3-V1 | 15.00% | Δε [1 kHz, 20° C.]: | 7.2 |
| CC-4-V | 18.00% | $\varepsilon_{\parallel}$ [1 kHz, 20° C.]: | 10.3 |
| CC-5-V | 20.00% | $\varepsilon_{\perp}$ [1 kHz, 20° C.]: | 3.1 |
| CCP-V-1 | 6.00% | $K_1$ [pN, 20° C.]: | 15.3 |
| APUQU-3-F | 15.00% | $K_3$ [pN, 20° C.]: | 13.5 |
| PUQU-3-F | 5.50% | $\gamma_1$ [mPa · s, 20° C.]: | 63 |
| PGP-2-4 | 3.00% | $V_0$ [20° C., V]: | 1.53 |
| BCH-32 | 7.00% | | |

H17: Nematic host mixture (Δε > 0)

| | | | |
|---|---|---|---|
| APUQU-2-F | 6.00% | Clearing point [° C.]: | 74.0 |
| APUQU-3-F | 12.00% | Δn [589 nm, 20° C.]: | 0.120 |
| PUQU-3-F | 18.00% | Δε [1 kHz, 20° C.]: | 17.4 |
| CPGU-3-OT | 9.00% | $\varepsilon_{\parallel}$ [1 kHz, 20° C.]: | 22.0 |
| CCGU-3-F | 3.00% | $\varepsilon_{\perp}$ [1 kHz, 20° C.]: | 4.5 |
| BCH-3F.F.F | 14.00% | $K_1$ [pN, 20° C.]: | 10.1 |
| CCQU-3-F | 10.00% | $K_3$ [pN, 20° C.]: | 10.8 |
| CC-3-V | 25.00% | $\gamma_1$ [mPa · s, 20° C.]: | 111 |
| PGP-2-2V | 3.00% | $V_0$ [20° C., V]: | 0.80 |

H18: Nematic host mixture (Δε > 0)

| | | | |
|---|---|---|---|
| PUQU-3-F | 15.00% | Clearing point [° C.]: | 74.3 |
| APUQU-2-F | 5.00% | Δn [589 nm, 20° C.]: | 0.120 |
| APUQU-3-F | 12.00% | Δε [1 kHz, 20° C.]: | 14.9 |
| CCQU-3-F | 11.00% | $\varepsilon_{\parallel}$ [1 kHz, 20° C.]: | 19.1 |
| CCQU-5-F | 1.50% | $\varepsilon_{\perp}$ [1 kHz, 20° C.]: | 4.3 |
| CPGU-3-OT | 5.00% | $K_1$ [pN, 20° C.]: | 11.2 |
| CCP-3OCF3 | 4.50% | $K_3$ [pN, 20° C.]: | 10.8 |
| CGU-3-F | 10.00% | $\gamma_1$ [mPa · s, 20° C.]: | 98 |
| PGP-2-3 | 1.50% | $V_0$ [20° C., V]: | 0.91 |
| PGP-2-2V | 8.00% | | |
| CC-3-V | 26.50% | | |

H19: Nematic host mixture (Δε > 0)

| | | | |
|---|---|---|---|
| CCQU-3-F | 9.00% | Clearing point [° C.]: | 94.5 |
| CCQU-5-F | 9.00% | Δn [589 nm, 20° C.]: | 0.121 |
| PUQU-3-F | 16.00% | Δε [1 kHz, 20° C.]: | 20.4 |
| APUQU-2-F | 8.00% | $\varepsilon_{\parallel}$ [1 kHz, 20° C.]: | 24.7 |
| APUQU-3-F | 9.00% | $\varepsilon_{\perp}$ [1 kHz, 20° C.]: | 4.3 |
| PGUQU-3-F | 8.00% | $K_1$ [pN, 20° C.]: | 12.1 |
| CPGU-3-OT | 7.00% | $K_3$ [pN, 20° C.]: | 13.9 |
| CC-4-V | 18.00% | $\gamma_1$ [mPa · s, 20° C.]: | 163 |
| CC-5-V | 5.00% | $V_0$ [20° C., V]: | 0.81 |
| CCP-V-1 | 6.00% | | |
| CCPC-33 | 3.00% | | |
| PPGU-3-F | 2.00% | | |

H20: Nematic host mixture (Δε > 0)

| | | | |
|---|---|---|---|
| CC-3-V | 28.50% | Clearing point [° C.]: | 85.6 |
| CCP-V1 | 3.00% | Δn [589 nm, 20° C.]: | 0.121 |
| CCPC-33 | 2.00% | Δε [1 kHz, 20° C.]: | 19.5 |
| PGU-2-F | 4.00% | $\varepsilon_{\parallel}$ [1 kHz, 20° C.]: | 23.8 |
| CCQU-3-F | 8.00% | $\varepsilon_{\perp}$ [1 kHz, 20° C.]: | 4.3 |
| CCQU-5-F | 6.00% | $K_1$ [pN, 20° C.]: | 11.6 |
| CCGU-3-F | 3.00% | $K_3$ [pN, 20° C.]: | 12.7 |
| PUQU-2-F | 2.00% | $\gamma_1$ [mPa · s, 20° C.]: | 126 |
| PUQU-3-F | 10.00% | $V_0$ [20° C., V]: | 0.81 |
| APUQU-2-F | 6.00% | | |
| APUQU-3-F | 9.00% | | |
| PGUQU-3-F | 5.00% | | |
| PGUQU-4-F | 5.00% | | |
| PGUQU-5-F | 4.00% | | |
| CPGU-3-OT | 4.00% | | |
| PPGU-3-F | 0.50% | | |

The following polymerizable self-alignment additives are used:

| Polymerizable self-alignment additive No. | Structure |
| --- | --- |
| 1 | 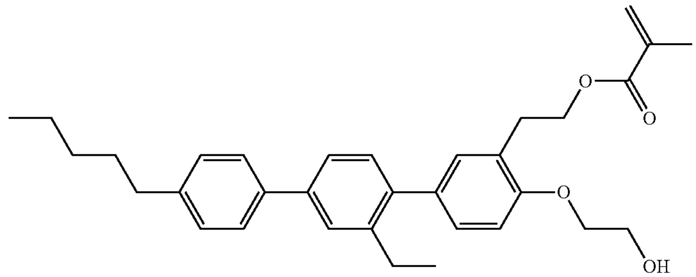 [SMILES: C=C(C)C(=O)OCCc1cc(-c2ccc(-c3ccc(CCCCC)cc3)cc2CC)ccc1OCCO] |
| 2 | 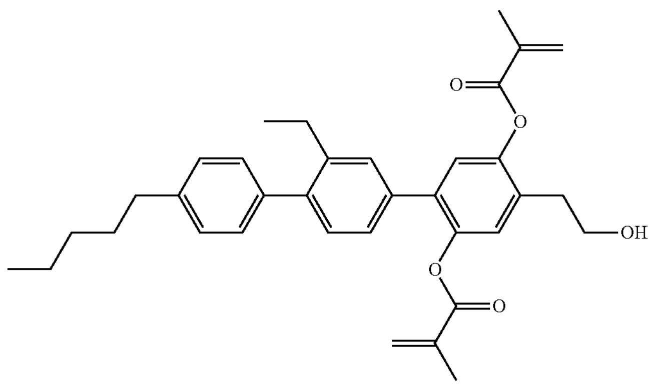 [SMILES: C=C(C)C(=O)Oc1cc(-c2ccc(-c3ccc(CCCCC)cc3)c(CC)c2)c(OC(=O)C(=C)C)cc1CCO] |
| 3 | 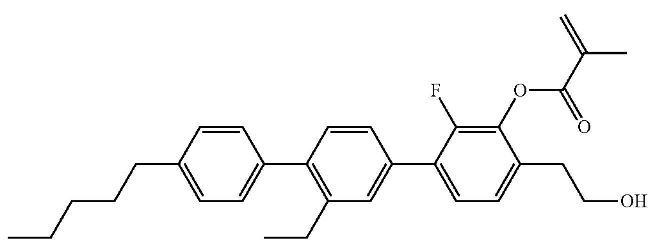 [SMILES: C=C(C)C(=O)Oc1c(CCO)ccc(-c2ccc(-c3ccc(CCCCC)cc3)c(CC)c2)c1F] Tg-7C51I |
| 4 | 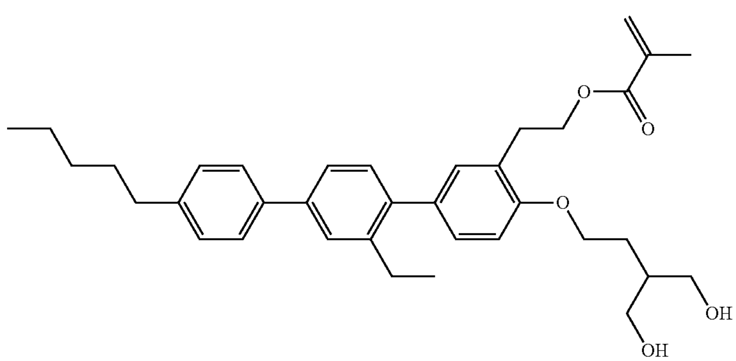 [SMILES: C=C(C)C(=O)OCCc1cc(-c2ccc(-c3ccc(CCCCC)cc3)cc2CC)ccc1OCCC(CO)CO] |
| 5 | 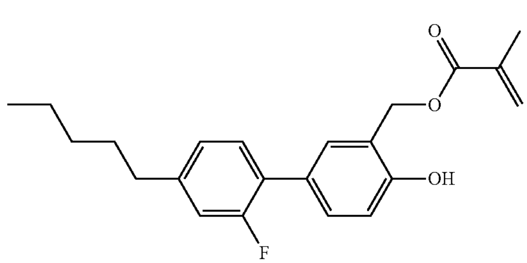 [SMILES: C=C(C)C(=O)OCc1cc(-c2ccc(CCCCC)cc2F)ccc1O] C57I |

-continued
| Polymerizable self-alignment additive No. | Structure |
|---|---|
| 6 | 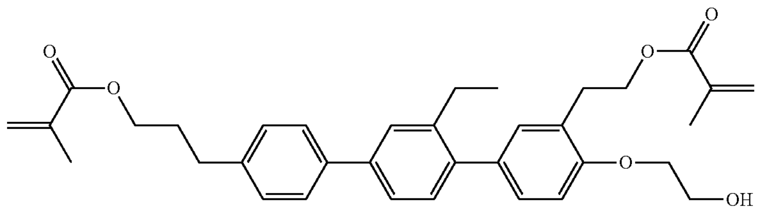 [SMILES: C=C(C)C(=O)OCCCc1ccc(-c2ccc(-c3ccc(OCCO)c(CCOC(=O)C(=C)C)c3)c(CC)c2)cc1] T$_g$-16C86I |
| 7 | 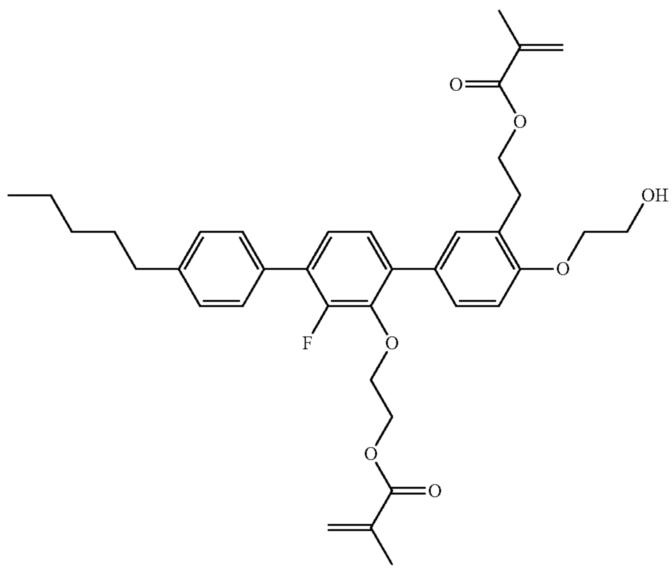 [SMILES: C=C(C)C(=O)OCCOc1c(-c2ccc(OCCO)c(CCOC(=O)C(=C)C)c2)ccc(-c2ccc(CCCCC)cc2)c1F] T$_g$-21I |
| 8 | 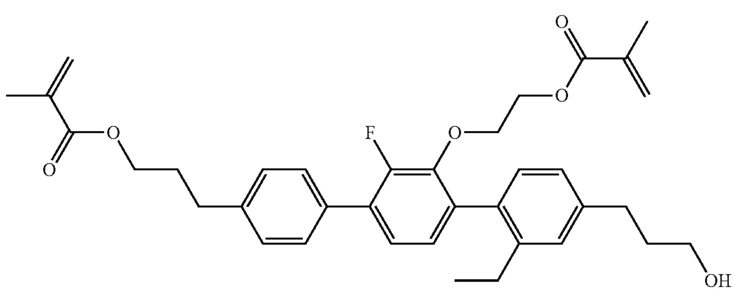 [SMILES: C=C(C)C(=O)OCCCc1ccc(-c2ccc(-c3ccc(CCCO)cc3CC)c(OCCOC(=O)C(=C)C)c2F)cc1] T$_g$-26I |
| 9 | 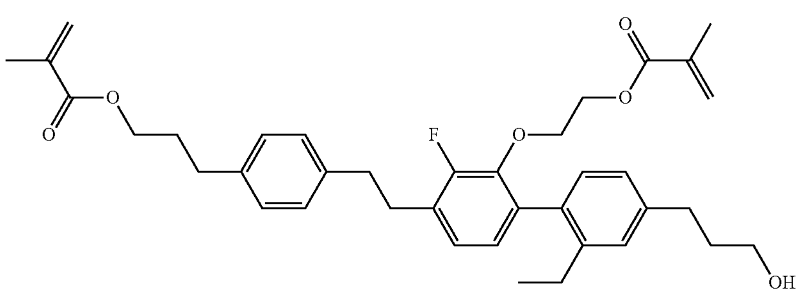 [SMILES: C=C(C)C(=O)OCCCc1ccc(CCc2ccc(-c3ccc(CCCO)cc3CC)c(OCCOC(=O)C(=C)C)c2F)cc1] T$_g$-36I |

-continued
| Polymerizable self-alignment additive No. | Structure |
|---|---|
| 10 | 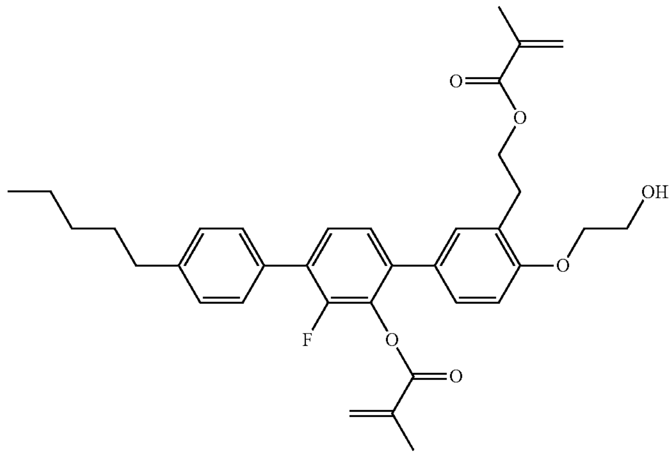 [SMILES: C=C(C)C(=O)OCCc1cc(-c2ccc(-c3ccc(CCCCC)cc3)c(F)c2OC(=O)C(=C)C)ccc1OCCO] Tg-3I |
| 11 | 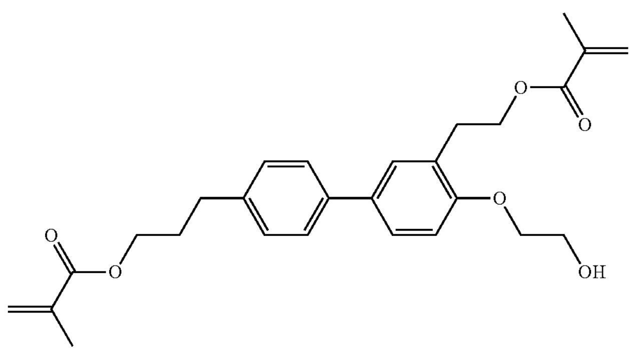 [SMILES: C=C(C)C(=O)OCCCc1ccc(-c2ccc(OCCO)c(CCOC(=O)C(=C)C)c2)cc1] |
| 12 | 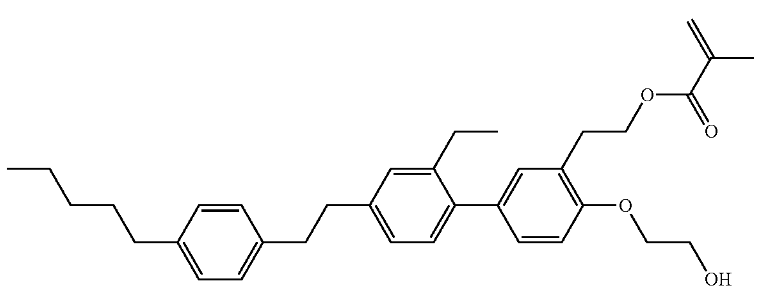 [SMILES: C=C(C)C(=O)OCCc1cc(-c2ccc(CCc3ccc(CCCCC)cc3)cc2CC)ccc1OCCO] C40I |

-continued
| Polymerizable self-alignment additive No. | Structure |
|---|---|
| 13 | 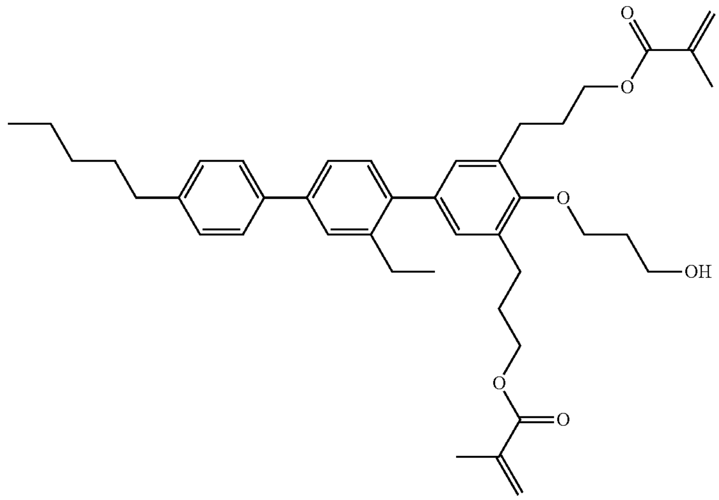 [SMILES: C=C(C)C(=O)OCCCc1cc(-c2ccc(-c3ccc(CCCCC)cc3)cc2CC)cc(CCCOC(=O)C(=C)C)c1OCCCO] $T_g$-38I |
| 14 | 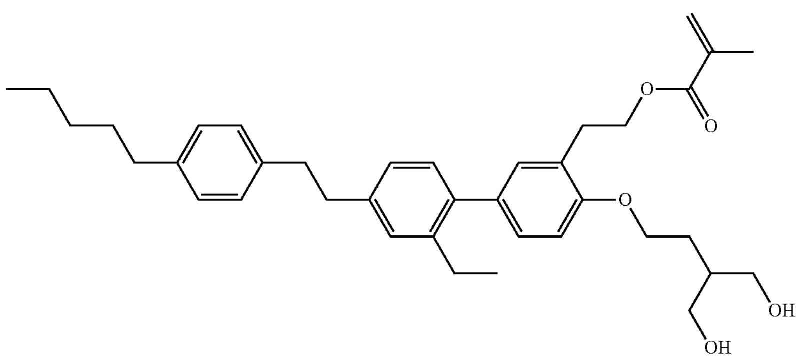 [SMILES: C=C(C)C(=O)OCCc1cc(-c2ccc(CCc3ccc(CCCCC)cc3)cc2CC)ccc1OCCC(CO)CO] $T_g$-26C54I |
| 15 | 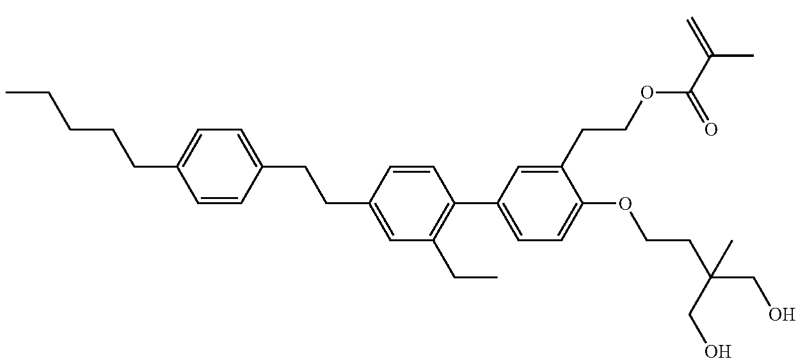 [SMILES: C=C(C)C(=O)OCCc1cc(-c2ccc(CCc3ccc(CCCCC)cc3)cc2CC)ccc1OCCC(C)(CO)CO] $T_g$-24I |

-continued
| Polymerizable self-alignment additive No. | Structure |
|---|---|
| 16 | 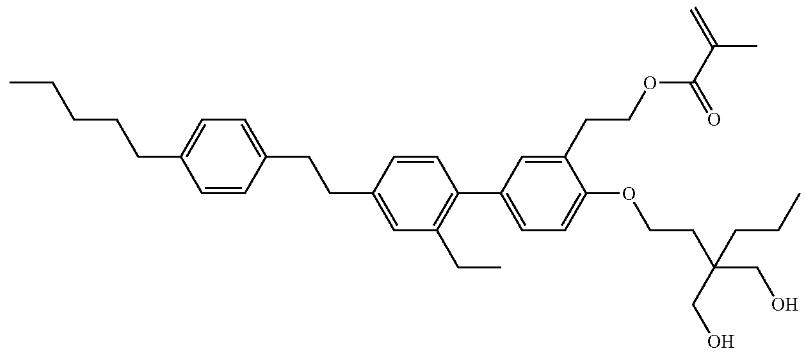 [SMILES: C=C(C)C(=O)OCCc1cc(-c2ccc(CCc3ccc(CCCCC)cc3)cc2CC)ccc1OCCC(CO)(CO)CCC] Tg-21I |
| 17 | 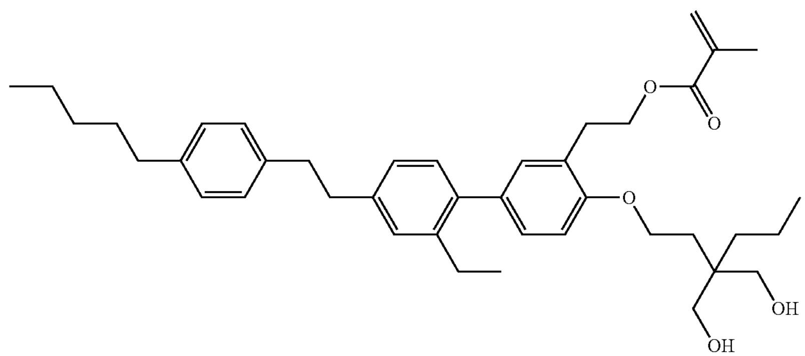 [SMILES: C=C(C)C(=O)OCCc1cc(-c2ccc(CCc3ccc(CCCCC)cc3)cc2CC)ccc1OCCC(CO)(CO)CCC] Tg-20I |
| 18 | 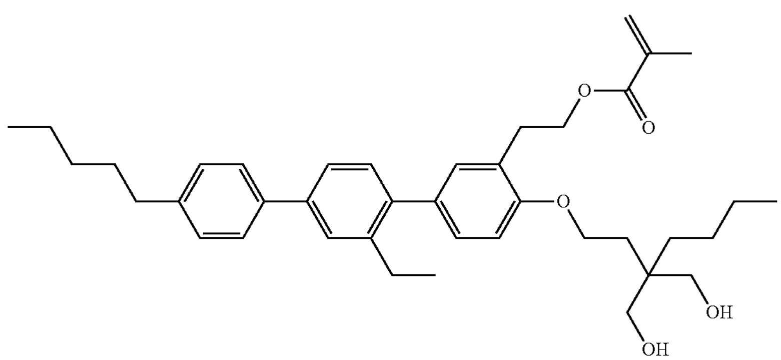 [SMILES: C=C(C)C(=O)OCCc1cc(-c2ccc(-c3ccc(CCCCC)cc3)cc2CC)ccc1OCCC(CO)(CO)CCCC] Tg-14I |
| 19 | 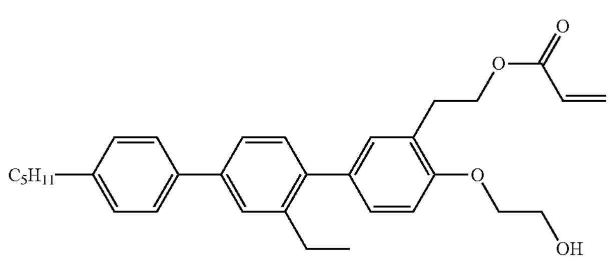 |
Where appropriate phase behavior ($T_g$: glass transition temperature, C: crystalline, I: isotropic phase), transition temperatures in ° C.

The following polymerizable compound is used:

RM-1

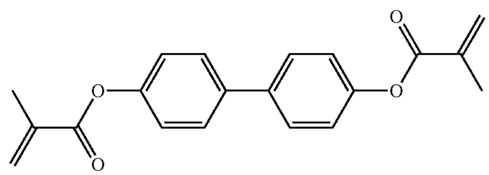

Mixture Example 1

Polymerizable self-alignment additive 1 (2.0% by weight) is added to a nematic LC medium $H_1$ of the VA type ($\Delta\varepsilon<0$), and the mixture is homogenized.

Use in Test Cells without Pre-Alignment Layer:

The mixture formed is introduced into a test cell (without polyimide alignment layer, layer thickness d≈4.0 μm, ITO coating on both sides, structured ITO for multidomain switching, without passivation layer). The LC medium has a spontaneous homeotropic (vertical) alignment with respect to the substrate surfaces. This alignment remains stable up to the clearing point, and the VA cell formed can be switched reversibly by application of a voltage.

VA alignment layers which are used for PM-VA, PVA, MVA and analogous technologies are no longer necessary with the use of additives such as polymerizable self-alignment additive 1.

Mixture Example 2

Polymerizable self-alignment additive 1 (2.0% by weight) is added to a nematic LC medium H15 of the VA-IPS type ($\Delta\varepsilon>0$), and the mixture is homogenized.

Use in Test Cells without Pre-Alignment Layer:

The mixture formed is introduced into a test cell (without polyimide alignment layer, layer thickness d≈4 μm, ITO interdigital electrodes arranged on one substrate surface, glass on the opposite substrate surface, without passivation layer). The LC medium has a spontaneous homeotropic (vertical) alignment with respect to the substrate surfaces. This alignment remains stable up to the clearing point, and the VA-IPS cell formed can be switched reversibly by application of a voltage.

VA alignment layers which are used for VA-IPS, HT-VA and analogous technologies are no longer necessary with the use of additives such as polymerizable self-alignment additive 1.

Mixture Examples 3-20

Polymerizable self-alignment additives 2-19 (% by weight in accordance with Table 5) are added to a nematic LC medium H1 ($\Delta\varepsilon<0$) analogously to Mixture Example 1, and the mixture is homogenized. The mixtures formed are introduced into test cells without pre-alignment layer. The LC media have a spontaneous homeotropic (vertical) alignment with respect to the substrate surfaces. This alignment remains stable up to the clearing point, and the VA cells formed can be switched reversibly by application of a voltage.

Mixture Examples 21-33

Polymerizable self-alignment additives 2-4, 7, 10, 12-19 (% by weight in accordance with Table 5) are added to a nematic LC medium H15 ($\Delta\varepsilon>0$) analogously to Mixture Example 2, and the mixture is homogenized. The mixtures formed are introduced into test cells without pre-alignment layer. The LC media have a spontaneous homeotropic (vertical) alignment with respect to the substrate surfaces. This alignment remains stable up to the clearing point, and the VA-IPS cells formed can be switched reversibly by application of a voltage.

Mixture Examples 34-98

Polymerizable self-alignment additives 1, 4, 13, 18 and 19 (% by weight in accordance with Table 5) are added to nematic LC media H2-H14 ($\Delta\varepsilon<0$) analogously to Mixture Example 1, and the mixture is homogenized. The mixtures formed are introduced into test cells without pre-alignment layer (cf. Mixture Example 1). The LC media have a spontaneous homeotropic (vertical) alignment with respect to the substrate surfaces. This alignment remains stable up to the clearing point, and the VA cells formed can be switched reversibly by application of a voltage.

Mixture Examples 99-123

Polymerizable self-alignment additives 1, 4, 13, 18 and 19 (% by weight in accordance with Table 5) are added to nematic LC media H16-H20 ($\Delta\varepsilon>0$) analogously to Mixture Example 2, and the mixture is homogenized. The mixtures formed are introduced into test cells without pre-alignment layer. The LC media have a spontaneous homeotropic (vertical) alignment with respect to the substrate surfaces. This alignment remains stable up to the clearing point, and the VA-IPS cells formed can be switched reversibly by application of a voltage.

Mixture Examples 1a, 3a-5a, 8a, 11a, 13a-19a (polymerization of Mixture Examples 1,3-5, 8, 11, 13-19)

In each case, a polymerizable self-alignment additive 1, 2-4, 7, 10, 12-18 (% by weight in accordance with Table 5) is added to a nematic LC medium H1 ($\Delta\varepsilon<0$), and the mixture is homogenized.

Use in Test Cells without Pre-Alignment Layer:

The mixtures formed are introduced into test cells (without polyimide alignment layer, layer thickness d≈4.0 μm, ITO coating on both sides (structured ITO for multidomain switching), without passivation layer). The LC media have a spontaneous homeotropic (vertical) alignment with respect to the substrate surfaces. This alignment remains stable up to the clearing point, and the VA cell formed can be switched reversibly by application of a voltage.

While applying a voltage greater than the optical threshold voltage (for example 14 Vpp), the VA cells are irradiated for 12 min with UV light having an intensity of 100 $mW/cm^2$ at 20° C. with a 340 nm band-pass filter. This causes polymerization of the polymerizable compounds. The homeotropic alignment is thus additionally stabilized, a 'pre-tilt' is established, and a polymer layer forms (Table 1). The PSA-VA cells obtained can be switched reversibly up to the clearing point on application of a voltage. The response times are shortened compared with the unpolymerized cell. The threshold voltages ($V_{10}$) change (Table 2). Depending on the chemical structure of the polymerizable component, the VHR (voltage holding ratio) can be improved slightly (Table 3).

The polymerization can also be carried out without application of a voltage. The homeotropic alignment is thus additionally stabilized and a polymer layer forms without a 'pre-tilt' being established. The polymer layer acts as protective layer and improves the long-term stability of the PSA-VA cell.

VA alignment layers which are used for PSA, PS-VA and analogous technologies are no longer necessary with the use of additives such as the polymerizable self-alignment additives 1-4.

Mixture Examples 1b, 3b-5b, 8b, 11 b, 13b-19b (Polymer Stabilization of Mixture Examples 1a, 3a-5a, 8a, 11a, 13a-19a)

A polymerizable compound (RM-1, 0.3% by weight) and a polymerizable self-alignment additive 1, 2-4, 7, 10, 12-18 (% by weight in accordance with Table 5) are added to a nematic LC medium H1 (Δε<0), and the mixture is homogenized.

Use in Test Cells without Pre-Alignment Layer:

The mixtures formed are introduced into test cells (without polyimide alignment layer, layer thickness d≈4.0 μm, ITO coating on both sides (structured ITO for multidomain switching), without passivation layer). The LC media have a spontaneous homeotropic (vertical) alignment with respect to the substrate surfaces. This alignment remains stable up to the clearing point, and the VA cell formed can be switched reversibly by application of a voltage.

While applying a voltage greater than the optical threshold voltage (for example 14 Vpp), the VA cells are irradiated for 12 min with UV light having an intensity of 100 mW/cm$^2$ at 20° C. with a 340 nm band-pass filter. This causes polymerization of the polymerizable compounds. The homeotropic alignment is thus additionally stabilized, a 'pre-tilt' is established, and a polymer layer forms (Table 1). The PSA-VA cells obtained can be switched reversibly up to the clearing point on application of a voltage. The response times are shortened compared with the unpolymerized cell. The threshold voltages ($V_{10}$) change (Table 2). Depending on the chemical structure of the polymerizable components, the VHR (voltage holding ratio) can be improved slightly (Table 4).

The polymerization can also be carried out without application of a voltage. The homeotropic alignment is thus additionally stabilized and a polymer layer forms without a 'pre-tilt' being established. The polymer layer acts as protective layer and improves the long-term stability of the PSA-VA cell.

VA alignment layers which are used for PSA, PS-VA and analogous technologies are no longer necessary with the use of additives such as the polymerizable self-alignment additives 1-4.

TABLE 1

Layer thickness d and roughness $R_a$ of the polymer layer formed after UV irradiation. Host H1 in combination with polymerizable self-alignment additive (PSAA). Test cell of the PSA type. Polymerization conditions: 0 Vpp, 15 min, 100 mW/cm$^2$, 340 nm band-pass filter, 40° C. Cell preparation for AFM measurements: the cells are rinsed with cyclohexane after the irradiation, the cell substrates are separated from one another and used for the measurements (Park or Veeco, room temperature).

| Mixture Example | PSAA | Further polym. comp. | $R_a$/nm | d/nm |
|---|---|---|---|---|
| 1a | 1 | | 1.4 | 12 |
| 3a | 2 | | 3.6 | 20 |
| 5a | 4 | | 2.2 | — |
| 6a | 5 | | 2.5 | 46 |
| 1b | 1 | RM-1 | 2.2 | 33 |
| 6b | 5 | RM-1 | 1.4 | 52 |

TABLE 2

Response times and threshold voltages $V_{10}$ of VA and PSA cells. Host H1 in combination with polymerizable self-alignment additive (PSAA). Polymerization conditions: UV-1 (340 nm band-pass filter, 20° C., 14 Vpp, 2 min, 50 mW/cm$^2$); UV-2 (340 nm band-pass filter, 20° C., 0 Vpp, 10 min, 100 mW/cm$^2$).

| Mixture Example | PSAA | Further polym. comp. | UV irradiation UV-1 + -2 | Cell type | $V_{10}$/V | Response time/ms 0 V→5 V |
|---|---|---|---|---|---|---|
| 1 | 1 | | No | VA | 2.50 | 32 |
| 3 | 2 | | No | VA | 2.43 | 35 |
| 4 | 3 | | No | VA | 2.45 | 33 |
| 5 | 4 | | No | VA | 2.51 | 31 |
| 7 | 6 | | No | VA | 2.47 | 34 |
| 8 | 7 | | No | VA | 2.48 | 31 |
| 10 | 9 | | No | VA | 2.42 | 34 |
| 13 | 12 | | No | VA | 2.48 | 28 |
| 14 | 13 | | No | VA | 2.48 | 34 |
| 15 | 14 | | No | VA | 2.50 | 28 |
| 17 | 16 | | No | VA | 2.51 | 28 |
| 19 | 18 | | No | VA | 2.49 | 31 |
| 1a | 1 | | Yes | PSA | 2.58 | 23 |
| 3a | 2 | | Yes | PSA | 1.57 | 20 |
| 4a | 3 | | Yes | PSA | 2.53 | 16 |
| 5a | 4 | | Yes | PSA | 2.47 | 27 |
| 8a | 7 | | Yes | PSA | 2.53 | 16 |
| 14a | 13 | | Yes | PSA | 2.53 | 29 |
| 1b | 1 | RM-1 | Yes | PSA | 2.64 | 19 |
| 3b | 2 | RM-1 | Yes | PSA | — | — |
| 4b | 3 | RM-1 | Yes | PSA | 2.60 | 17 |
| 5b | 4 | RM-1 | Yes | PSA | 2.57 | 29 |
| 14b | 13 | RM-1 | Yes | PSA | 2.58 | 26 |

TABLE 3

VHR (voltage holding ratio, 60 Hz, 100° C., 5 min) before and after heating (2 h, 120° C.). Host mixture H1 in combination with polymerizable self-alignment additive (PSAA).

| | | | | VHR/% | |
|---|---|---|---|---|---|
| Mixture Example | PSAA | UV irradiation | Cell type | Before heating | After heating |
| H1 | — | No | | 99.0 | 99.3 |
| 1 | 1 | No | VA | 98.6 | 98.6 |
| 3 | 2 | No | VA | 97.9 | 96.0 |
| 4 | 3 | No | VA | 97.4 | 98.3 |
| 5 | 4 | No | VA | 96.4 | — |
| 8 | 7 | No | VA | 96.7 | — |
| 13 | 12 | No | VA | 96.4 | 96.9 |
| 14 | 13 | No | VA | 96.4 | 92.0 |
| 15 | 14 | No | VA | 97.2 | 94.8 |
| 17 | 16 | No | VA | 97.7 | 97.8 |
| 19 | 18 | No | VA | 97.6 | 97.8 |

TABLE 4

VHR (voltage holding ratio, 6 Hz, 100° C., 5 min) before and after UV irradiation. Host mixture H1 in combination with polymerizable self-alignment additive (PSAA). Polymerization conditions: UV-1 (340 nm band-pass filter, 20° C., 0 Vpp, 2 min, 50 mW/cm$^2$); UV-2 (340 nm band-pass filter, 20° C., 0 Vpp, 10 min, 100 mW/cm$^2$).

| Mixture Example | PSAA | Further polym. comp. | UV irradiation UV-1 + -2 | Cell type | Before UV | After UV |
|---|---|---|---|---|---|---|
| H1 | — | | Yes | | 94.1 | 93.1 |
| H1 | — | RM-1 | Yes | | 93.1 | 94.7 |
| 1a | 1 | | Yes | PSA | 92.5 | 85.9 |
| 3a | 2 | | Yes | PSA | 89.6 | 92.8 |
| 1b | 1 | RM-1 | Yes | PSA | 92.6 | 89.9 |
| 3b | 2 | RM-1 | Yes | PSA | 90.6 | 97.4 |
| 5b | 4 | RM-1 | Yes | PSA | 91.3 | 93.2 |

TABLE 5

| % by weight for Mixture Examples 1-123 | |
|---|---|
| PSAA | % by wt. |
| 1 | 2.0 |
| 2 | 2.0 |
| 3 | 2.0 |
| 4 | 0.3 |
| 5 | 4.0 |
| 6 | 3.0 |
| 7 | 2.5 |
| 8 | 3.0 |
| 9 | 3.0 |
| 10 | 2.5 |
| 11 | 3.0 |
| 12 | 2.0 |
| 13 | 1.5 |
| 14 | 0.3 |
| 15 | 0.3 |
| 16 | 0.3 |
| 17 | 0.5 |
| 18 | 0.5 |
| 19 | 3.0 |

The invention claimed is:

1. A liquid-crystal medium comprising a low-molecular-weight, non-polymerizable liquid-crystalline component and a polymerizable or polymerized component comprising one or more polymerizable compounds of formula I, where the polymerized component is obtainable by polymerization of the polymerizable component, $$R^1\text{-}[A^3Z^3]_m\text{-}[A^2]_k\text{-}[Z^2]_n\text{-}A^1\text{-}R^a \qquad (I)$$

in which $A^1$, $A^2$, $A^3$ each, independently of one another, denote an aromatic, heteroaromatic, alicyclic or heterocyclic group, which may also contain fused rings, and which may also be mono- or polysubstituted by a group L or -Sp-P, L in each case, independently of one another, denotes H, F, Cl, Br, I, —CN, —$NO_2$, —NCO, —NCS, —OCN, —SCN, —C(=O)N($R^0$)$_2$, —C(=O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F or Cl, P denotes a polymerizable group, Sp denotes a spacer group or a single bond, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, —$(CR^0R^{00})_{n1}$—, —CH(-Sp-P)—, —$CH_2$CH(-Sp-P)—, or —CH(-Sp-P)CH(-Sp-P)—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, —$(CR^0R^{00})_{n1}$—, —CH(-Sp-P)—, —$CH_2$CH(-Sp-P)—, or —CH(-Sp-P)CH(-Sp-P)—, n1 denotes 1, 2, 3 or 4, n denotes 0 or 1, m denotes 0, 1, 2, 3, 4, 5 or 6, k denotes 0 or 1, $R^0$ in each case, independently of one another, denotes alkyl having 1 to 12 C atoms, $R^{00}$ in each case, independently of one another, denotes H or alkyl having 1 to 12 C atoms, $R^1$, independently of one another, denotes H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, $R^a$ denotes an anchor group of the formula

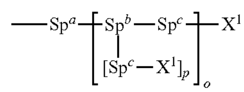

or

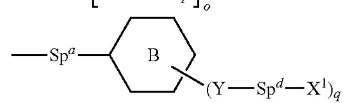

p denotes 1 or 2, q denotes 2 or 3,

B denotes a substituted or unsubstituted ring system or condensed ring system,

Y, independently of one another, denotes —O—, —S—, —C(O)—, —C(O)O—, —OC(O)—, —$NR^{11}$— or a single bond, o denotes 0 or 1, $X^1$, independently of one another, denotes H, alkyl, fluoroalkyl, OH, $NH_2$, $NHR^{11}$, $NR^{11}_2$, $OR^{11}$, C(O)OH, —CHO, where at least one group $X^1$ denotes a radical selected from —OH, —$NH_2$, $NHR^{11}$, C(O)OH and —CHO, $R^{11}$ denotes alkyl having 1 to 12 C atoms, $Sp^a$, $Sp^c$, $Sp^d$ each, independently of one another, denote a spacer group or a single bond, and $Sp^b$ denotes a tri- or tetravalent group, where the compound of the formula I contains at least one polymerizable group P within the groups $A^1$, $A^2$, $A^3$, $Z^2$ and $Z^3$, as are present; and wherein said liquid-crystal medium further comprises:

(a) one or more compounds selected from the compounds of formulae A, B and C,

A

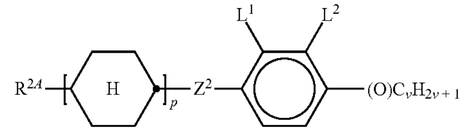

B

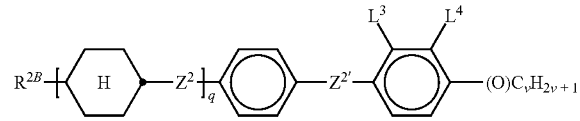

-continued

C

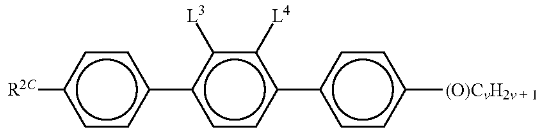

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals is each optimally replaced by —O—, —S—,

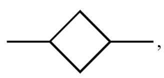

—C≡C—, —$CF_2O$—, —$OCF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, or —CH═$CHCH_2O$—, (O) denotes —O— or a single bond, p denotes 1 or 2, q denotes 0 or 1, and v denotes 1 to 6; or (b) one or more compounds selected from the compounds of formulae II and III

II

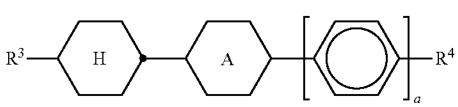

III

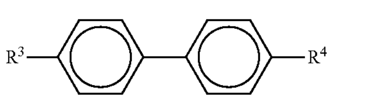

in which ring A denotes 1,4-phenylene or trans-1,4-cyclohexylene, a is 0 or 1, $R^3$ in each case, independently of one another, denotes alkyl having 1 to 9 C atoms or alkenyl having 2 to 9 C atoms, and $R^4$ in each case, independently of one another, denotes an unsubstituted or halogenated alkyl radical having 1 to 12 C atoms, where, in addition, one or two non-adjacent $CH_2$ groups are each optionally replaced by —O—, —CH═CH—, —CH═CF—, —(CO)—, —O(CO)— or —(CO)O— in such a way that O atoms are not linked directly to one another; or (c) one or more compounds selected from the compounds of formulae IV and V

IV

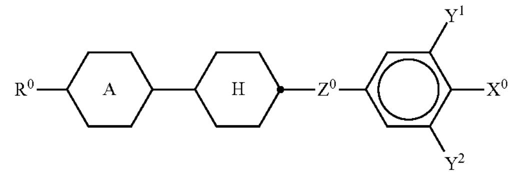

V

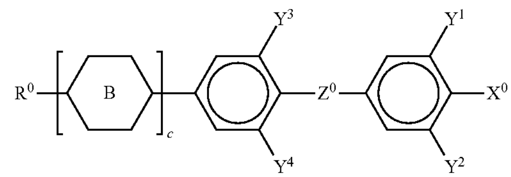

in which $R^0$ denotes an alkyl or alkoxy radical having 1 to 15 C atoms, in which, in addition, one or more $CH_2$ groups in these radicals are each optionally, independently of one another, replaced by —C≡C—, —$CF_2O$—, —CH═CH—,

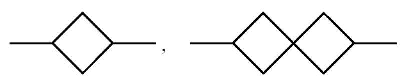

—O—, —(CO)O— or —O(CO)— in such a way that O atoms are not linked directly to one another, and in which, in addition, one or more H atoms are each optionally replaced by halogen, ring A denotes

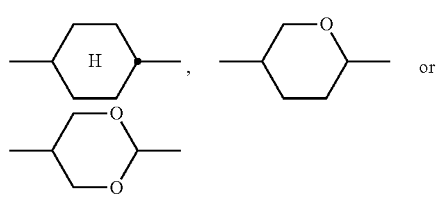

ring B, independently of one another, denotes 1,4-phenylene, optionally substituted by one or two F or Cl,

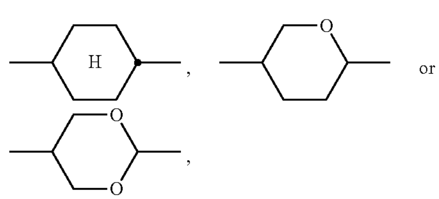

$X^0$ denotes F, Cl, CN, $SF_5$, SCN, NCS, a halogenated alkyl group, a halogenated alkenyl group, a halogenated alkoxy group or a halogenated alkenyloxy group, each having up to 6 C atoms, $Y^{1-4}$ each, independently of one another, denote H or F, $Z^0$ denotes —$CF_2O$—, —(CO)O— or a single bond, and c denotes 0, 1 or 2.

2. The medium according to claim 1, wherein, in formula I, $A^1$, $A^2$, $A^3$ each, independently of one another, denote 1,4-phenylene, naphthalene-1,4-diyl or naphthalene-2,6-diyl, where, in addition, one or more CH groups in these groups may each be replaced by N, cyclohexane-1,4-diyl, in which, in addition, one or more non-adjacent $CH_2$ groups are each optionally replaced by O or S, 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl, where all these groups are unsubstituted or mono- or polysubstituted by a group L or -Sp-P.

3. The medium according to claim 1, wherein the one or more compounds of formula I are selected from the compounds of formula I1,

I1

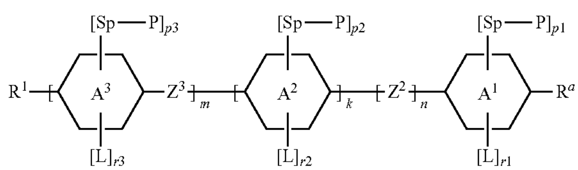

in which $R^1$, $R^a$, A, $A^2$, $A^3$, $Z^2$, $Z^3$, L, Sp, P, k, m and n independently are as defined, and p1, p2, p3 independently denote 0, 1, 2 or 3, and r1, r2, r3 independently denote 0, 1, 2 or 3, where the compound of formula I1 contains at least one polymerizable group P within the groups $A^1$, $A^2$, $A^3$, $Z^2$ and $Z^3$, as are present.

4. The medium according to claim 1, wherein the one or more compounds of formula I each contain in total at least one polymerizable group -Sp-P within the groups $A^1$, $A^2$ and $A^3$, as are present.

5. The medium according to claim 1, wherein the one or more compounds of formula I are selected from compounds of formulae IA, IB, IC, ID and IE:

IA

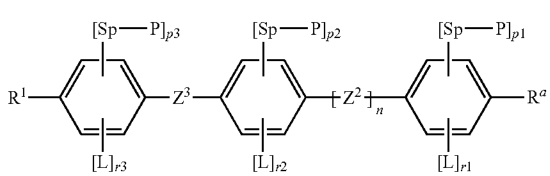

IB

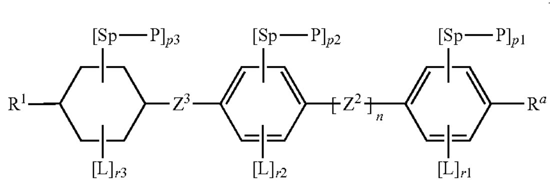

-continued

IC

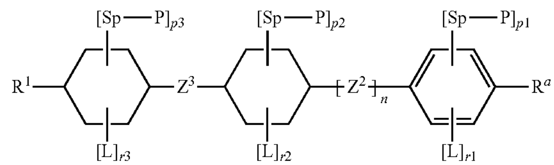

ID

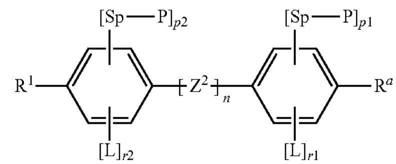

IE

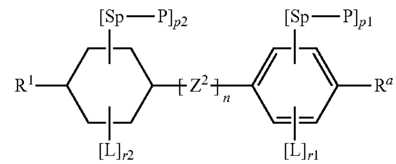

in which $R^1$, $R^a$, $Z^2$, $Z^3$, L, Sp, P and n independently are as defined, p1, p2, p3 independently denote 0, 1, 2 or 3, and r1, r2, r3 independently denote 0, 1, 2 or 3, where each of the compounds of formulae IA, IB, IC, ID and IE contains at least one polymerizable group P.

6. The medium according to claim 1, wherein, besides said one or more compounds of formula I, the polymerizable or polymerized component of said medium further comprises one or more polymerizable or polymerized compounds, where the polymerized component is obtainable by polymerization of the polymerizable component.

7. The medium according to claim 1, wherein, besides said one or more compounds of formula I, said medium further comprises one or more non-polymerizable compounds of formula I', $$R^1\text{-}[A^3\text{-}Z^3]_m\text{-}[A^2]_k\text{-}[Z^2]\text{-}A^1\text{-}R^a \qquad \text{I'}$$

in which m, k, n and the group $R^a$ are as defined for formula I, $A^1$, $A^2$, $A^3$ each, independently of one another, denote an aromatic, heteroaromatic, alicyclic or heterocyclic group, which may also contain fused rings, and which may also be mono- or polysubstituted by a group L, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, or —$(CR^0R^{00})_{n1}$—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$, —CH═CH—, —CF═CF—, —C≡C—, —CH═CH—COO—, —OCO—CH═CH—, or —$(CR^0R^{00})_{n1}$—, n1 denotes 1, 2, 3 or 4, L in each case, independently of one another, denotes H, F, Cl, Br, I, —CN, —$NO_2$, —NCO, —NCS, —OCN, —SCN, —C(═O)N($R^0$)$_2$, —C(═O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms are each optionally replaced by F or Cl, $R^0$ in each case, independently of one another, denotes alkyl having 1 to 12 C atoms, $R^0$ in each case, independently of one another, denotes H or alkyl having 1 to 12 C atoms, and $R^1$, independently of one another, denotes H, halogen, straight-chain, branched or cyclic alkyl having 1 to 25 C atoms, in which, in addition, one or more non-adjacent $CH_2$ groups are each optionally replaced by —O—, —S—, —CO—, —CO—O—, —O—CO—, or —O—CO—O— in such a way that O and/or S atoms are not linked directly to one another and in which, in addition, one or more H atoms are each optionally replaced by F or Cl.

8. The medium according to claim 7, wherein said one or more non-polymerizable compounds of formula I' are selected from the following formulae:

IA'

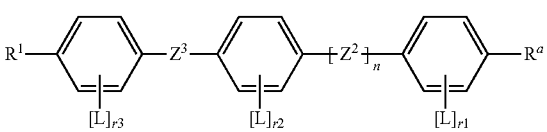

IB'

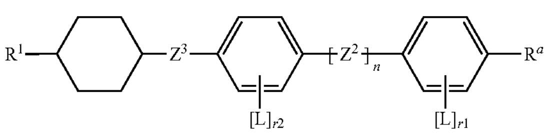

IC'

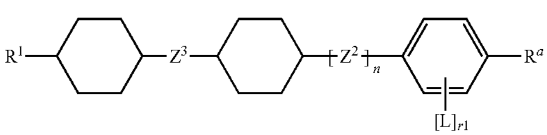

ID'

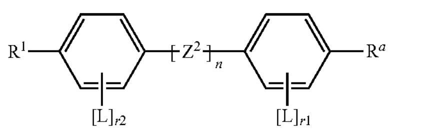

IE'

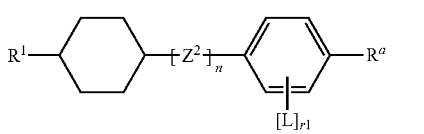

in which $R^1$, $R^a$, $Z^2$, $Z^3$, L and n independently are as defined in claim 7, and r1, r2, r3 independently denote 0, 1, 2, 3 or 4.

9. The medium according to claim 1, wherein said one or more compounds of formula I comprise one or more compounds selected from the following formulae:

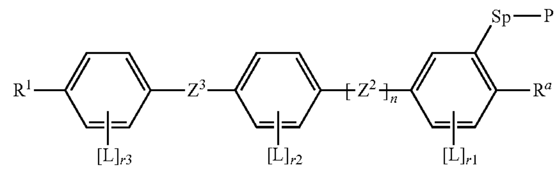

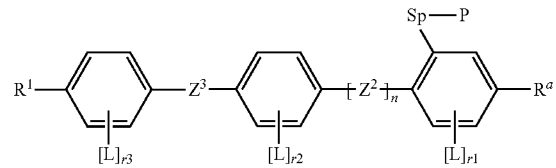

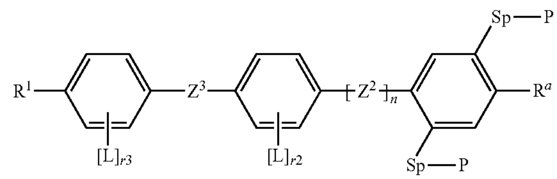

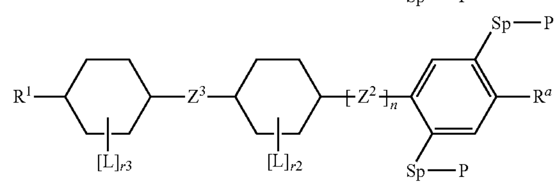

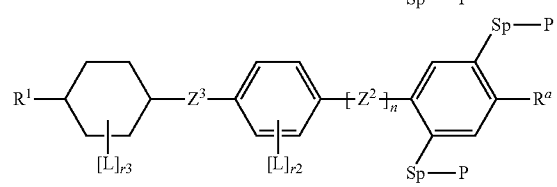

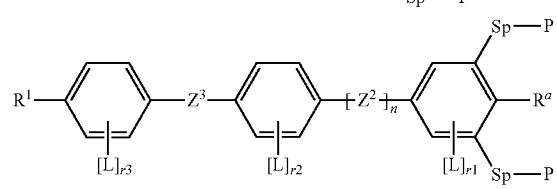

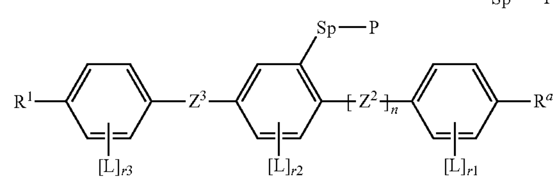

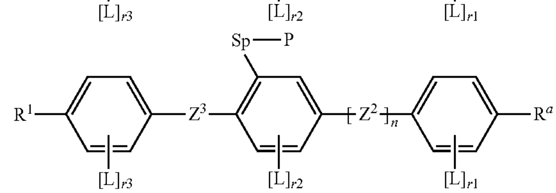

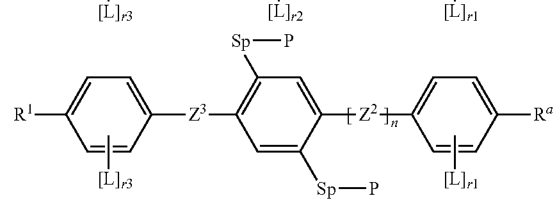

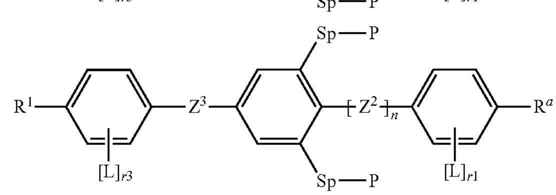

-continued

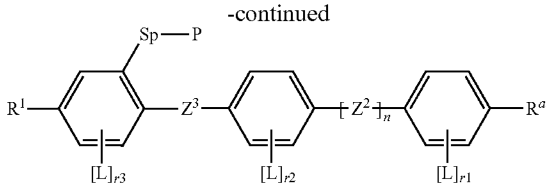

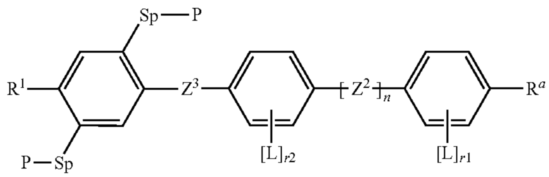

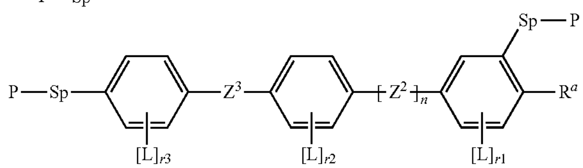

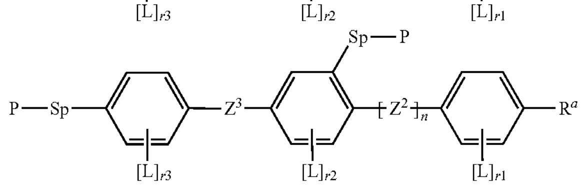

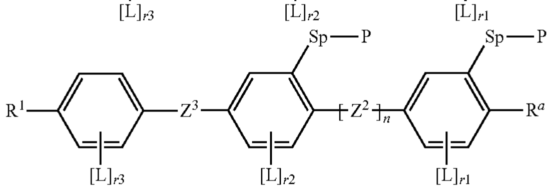

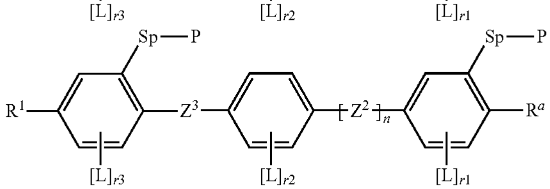

in which

L, Sp, P, $R^a$ and $Z^2$ independently are as defined in claim 1, $Z^3$ denotes a single bond or $—CH_2CH_2—$, n denotes 0 or 1, p1, p2, p3 independently denote 0, 1, 2 or 3, r1, r2, r3 independently denote 0, 1, 2 or 3, and $R^1$ denotes H, halogen, straight-chain, branched or cyclic alkyl having 1 to 25 C atoms, in which, in addition, one or more non-adjacent $CH_2$ groups are each optionally replaced by —O—, —S—, —CO—, —CO—O—, —O—CO—, or —O—CO—O— in such a way that O and/or S atoms are not linked directly to one another and in which, in addition, one or more H atoms are each optionally replaced by F or Cl.

10. The medium according to claim 1, wherein group $R^a$ in formula I contains one, two or three OH groups.

11. The medium according to claim 1, wherein group $R^a$ denotes a group selected from $$—Sp^a—X^1 \quad \text{and} \quad —Sp^a—\underset{[Sp^c—X^1]_p}{Sp^b}—Sp^c—X^1$$

in which $Sp^a$, $Sp^b$, $Sp^c$, p and $X^1$ have the meaning as defined.

12. The medium according to claim 1, wherein group $R^a$ denotes a group selected from the following part-formulae:

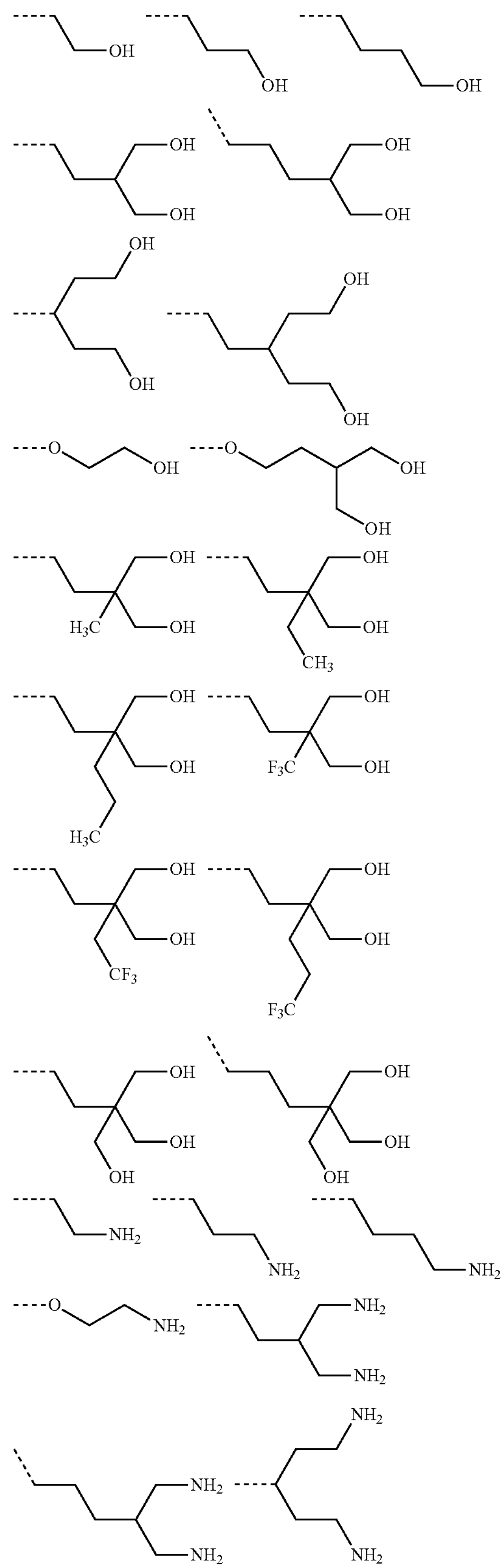

-continued

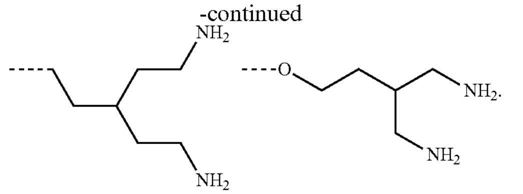

13. The medium according to claim 1, wherein, for the one or more compounds of formula I, n=0.

14. The medium according to claim 1, wherein, for the one or more compounds of formula I, P is vinyloxy, acrylate, methacrylate, fluoroacrylate, chloroacrylate, oxetane or epoxide.

15. The medium according to claim 1, wherein said medium comprises compounds of formula I in a concentration of less than 10% by weight.

16. The medium according to claim 1, wherein said medium comprises one or more polymerizable compounds of formula M or a (co)polymer comprising compounds of formula M:

$$P^1\text{-}Sp^1\text{-}A^2\text{-}(Z^1\text{-}A^1)_n\text{-}Sp^2\text{-}P^2 \qquad \text{M}$$

in which the individual radicals have the following meanings:

$P^1$, $P^2$ each independently denote a polymerizable group, $Sp^1$, $Sp^2$ each independently denote a spacer group, $A^1$, $A^2$ each, independently of one another, denote a radical selected from the following groups:

a) the group consisting of trans-1,4-cyclohexylene, 1,4-cyclohexenylene and 4,4'-bicyclohexylene, in which, in addition, one or more non-adjacent $CH_2$ groups are each optionally replaced by —O— or —S— and in which, in addition, one or more H atoms are each optionally replaced by a group L, or selected from

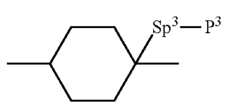

b) the group consisting of 1,4-phenylene and 1,3-phenylene, in which, in addition, one or two CH groups are each optionally replaced by N and in which, in addition, one or more H atoms are each optionally replaced by a group L or $\text{-}Sp^3\text{-}P$, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L, d) the group consisting of saturated, partially unsaturated or fully unsaturated, and optionally substituted, polycyclic radicals having 5 to 20 cyclic C atoms, one or more of which may each optionally, in addition, be replaced by heteroatoms, $P^3$ denotes a polymerizable group, $Sp^3$ denotes a spacer group, n denotes 0, 1, 2 or 3, $Z^1$ in each case, independently of one another, denotes —CO—O—, —O—CO—, —$CH_2$O—, —O$CH_2$—, —$CF_2$O—, —O$CF_2$—, —$(CH_2)_n$— where n is 2, 3 or 4, —O—, —CO—, —C($R^cR^d$)—, —$CH_2CF_2$—, —$CF_2CF_2$— or a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, and $R^c$ and $R^d$ each, independently of one another, denote H, F, $CF_3$, or alkyl having 1 to 6 C atoms, where one or more of the groups $P^1\text{-}Sp^1\text{-}$, $\text{-}Sp^2\text{-}P^2$ and $\text{-}Sp^3\text{-}P^3$ may denote a radical $R^{aa}$, with the proviso that at least one of the groups $P^1\text{-}Sp^1\text{-}$, $\text{-}Sp^2\text{-}P^2$ and $\text{-}Sp^3\text{-}P^3$ present does not denote $R^{aa}$, $R^{aa}$ denotes H, F, Cl, CN or straight-chain or branched alkyl having 1 to 25 C atoms, in which, in addition, one or more non-adjacent $CH_2$ groups are each optionally replaced, independently of one another, by C($R^0$)=C($R^{00}$)—, —C≡C—, —O—, —S—, —CO—, —CO—O—, —O—CO—, or —O—CO—O— in such a way that O and/or S atoms are not linked directly to one another, and in which, in addition, one or more H atoms are each optionally replaced by F, Cl, CN or $P^1\text{-}Sp^1\text{-}$, where the groups —OH, —$NH_2$, —SH, —NHR, —C(O)OH and —CHO are not present in $R^{aa}$, and $R^0$, $R^{00}$ each, independently of one another, denote H, F or straight-chain or branched alkyl having 1 to 12 C atoms, in which, in addition, one or more H atoms are each optionally replaced by F.

17. The medium according to claim 16, wherein the polymerizable or polymerized component comprises 0.01 to 5% by weight of one or more compounds of the formula M.

18. The medium according to claim 7, wherein the polymerizable or polymerized component comprises 0.01 to 10% by weight of one or more non-polymerizable compounds of the formula I' containing at least one anchor group.

19. The medium according to claim 1, wherein the polymerizable or polymerized component comprises one or more compounds selected from the compounds of the following formulae:

M1

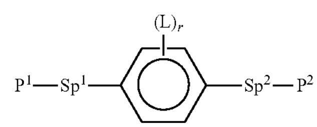

M2

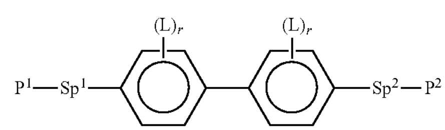

M3

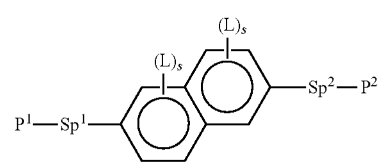

M4

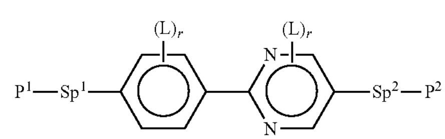

-continued
M5
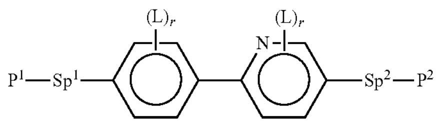
M6
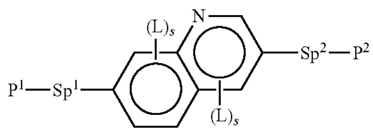
M7
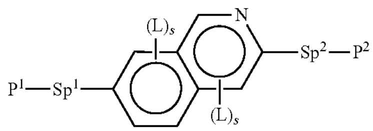
M8
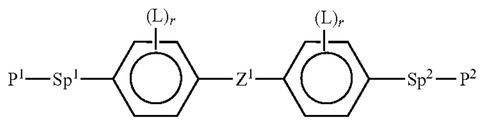
M9
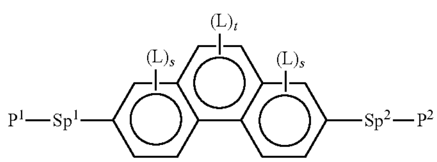
M10
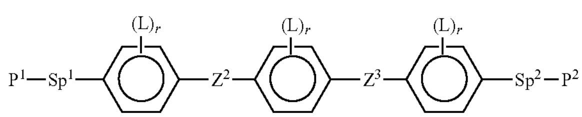
M11
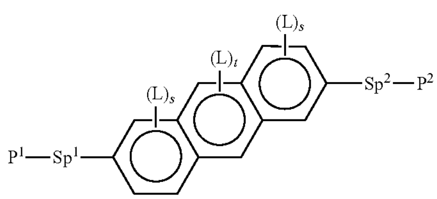
M12
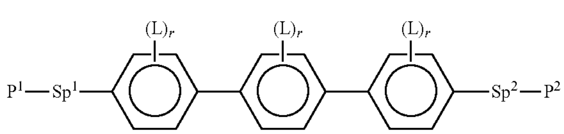
M13
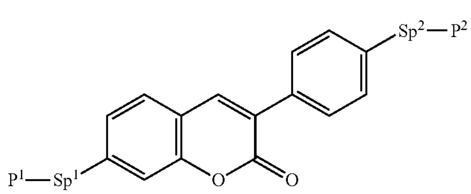
M14
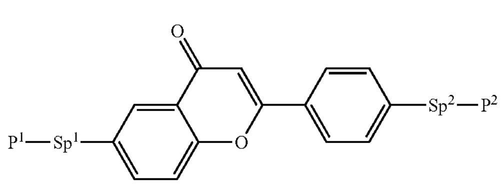
-continued
M15
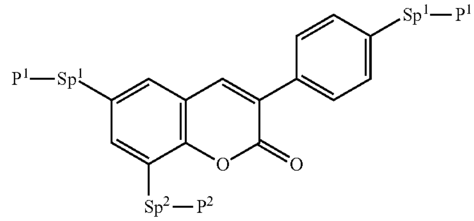
M16
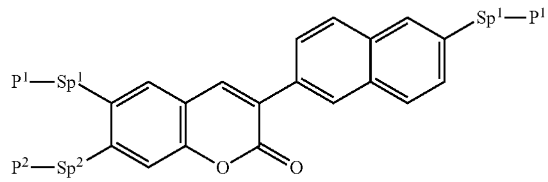
M17
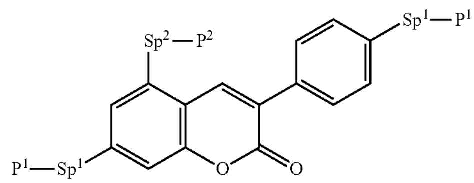
M18
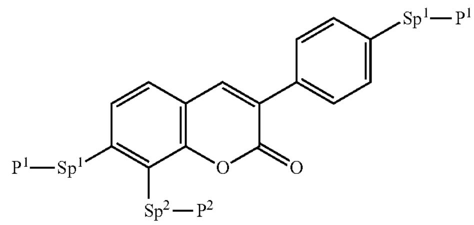
M19
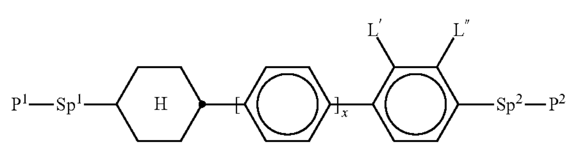
M20
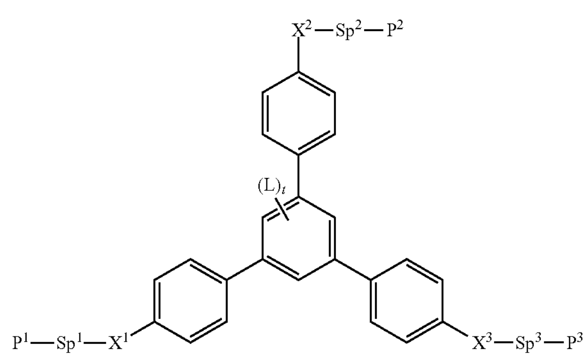
M21
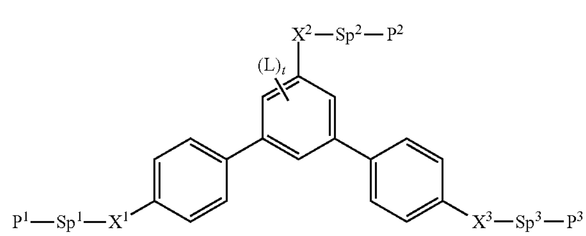

-continued
M22
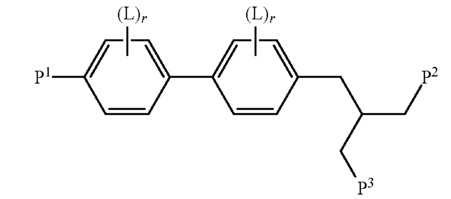
M23
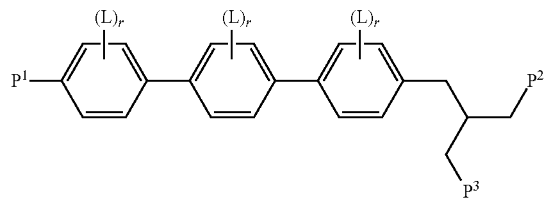
M24
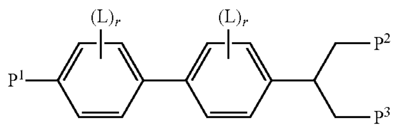
M25
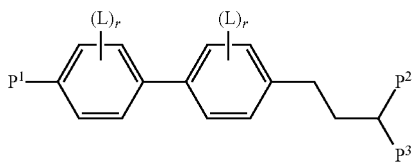
M26
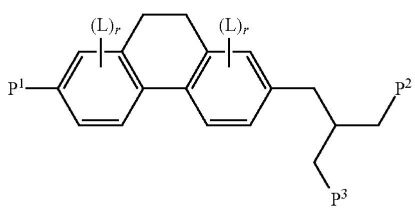
M27
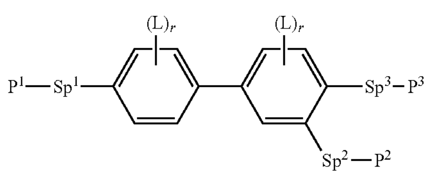
M28
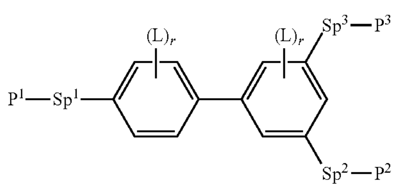
M29
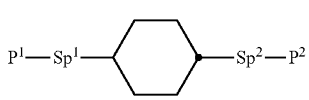
M30
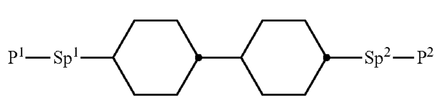
M31
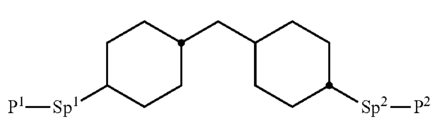
-continued
M32
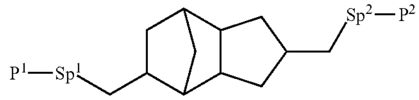
M33
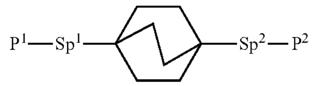
M34
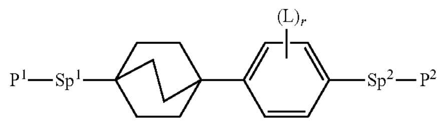
M35
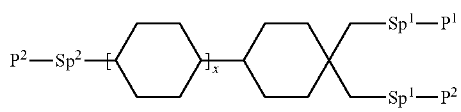
M36
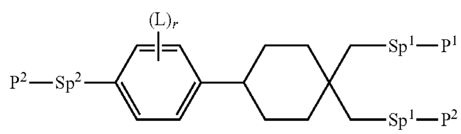
M37
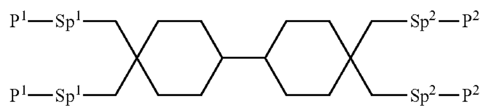
M38
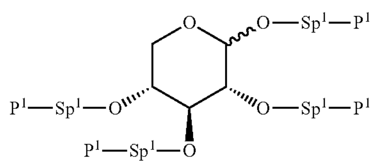
M39
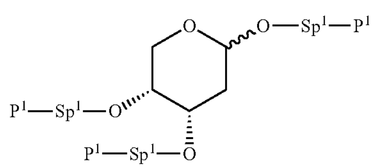
M40
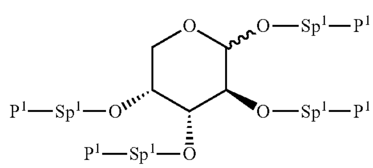
M41
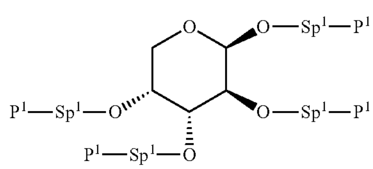
M42
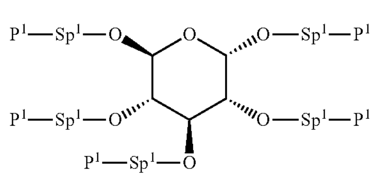
in which the individual radicals have the following meanings:

$P^1$, $P^2$ and $P^3$ each, independently of one another, denote a polymerizable group, $Sp^1$, $Sp^2$ and $Sp^3$ each, independently of one another, denote a single bond or a spacer group, where, in addition, one or more of the radicals $P^1$-Sp-, $P^2$-$Sp^2$- and $P^3$-$Sp^3$- may denote a radical $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups are each optionally replaced, independently of one another, by $C(R^0)$=$C(R^0)$—, —C≡C—, —$N(R^0)$—, —O—, —S—, —CO—, —CO—O—, —O—CO—, or —O—CO—O— in such a way that 0 and/or S atoms are not linked directly to one another, and in which, in addition, one or more H atoms are each optionally replaced by F, Cl, CN or $P^1$-$Sp^1$-, where —OH, —$NH_2$, —SH, —NHR, —C(O)OH and —CHO are not present in the group R", $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$— where n is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

20. A liquid-crystal display comprising a liquid-crystal cell having two substrates and at least two electrodes, where at least one substrate is transparent to light and at least one substrate has one or two electrodes, and having a layer of a liquid-crystal medium according to claim 1 located between the substrates, where the one or more compounds of formula I are suitable for effecting homeotropic alignment of the liquid-crystal medium with respect to the substrate surfaces.

21. The display according to claim 20, wherein the substrates have no alignment layers for homeotropic alignment.

22. The display according to claim 20, wherein the substrates have alignment layers on one or both sides.

23. The display according to claim 20, wherein said display is a VA display containing a liquid-crystal medium having negative dielectric anisotropy and electrodes arranged on opposite substrates.

24. The display according to claim 20, wherein said display is a VA-IPS display containing a liquid-crystal medium having positive dielectric anisotropy and interdigital electrodes arranged on at least one substrate.

25. A process for the preparation of liquid-crystal medium, said process comprising mixing one or more compounds of the formula I according to claim 1 with a low-molecular-weight liquid-crystalline component, and one or more polymerizable compounds and/or any desired additives are optionally added.

26. A compound of formula I1

I1

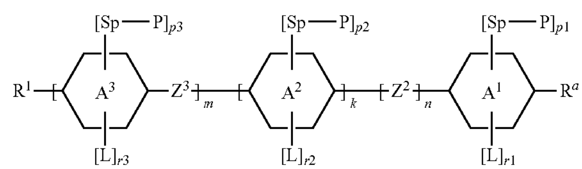

in which $A^1$, $A^2$, $A^3$ each, independently of one another, denote an aromatic, heteroaromatic, alicyclic or heterocyclic group, which may also contain fused rings, and which is unsubstituted or mono- or polysubstituted by a group L or -Sp-P, L in each case, independently of one another, denotes H, F, Cl, Br, I, —CN, —$NO_2$, —NCO, —NCS, —OCN, —SCN, —C(=O)$N(R^0)_2$, —C(=O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms are each optionally replaced by F or Cl, P denotes a polymerizable group, Sp denotes a spacer group or a single bond, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, —$(CR^0R^{00})_{n1}$—, —CH(Sp-P)—, —$CH_2$CH(-Sp-P)—, or —CH(-Sp-P)CH(-Sp-P)—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$, —CH=CH—, —CF=CF—, —C≡C—, —CH=CH—COO—, —OCO—CH=CH—, —$(CR^0R^{00})_{n1}$—, —CH(-Sp-P)—, —$CH_2$CH(-Sp-P)—, or —CH(-Sp-P)CH(-Sp-P)—, n1 denotes 1, 2, 3 or 4, n denotes 0 or 1, m denotes 0, 1, 2, 3, 4, 5 or 6, k denotes 1, $R^0$ in each case, independently of one another, denotes alkyl having 1 to 12 C atoms, $R^0$ in each case, independently of one another, denotes H or alkyl having 1 to 12 C atoms, $R^1$, independently of one another, denotes H, halogen, straight-chain, branched or cyclic alkyl having 1 to 25 C atoms, in which, in addition, one or more non-adjacent $CH_2$ groups are each optionally replaced by —O—, —S—, —CO—, —CO—O—, —O—CO—, or —O—CO—O— in such a way that O and/or S atoms are not linked directly to one another and in which, in addition, one or more H atoms are each optionally replaced by F or Cl, or a group -Sp-P, $R^a$ denotes an anchor group of the formula

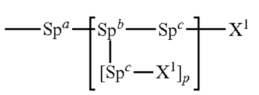

or

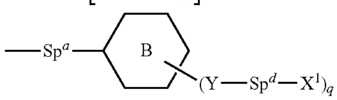

p denotes 1 or 2, q denotes 2 or 3,

B denotes a substituted or unsubstituted ring system or condensed ring system,

Y, independently of one another, denotes —O—, —S—, —C(O)—, —C(O)O—, —OC(O)—, —$NR^{11}$— or a single bond, o denotes 0 or 1, $X^1$, independently of one another, denotes H, alkyl, fluoroalkyl, OH, $NH_2$, $NHR^{11}$, $NR^{11}_2$, $OR^{11}$, C(O)OH, —CHO, where at least one group $X^1$ denotes a radical selected from —OH, —$NH_2$, $NHR^{11}$, C(O)OH and —CHO, $R^{11}$ denotes alkyl having 1 to 12 C atoms, $Sp^a$, $Sp^c$, $Sp^d$ each, independently of one another, denote a spacer group or a single bond, $Sp^b$ denotes a tri- or tetravalent group, p1, p2, p3 independently denote 0, 1, 2 or 3, and r1, r2, r3 independently denote 0, 1, 2 or 3, where the compound of the formula I1 contains at least one polymerizable group P within the groups $A^1$, $A^2$, $A^3$, $Z^2$ and $Z^3$, as are present.

27. A compound according to claim 26, wherein m is 1.

28. A compound according to claim 26, wherein $A^1$ and $A^2$ independently denote 1,4-phenylene or cyclohexane-1,4-diyl, each of which may be mono- or polysubstituted by a group L or -Sp-P.

29. A method for effecting homeotropic alignment with respect to respect to a surface delimiting in a liquid-crystal medium, comprising adding to said medium one or more compounds according to claim 1.

30. A process for the production of a liquid-crystal display comprising a liquid-crystal cell having two substrates and at least two electrodes, where at least one substrate is transparent to light and at least one substrate has one or two electrodes, said process comprising:

filling of the cell with a liquid-crystal medium according to claim 1, where homeotropic alignment of the liquid-crystal medium with respect to the substrate surfaces is established, and polymerizing the polymerizable component(s), optionally with application of a voltage to the cell or under the action of an electric field, in one or more process steps.

31. The medium according to claim 1, wherein said medium contains one or more compounds of the formulae A, B and C.

32. The medium according to claim 31, wherein said one or more compounds of the formulae A, B and C are selected from the following formulae:

A-1

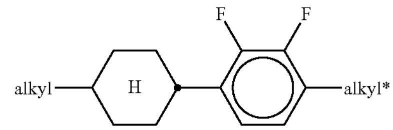

A-2

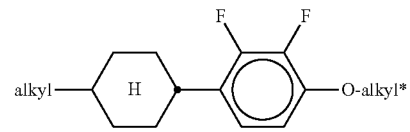

A-7

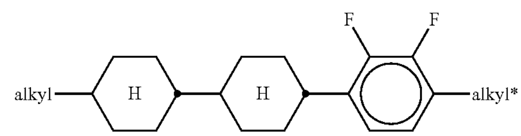

A-8

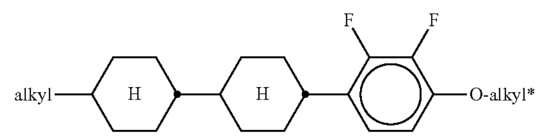

B-1

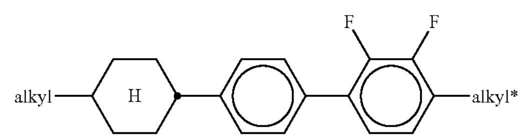

B-2

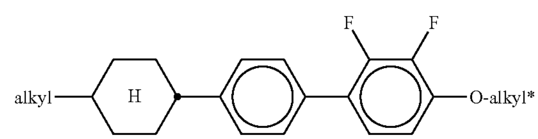

B-11

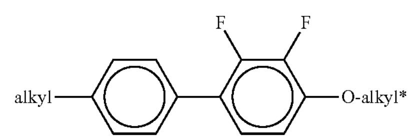

C-1

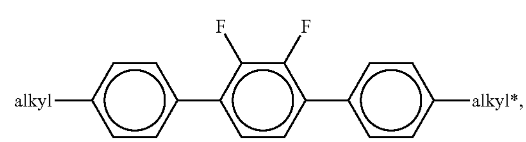

wherein alkyl and alkyl* each, independently of one another, denote a straight-chain alkyl radical having 1-6 C atoms.

33. The medium according to claim 1, wherein said medium contains one or more compounds of the formulae II and III.

34. The medium according to claim 1, wherein said medium contains one or more compounds of the formulae IV and V.

35. The medium according to claim 1, wherein $Sp^a$ denotes a spacer group.

36. The medium according to claim 1, wherein $Sp^a$ denotes a group selected from —$CH_2$—, —$CH_2CH_2$—, —$OCH_2CH_2$—, —$CH_2CH_2CH_2$—, —$OCH_2CH_2CH_2$—, —$CH_2CH_2CH_2CH_2$—, —$OCH_2CH_2CH_2CH_2$—, —$CH_2CH_2OCH_2CH_2$—, and —$OCH_2CH_2OCH_2CH_2$—.

37. The medium according to claim 1, wherein $Sp^c$ or $Sp^d$ each independently denotes a group selected from —$CH_2$—, —$CH_2CH_2$—, —$CH_2CH_2CH_2$—, —$CH_2CH_2CH_2CH_2$—, and —$CH_2CH_2OCH_2CH_2$—.

38. The medium according to claim 1, wherein $R^a$ is

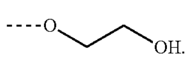

39. The medium according to claim 1, wherein $R^a$ is

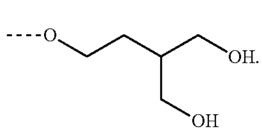

40. The medium according to claim 1, wherein $R^a$ is —O—$CH_2CH_2CH_2OH$.

41. The medium according to claim 1, wherein said medium is nematic.

42. The medium according to claim 1, wherein said medium contains ≤2% by weight of compounds of formula I.

43. A compound according to claim 26, wherein p1+p2+p3 is >0.

44. A compound according to claim 26, wherein p1+p2+p3 is 1 or 2.

45. A compound according to claim 26, wherein p1 is >0.

46. A compound according to claim 26, wherein p1 is 1 or 2.

47. A compound according to claim 26, wherein r1+r2+r3 is >0 and L is not H.

48. A compound according to claim 26, wherein $R^a$ is

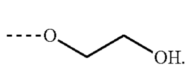

49. A compound according to claim 26, wherein $R^a$ is

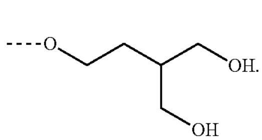

50. A compound according to claim 26, wherein $R^a$ is —O—$CH_2CH_2CH_2OH$.

51. A compound according to claim 26, wherein the polymerizable group P is methacrylate.

52. A compound according to claim 26, wherein groups $A^1$, $A^2$, $A^3$ each independently denote a group selected from a) the group consisting of 1,4-phenylene and 1,3-phenylene, in which, in addition, one or more H atoms are each optionally replaced by L or -Sp-P, b) the group consisting of trans-1,4-cyclohexylene, 1,4-cyclohexenylene and 4,4'-bicyclohexylene, in which, in addition, one or more non-adjacent $CH_2$ groups are each optionally replaced by —O— or —S— wherein, in addition, one or more H atoms are each optionally replaced by F, L, or -Sp-P.

53. A compound according to claim 26, wherein $Sp^a$ denotes a spacer group.

54. A compound according to claim 26, wherein $Sp^a$ denotes a group selected from —$CH_2$—, —$CH_2CH_2$—, —$OCH_2CH_2$—, —$CH_2CH_2CH_2$—, —$OCH_2CH_2CH_2$—, —$CH_2CH_2CH_2CH_2$—, —$OCH_2CH_2CH_2CH_2$—, —$CH_2CH_2OCH_2CH_2$—, and —$OCH_2CH_2OCH_2CH_2$—.

55. A compound according to claim 26, wherein $Sp^c$ or $Sp^d$ each independently denotes a group selected from —$CH_2$—, —$CH_2CH_2$—, —$CH_2CH_2CH_2$—, —$CH_2CH_2CH_2CH_2$—, and —$CH_2CH_2OCH_2CH_2$—.

56. A compound according to claim 26, wherein $R^1$ is n-pentyl.

57. A compound according to claim 26, wherein m is 2.

58. The medium according to claim 1, wherein said one or more polymerizable compounds of formula I are selected from the following formulae:

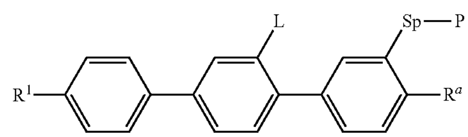

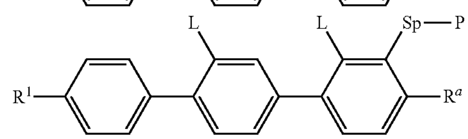

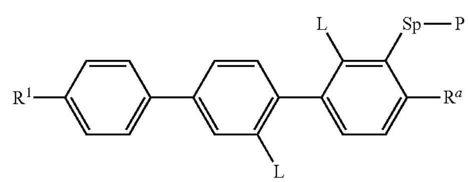

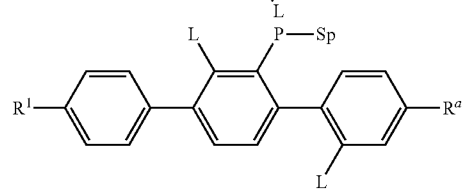

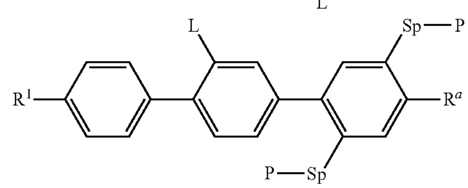

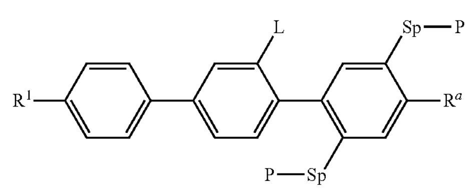

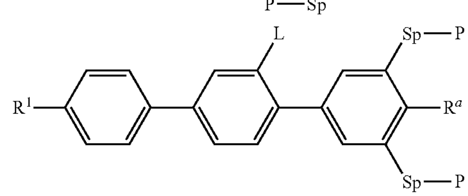

-continued
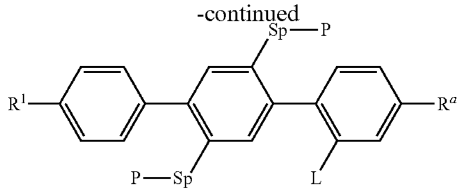
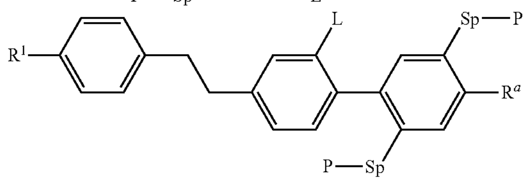
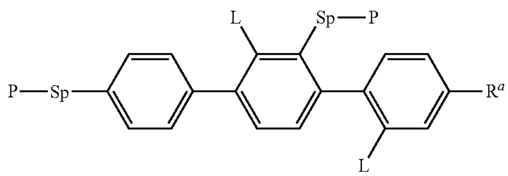
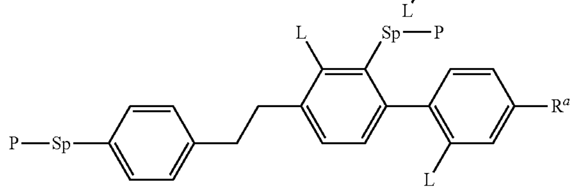
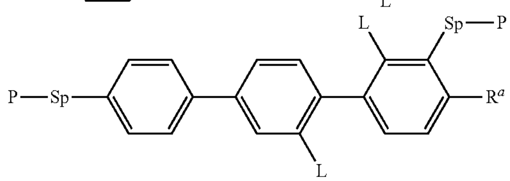
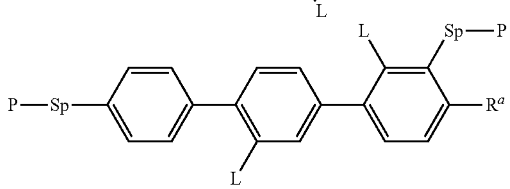
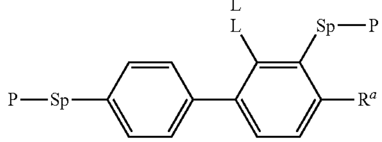
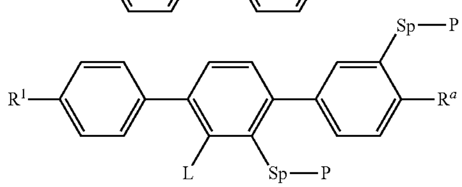
-continued
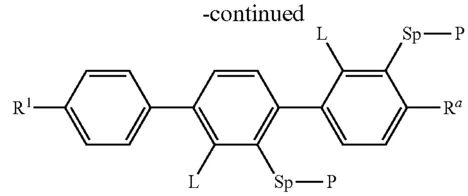
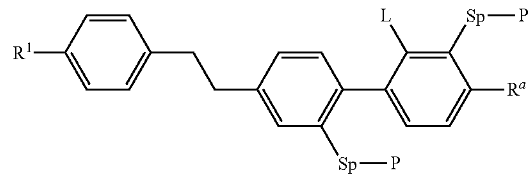
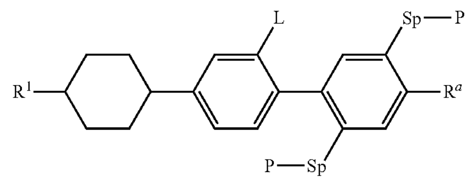
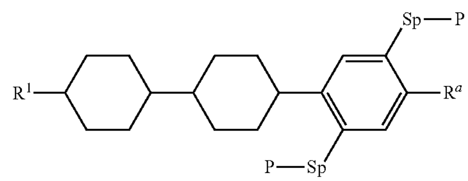
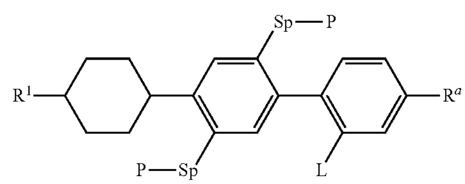
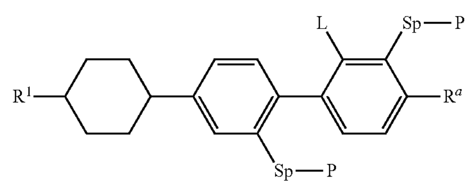
wherein $R^1$, Sp, P, L and $R^a$ independently are as defined in claim 1.
* * * * *